(12) United States Patent
Izumi et al.

(10) Patent No.: US 7,738,169 B2
(45) Date of Patent: Jun. 15, 2010

(54) INFRARED LENS, INFRARED CAMERA AND NIGHT VISION

(75) Inventors: Tatsuya Izumi, Osaka (JP); Chihiro Hiraiwa, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 258 days.

(21) Appl. No.: 11/919,754

(22) PCT Filed: Nov. 7, 2006

(86) PCT No.: PCT/JP2006/322195

§ 371 (c)(1),
(2), (4) Date: Nov. 1, 2007

(87) PCT Pub. No.: WO2007/086171

PCT Pub. Date: Aug. 2, 2007

(65) Prior Publication Data

US 2009/0027766 A1    Jan. 29, 2009

(30) Foreign Application Priority Data

Jan. 30, 2006  (JP) ............................ 2006-020411
Mar. 10, 2006  (JP) ............................ 2006-065401

(51) Int. Cl.
*G02B 13/14* (2006.01)
(52) U.S. Cl. ..................................................... 359/356
(58) Field of Classification Search ................. 359/356, 359/357
See application file for complete search history.

(56) References Cited

U.S. PATENT DOCUMENTS 3,363,962 A * 1/1968 Vogl ............................ 359/356
4,486,286 A * 12/1984 Lewin et al. ............ 204/192.11
5,940,224 A * 8/1999 Zhang ........................ 359/749
6,090,456 A    7/2000 Wu et al.
6,423,969 B1 * 7/2002 Amon .................... 250/339.01

(Continued)

FOREIGN PATENT DOCUMENTS

DE    2544148 A * 4/1976

(Continued)

OTHER PUBLICATIONS

International Preliminary Report on Patentability and Written Opinion of the International Searching Authority issued in International Application No. PCT/JP2006/322195, dated Aug. 14, 2008.

(Continued)

*Primary Examiner*—Alessandro Amari
*Assistant Examiner*—Mark Consilvio
(74) *Attorney, Agent, or Firm*—McDermott Will & Emery LLP

(57) ABSTRACT

An infrared lens 1a includes first to third lenses L1 to L3 which are made of zinc sulfide and arranged in this order from an object side. Each of the first to third lenses L1 to L3 is configured as a positive meniscus lens of which convex surface is opposed to the object. The lenses L1 to L3 are formed by heat-press molding raw powder of zinc sulfide using a lens-shaped mold. In addition, a concave surface (the surface opposed to the image side) of the first lens L1 is formed as a diffractive surface.

17 Claims, 137 Drawing Sheets

U.S. PATENT DOCUMENTS

| | | | |
|---|---|---|---|
| 6,989,537 B2 * | 1/2006 | Cook | 250/353 |
| 2003/0169491 A1 * | 9/2003 | Bender et al. | 359/356 |
| 2004/0212107 A1 * | 10/2004 | Hasegawa | 264/1.21 |
| 2004/0263978 A1 * | 12/2004 | Chipper | 359/566 |

FOREIGN PATENT DOCUMENTS

| | | |
|---|---|---|
| EP | 0 544 174 A1 | 6/1993 |
| EP | 0 950 904 A1 | 10/1999 |
| JP | 62-109014 | 5/1987 |
| JP | 7-113952 | 5/1995 |
| JP | 2003-295052 | 10/2003 |
| JP | 2003295052 A * | 10/2003 |
| JP | 2006197015 A * | 7/2006 |
| WO | WO 2004/099841 A2 | 11/2004 |

OTHER PUBLICATIONS

Supplementary European Search Report issued in European Patent Application No. 06 82 3099, dated Feb. 15, 2010.

* cited by examiner

FIG. 2

| SURFACE NO. | SURFACE TYPE | RADIUS OF CURVATURE | SURFACE SEPERATION | APERTURE RADIUS | MATERIAL |
|---|---|---|---|---|---|
| 1 | SPHERICAL SURFACE | 22.3377 | 4.5000 | 14.2100 | ZnS |
| 2 | DIFFRACTIVE-ASPHERIC SURFACE | 15.9574 | 17.8518 | 14.3522 | |
| 3 | SPHERICAL SURFACE | 19.2089 | 3.0000 | 8.5514 | ZnS |
| 4 | SPHERICAL SURFACE | 16.7373 | 2.5846 | 7.3917 | |
| 5 | ASPHERIC SURFACE | 14.8308 | 3.0000 | 6.8614 | ZnS |
| 6 | SPHERICAL SURFACE | 30.4551 | 5.3600 | 6.2488 | |
| 7 | SPHERICAL SURFACE | INFINITY | 1.0000 | 5.3257 | Ge |
| 8 | SPHERICAL SURFACE | INFINITY | 1.6400 | 5.2776 | |
| IMAGE | SPHERICAL SURFACE | INFINITY | 0.0000 | 5.0000 | |

FIG. 3

| | K | A2 | A4 | A6 | A8 |
|---|---|---|---|---|---|
| SECOND SURFACE | -7.9893E-01 | -1.7144E-02 | -3.6358E-07 | 3.0557E-10 | |
| FIFTH SURFACE | -9.3220E-01 | -1.5582E-02 | -6.5901E-05 | -3.2333E-07 | -8.8706E-09 |

| | C1 |
|---|---|
| SECOND SURFACE | -1.6402E-03 |

FIG. 16

| SURFACE NO. | SURFACE TYPE | RADIUS OF CURVATURE | SURFACE SEPERATION | APERTURE RADIUS | MATERIAL |
|---|---|---|---|---|---|
| 1 | SPHERICAL SURFACE | 20.4967 | 4.5000 | 12.9400 | ZnS |
| 2 | DIFFRACTIVE-ASPHERIC SURFACE | 14.6759 | 8.3369 | 12.9818 | |
| 3 | SPHERICAL SURFACE | 19.0768 | 3.0000 | 10.7579 | ZnS |
| 4 | SPHERICAL SURFACE | 20.2693 | 10.1523 | 9.7225 | |
| 5 | ASPHERIC SURFACE | 12.6812 | 3.0000 | 6.3437 | ZnS |
| 6 | SPHERICAL SURFACE | 20.9890 | 3.0000 | 5.6491 | |
| 7 | SPHERICAL SURFACE | INFINITY | 1.0000 | 5.2744 | Ge |
| 8 | SPHERICAL SURFACE | INFINITY | 1.6400 | 5.2329 | |
| IMAGE | SPHERICAL SURFACE | INFINITY | 0.0000 | 5.0000 | |

FIG. 17

| | K | A2 | A4 | A6 | A8 |
|---|---|---|---|---|---|
| SECOND SURFACE | -7.0519E-01 | -1.6564E-02 | -2.4059E-06 | -3.9480E-10 | |
| FIFTH SURFACE | -1.29963E+00 | -1.4784E-02 | -8.3211E-05 | -3.0822E-07 | -2.8793E-08 |

| | C1 |
|---|---|
| SECOND SURFACE | -1.9577E-03 |

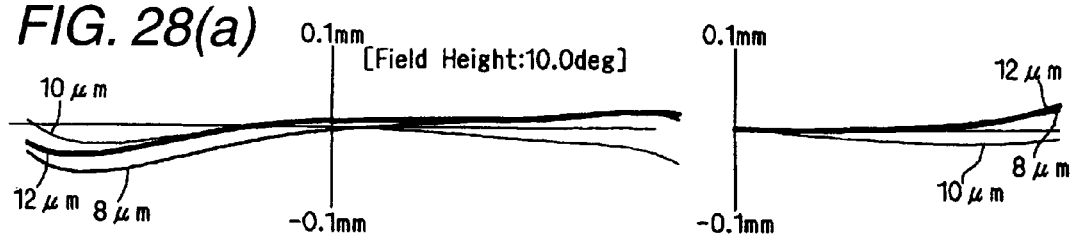
FIG. 28(a) [Field Height:10.0deg]
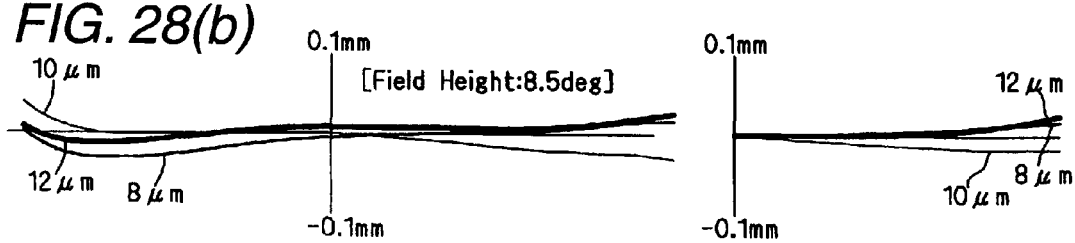
FIG. 28(b) [Field Height:8.5deg]
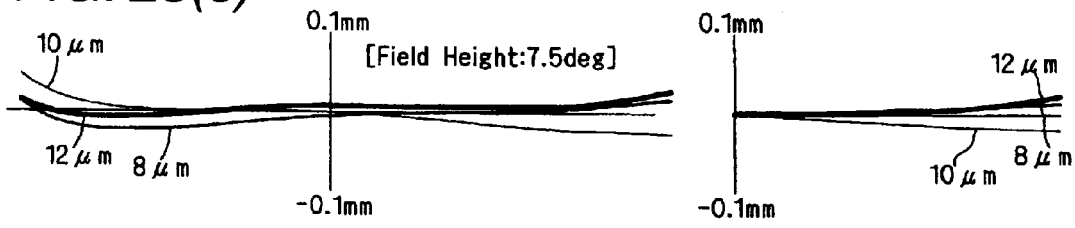
FIG. 28(c) [Field Height:7.5deg]
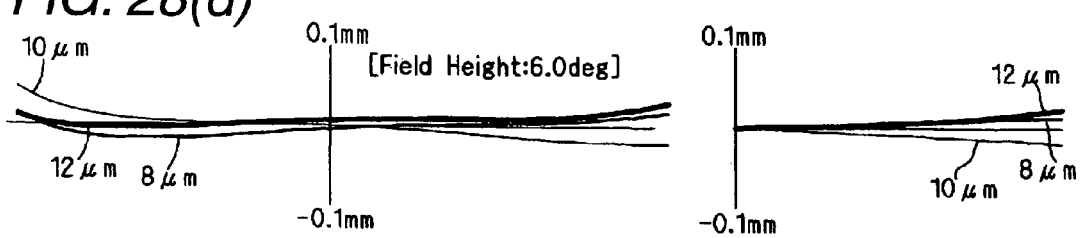
FIG. 28(d) [Field Height:6.0deg]
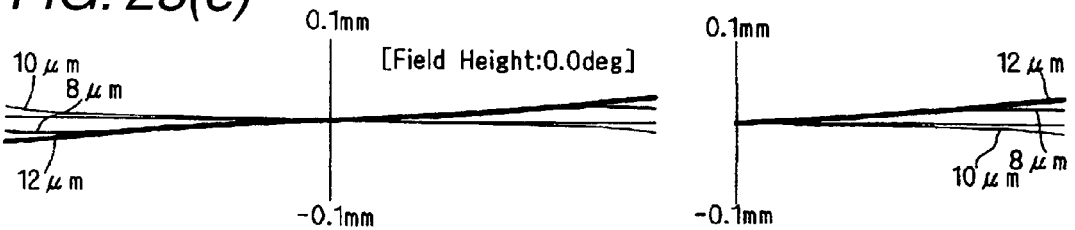
FIG. 28(e) [Field Height:0.0deg]

FIG. 30

| SURFACE NO. | SURFACE TYPE | RADIUS OF CURVATURE | SURFACE SEPERATION | APERTURE RADIUS | MATERIAL |
|---|---|---|---|---|---|
| 1 | SPHERICAL SURFACE | 22.3377 | 4.5000 | 15.0000 | ZnS |
| 2 | DIFFRACTIVE-ASPHERIC SURFACE | 15.9657 | 18.5491 | 15.2791 | |
| 3 | SPHERICAL SURFACE | 22.5141 | 3.0000 | 8.5078 | ZnS |
| 4 | SPHERICAL SURFACE | 21.9196 | 2.6985 | 7.4343 | |
| 5 | ASPHERIC SURFACE | 20.0000 | 3.0000 | 6.7327 | ZnS |
| 6 | SPHERICAL SURFACE | 47.9324 | 5.3600 | 6.2191 | |
| 7 | SPHERICAL SURFACE | INFINITY | 1.0000 | 5.3015 | Ge |
| 8 | SPHERICAL SURFACE | INFINITY | 1.6400 | 5.2560 | |
| IMAGE | SPHERICAL SURFACE | INFINITY | 0.0000 | 5.0000 | |

FIG. 31

| | K | A2 | A4 | A6 | A8 |
|---|---|---|---|---|---|
| SECOND SURFACE | −7.9029E−01 | −1.7216E−02 | −8.3792E−07 | −1.8118E−10 | |
| FIFTH SURFACE | −1.2942E+00 | −1.7521E−02 | −8.1670E−05 | −3.4213E−07 | −6.9304E−09 |

| | C1 |
|---|---|
| SECOND SURFACE | −1.6166E−03 |

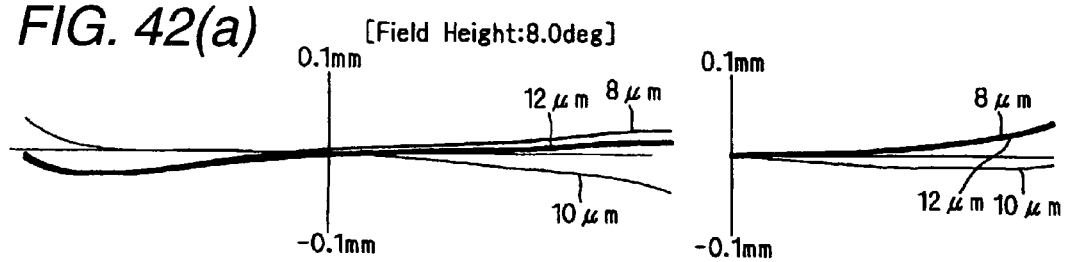
FIG. 42(a) [Field Height:8.0deg]
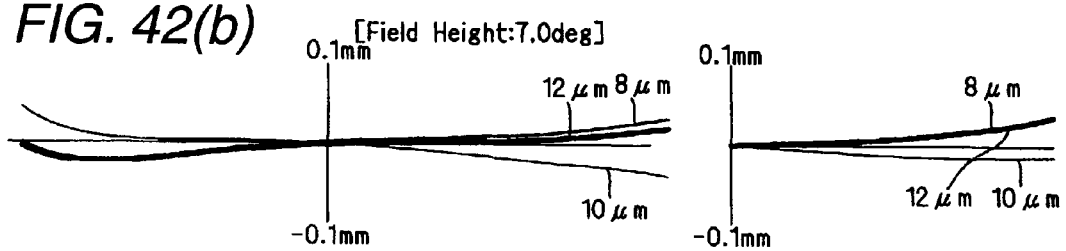
FIG. 42(b) [Field Height:7.0deg]
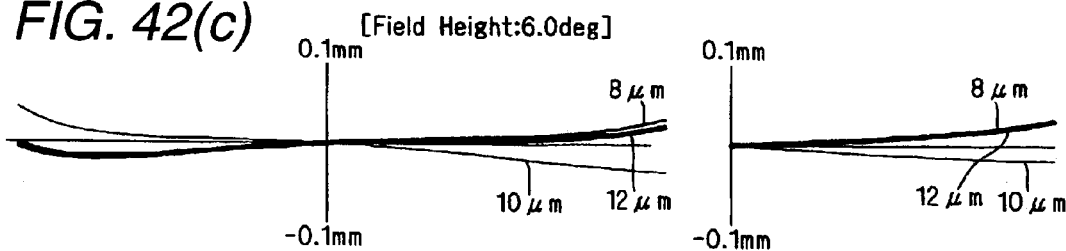
FIG. 42(c) [Field Height:6.0deg]
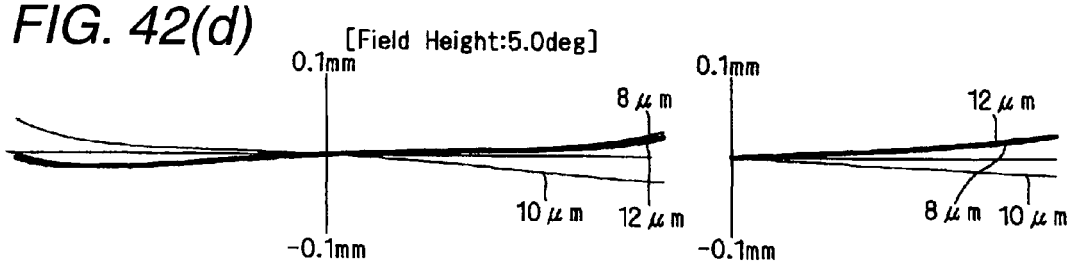
FIG. 42(d) [Field Height:5.0deg]
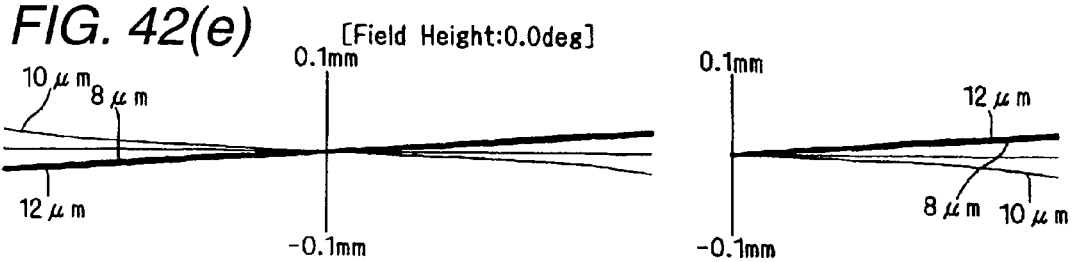
FIG. 42(e) [Field Height:0.0deg]

FIG. 44

| SURFACE NO. | SURFACE TYPE | RADIUS OF CURVATURE | SURFACE SEPERATION | APERTURE RADIUS | MATERIAL |
|---|---|---|---|---|---|
| 1 | SPHERICAL SURFACE | 20.4967 | 4.5000 | 12.9400 | ZnS |
| 2 | DIFFRACTIVE-ASPHERIC SURFACE | 14.5979 | 6.1413 | 12.9547 | |
| 3 | SPHERICAL SURFACE | 21.6194 | 3.0000 | 11.4364 | ZnS |
| 4 | SPHERICAL SURFACE | 24.1935 | 12.0784 | 10.4961 | |
| 5 | ASPHERIC SURFACE | 12.7794 | 3.0000 | 6.3502 | ZnS |
| 6 | SPHERICAL SURFACE | 21.2861 | 3.0000 | 5.6600 | |
| 7 | SPHERICAL SURFACE | INFINITY | 1.0000 | 5.2791 | Ge |
| 8 | SPHERICAL SURFACE | INFINITY | 1.6400 | 5.2371 | |
| IMAGE | SPHERICAL SURFACE | INFINITY | 0.0000 | 5.0000 | |

FIG. 45

| | K | A2 | A4 | A6 | A8 |
|---|---|---|---|---|---|
| SECOND SURFACE | -6.8618E-01 | -1.6344E-02 | -2.8989E-06 | -1.0997E-09 | |
| FIFTH SURFACE | -1.3893E+00 | -1.4689E-02 | -7.6255E-05 | -2.2758E-07 | -2.9637E-08 |

| | C1 |
|---|---|
| SECOND SURFACE | -1.9796E-03 |

FIG. 47

| SURFACE NO. | SURFACE TYPE | RADIUS OF CURVATURE | SURFACE SEPERATION | APERTURE RADIUS | MATERIAL |
|---|---|---|---|---|---|
| 1 | SPHERICAL SURFACE | 22.3377 | 4.5000 | 14.2100 | ZnS |
| 2 | DIFFRACITIVE-ASPHERIC SURFACE | 16.4084 | 15.8979 | 14.5090 | |
| 3 | SPHERICAL SURFACE | 37.2818 | 3.0000 | 8.4601 | ZnS |
| 4 | SPHERICAL SURFACE | 21.0746 | 2.8001 | 7.3857 | |
| 5 | ASPHERIC SURFACE | 12.9296 | 3.0000 | 6.7940 | ZnS |
| 6 | SPHERICAL SURFACE | 32.6818 | 5.3600 | 6.2556 | |
| 7 | SPHERICAL SURFACE | INFINITY | 1.0000 | 5.3230 | Ge |
| 8 | SPHERICAL SURFACE | INFINITY | 1.6400 | 5.2749 | |
| IMAGE | SPHERICAL SURFACE | INFINITY | 0.0000 | 5.0000 | |

FIG. 48

| | K | A2 | A4 | A6 | A8 |
|---|---|---|---|---|---|
| SECOND SURFACE | -8.2702E-01 | -1.8206E-02 | -5.0827E-08 | -6.1461E-10 | |
| FIFTH SURFACE | -8.7167E-01 | -1.5669E-02 | -6.8139E-05 | -2.2657E-07 | -1.3171E-08 |

| | C1 |
|---|---|
| SECOND SURFACE | -1.7082E-03 |

FIG. 49(a)

[EXAMPLE 1-5]

| f1/f | | 0.96 |
|---|---|---|
| f | | 31.1 |
| f1 | | 29.7 |
| F Value | | 1.1 |
| Maximum Diameter | | 28.4 |
| 12 μm | Sagittal | Tangential |
| 0° | 0.157 | 0.157 |
| 5.3° | 0.44 | 0.489 |
| 6.4° | 0.512 | 0.497 |
| 7.5° | 0.544 | 0.391 |
| 10 μm | Sagittal | Tangential |
| 0° | 0.616 | 0.616 |
| 5.3° | 0.323 | 0.288 |
| 6.4° | 0.222 | 0.292 |
| 7.5° | 0.16 | 0.412 |
| 8 μm | Sagittal | Tangential |
| 0° | 0.312 | 0.312 |
| 5.3° | 0.605 | 0.595 |
| 6.4° | 0.649 | 0.534 |
| 7.5° | 0.651 | 0.299 |
| 8~12 μm | Sagittal | Tangential |
| 0° | 0.501 | 0.501 |
| 5.3° | 0.493 | 0.476 |
| 6.4° | 0.461 | 0.459 |
| 7.5° | 0.427 | 0.439 |

FIG. 49(b)

[EXAMPLE 1-3]

| f1/f | | 1.00 |
|---|---|---|
| f | | 33.5 |
| f1 | | 33.5 |
| F Value | | 1.1 |
| Maximum Diameter | | 30.0 |
| 12 μm | Sagittal | Tangential |
| 0° | 0.28 | 0.28 |
| 5.0° | 0.398 | 0.414 |
| 6.0° | 0.423 | 0.413 |
| 7.0° | 0.441 | 0.37 |
| 10 μm | Sagittal | Tangential |
| 0° | 0.489 | 0.489 |
| 5.0° | 0.365 | 0.353 |
| 6.0° | 0.326 | 0.354 |
| 7.0° | 0.293 | 0.394 |
| 8 μm | Sagittal | Tangential |
| 0° | 0.369 | 0.369 |
| 5.0° | 0.468 | 0.431 |
| 6.0° | 0.458 | 0.379 |
| 7.0° | 0.487 | 0.254 |
| 8~12 μm | Sagittal | Tangential |
| 0° | 0.495 | 0.495 |
| 5.0° | 0.483 | 0.466 |
| 6.0° | 0.471 | 0.45 |
| 7.0° | 0.456 | 0.428 |

FIG. 49(c)

[EXAMPLE 1-1]

| f1/f | | 1.10 |
|---|---|---|
| f | | 31.3 |
| f1 | | 34.4 |
| F Value | | 1.1 |
| Maximum Diameter | | 28.4 |
| 12 μm | Sagittal | Tangential |
| 0° | 0.269 | 0.269 |
| 5.3° | 0.464 | 0.506 |
| 6.4° | 0.516 | 0.512 |
| 7.5° | 0.54 | 0.443 |
| 10 μm | Sagittal | Tangential |
| 0° | 0.593 | 0.593 |
| 5.3° | 0.392 | 0.355 |
| 6.4° | 0.32 | 0.361 |
| 7.5° | 0.271 | 0.444 |
| 8 μm | Sagittal | Tangential |
| 0° | 0.37 | 0.37 |
| 5.3° | 0.566 | 0.551 |
| 6.4° | 0.597 | 0.491 |
| 7.5° | 0.594 | 0.292 |
| 8~12 μm | Sagittal | Tangential |
| 0° | 0.528 | 0.528 |
| 5.3° | 0.522 | 0.493 |
| 6.4° | 0.502 | 0.482 |
| 7.5° | 0.477 | 0.467 |

FIG. 50(a)
[EXAMPLE 1-2]

| f1/f | 1.40 |
|---|---|
| f | 25.9 |
| f1 | 36.2 |
| F Value | 1.0 |
| Maximum Diameter | 25.9 |

| 12 μm | Sagittal | Tangential |
|---|---|---|
| 0° | 0.265 | 0.265 |
| 6.0° | 0.555 | 0.562 |
| 7.5° | 0.611 | 0.557 |
| 8.5° | 0.613 | 0.474 |
| 10 μm | Sagittal | Tangential |
| 0° | 0.702 | 0.702 |
| 6.0° | 0.43 | 0.44 |
| 7.5° | 0.298 | 0.43 |
| 8.5° | 0.235 | 0.487 |
| 8 μm | Sagittal | Tangential |
| 0° | 0.295 | 0.295 |
| 6.0° | 0.595 | 0.527 |
| 7.5° | 0.631 | 0.434 |
| 8.5° | 0.617 | 0.25 |
| 8~12 μm | Sagittal | Tangential |
| 0° | 0.547 | 0.547 |
| 6.0° | 0.557 | 0.494 |
| 7.5° | 0.505 | 0.454 |
| 8.5° | 0.463 | 0.429 |

FIG. 50(b)
[EXAMPLE 1-4]

| f1/f | 1.45 |
|---|---|
| f | 25.9 |
| f1 | 37.5 |
| F Value | 1.1 |
| Maximum Diameter | 25.9 |

| 12 μm | Sagittal | Tangential |
|---|---|---|
| 0° | 0.176 | 0.176 |
| 6.0° | 0.516 | 0.538 |
| 7.5° | 0.6 | 0.657 |
| 8.5° | 0.611 | 0.489 |
| 10 μm | Sagittal | Tangential |
| 0° | 0.732 | 0.732 |
| 6.0° | 0.475 | 0.464 |
| 7.5° | 0.314 | 0.42 |
| 8.5° | 0.23 | 0.462 |
| 8 μm | Sagittal | Tangential |
| 0° | 0.178 | 0.178 |
| 6.0° | 0.551 | 0.495 |
| 7.5° | 0.621 | 0.444 |
| 8.5° | 0.622 | 0.284 |
| 8~12 μm | Sagittal | Tangential |
| 0° | 0.501 | 0.501 |
| 6.0° | 0.562 | 0.51 |
| 7.5° | 0.51 | 0.471 |
| 8.5° | 0.462 | 0.446 |

FIG. 52

| SURFACE NO. | SURFACE TYPE | RADIUS OF CURVATURE | SURFACE SEPERATION | APERTURE RADIUS | MATERIAL |
|---|---|---|---|---|---|
| 1 | SPHERICAL SURFACE | 18.0000 | 4.0000 | 10.0000 | ZnS |
| 2 | DIFFRACTIVE-ASPHERIC SURFACE | 14.2526 | 6.3365 | 10.4418 | |
| 3 | SPHERICAL SURFACE | -33.0485 | 3.0000 | 9.9751 | ZnS |
| 4 | ASPHERIC SURFACE | -38.4228 | 5.1600 | 10.2512 | |
| 5 | ASPHERIC SURFACE | 13.5000 | 3.0000 | 6.6597 | ZnS |
| 6 | ASPHERIC SURFACE | 15.6823 | 2.0000 | 6.4704 | |
| 7 | SPHERICAL SURFACE | INFINITY | 1.0000 | 6.1527 | Ge |
| 8 | SPHERICAL SURFACE | INFINITY | 3.0000 | 6.0772 | |
| IMAGE | SPHERICAL SURFACE | INFINITY | 0.0000 | 5.1620 | |

FIG. 53

| | K | A2 | A4 | A6 | A8 |
|---|---|---|---|---|---|
| SECOND SURFACE | 2.0726E-01 | -2.1604E-02 | -3.7010E-05 | -8.9515E-08 | -6.8782E-10 |
| FOURTH SURFACE | 3.3003E-01 | 2.2849E-03 | -9.2519E-05 | 4.3787E-07 | -1.6159E-09 |
| FIFTH SURFACE | -1.0410E+00 | 1.2355E-02 | -2.4896E-05 | -5.0000E-06 | -9.0000E-08 |
| SIXTH SURFACE | -4.8438E-02 | 9.6688E-03 | 2.5438E-04 | -2.5487E-05 | 2.0189E-07 |

| | C1 | C2 |
|---|---|---|
| SECOND SURFACE | -2.5090E-03 | -1.8156E-06 |

FIG. 66

| SURFACE NO. | SURFACE TYPE | RADIUS OF CURVATURE | SURFACE SEPERATION | APERTURE RADIUS | MATERIAL |
|---|---|---|---|---|---|
| 1 | SPHERICAL SURFACE | 18.0000 | 4.0000 | 7.9000 | ZnS |
| 2 | DIFFRACTIVE-ASPHERIC SURFACE | 14.2404 | 7.3269 | 8.0660 | |
| 3 | SPHERICAL SURFACE | -48.9511 | 3.0000 | 7.1453 | ZnS |
| 4 | ASPHERIC SURFACE | -76.2187 | 2.9287 | 7.1856 | |
| 5 | ASPHERIC SURFACE | 15.5704 | 3.0000 | 6.4042 | ZnS |
| 6 | ASPHERIC SURFACE | 22.1410 | 2.0000 | 6.3807 | |
| 7 | SPHERICAL SURFACE | INFINITY | 1.0000 | 6.0082 | Ge |
| 8 | SPHERICAL SURFACE | INFINITY | 3.0000 | 5.9428 | |
| IMAGE | SPHERICAL SURFACE | INFINITY | 0.0000 | 5.1620 | |

FIG. 67

| | K | A2 | A4 | A6 | A8 |
|---|---|---|---|---|---|
| SECOND SURFACE | 5.0766E-01 | -2.3365E-02 | -5.4193E-05 | -1.5291E-07 | -2.4934E-09 |
| FOURTH SURFACE | -2.4421E+02 | 1.2503E-02 | -3.2198E-04 | 2.9525E-06 | -1.8892E-08 |
| FIFTH SURFACE | -6.4449E-01 | 2.1236E-02 | -8.3177E-05 | -2.8219E-06 | -1.5459E-07 |
| SIXTH SURFACE | 2.8693E+00 | 5.9878E-03 | 4.5095E-04 | -3.0227E-05 | 2.4125E-07 |

| | C1 | C2 |
|---|---|---|
| SECOND SURFACE | -2.6483E-03 | -3.7648E-07 |

FIG. 78(a)
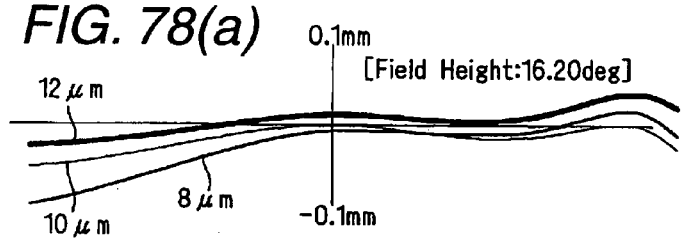 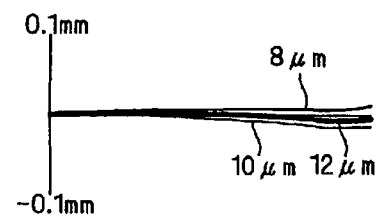
FIG. 78(b)
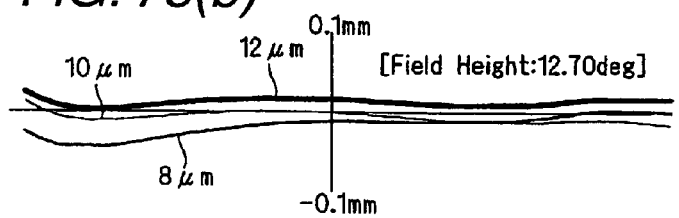 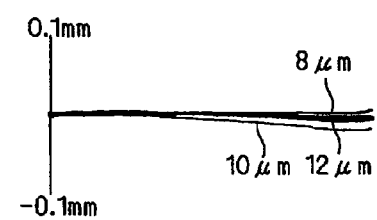
FIG. 78(c)
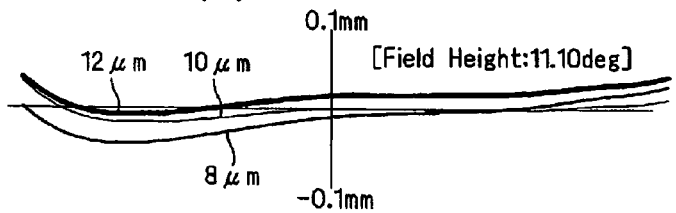 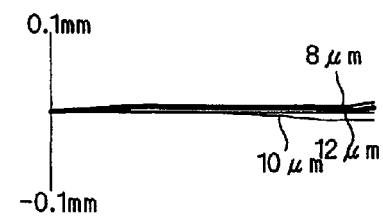
FIG. 78(d)
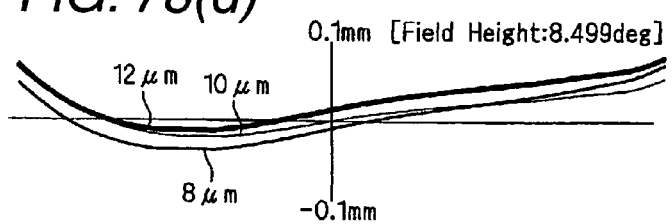 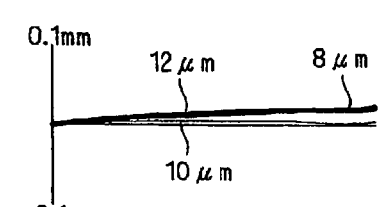
FIG. 78(e)
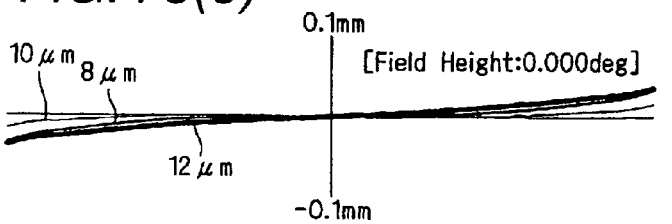 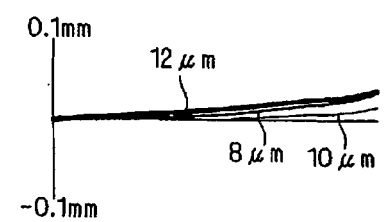

FIG. 80

| SURFACE NO. | SURFACE TYPE | RADIUS OF CURVATURE | SURFACE SEPERATION | APERTURE RADIUS | MATERIAL |
|---|---|---|---|---|---|
| 1 | SPHERICAL SURFACE | 18.0000 | 4.0000 | 8.6000 | ZnS |
| 2 | DIFFRACTIVE-ASPHERIC SURFACE | 13.7409 | 5.0742 | 8.7424 | |
| 3 | SPHERICAL SURFACE | -64.3102 | 3.0000 | 9.3304 | ZnS |
| 4 | ASPHERIC SURFACE | -56.0293 | 4.8309 | 9.6349 | |
| 5 | ASPHERIC SURFACE | 16.6967 | 3.0000 | 6.1931 | ZnS |
| 6 | ASPHERIC SURFACE | 17.4714 | 2.0000 | 5.9986 | |
| 7 | SPHERICAL SURFACE | INFINITY | 1.0000 | 5.7599 | Ge |
| 8 | SPHERICAL SURFACE | INFINITY | 3.0000 | 5.7144 | |
| IMAGE | SPHERICAL SURFACE | INFINITY | 0.0000 | 5.1620 | |

FIG. 81

| | K | A2 | A4 | A6 | A8 |
|---|---|---|---|---|---|
| SECOND SURFACE | 7.7922E-01 | -2.2791E-02 | -3.9176E-05 | -3.4137E-07 | 6.6325E-10 |
| FOURTH SURFACE | 7.2130E+00 | 1.6447E-04 | -1.5011E-04 | 6.0700E-07 | -3.3086E-09 |
| FIFTH SURFACE | 5.2560E+00 | 1.4656E-02 | -5.1272E-04 | -1.1140E-05 | -1.0731E-07 |
| SIXTH SURFACE | -2.1128E+00 | 1.4387E-02 | -1.7378E-04 | -2.5218E-05 | 3.5498E-07 |

| | C1 | C2 |
|---|---|---|
| SECOND SURFACE | -2.3030E-03 | -1.1871E-05 |

FIG. 92(a) 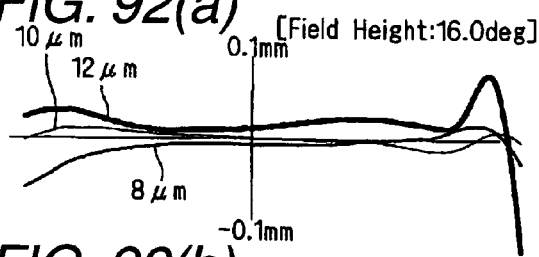 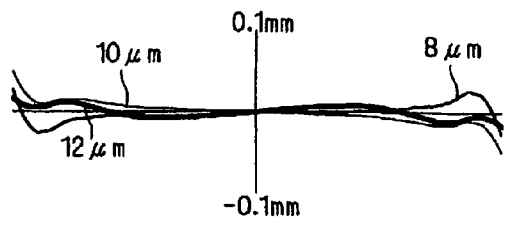
FIG. 92(b) 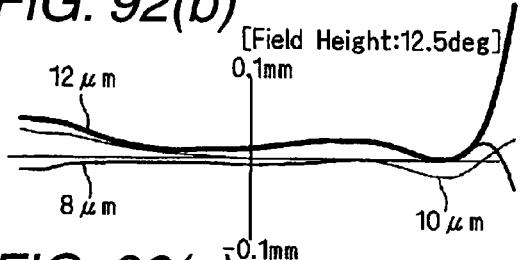 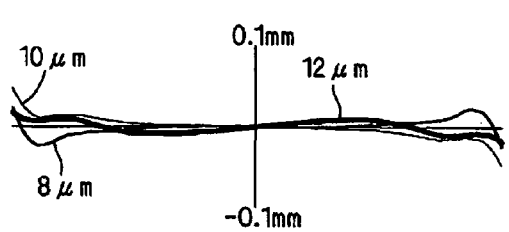
FIG. 92(c) 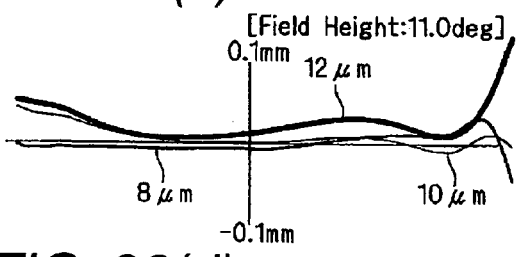 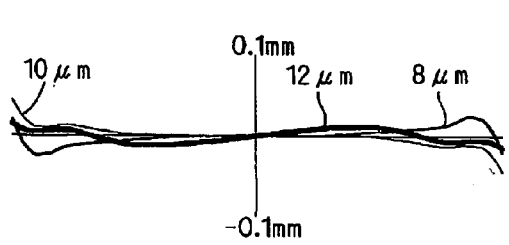
FIG. 92(d) 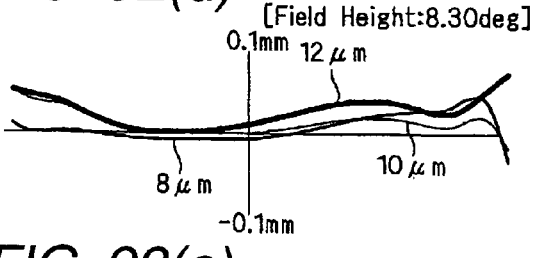 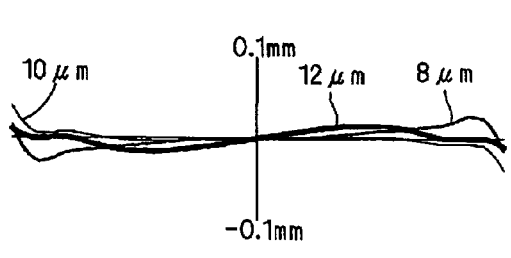
FIG. 92(e) 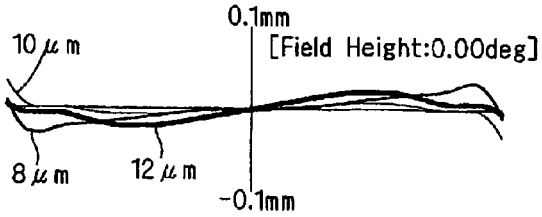 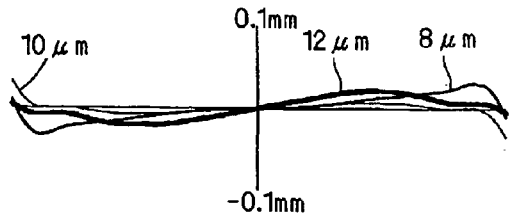

FIG. 94

| SURFACE NO. | SURFACE TYPE | RADIUS OF CURVATURE | SURFACE SEPERATION | APERTURE RADIUS | MATERIAL |
|---|---|---|---|---|---|
| 1 | SPHERICAL SURFACE | 18.0000 | 4.0000 | 7.9000 | ZnS |
| 2 | DIFFRACTIVE-ASPHERIC SURFACE | 13.9911 | 8.6198 | 8.0708 | |
| 3 | SPHERICAL SURFACE | -58.4709 | 3.0000 | 7.3335 | ZnS |
| 4 | ASPHERIC SURFACE | -64.5747 | 2.1515 | 7.4058 | |
| 5 | ASPHERIC SURFACE | 15.4556 | 3.0000 | 6.7168 | ZnS |
| 6 | ASPHERIC SURFACE | 19.9993 | 2.0000 | 6.5917 | |
| 7 | SPHERICAL SURFACE | INFINITY | 1.0000 | 6.2059 | Ge |
| 8 | SPHERICAL SURFACE | INFINITY | 3.0000 | 6.1289 | |
| IMAGE | SPHERICAL SURFACE | INFINITY | 0.0000 | 5.1620 | |

FIG. 95

| | K | A2 | A4 | A6 | A8 |
|---|---|---|---|---|---|
| SECOND SURFACE | 4.6149E-01 | -2.1614E-02 | -5.5976E-05 | -8.6927E-08 | -3.2906E-09 |
| FOURTH SURFACE | 6.3388E+00 | 1.2550E-02 | -2.9233E-04 | 2.9385E-06 | -1.6191E-08 |
| FIFTH SURFACE | -1.2386E+00 | 2.2980E-02 | -5.5223E-05 | -1.8178E-06 | -1.0978E-07 |
| SIXTH SURFACE | 5.2396E+00 | 5.5761E-03 | 3.0683E-04 | -2.2402E-05 | 1.2193E-07 |

| | C1 | C2 |
|---|---|---|
| SECOND SURFACE | -2.7292E-03 | 4.0382E-07 |

FIG. 97

| SURFACE NO. | SURFACE TYPE | RADIUS OF CURVATURE | SURFACE SEPERATION | APERTURE RADIUS | MATERIAL |
|---|---|---|---|---|---|
| 1 | SPHERICAL SURFACE | 18.0000 | 4.0000 | 8.6000 | ZnS |
| 2 | DIFFRACTIVE-ASPHERIC SURFACE | 13.7275 | 5.7436 | 8.7314 | |
| 3 | SPHERICAL SURFACE | -61.0982 | 3.0000 | 9.4498 | ZnS |
| 4 | ASPHERIC SURFACE | -48.3198 | 4.3059 | 9.7294 | |
| 5 | ASPHERIC SURFACE | 16.7104 | 3.0000 | 6.2414 | ZnS |
| 6 | ASPHERIC SURFACE | 18.2298 | 2.0000 | 5.9723 | |
| 7 | SPHERICAL SURFACE | INFINITY | 1.0000 | 5.7319 | Ge |
| 8 | SPHERICAL SURFACE | INFINITY | 3.0000 | 5.6883 | |
| IMAGE | SPHERICAL SURFACE | INFINITY | 0.0000 | 5.1620 | |

FIG. 98

| | K | A2 | A4 | A6 | A8 |
|---|---|---|---|---|---|
| SECOND SURFACE | 7.6833E-01 | -2.1987E-02 | -4.0007E-05 | -3.1099E-07 | 4.2299E-10 |
| FOURTH SURFACE | 1.8339E+00 | -1.7225E-03 | -1.4540E-04 | 6.4816E-07 | -3.2767E-09 |
| FIFTH SURFACE | 5.0250E+00 | 9.6376E-03 | -5.3279E-04 | -1.3050E-05 | 6.4585E-10 |
| SIXTH SURFACE | -3.8730E+00 | 1.1975E-02 | -2.4253E-04 | -2.0361E-05 | 3.2970E-07 |

| | C1 | C2 |
|---|---|---|
| SECOND SURFACE | -2.3294E-03 | -1.2615E-05 |

FIG. 99(a)

[EXAMPLE 2-5]

| | | |
|---|---|---|
| f12/f | 1.00 | |
| f | 17.0 | |
| f12 | 17.00 | |
| F Value | 1.01 | |
| Maximum Diameter | 17.2 | |
| View Angle | 32° | |
| 12 μm | Sagittal | Tangential |
| 0° | 0.255 | 0.256 |
| 11.0° | 0.568 | 0.535 |
| 12.5° | 0.538 | 0.416 |
| 16.0° | 0.444 | 0.562 |
| 10 μm | Sagittal | Tangential |
| 0° | 0.645 | 0.645 |
| 11.0° | 0.446 | 0.416 |
| 12.5° | 0.308 | 0.212 |
| 16.0° | 0.149 | 0.439 |
| 8 μm | Sagittal | Tangential |
| 0° | 0.104 | 0.104 |
| 11.0° | 0.617 | 0.584 |
| 12.5° | 0.685 | 0.666 |
| 16.0° | 0.613 | 0.497 |
| 8~12 μm | Sagittal | Tangential |
| 0° | 0.421 | 0.421 |
| 11.0° | 0.545 | 0.297 |
| 12.5° | 0.481 | 0.171 |
| 16.0° | 0.349 | 0.172 |

FIG. 99(b)

[EXAMPLE 2-3]

| | | |
|---|---|---|
| f12/f | 1.05 | |
| f | 17.0 | |
| f12 | 17.85 | |
| F Value | 1.01 | |
| Maximum Diameter | 17.2 | |
| View Angle | 32° | |
| 12 μm | Sagittal | Tangential |
| 0° | 0.275 | 0.275 |
| 11.0° | 0.514 | 0.507 |
| 12.5° | 0.537 | 0.465 |
| 16.0° | 0.612 | 0.552 |
| 10 μm | Sagittal | Tangential |
| 0° | 0.687 | 0.687 |
| 11.0° | 0.468 | 0.458 |
| 12.5° | 0.407 | 0.297 |
| 16.0° | 0.469 | 0.492 |
| 8 μm | Sagittal | Tangential |
| 0° | 0.208 | 0.208 |
| 11.0° | 0.532 | 0.528 |
| 12.5° | 0.599 | 0.663 |
| 16.0° | 0.61 | 0.486 |
| 8~12 μm | Sagittal | Tangential |
| 0° | 0.477 | 0.477 |
| 11.0° | 0.519 | 0.334 |
| 12.5° | 0.512 | 0.255 |
| 16.0° | 0.565 | 0.252 |

FIG. 99(c)

[EXAMPLE 2-1]

| | | |
|---|---|---|
| f12/f | 1.25 | |
| f | 17.7 | |
| f12 | 22.19 | |
| F Value | 0.89 | |
| Maximum Diameter | 20.0 | |
| View Angle | 31° | |
| 12 μm | Sagittal | Tangential |
| 0° | 0.393 | 0.393 |
| 10.9° | 0.664 | 0.642 |
| 12.15° | 0.676 | 0.584 |
| 15.34° | 0.636 | 0.636 |
| 10 μm | Sagittal | Tangential |
| 0° | 0.74 | 0.74 |
| 10.9° | 0.385 | 0.516 |
| 12.15° | 0.358 | 0.421 |
| 15.34° | 0.595 | 0.573 |
| 8 μm | Sagittal | Tangential |
| 0° | 0.476 | 0.476 |
| 10.9° | 0.594 | 0.441 |
| 12.15° | 0.624 | 0.499 |
| 15.34° | 0.468 | 0.232 |
| 8~12 μm | Sagittal | Tangential |
| 0° | 0.623 | 0.623 |
| 10.9° | 0.535 | 0.289 |
| 12.15° | 0.534 | 0.214 |
| 15.34° | 0.594 | 0.25 |

FIG. 100(d)

[EXAMPLE 2-2]

| f12/f | 1.75 |
|---|---|
| f | 17.0 |
| f12 | 29.75 |
| F Value | 1.08 |
| Maximum Diameter | 15.8 |
| View Angle | 32° |

| 12 μm | Sagittal | Tangential |
|---|---|---|
| 0° | 0.263 | 0.263 |
| 11.1° | 0.431 | 0.451 |
| 12.7° | 0.544 | 0.514 |
| 16.2° | 0.64 | 0.39 |

| 10 μm | Sagittal | Tangential |
|---|---|---|
| 0° | 0.683 | 0.683 |
| 11.1° | 0.464 | 0.503 |
| 12.7° | 0.433 | 0.46 |
| 16.2° | 0.595 | 0.422 |

| 8 μm | Sagittal | Tangential |
|---|---|---|
| 0° | 0.457 | 0.457 |
| 11.1° | 0.394 | 0.256 |
| 12.7° | 0.549 | 0.47 |
| 16.2° | 0.638 | 0.309 |

| 8~12 μm | Sagittal | Tangential |
|---|---|---|
| 0° | 0.531 | 0.531 |
| 11.1° | 0.449 | 0.254 |
| 12.7° | 0.499 | 0.208 |
| 16.2° | 0.634 | 0.277 |

FIG. 100(e)

[EXAMPLE 2-4]

| f12/f | 1.80 |
|---|---|
| f | 16.6 |
| f12 | 29.88 |
| F Value | 1.05 |
| Maximum Diameter | 15.8 |
| View Angle | 33° |

| 12 μm | Sagittal | Tangential |
|---|---|---|
| 0° | 0.138 | 0.138 |
| 11.4° | 0.578 | 0.604 |
| 13.1° | 0.397 | 0.487 |
| 16.7° | 0.309 | 0.271 |

| 10 μm | Sagittal | Tangential |
|---|---|---|
| 0° | 0.52 | 0.52 |
| 11.4° | 0.341 | 0.581 |
| 13.1° | 0.133 | 0.482 |
| 16.7° | 0.143 | 0.34 |

| 8 μm | Sagittal | Tangential |
|---|---|---|
| 0° | 0.117 | 0.117 |
| 11.4° | 0.671 | 0.499 |
| 13.1° | 0.616 | 0.561 |
| 16.7° | 0.646 | 0.276 |

| 8~12 μm | Sagittal | Tangential |
|---|---|---|
| 0° | 0.325 | 0.325 |
| 11.4° | 0.492 | 0.129 |
| 13.1° | 0.32 | 0.121 |
| 16.7° | 0.311 | 0.133 |

FIG. 102

| SURFACE NO. | SURFACE TYPE | RADIUS OF CURVATURE | SURFACE SEPERATION | APERTURE RADIUS | MATERIAL |
|---|---|---|---|---|---|
| 1 | ASPHERIC SURFACE | 17.0000 | 4.5000 | 9.0000 | ZnS |
| 2 | DIFFRACTIVE-ASPHERIC SURFACE | 13.3037 | 12.7984 | 9.4371 | |
| 3 | ASPHERIC SURFACE | 17.1086 | 4.5000 | 6.6706 | ZnS |
| 4 | ASPHERIC SURFACE | 15.4516 | 1.4158 | 5.9518 | |
| 5 | SPHERICAL SURFACE | INFINITY | 1.0000 | 5.8479 | Ge |
| 6 | SPHERICAL SURFACE | INFINITY | 3.0000 | 5.7970 | |
| IMAGE | SPHERICAL SURFACE | INFINITY | 0.0000 | 5.1620 | |

FIG. 103

| | K | A2 | A4 | A6 | A8 |
|---|---|---|---|---|---|
| FIRST SURFACE | -0.929450 | | -0.386325E-05 | 0.760675E-07 | -0.411458E-08 |
| SECOND SURFACE | 2.0244E-01 | -1.9000E-02 | -8.9206E-05 | -5.1301E-07 | -4.5331E-09 |
| THIRD SURFACE | -9.4992E-01 | 6.7754E-03 | 1.2199E-06 | -5.9156E-07 | -6.2025E-08 |
| FOURTH SURFACE | 3.9757E+00 | -3.2269E-03 | 4.2604E-05 | -8.2740E-06 | -1.0935E-07 |

| | C1 | C2 |
|---|---|---|
| SECOND SURFACE | -2.3848E-03 | |

FIG. 114(a) [Field Height:14.97deg]
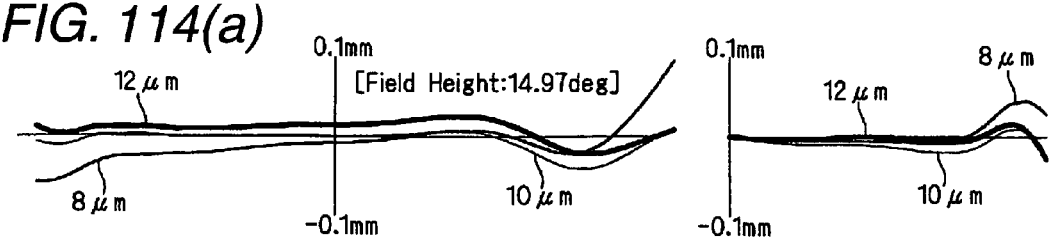
FIG. 114(b) [Field Height:12.00deg]
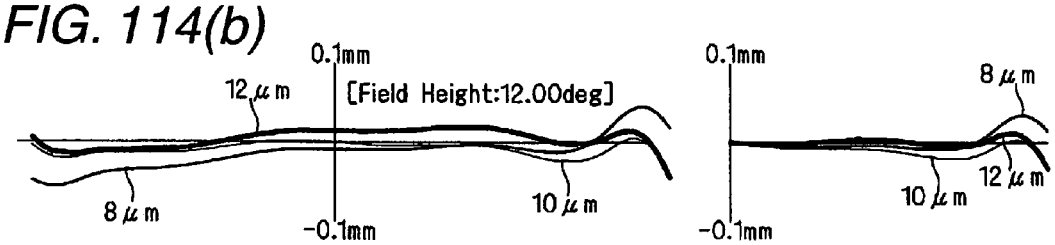
FIG. 114(c) [Field Height:10.50deg]
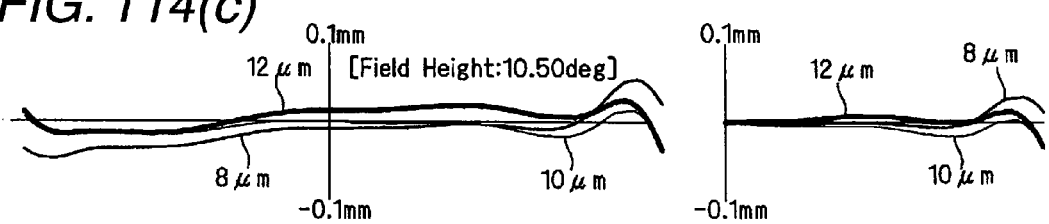
FIG. 114(d) [Field Height:7.998deg]
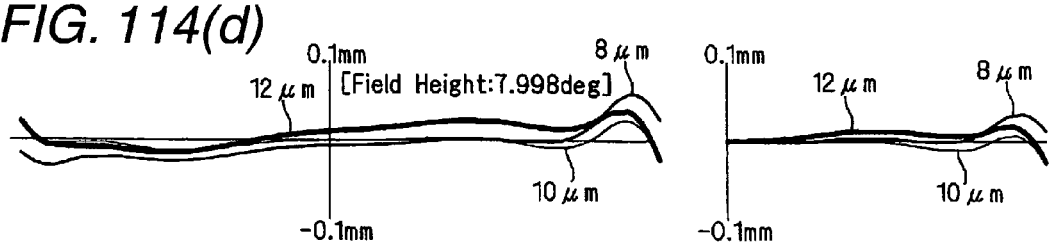
FIG. 114(e) [Field Height:0.000deg]
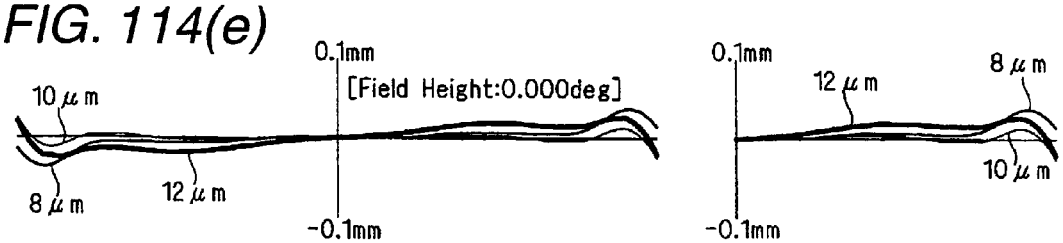

FIG. 116

| SURFACE NO. | SURFACE TYPE | RADIUS OF CURVATURE | SURFACE SEPERATION | APERTURE RADIUS | MATERIAL |
|---|---|---|---|---|---|
| 1 | ASPHERIC SURFACE | 17.5000 | 5.0000 | 8.3000 | ZnS |
| 2 | DIFFRACTIVE-ASPHERIC SURFACE | 13.6827 | 12.9297 | 8.4555 | |
| 3 | ASPHERIC SURFACE | 13.6557 | 4.7000 | 6.7057 | ZnS |
| 4 | ASPHERIC SURFACE | 10.3927 | 1.5733 | 5.9572 | |
| 5 | SPHERICAL SURFACE | INFINITY | 1.0000 | 5.8490 | Ge |
| 6 | SPHERICAL SURFACE | INFINITY | 3.0000 | 5.7961 | |
| IMAGE | SPHERICAL SURFACE | INFINITY | 0.0000 | 5.1620 | |

FIG. 117

| | K | A2 | A4 | A6 | A8 |
|---|---|---|---|---|---|
| FIRST SURFACE | -0.895748 | | -0.210790E-05 | -0.879648E-07 | -0.227502E-08 |
| SECOND SURFACE | 2.8923E-01 | -1.7323E-02 | -9.1931E-05 | -6.1953E-07 | -3.1357E-09 |
| THIRD SURFACE | -5.9378E-01 | 1.4711E-03 | 1.9302E-04 | -9.3046E-06 | 1.8308E-07 |
| FOURTH SURFACE | 1.1418E+00 | -1.6633E-02 | 1.2087E-04 | -8.7105E-06 | -1.9575E-07 |

| | C1 | C2 |
|---|---|---|
| SECOND SURFACE | -2.5065E-03 | 3.2643E-06 |

FIG. 130

| SURFACE NO. | SURFACE TYPE | RADIUS OF CURVATURE | SURFACE SEPERATION | APERTURE RADIUS | MATERIAL |
|---|---|---|---|---|---|
| 1 | ASPHERIC SURFACE | 17.5000 | 4.5000 | 8.6500 | ZnS |
| 2 | DIFFRACTIVE-ASPHERIC SURFACE | 13.6751 | 12.3769 | 9.2028 | |
| 3 | ASPHERIC SURFACE | 19.9507 | 4.5000 | 6.2868 | ZnS |
| 4 | ASPHERIC SURFACE | 18.4507 | 1.1189 | 5.8970 | |
| 5 | SPHERICAL SURFACE | INFINITY | 1.0000 | 5.8005 | Ge |
| 6 | SPHERICAL SURFACE | INFINITY | 3.0000 | 5.7532 | |
| IMAGE | SPHERICAL SURFACE | INFINITY | 0.0000 | 5.1620 | |

FIG. 131

| | K | A2 | A4 | A6 | A8 |
|---|---|---|---|---|---|
| FIRST SURFACE | -1.180270 | | -0.973826E-05 | -0.176072E-07 | -0.632770E-08 |
| SECOND SURFACE | 2.5018E-01 | -2.0627E-02 | -1.0182E-04 | -9.5761E-07 | -2.3789E-09 |
| THIRD SURFACE | -2.3273E+00 | 6.4685E-03 | -4.2715E-05 | -3.6232E-06 | -4.6176E-08 |
| FOURTH SURFACE | -1.6274E+00 | -8.9642E-04 | 1.7366E-04 | -1.5920E-05 | 1.2440E-07 |

| | C1 | C2 |
|---|---|---|
| SECOND SURFACE | -2.3581E-03 | |

FIG. 142(a)
FIG. 142(b)
FIG. 142(c)
FIG. 142(d)
FIG. 142(e)
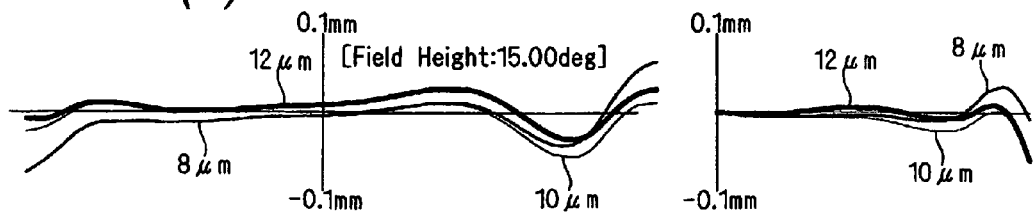
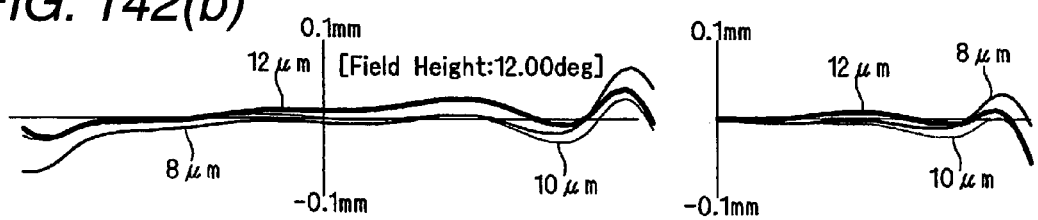
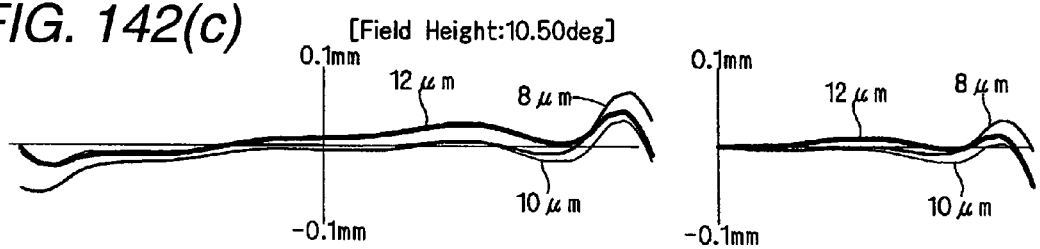
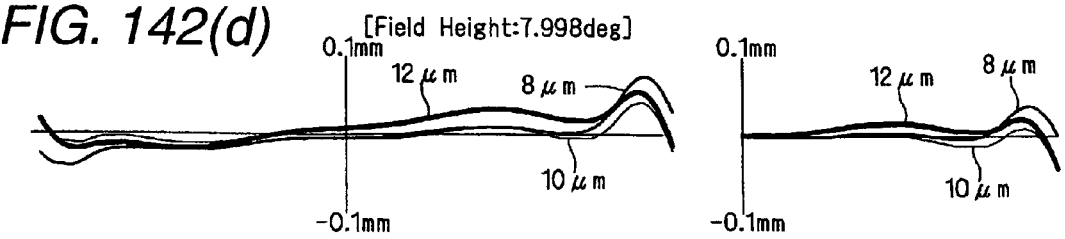
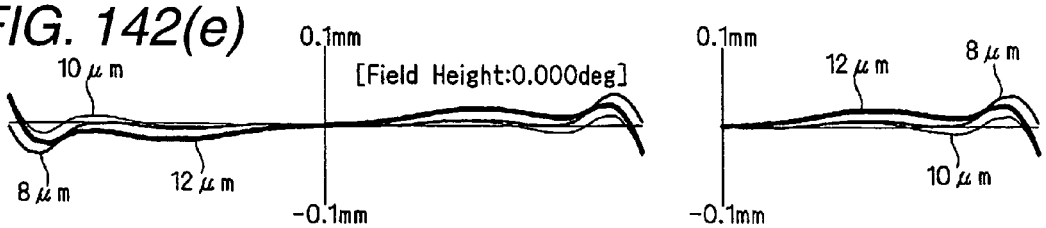

FIG. 144

| SURFACE NO. | SURFACE TYPE | RADIUS OF CURVATURE | SURFACE SEPERATION | APERTURE RADIUS | MATERIAL |
|---|---|---|---|---|---|
| 1 | ASPHERIC SURFACE | 17.5000 | 5.0000 | 8.2000 | ZnS |
| 2 | DIFFRACTIVE-ASPHERIC SURFACE | 13.6657 | 13.1159 | 8.2908 | |
| 3 | ASPHERIC SURFACE | 13.7494 | 4.7000 | 6.8123 | ZnS |
| 4 | ASPHERIC SURFACE | 10.5041 | 1.6404 | 5.9641 | |
| 5 | SPHERICAL SURFACE | INFINITY | 1.0000 | 5.8552 | Ge |
| 6 | SPHERICAL SURFACE | INFINITY | 3.0000 | 5.8019 | |
| IMAGE | SPHERICAL SURFACE | INFINITY | 0.0000 | 5.1620 | |

FIG. 145

| | K | A2 | A4 | A6 | A8 |
|---|---|---|---|---|---|
| FIRST SURFACE | -0.842939 | | -0.843759E-06 | -0.707105E-07 | -0.187561E-08 |
| SECOND SURFACE | 2.4269E-01 | -1.6955E-02 | -8.5073E-05 | -5.3522E-07 | -2.9710E-09 |
| THIRD SURFACE | -3.2608E-01 | 1.9456E-03 | 2.2173E-04 | -9.6176E-06 | 1.8579E-07 |
| FOURTH SURFACE | 1.1083E+00 | -1.6720E-02 | 1.8245E-04 | -8.0559E-06 | -1.8449E-07 |

| | C1 | C2 |
|---|---|---|
| SECOND SURFACE | -2.5504E-03 | 3.6375E-06 |

FIG. 147

| SURFACE NO. | SURFACE TYPE | RADIUS OF CURVATURE | SURFACE SEPERATION | APERTURE RADIUS | MATERIAL |
|---|---|---|---|---|---|
| 1 | ASPHERIC SURFACE | 17.5000 | 4.5000 | 8.7000 | ZnS |
| 2 | DIFFRACTIVE-ASPHERIC SURFACE | 13.7596 | 12.4138 | 9.2310 | |
| 3 | ASPHERIC SURFACE | 25.0380 | 4.5000 | 6.1311 | ZnS |
| 4 | ASPHERIC SURFACE | 24.0695 | 0.7998 | 5.9524 | |
| 5 | SPHERICAL SURFACE | INFINITY | 1.0000 | 5.8498 | Ge |
| 6 | SPHERICAL SURFACE | INFINITY | 3.0000 | 5.7995 | |
| IMAGE | SPHERICAL SURFACE | INFINITY | 0.0000 | 5.1620 | |

FIG. 148

| | K | A2 | A4 | A6 | A8 |
|---|---|---|---|---|---|
| FIRST SURFACE | -1.115036 | | -0.796998E-05 | 0.552542E-07 | -0.635713E-08 |
| SECOND SURFACE | 2.6151E-01 | -2.1321E-02 | -9.4546E-05 | -8.2979E-07 | -3.1615E-09 |
| THIRD SURFACE | -1.3009E+01 | 5.6685E-03 | -2.6147E-05 | -5.4691E-06 | -2.7676E-08 |
| FOURTH SURFACE | -2.2697E+00 | -2.1228E-03 | 1.0496E-04 | -1.6854E-05 | 1.7176E-07 |

| | C1 | C2 |
|---|---|---|
| SECOND SURFACE | -2.4287E-03 | |

FIG. 149(a)

[EXAMPLE 3-5]

| | f1/f | 1.20 |
|---|---|---|
| | f | 18.2 |
| | f12 | 21.84 |
| | FValue | 1.04 |
| | Maximum Diameter | 17.4 |
| | View Angle | 30° |

| 12 μm | Sagittal | Tangential |
|---|---|---|
| 0° | 0.277 | 0.277 |
| 10.5° | 0.596 | 0.348 |
| 12.0° | 0.569 | 0.529 |
| 15.0° | 0.324 | 0.551 |

| 10 μm | Sagittal | Tangential |
|---|---|---|
| 0° | 0.701 | 0.701 |
| 10.5° | 0.321 | 0.621 |
| 12.0° | 0.138 | 0.491 |
| 15.0° | 0.063 | 0.427 |

| 8 μm | Sagittal | Tangential |
|---|---|---|
| 0° | 0.571 | 0.571 |
| 10.5° | 0.608 | 0.389 |
| 12.0° | 0.487 | 0.522 |
| 15.0° | 0.165 | 0.46 |

| 8~12 μm | Sagittal | Tangential |
|---|---|---|
| 0° | 0.583 | 0.583 |
| 10.5° | 0.474 | 0.438 |
| 12.0° | 0.335 | 0.434 |
| 15.0° | 0.075 | 0.38 |

FIG. 149(b)

[EXAMPLE 3-3]

| | f1/f | 1.25 |
|---|---|---|
| | f | 18.2 |
| | f12 | 22.75 |
| | FValue | 1.05 |
| | Maximum Diameter | 17.3 |
| | View Angle | 30° |

| 12 μm | Sagittal | Tangential |
|---|---|---|
| 0° | 0.246 | 0.246 |
| 10.5° | 0.587 | 0.318 |
| 12.0° | 0.628 | 0.458 |
| 15.0° | 0.59 | 0.505 |

| 10 μm | Sagittal | Tangential |
|---|---|---|
| 0° | 0.707 | 0.707 |
| 10.5° | 0.468 | 0.613 |
| 12.0° | 0.347 | 0.588 |
| 15.0° | 0.206 | 0.522 |

| 8 μm | Sagittal | Tangential |
|---|---|---|
| 0° | 0.574 | 0.574 |
| 10.5° | 0.665 | 0.344 |
| 12.0° | 0.628 | 0.446 |
| 15.0° | 0.585 | 0.337 |

| 8~12 μm | Sagittal | Tangential |
|---|---|---|
| 0° | 0.577 | 0.577 |
| 10.5° | 0.568 | 0.401 |
| 12.0° | 0.502 | 0.43 |
| 15.0° | 0.407 | 0.381 |

FIG. 149(c)

[EXAMPLE 3-1]

| | f1/f | 1.37 |
|---|---|---|
| | f | 18.2 |
| | f12 | 24.99 |
| | FValue | 1.01 |
| | Maximum Diameter | 18.0 |
| | View Angle | 30° |

| 12 μm | Sagittal | Tangential |
|---|---|---|
| 0° | 0.241 | 0.241 |
| 10.5° | 0.632 | 0.354 |
| 12.0° | 0.645 | 0.453 |
| 15.0° | 0.582 | 0.555 |

| 10 μm | Sagittal | Tangential |
|---|---|---|
| 0° | 0.722 | 0.722 |
| 10.5° | 0.438 | 0.622 |
| 12.0° | 0.319 | 0.604 |
| 15.0° | 0.211 | 0.564 |

| 8 μm | Sagittal | Tangential |
|---|---|---|
| 0° | 0.513 | 0.513 |
| 10.5° | 0.657 | 0.219 |
| 12.0° | 0.621 | 0.257 |
| 15.0° | 0.557 | 0.204 |

| 8~12 μm | Sagittal | Tangential |
|---|---|---|
| 0° | 0.568 | 0.568 |
| 10.5° | 0.561 | 0.327 |
| 12.0° | 0.49 | 0.323 |
| 15.0° | 0.402 | 0.283 |

FIG. 150(d)

[EXAMPLE 3-2]

| f1/f | 1.50 |
|---|---|
| f | 18.2 |
| f12 | 27.30 |
| F Value | 1.09 |
| Maximum Diameter | 16.6 |
| View Angle | 30° |

| 12 μm | Sagittal | Tangential |
|---|---|---|
| 0° | 0.506 | 0.506 |
| 10.5° | 0.592 | 0.318 |
| 12.0° | 0.592 | 0.365 |
| 15.0° | 0.6 | 0.545 |

| 10 μm | Sagittal | Tangential |
|---|---|---|
| 0° | 0.377 | 0.377 |
| 10.5° | 0.279 | 0.565 |
| 12.0° | 0.249 | 0.55 |
| 15.0° | 0.333 | 0.539 |

| 8 μm | Sagittal | Tangential |
|---|---|---|
| 0° | 0.45 | 0.45 |
| 10.5° | 0.528 | 0.277 |
| 12.0° | 0.542 | 0.203 |
| 15.0° | 0.643 | 0.479 |

| 8~12 μm | Sagittal | Tangential |
|---|---|---|
| 0° | 0.438 | 0.438 |
| 10.5° | 0.425 | 0.255 |
| 12.0° | 0.412 | 0.228 |
| 15.0° | 0.488 | 0.202 |

FIG. 150(e)

[EXAMPLE 3-4]

| f1/f | 1.55 |
|---|---|
| f | 18.2 |
| f12 | 28.21 |
| F Value | 1.10 |
| Maximum Diameter | 16.4 |
| View Angle | 30° |

| 12 μm | Sagittal | Tangential |
|---|---|---|
| 0° | 0.5 | 0.5 |
| 10.5° | 0.541 | 0.355 |
| 12.0° | 0.529 | 0.401 |
| 15.0° | 0.534 | 0.51 |

| 10 μm | Sagittal | Tangential |
|---|---|---|
| 0° | 0.329 | 0.329 |
| 10.5° | 0.232 | 0.561 |
| 12.0° | 0.188 | 0.556 |
| 15.0° | 0.231 | 0.548 |

| 8 μm | Sagittal | Tangential |
|---|---|---|
| 0° | 0.357 | 0.357 |
| 10.5° | 0.471 | 0.252 |
| 12.0° | 0.489 | 0.176 |
| 15.0° | 0.603 | 0.411 |

| 8~12 μm | Sagittal | Tangential |
|---|---|---|
| 0° | 0.387 | 0.387 |
| 10.5° | 0.372 | 0.222 |
| 12.0° | 0.349 | 0.198 |
| 15.0° | 0.404 | 0.154 |

INFRARED LENS, INFRARED CAMERA AND NIGHT VISION

RELATED APPLICATIONS

This application is the U.S. National Phase under 35 U.S.C. 371 of International Application No. PCT/JP2006/322 195, filed on Nov. 7, 2006, which in turn claims the benefit of Japanese Application No. 2006-020411, filed on Jan. 30, 2006 and Japanese Application No. 2006-065401, filed on Mar. 10, 2006, the disclosures of which Applications are incorporated by reference herein.

TECHNICAL FIELD

The present invention relates to an infrared lens (more particularly, a far infrared lens), an infrared camera and a night vision.

BACKGROUND ART

An infrared lens using zinc sulfide as lens material is described in Patent Document 1.

Patent Document 1: Japanese Unexamined Patent Application Publication No. 2003-295052

DISCLOSURE OF THE INVENTION

Problems that the Invention is to Solve

The zinc sulfide is a low-cost lens material, but it has a characteristic that a light loss increase of zinc sulfide in a far-infrared wavelength region (8 to 12 μm) caused by a thickness increase is generally greater than that of germanium (for example, see FIG. 152 for reference). In particular, in a wavelength region not less than 10 μm, it is well known that the effect of light loss caused by internal absorption of the material itself is greater than that of the light loss caused by surface reflection, and transmittance is greatly lowered. Additionally, in a night vision system, judgment such as human recognition is generally performed by processing images obtained by the infrared camera, and thus it is required to obtain images of sufficient resolution to improve recognition performance.

However, in the infrared lens described in Patent Document 1 is relatively thick (the total lens thickness is about 14 mm), but it is not considering making a thinner lens. Thus, it is difficult to obtain infrared images of brightness usable for a practical night vision application. In addition, it can not be said that an MTF (Modulation Transfer Function) obtainable from the exemplary configuration disclosed in the Patent Document 1 is sufficient, and there is a problem of poor imaging performance.

Besides, there is a concern of increasing distortion in a wide angle region (for example, in the region where a view angle is 20° or more).

Since the infrared lens described in Patent Document 1 is produced by a cutting process, there is also a problem of high processing cost.

Therefore, the invention has been made to solve the aforementioned problems, and its object is to provide a low-cost infrared lens that is suitable for a night vision requiring bright images and high imaging performance and the related technologies thereof.

Means for Solving the Problem

To solve the aforementioned problem, according to a first invention, there is provided an infrared lens including at least first and second lens groups arranged in this order from an object side, in which the first and second lens groups have positive refractive power, and each of the first and second lens groups has at least one lens made of zinc sulfide.

An infrared lens according to a second invention is the infrared lens according to the first invention, in which at least one lens surface of the first or second lens group is formed as a diffractive surface.

An infrared lens according to a third invention is the infrared lens according to the first or second invention, in which at least one surface of the first lens group is formed as an aspheric surface.

An infrared lens according to a fourth invention is the infrared lens according to any one of the first to third inventions, in which the infrared lens is configured to satisfy the following relational expression:

$$1.25 \leq f1/f \leq 1.5$$

where
 f=total focal length of the first and second lens groups; and
 f1=focal length of the first lens group.

According to a fifth invention, there is provided an infrared lens including first, second, and third lens groups arranged in this order from an object side, in which the first to third lens groups have positive refractive power, each of the first to third lens groups has at least one lens made of zinc sulfide, and each of the first to third lens groups includes one positive meniscus lens of which a convex surface is opposed to the object.

An infrared lens according to a sixth invention is the infrared lens according to the fifth invention, in which at least one lens surface of the first to third lens groups is formed as a diffractive surface.

An infrared lens according to a seventh invention is the infrared lens according to the fifth or sixth invention, in which at least one surface of the positive meniscus lens of the first lens group is formed as an aspheric surface.

An infrared lens according to an eighth invention is the infrared lens according to any one of the fifth to seventh inventions, in which the infrared lens is configured to satisfy the following relational expression:

$$1.0 \leq f1/f \leq 1.4$$

where
 f=total focal length of the first to third lens groups; and
 f1=focal length of the positive meniscus lens of the first lens group.

According to a ninth invention, there is provided an infrared lens comprising first, second, and third lens groups arranged in this order from an object side, in which the first to third lens groups have positive refractive power, each of the first to third lens groups has at least one lens made of zinc sulfide, each of the first and third lens groups is constituted by one positive meniscus lens of which a convex surface is opposed to the object, and the second lens group is constituted by one negative meniscus lens of which a convex surface is opposed to an image side.

An infrared lens according to a tenth invention is the infrared lens according to the ninth invention, in which at least one lens surface of the first to third lens groups is formed as a diffractive surface.

An infrared lens according to an eleventh invention is the infrared lens according to the ninth or tenth invention, in which at least one surface of the positive meniscus lens of the first lens group is formed as an aspheric surface.

An infrared lens according to a twelfth invention is the infrared lens according to any one of the ninth to eleventh inventions, in which the infrared lens is configured to satisfy the following relational expression:

$$1.05 \leq f12/f \leq 1.75$$

where
f=total focal length of the first to third lens groups; and
f12=composite focal length of the first and second lens groups.

An infrared lens according to a thirteenth invention is the infrared lens according to any one of the first to twelfth inventions, in which at least one lens included in the first to third lens groups is formed by heat-press molding raw powder of zinc sulfide using a lens-shaped mold.

An infrared lens according to a fourteenth invention is the infrared lens according to any one of the first to thirteenth inventions, in which outer diameters Rd of the entire lenses included in the first to third lens groups satisfy the following relational expression: Rd<40 mm.

An infrared lens according to a fifteenth invention is the infrared lens according to any one of the first to fourteenth inventions, in which central thicknesses Tm and peripheral thicknesses Te of the entire lenses included in the first to third lens groups satisfy the following relational expression:

$$1.5 \text{ mm} < Tm < 8.0 \text{ mm; and}$$

$$1.0 \text{ mm} < Te < 8.0 \text{ mm.}$$

An infrared lens according to a sixteenth invention is the infrared lens according to any one of the first to fifteenth inventions, in which the lens surface of the first lens group closest to the object is coated with an ultra-hard film.

According to The seventeenth invention of the invention, there is provided an infrared camera including the infrared lens according to any one of the first to sixteenth inventions; and an imaging device picking up an image formed by the infrared lens.

According to an eighteenth invention, there is provided a night vision including the infrared camera according to the seventeenth invention; and a display unit for displaying a picture taken by the infrared camera.

ADVANTAGE OF THE INVENTION

According to the first invention, the entire lens is made of low-cost zinc sulfide, and the entire lenses are configured by at least the first and second lens groups having positive refractive power. Therefore, it is possible to improve an imaging performance while minimizing the light loss at the time of transmission through the lenses by minimizing thicknesses of the respective lenses, and thus it is possible to provide the infrared lens forming a bright image, and having a high imaging performance by using a configuration of low cost.

According to the second invention, it is possible to effectively improve chromatic aberration which is a main issue in the infrared lens.

According to the third invention, the aspheric surface is formed on the first lens group of which an aperture is large and the spherical aberration easily occurs, and thus it is possible to effectively improve the aberration.

Since the lenses included in the first lens group have largest diameter, the aspheric surface is formed on the first lens group. Therefore, a degree of a shape change of the aspheric surface (a degree of undulation) decreases relative to the case where the aspheric surface is formed on another lens and the mold fabrication and lens process are easy to perform.

According to the fourth invention, by satisfying these conditions, various aberrations (which include the distortion in the wide angle region) within the field of vision are corrected so as to have balance, and it is possible to easily embody the compact and bright infrared lens 2a.

According to the fifth invention, the whole infrared lens is configured by the three positive meniscus lens of which convex surfaces are opposed to the object. Therefore, it is possible to improve an imaging performance while minimizing the light loss at the time of transmission through the zinc sulfide lenses of by minimizing lens thicknesses. It is also possible to provide the infrared lens forming a bright image, and having a high imaging performance by using a configuration of low cost.

According to the sixth invention, it is possible to effectively improve chromatic aberration which is a main issue in the infrared lens.

According to the seventh invention, the aspheric surface is formed on the first lens group of which an aperture is large and the spherical aberration easily occurs, and thus it is possible to effectively improve the aberration.

Since the lenses included in the first lens group have largest diameter, the aspheric surface is formed on the first lens group. Therefore, a degree of a shape change of the aspheric surface (a degree of undulation) decreases relative to the case where the aspheric surface is formed on another lens and the mold fabrication and lens process are easy to perform.

According to the eighth invention, by employing a compact configuration, within a view angle of the infrared lens, it is possible to obtain the imaging performance (for example, MTF 0.2 or more) enough for the entire wavelength region (for example, 8 to 12 μm) of the received infrared rays for the imaging in the entire region.

According to the ninth invention, each of the first and third lens group has one positive meniscus lens of which a convex surface is opposed to the object, and the second lens group has one negative meniscus lens of which a convex surface is opposed to an image side. Therefore, it is possible to improve an imaging performance while minimizing the light loss at the time of transmission through the zinc sulfide lenses of by minimizing lens thicknesses. It is also possible to provide the infrared lens forming a bright image, and having a high imaging performance by using a configuration of low cost. In addition, it is possible to contrive to reduce lens cost and minimize the light loss at the time of transmission through the lenses by minimizing thicknesses of the entire lenses in comparison with the known zinc sulfide lenses.

According to the tenth invention, it is possible to effectively improve chromatic aberration which is a main issue in the infrared lens.

According to the eleventh invention, the aspheric surface is formed on the first lens group of which an aperture is large and the spherical aberration easily occurs, and thus it is possible to effectively improve the aberration.

Since the lenses included in the first lens group have largest diameter, the aspheric surface is formed on the first lens group. Therefore, a degree of a shape change of the aspheric surface (a degree of undulation) decreases relative to the case where the aspheric surface is formed on another lens and the mold fabrication and lens process are easy to perform.

According to the twelfth invention, by employing a compact configuration, within a view angle of the infrared lens, it is possible to obtain the imaging performance (for example, MTF 0.2 or more) enough for the entire wavelength region (for example, 8 to 12 μm) of the received infrared rays for the imaging in the entire region.

According to the thirteenth invention, it is possible to contrive to greatly reduce the material and processing cost of the infrared lens.

According to the fourteenth invention, when the heat press molding is performed on raw powder of zinc sulfide by using the lens shaped mold to form the lenses, the required compressive force of the press apparatus can be minimized. Therefore, it is possible to decrease installation cost for processing the lenses.

According to the fifteenth invention, when the heat press molding is performed on raw powder of zinc sulfide by using the lens shaped mold to form the lenses, it is possible to secure molding capability in the process of the heat press molding and to embody the infrared lens of which the thicknesses are thin and the light loss at the time of transmission through the lenses is minimized.

By minimizing the lens thicknesses, it is possible to prevent the problem that the distribution of the compressive force occurs in the thickness direction of the lenses in the process of the heat press molding by using the lens shaped mold and thus the distribution of the refractive index occurs in the thickness direction.

According to the sixteenth invention, by performing a coating process, it is possible to improve the transmittance characteristic thereof or protect the lens surface from external affections.

According to the seventeenth invention of the invention, it is possible to provide an infrared camera capable of obtaining pictures which have high resolution, high brightness, and high contrast, advantageous to decrease in size, and remarkably suitable for vehicle installation.

According to the eighteenth invention, it is possible to provide a night vision capable of obtaining pictures which have high resolution, high brightness, and high contrast, advantageous to decrease in size, and remarkably suitable for vehicle installation.

BRIEF DESCRIPTION OF THE DRAWINGS

FIG. 2 a diagram illustrating surface shapes, surface separations, and aperture radiuses of the respective lens shown in FIG. 1.

FIG. 3 is a diagram illustrating shape parameters of aspheric surface lenses and diffractive lenses shown in FIG. 1.

FIG. 16 is a diagram illustrating surface shapes, surface separations, and aperture radiuses of the respective lens shown in FIG. 15.

FIG. 17 is a diagram illustrating shape parameters of aspheric surface lenses and diffractive lenses shown in FIG. 15.

FIGS. 28(a) to 28(e) are graphs illustrating longitudinal aberration characteristics corresponding to the respective image heights in the configuration of FIG. 15.

FIG. 30 is a diagram illustrating surface shapes, surface separations, and aperture radiuses of the respective lens shown in FIG. 29.

FIG. 31 is a diagram illustrating shape parameters of aspheric surface lenses and diffractive lenses shown in FIG. 29.

FIGS. 42(a) to 42(e) are graphs illustrating longitudinal aberration characteristics corresponding to the respective image heights in the configuration of FIG. 29.

FIG. 44 is a diagram illustrating surface shapes, surface separations, and aperture radiuses of the respective lens shown in FIG. 43.

FIG. 45 is a diagram illustrating shape parameters of aspheric surface lenses and diffractive lenses shown in FIG. 43.

FIG. 47 is a diagram illustrating surface shapes, surface separations, and aperture radiuses of the respective lens shown in FIG. 46.

FIG. 48 is a diagram illustrating shape parameters of aspheric surface lenses and diffractive lenses shown in FIG. 46.

FIGS. 49(a) to 49(c) are diagrams illustrating tables arranging MTF characteristics of Examples 1-5, 1-3, and 1-1.

FIGS. 50(a) to 50(b) are diagrams illustrating tables arranging MTF characteristics of Examples 1-2 and 1-4.

FIG. 52 is a diagram illustrating surface shapes, surface separations, and aperture radiuses of the respective lens shown in FIG. 51.

FIG. 53 is a diagram illustrating shape parameters of aspheric surface lenses and diffractive lenses shown in FIG. 51.

FIG. 66 is a diagram illustrating surface shapes, surface separations, and aperture radiuses of the respective lens shown in FIG. 65.

FIG. 67 is a diagram illustrating shape parameters of aspheric surface lenses and diffractive lenses shown in FIG. 65.

FIGS. 78(a) to 78(e) are graphs illustrating longitudinal aberration characteristics corresponding to the respective image heights in the configuration of FIG. 65.

FIG. 80 is a diagram illustrating surface shapes, surface separations, and aperture radiuses of the respective lens shown in FIG. 79.

FIG. 81 is a diagram illustrating shape parameters of aspheric surface lenses and diffractive lenses shown in FIG. 79.

FIGS. 92(a) to 92(e) are graphs illustrating longitudinal aberration characteristics corresponding to the respective image heights in the configuration of FIG. 79.

FIG. 94 is a diagram illustrating surface shapes, surface separations, and aperture radiuses of the respective lens shown in FIG. 93.

FIG. 95 is a diagram illustrating shape parameters of aspheric surface lenses and diffractive lenses shown in FIG. 93.

FIG. 97 is a diagram illustrating surface shapes, surface separations, and aperture radiuses of the respective lens shown in FIG. 96.

FIG. 98 is a diagram illustrating shape parameters of aspheric surface lenses and diffractive lenses shown in FIG. 96.

FIGS. 99(a) to 99(c) are diagrams illustrating tables arranging MTF characteristics of Examples 2-5, 2-3, and 2-1.

FIGS. 100(d) and 100(e) are diagrams illustrating tables arranging MTF characteristics of Examples 2-2 and 2-4.

FIG. 102 is a diagram illustrating surface shapes, surface separations, and aperture radiuses of the respective lens shown in FIG. 101.

FIG. 103 is a diagram illustrating shape parameters of aspheric surface lenses and diffractive lenses shown in FIG. 101.

FIGS. 114(a) to 114(e) are graphs illustrating longitudinal aberration characteristics corresponding to the respective image heights in the configuration of FIG. 101.

FIG. 116 is a diagram illustrating surface shapes, surface separations, and aperture radiuses of the respective lens shown in FIG. 115.

FIG. 117 is a diagram illustrating shape parameters of aspheric surface lenses and diffractive lenses shown in FIG. 115.

FIG. 120 is a graph illustrating MTF characteristics (tangential) when the image height is 10.5° in the configuration of FIG. 115.

FIG. 121 is a graph illustrating MTF characteristics (sagittal) when the image height is 12.0° in the configuration of FIG. 115.

FIG. 122 is a graph illustrating MTF characteristics (tangential) when the image height is 12.0° in the configuration of FIG. 115.

FIG. 123 is a graph illustrating MTF characteristics (sagittal) when the image height is 15.0° in the configuration of FIG. 115.

FIG. 124 is a graph illustrating MTF characteristics (tangential) when the image height is 15.0° in the configuration of FIG. 115.

FIG. 125 is a graph illustrating spherical aberration characteristics in the configuration of FIG. 115.

FIG. 126 is a graph illustrating astigmatism characteristics in the configuration of FIG. 115.

FIG. 127 is a graph illustrating distortion characteristics in the configuration of FIG. 115.

Figure 115:
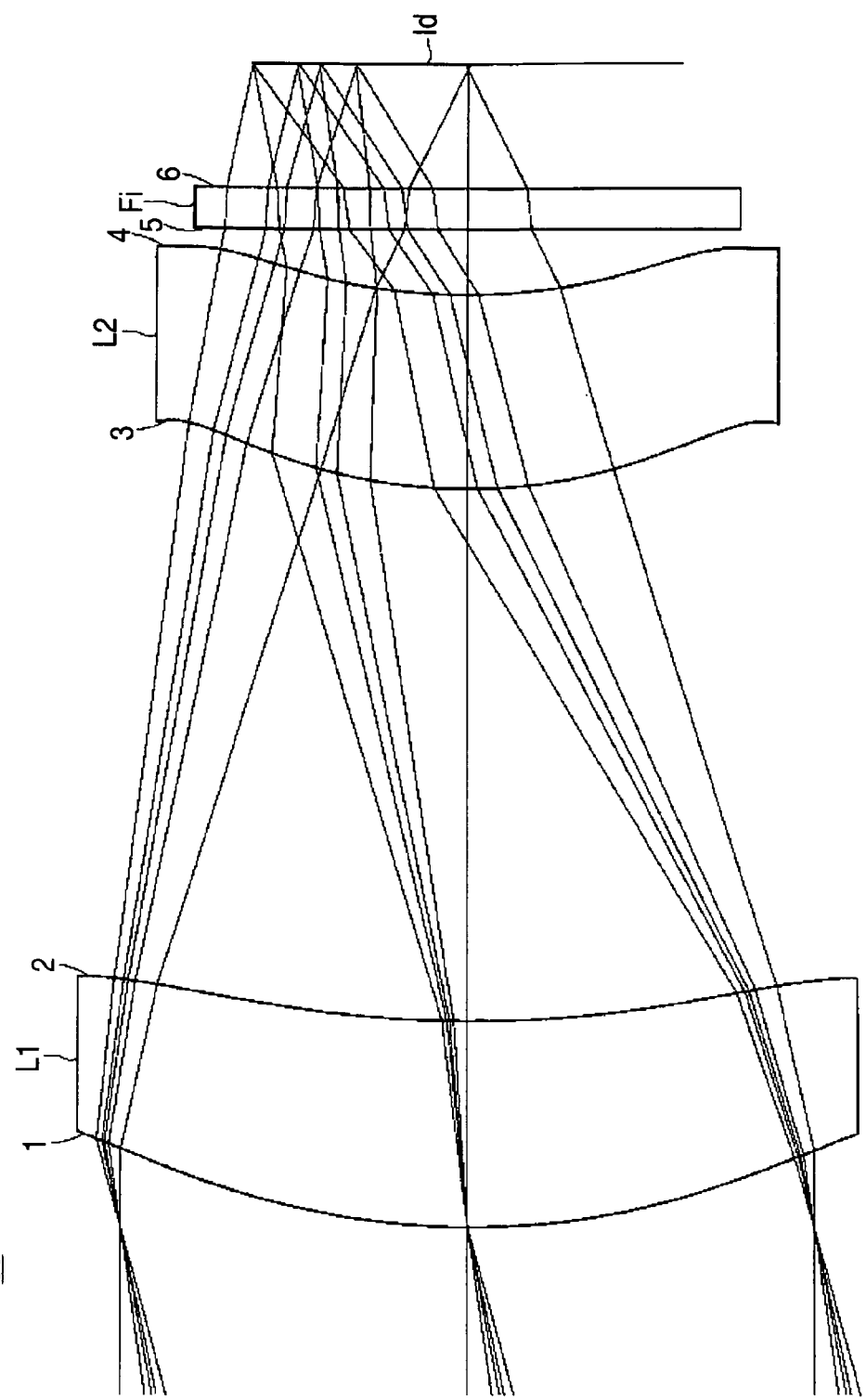
FIG. 115 is a diagram illustrating a configuration of Example 3-2 of an infrared lens according to Embodiment 3 of the invention.
Figure 118:
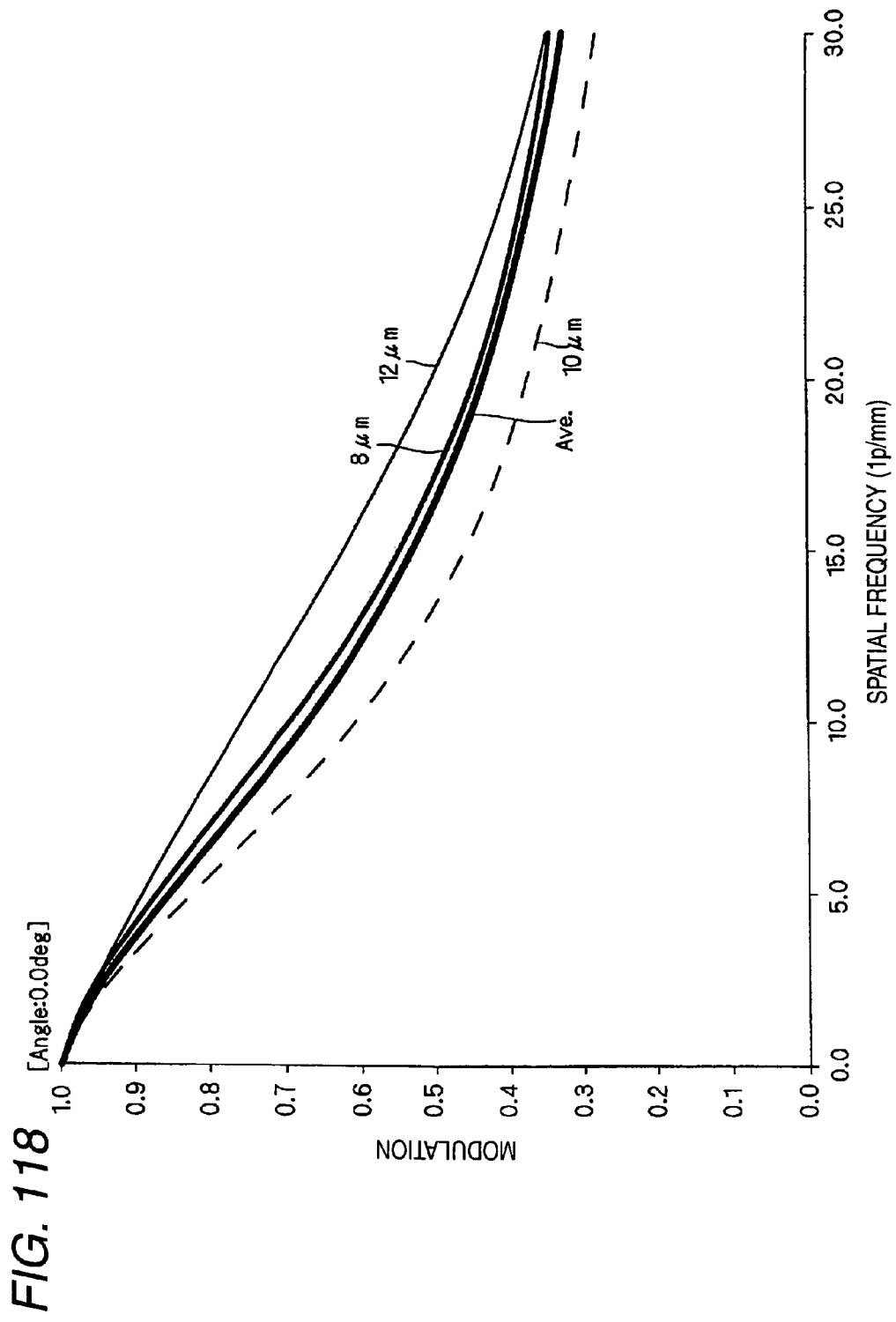
FIG. 118 is a graph illustrating MTF characteristics when the image height is 0° in the configuration of FIG. 115.
Figure 119:
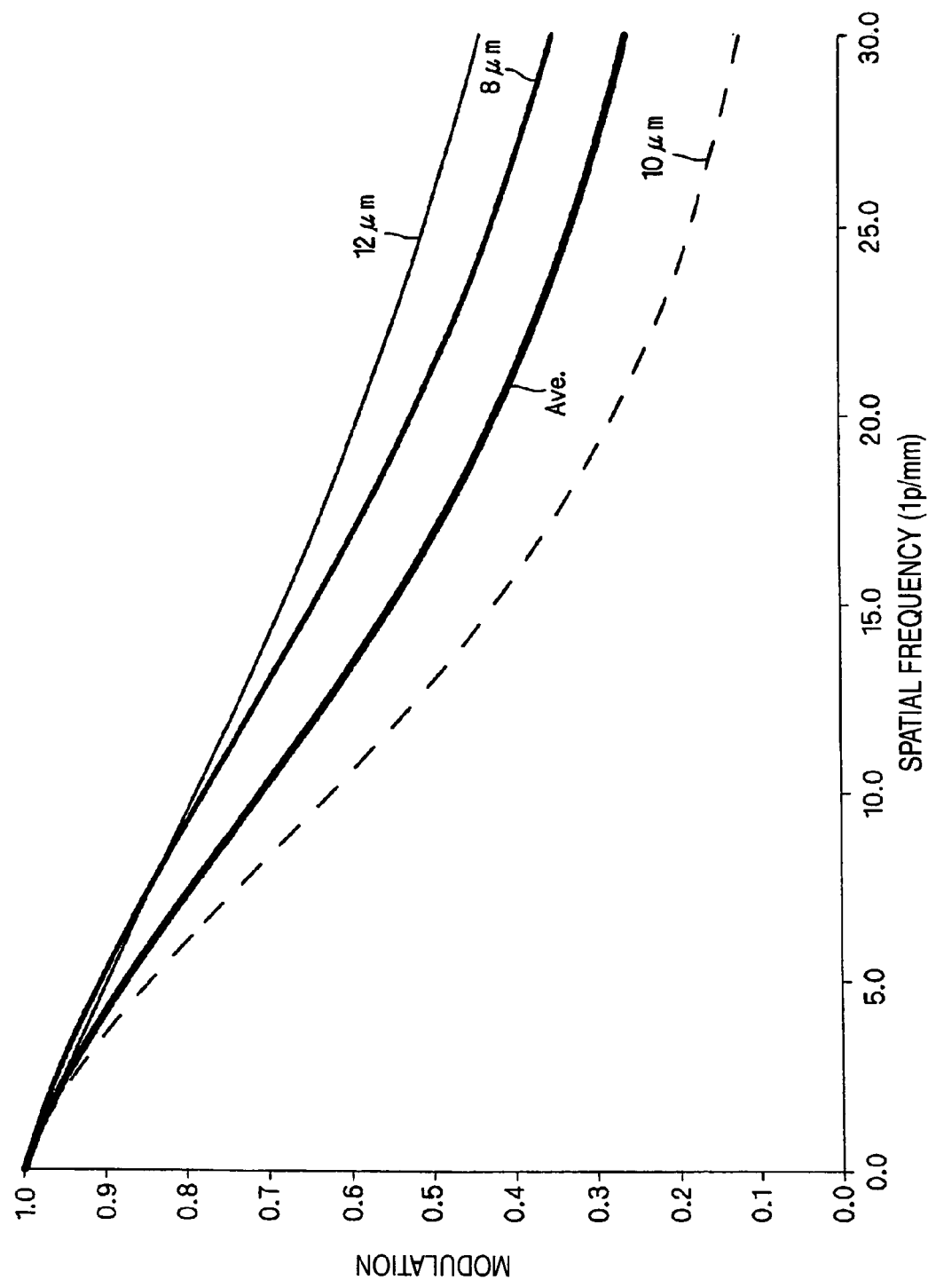
FIG. 119 is a graph illustrating MTF characteristics (sagittal) when the image height is 10.5° in the configuration of FIG. 115.
Figure 120:
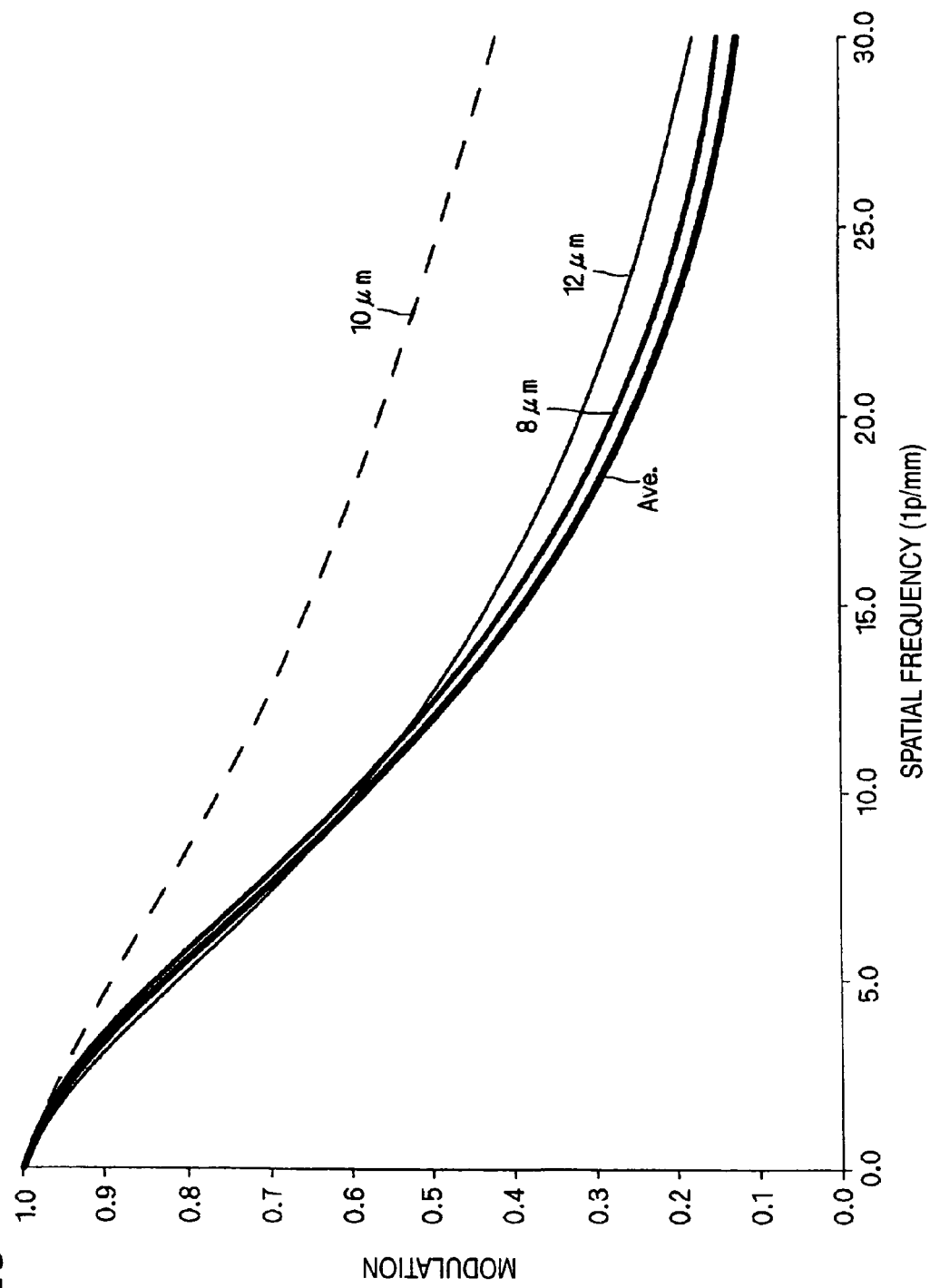
Figure 121:
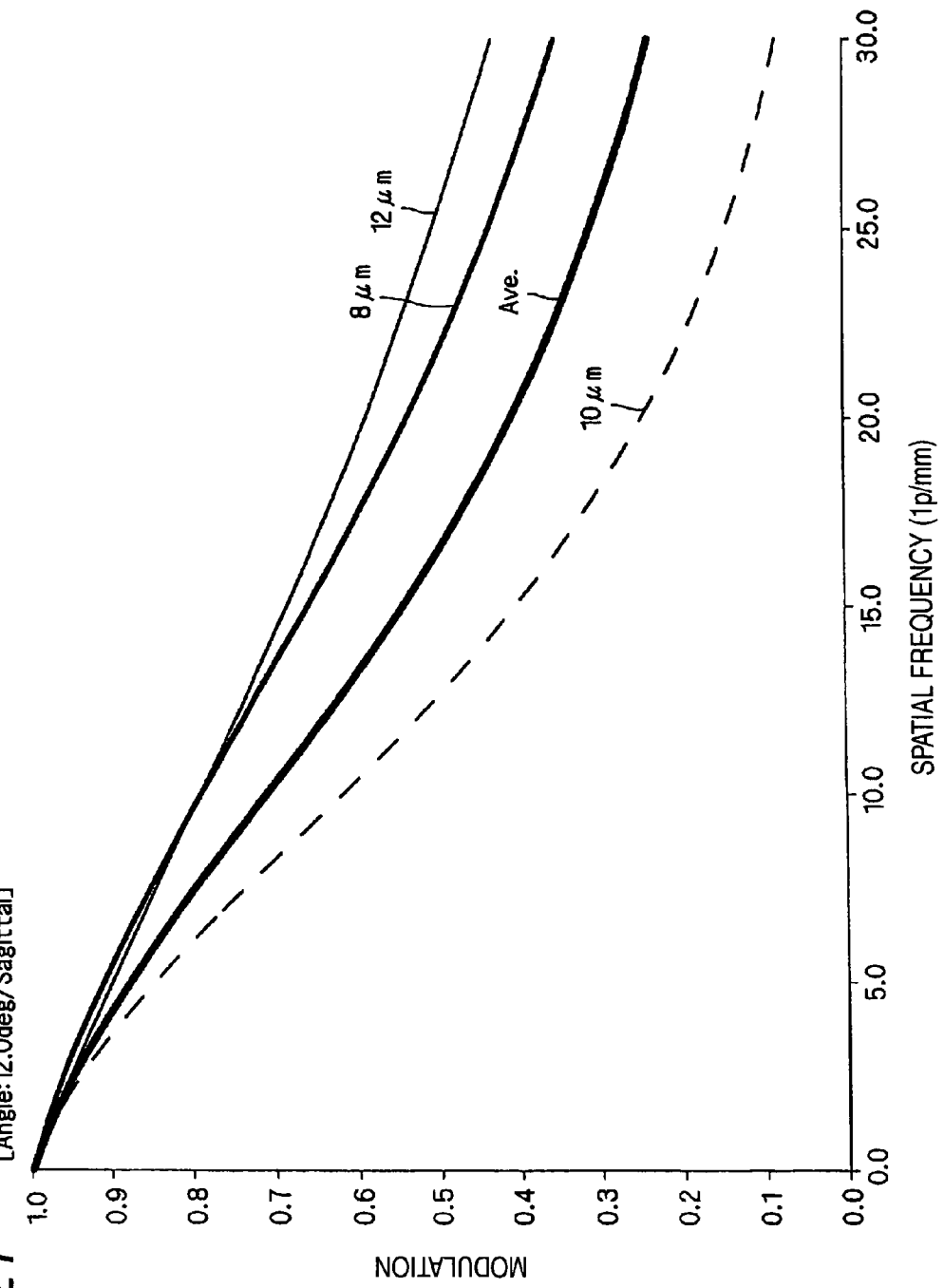
Figure 122:
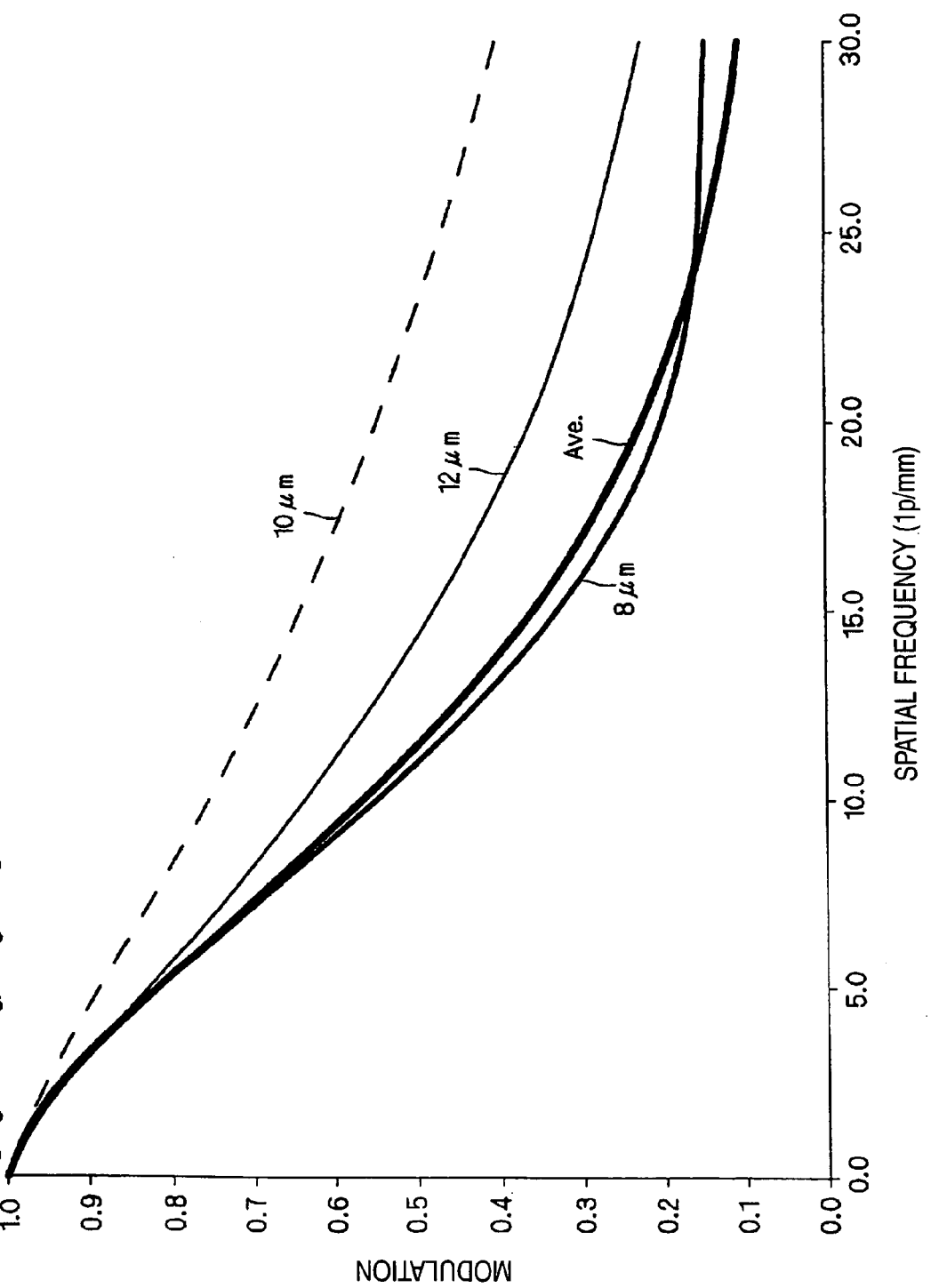
Figure 123:
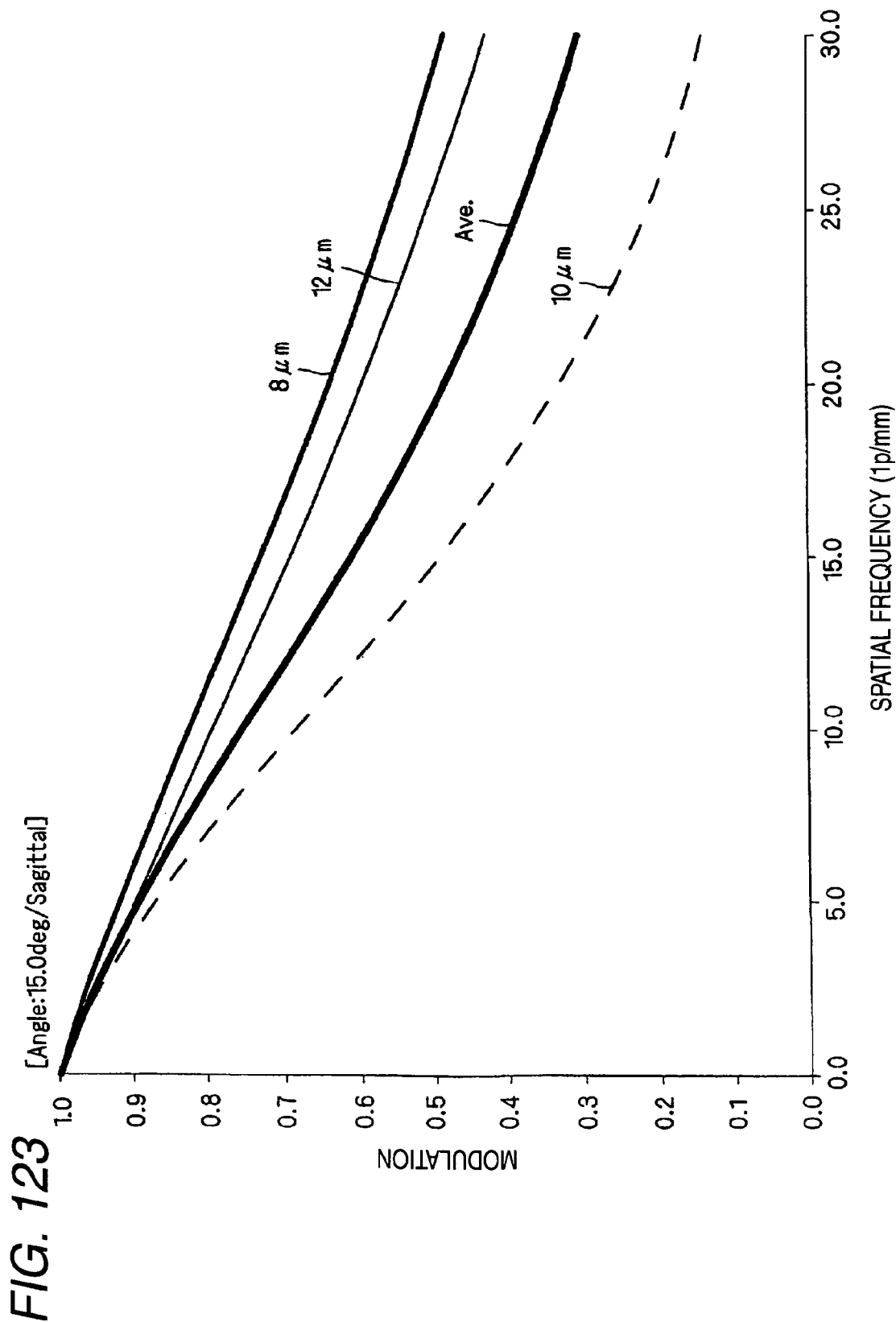
Figure 124:
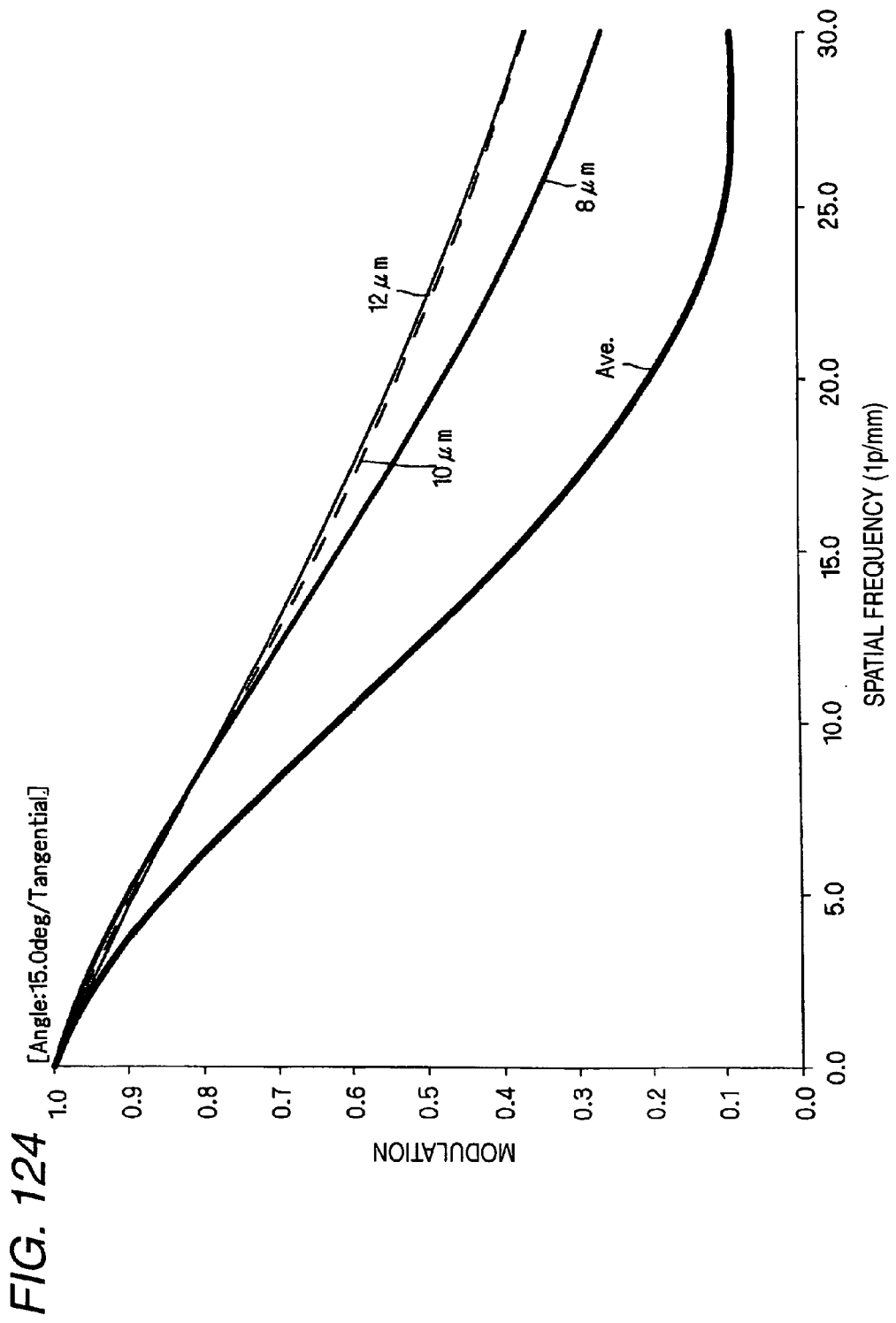
Figure 125:
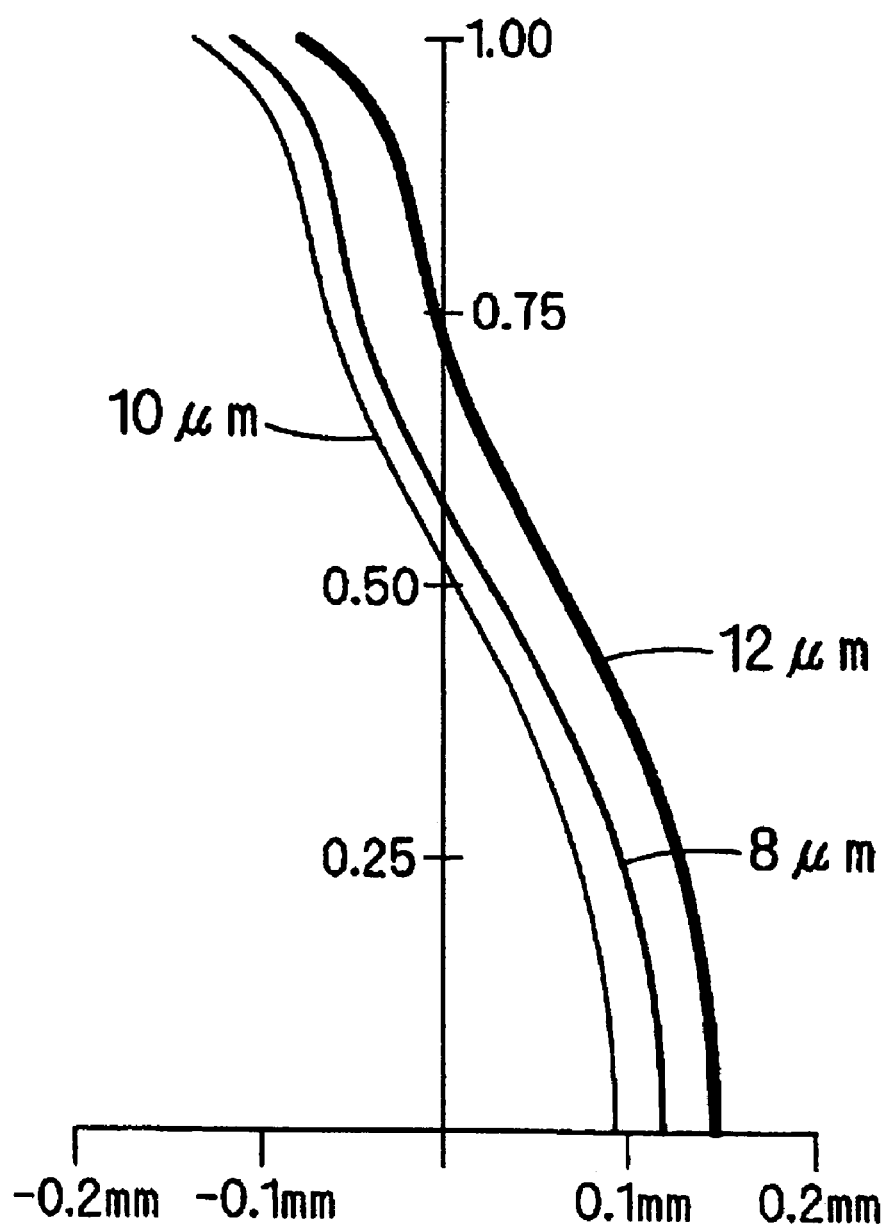
Figure 126:
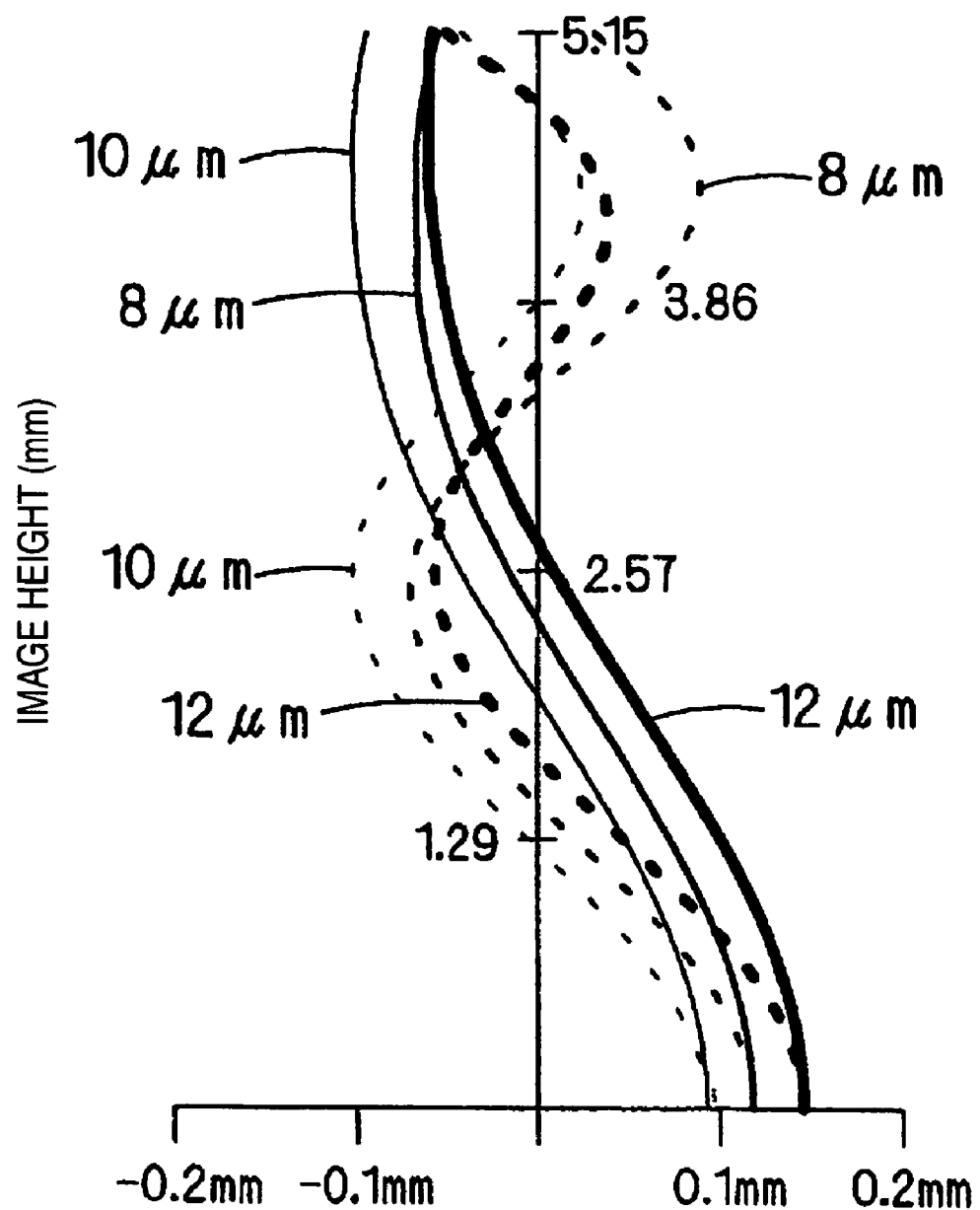
Figure 127:
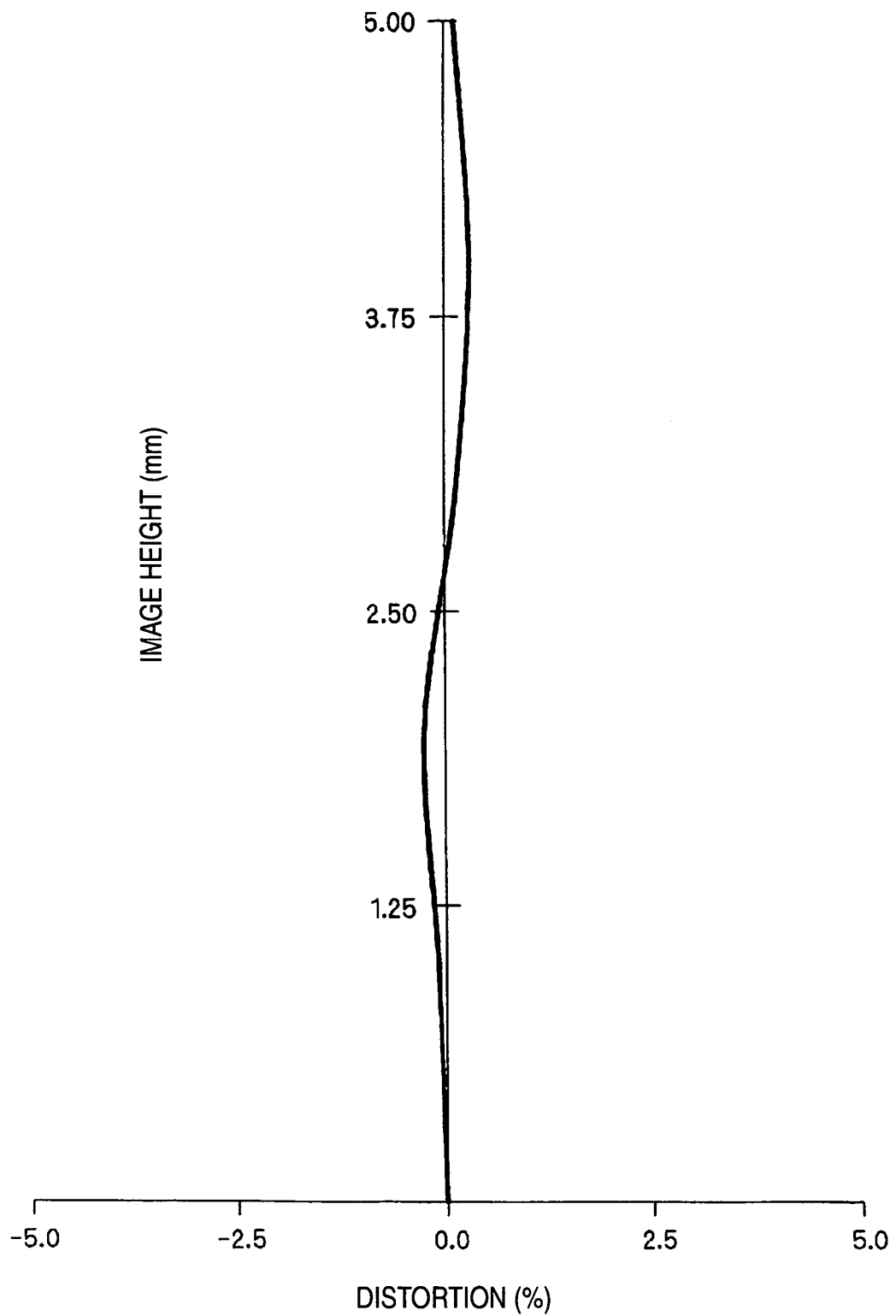
Figure 128A:
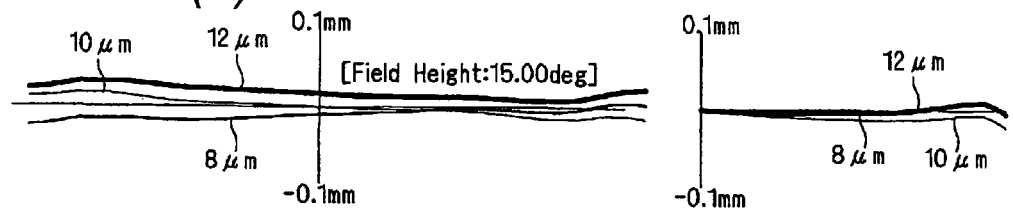
Figure 128B:
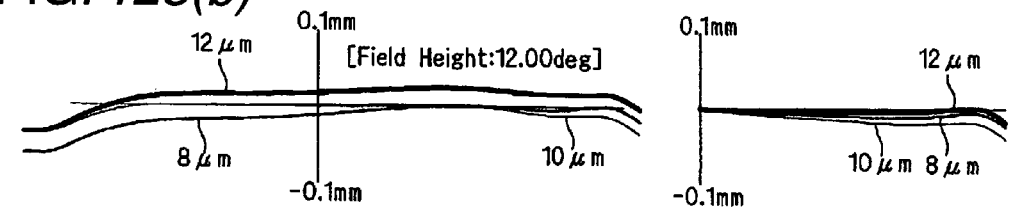
Figure 128C:
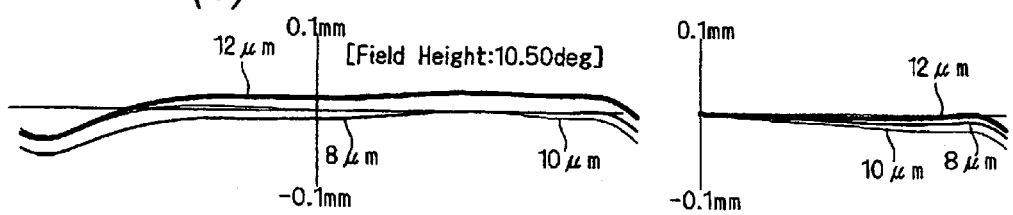
Figure 128D:
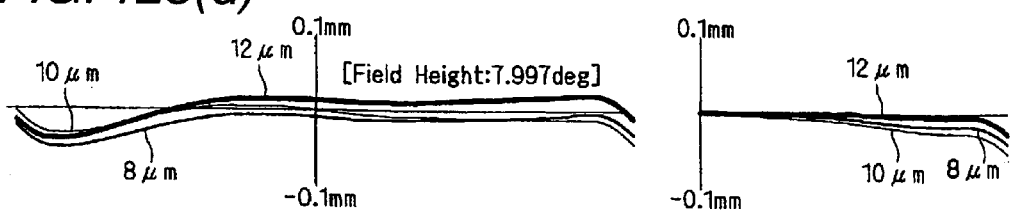
Figure 128E:
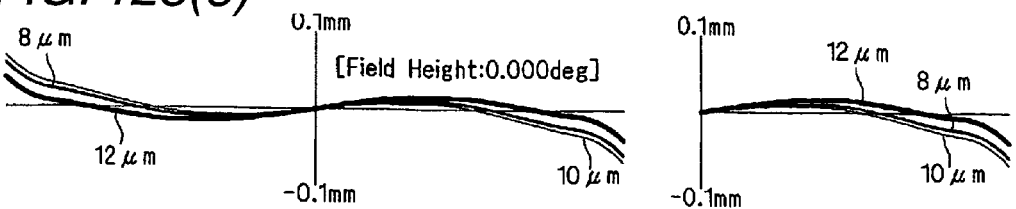

FIGS. 128(a) to 128(e) are graphs illustrating longitudinal aberration characteristics corresponding to the respective image heights in the configuration of FIG. 115.

Figure 129:
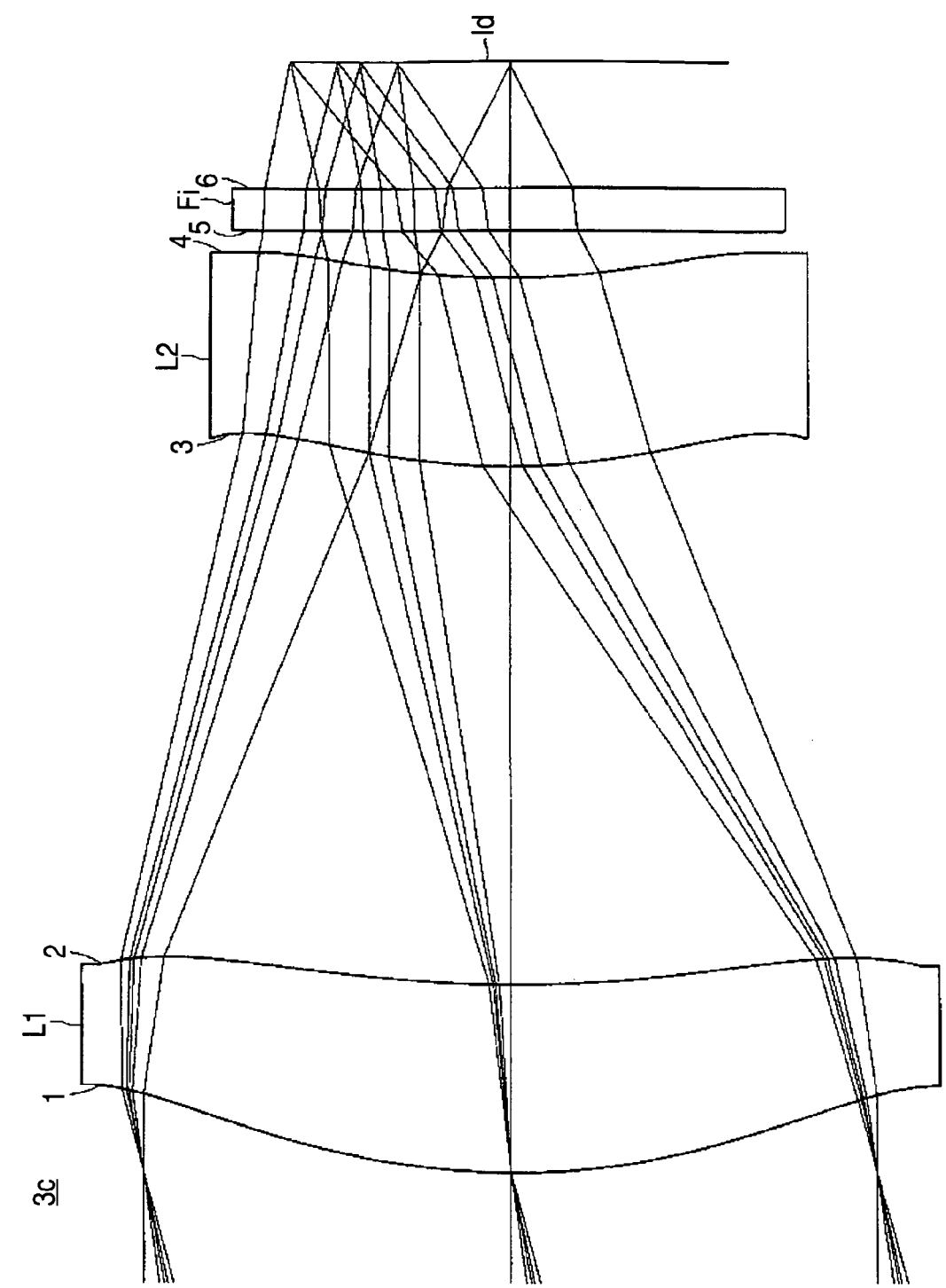

FIG. 129 is a diagram illustrating a configuration of Example 3-3 of an infrared lens according to Embodiment 3 of the invention.

FIG. 130 is a diagram illustrating surface shapes, surface separations, and aperture radiuses of the respective lens shown in FIG. 129.

FIG. 131 is a diagram illustrating shape parameters of aspheric surface lenses and diffractive lenses shown in FIG. 129.

Figure 132:
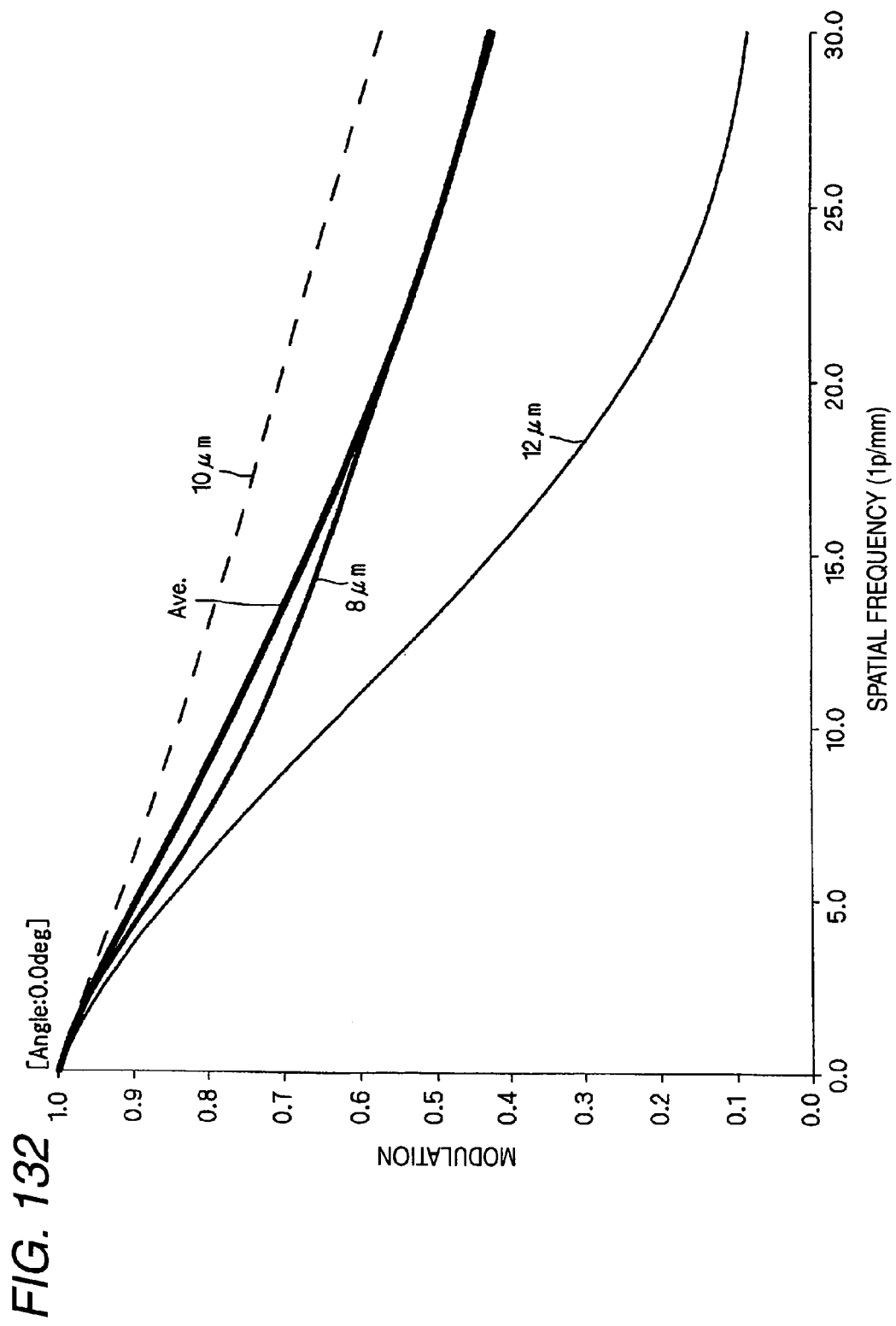

FIG. 132 is a graph illustrating MTF characteristics when the image height is 0° in the configuration of FIG. 129.

Figure 133:
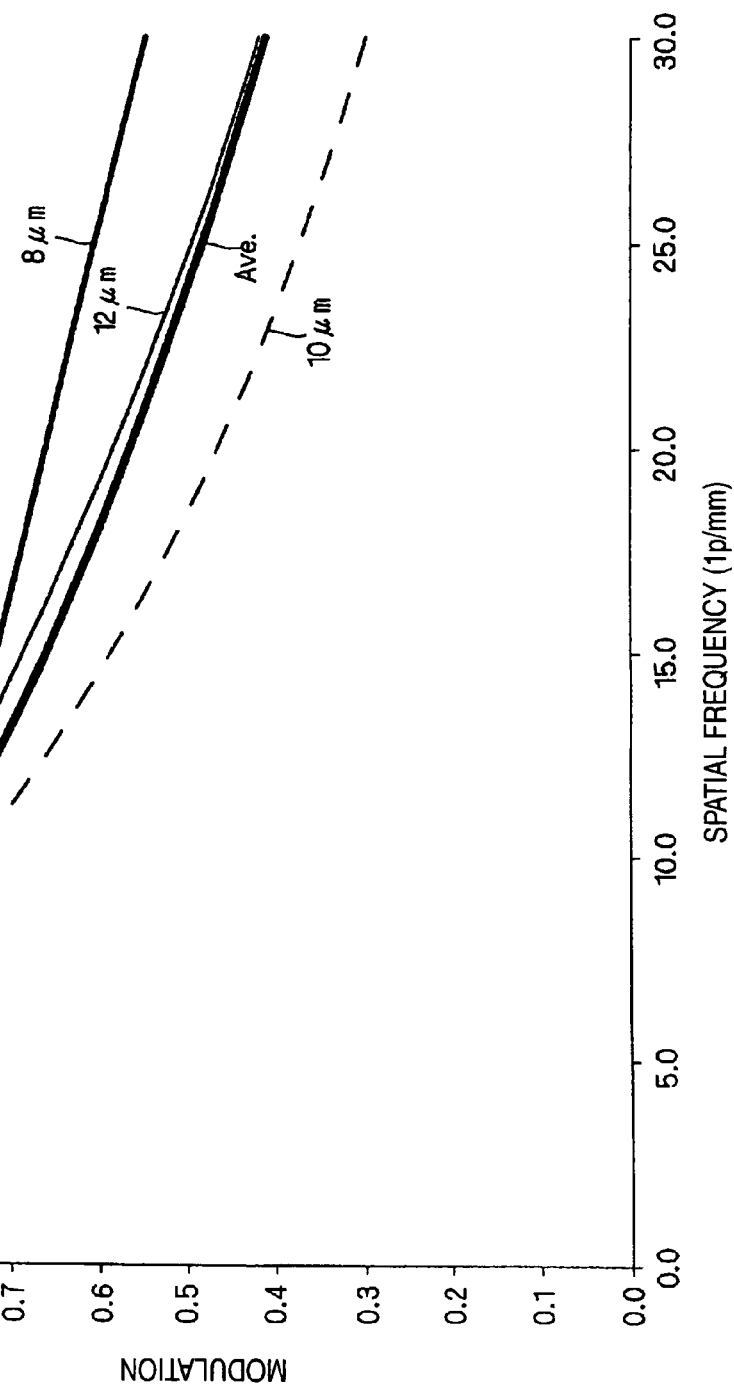

FIG. 133 is a graph illustrating MTF characteristics (sagittal) when the image height is 10.5° in the configuration of FIG. 129.

Figure 134:
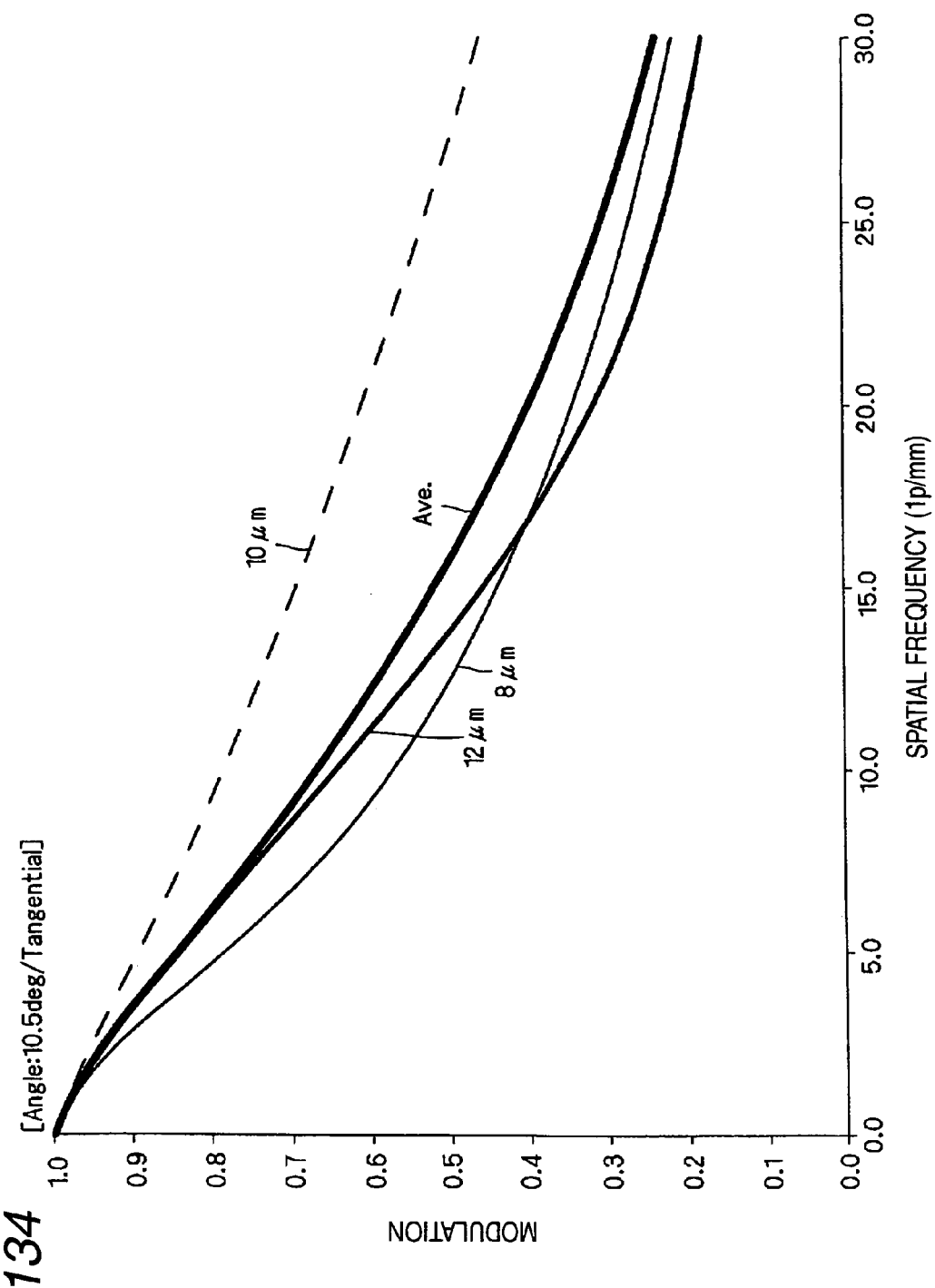

FIG. 134 is a graph illustrating MTF characteristics (tangential) when the image height is 10.5° in the configuration of FIG. 129.

Figure 135:
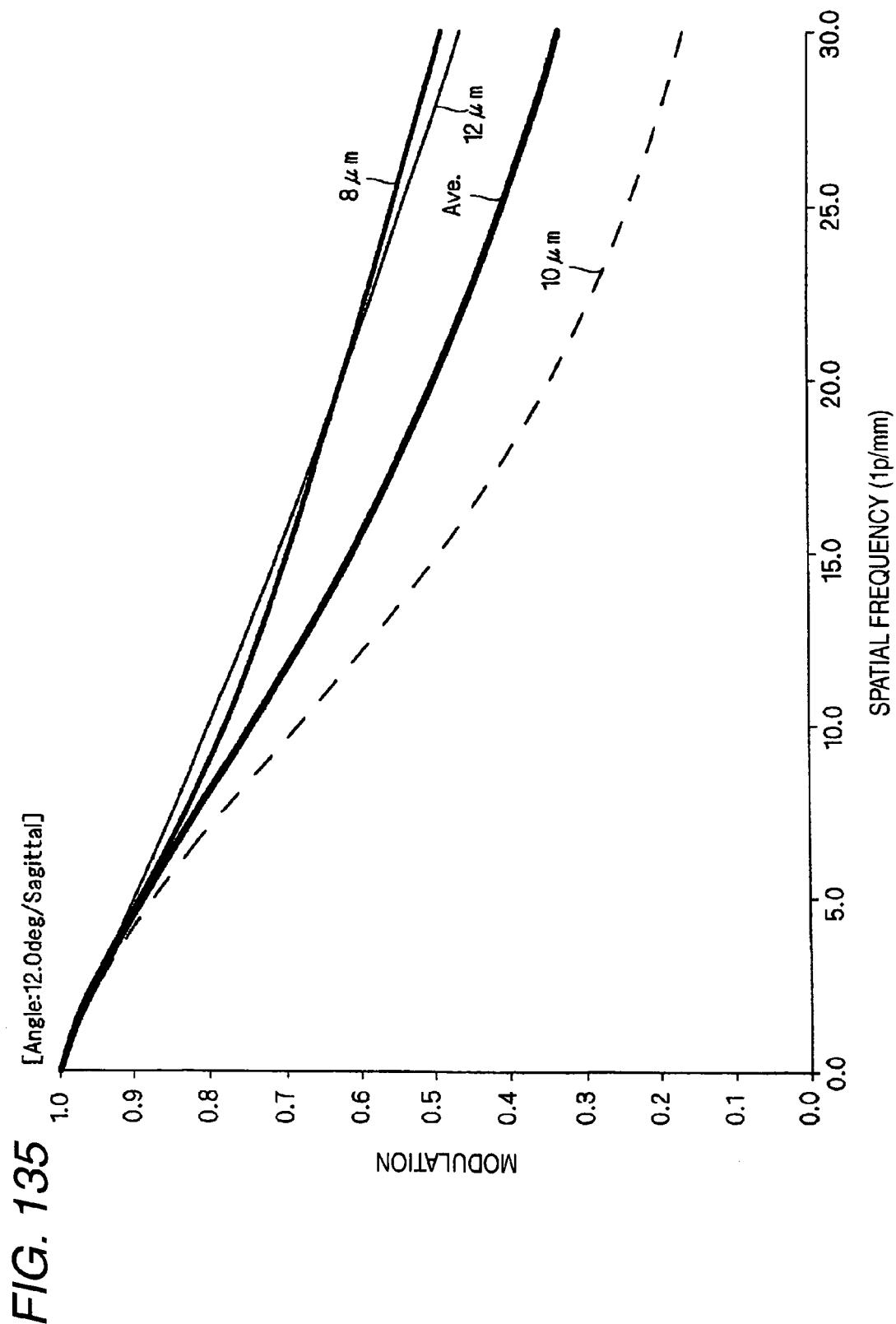

FIG. 135 is a graph illustrating MTF characteristics (sagittal) when the image height is 12.0° in the configuration of FIG. 129.

Figure 136:
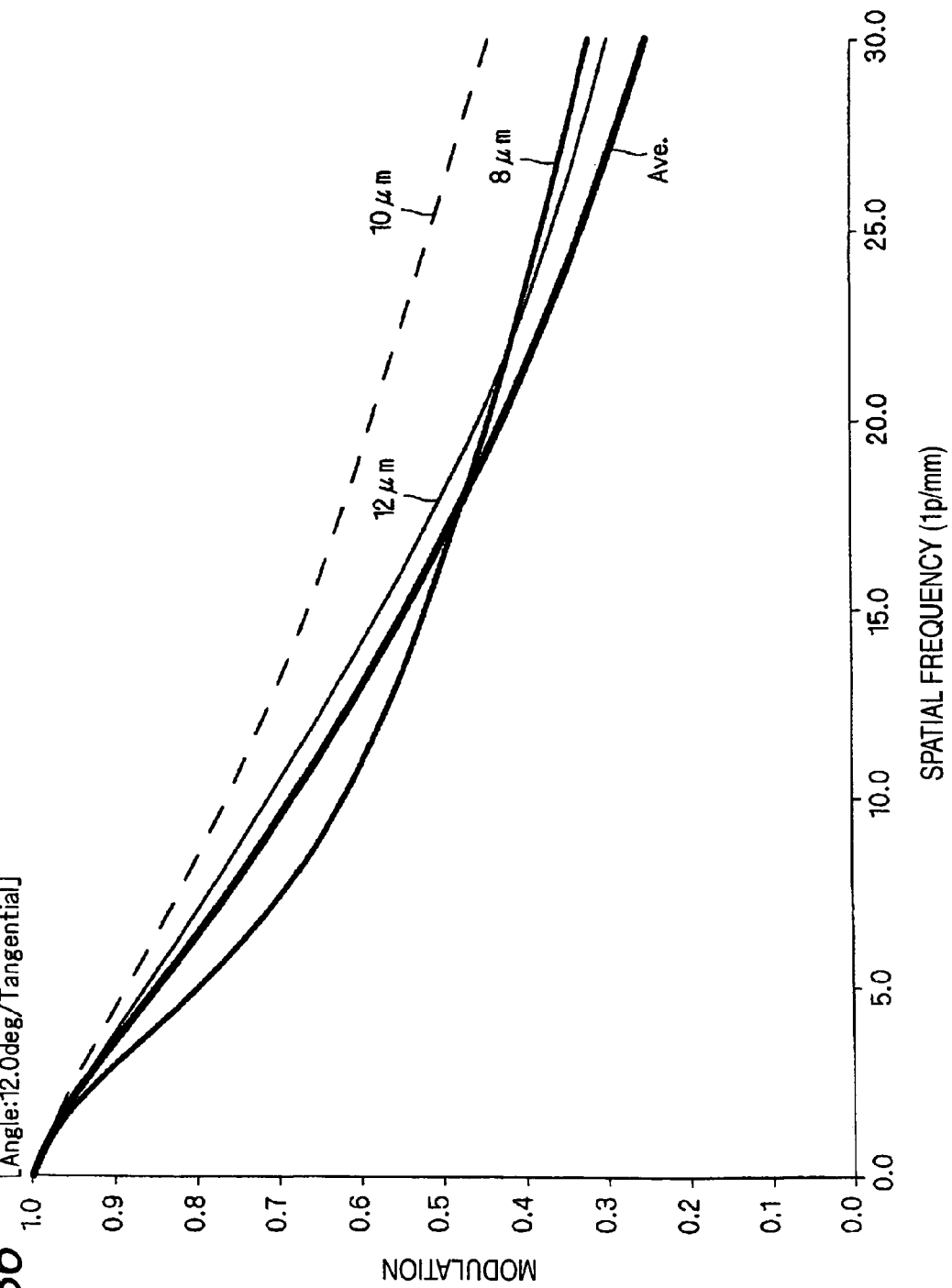

FIG. 136 is a graph illustrating MTF characteristics (tangential) when the image height is 12.0° in the configuration of FIG. 129.

Figure 137:
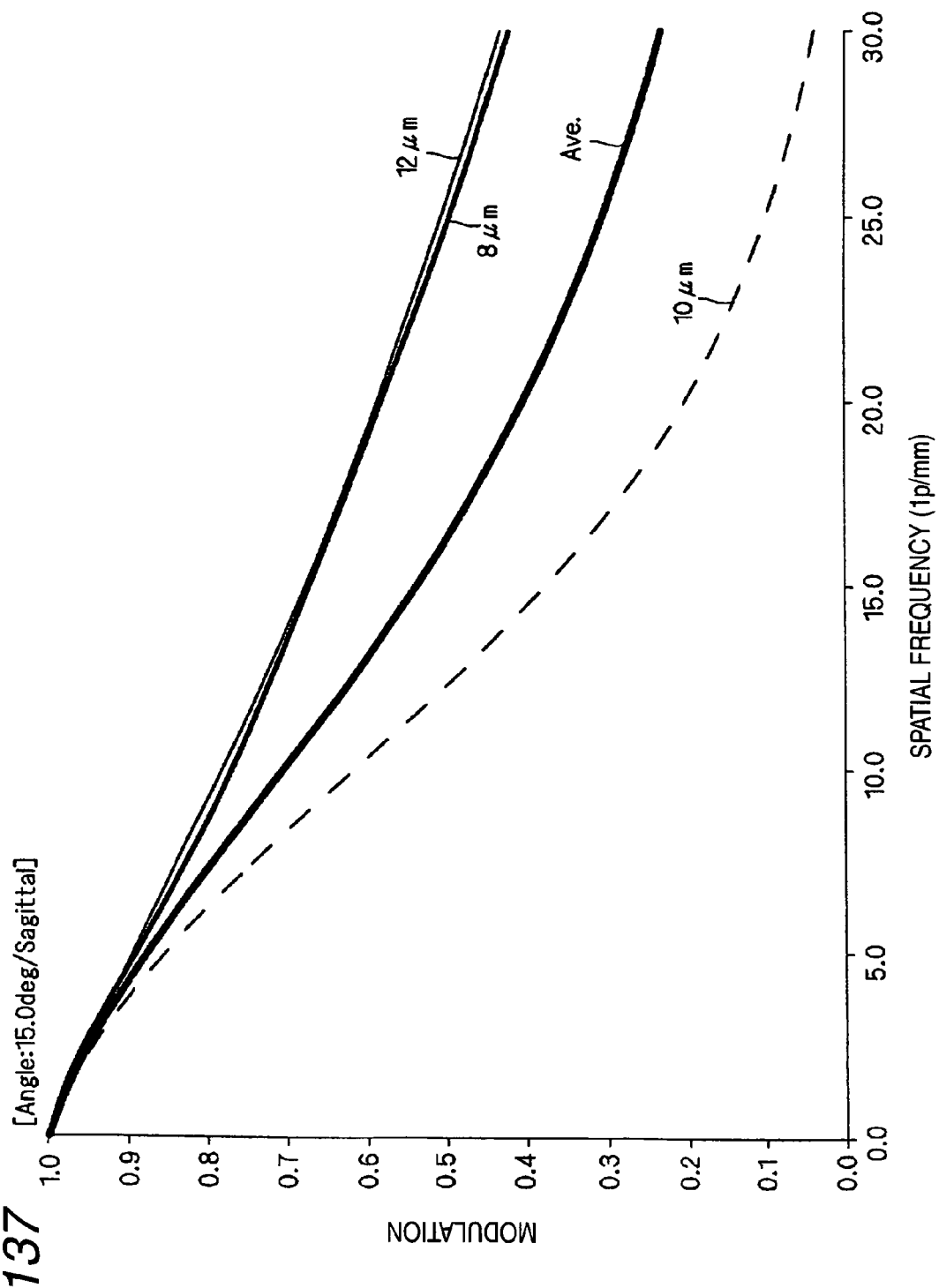

FIG. 137 is a graph illustrating MTF characteristics (sagittal) when the image height is 15.0° in the configuration of FIG. 129.

Figure 138:
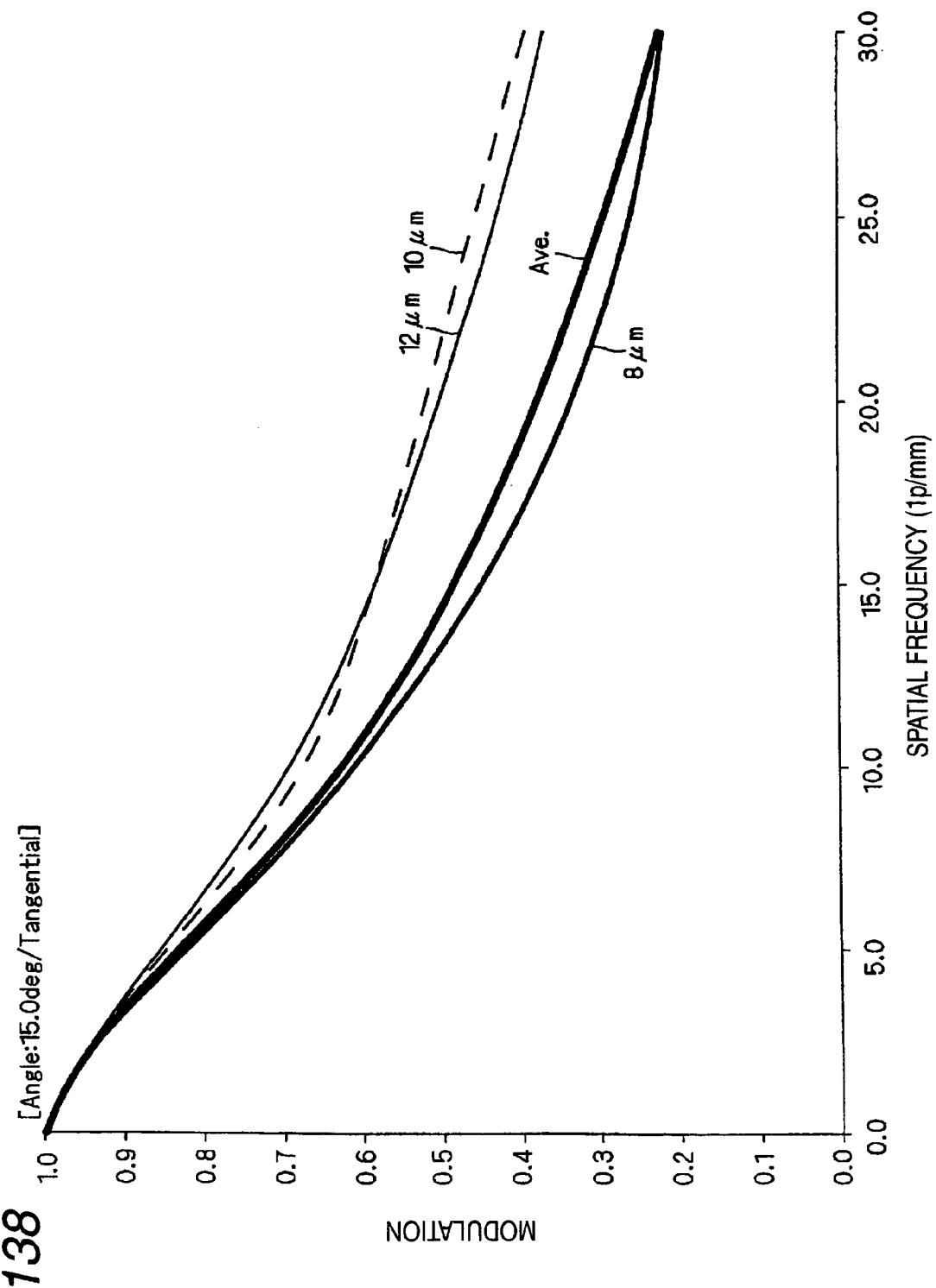

FIG. 138 is a graph illustrating MTF characteristics (tangential) when the image height is 15.0° in the configuration of FIG. 129.

Figure 139:
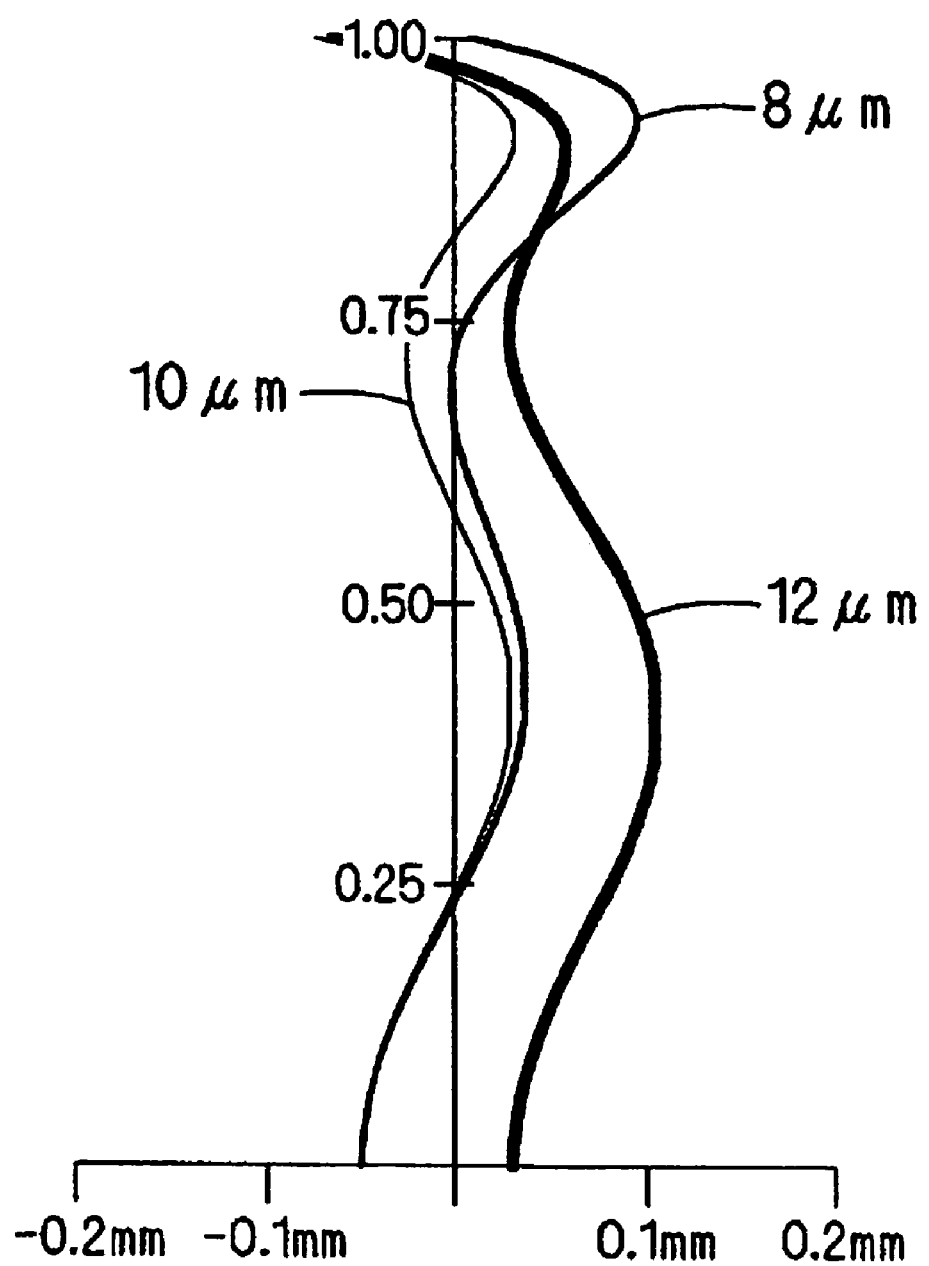

FIG. 139 is a graph illustrating spherical aberration characteristics in the configuration of FIG. 129.

Figure 140:
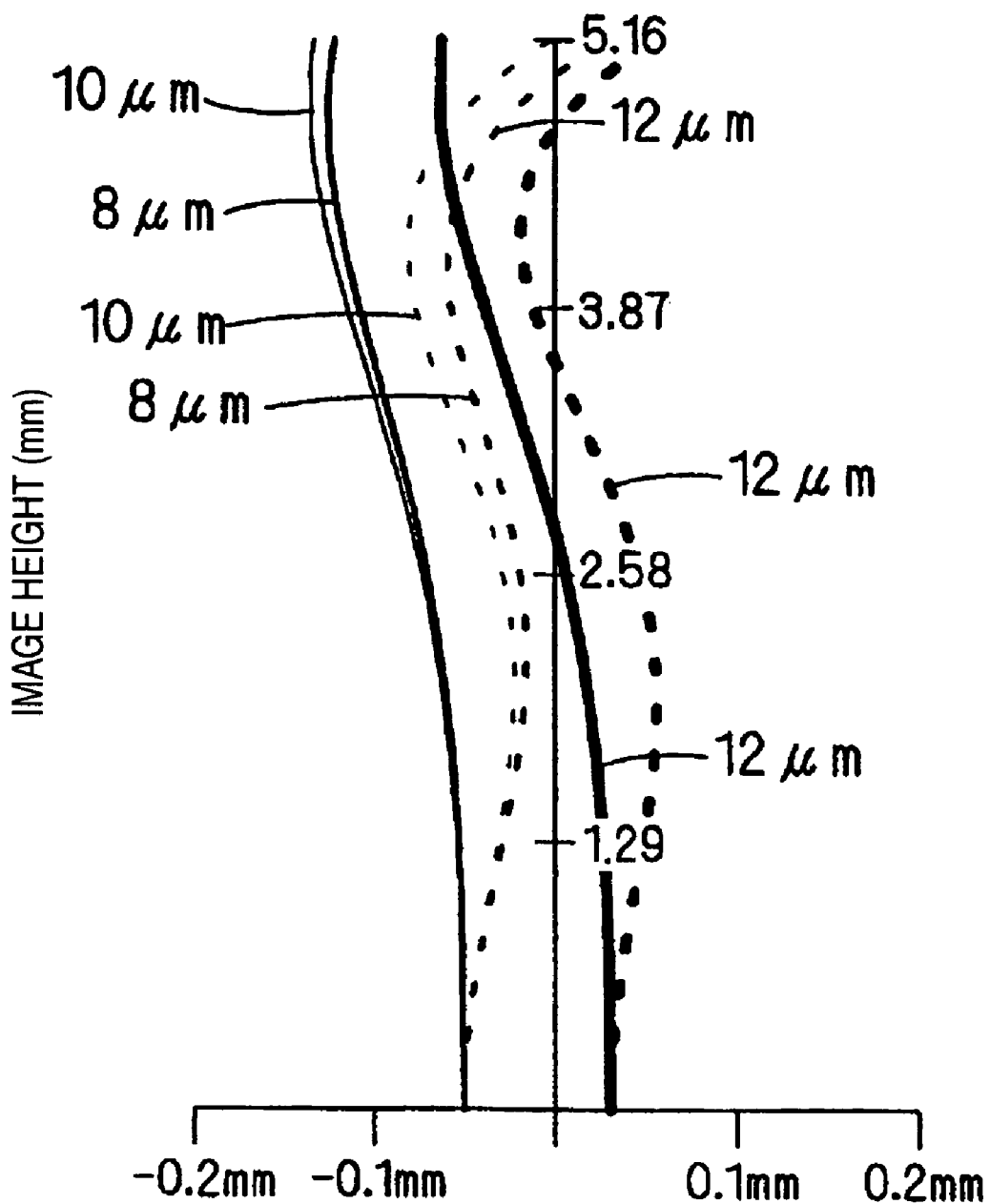

FIG. 140 is a graph illustrating astigmatism characteristics in the configuration of FIG. 129.

Figure 141:
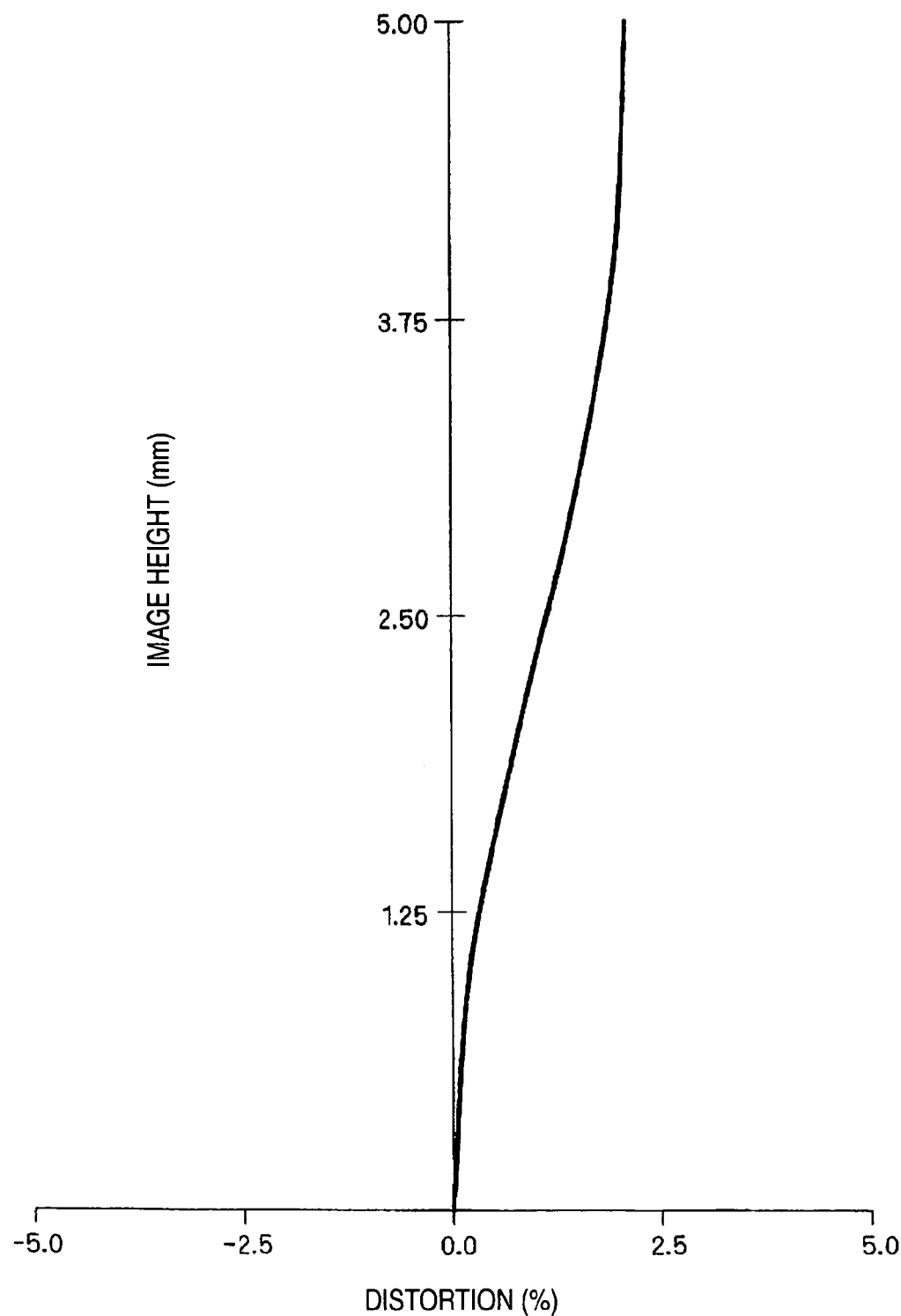

FIG. 141 is a graph illustrating distortion characteristics in the configuration of FIG. 129.

FIGS. 142(a) to 142(e) are graphs illustrating longitudinal aberration characteristics corresponding to the respective image heights in the configuration of FIG. 129.

Figure 143:
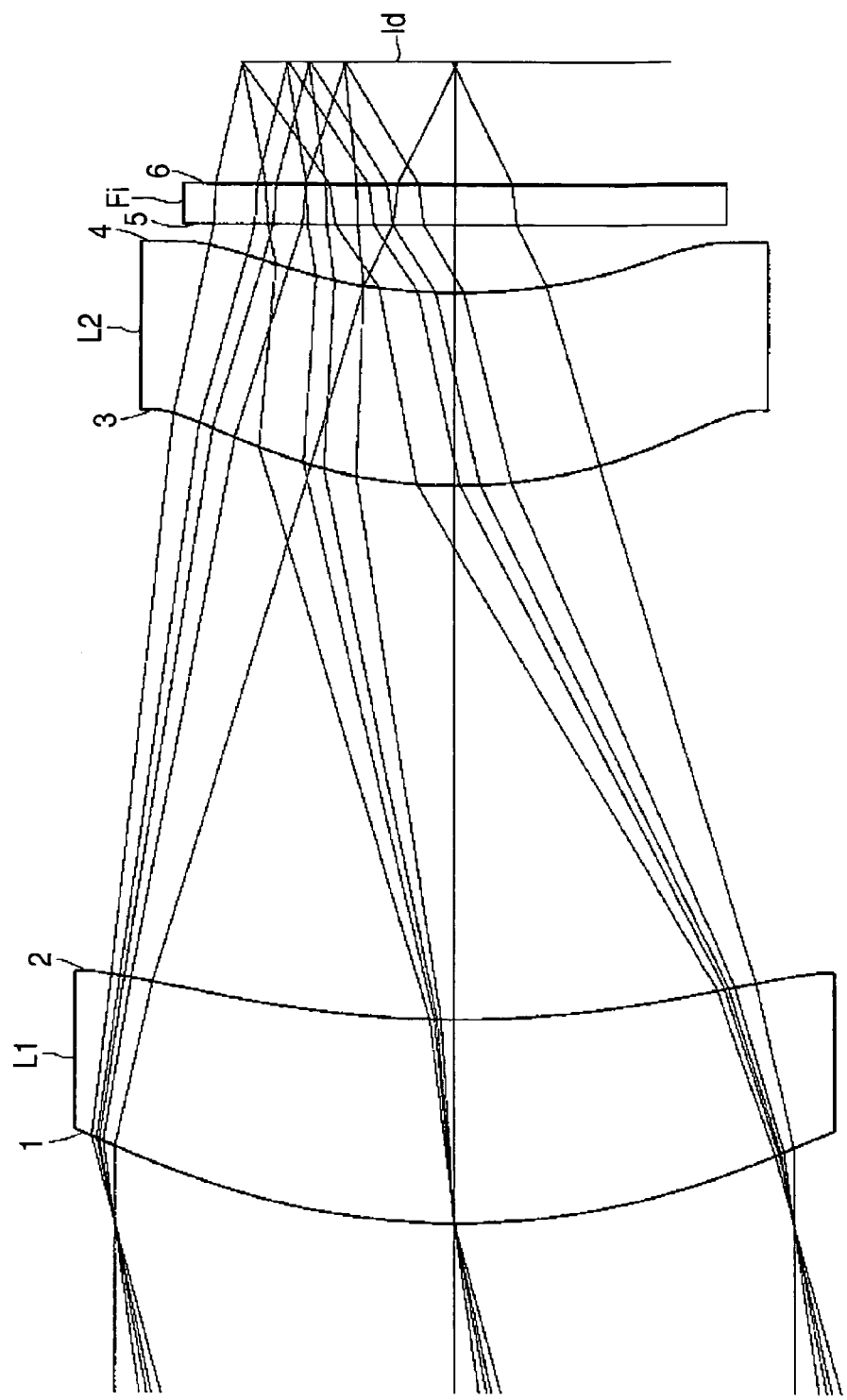

FIG. 143 is a diagram illustrating a configuration of Example 3-4 of infrared lens.

FIG. 144 is a diagram illustrating surface shapes, surface separations, and aperture radiuses of the respective lens shown in FIG. 143.

FIG. 145 is a diagram illustrating shape parameters of aspheric surface lenses and diffractive lenses shown in FIG. 143.

Figure 146:
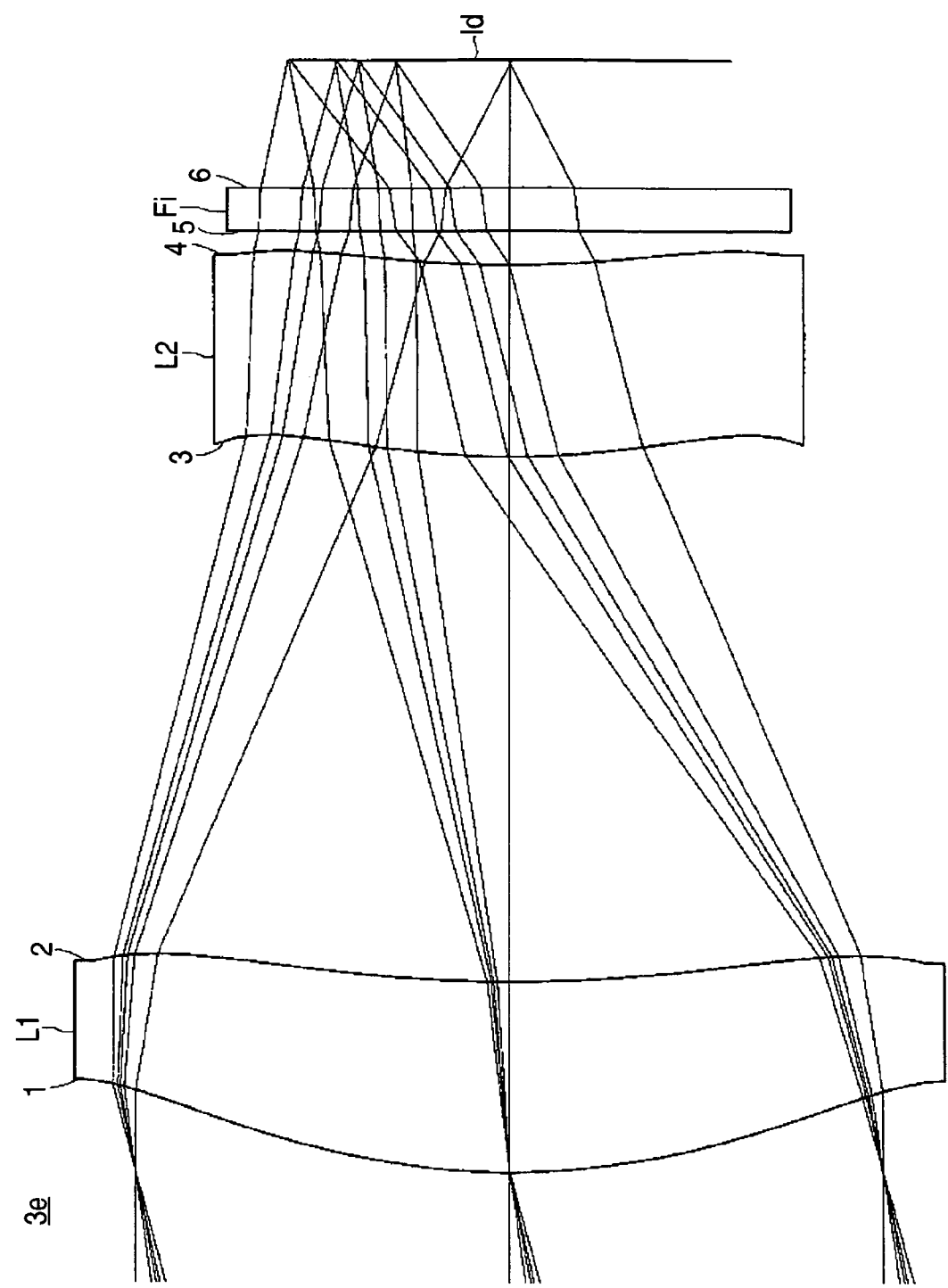

FIG. 146 is a diagram illustrating a configuration of Example 3-5 of infrared lens.

FIG. 147 is a diagram illustrating surface shapes, surface separations, and aperture radiuses of the respective lens shown in FIG. 146.

FIG. 148 is a diagram illustrating shape parameters of aspheric surface lenses and diffractive lenses shown in FIG. 146.

FIGS. 149(a) to 149(c) are diagrams illustrating tables arranging MTF characteristics of Examples 3-5, 3-3, and 3-1.

FIGS. 150(d) and 150(e) are diagrams illustrating tables arranging MTF characteristics of Examples 3-2 and 3-4.

Figure 151:
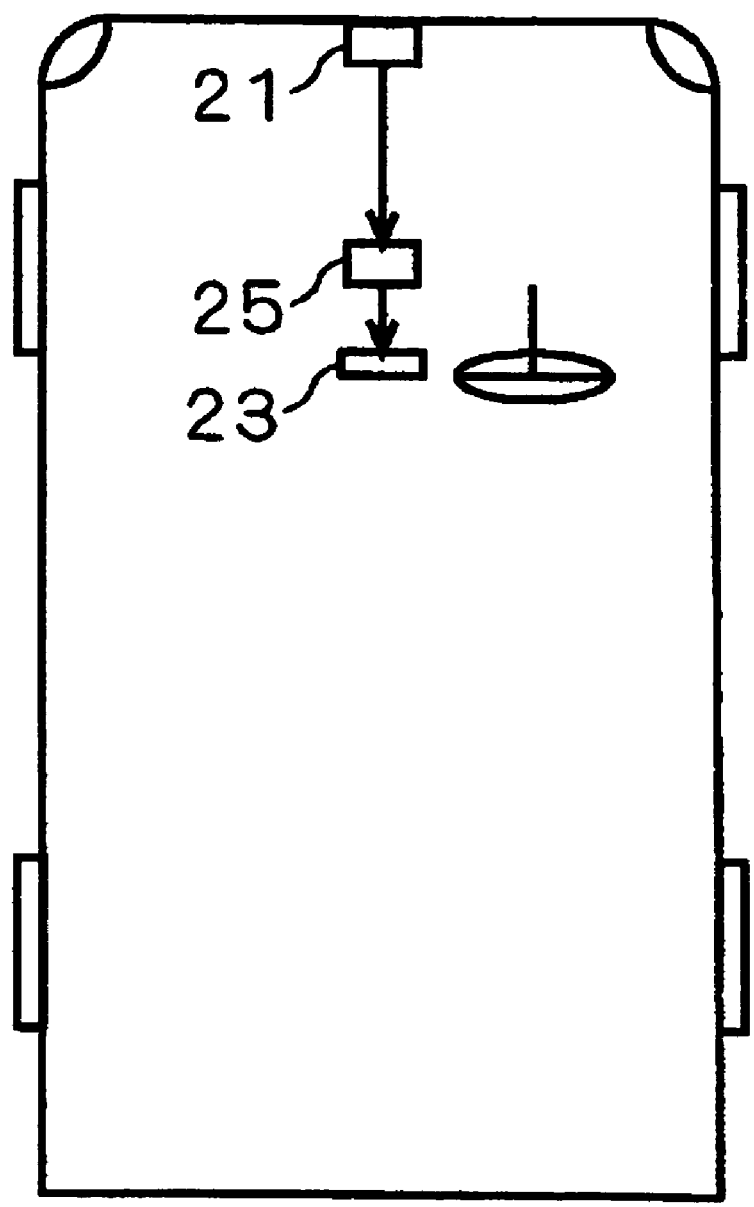

FIG. 151 is a schematic diagram illustrating a configuration of a night vision.

Figure 152:
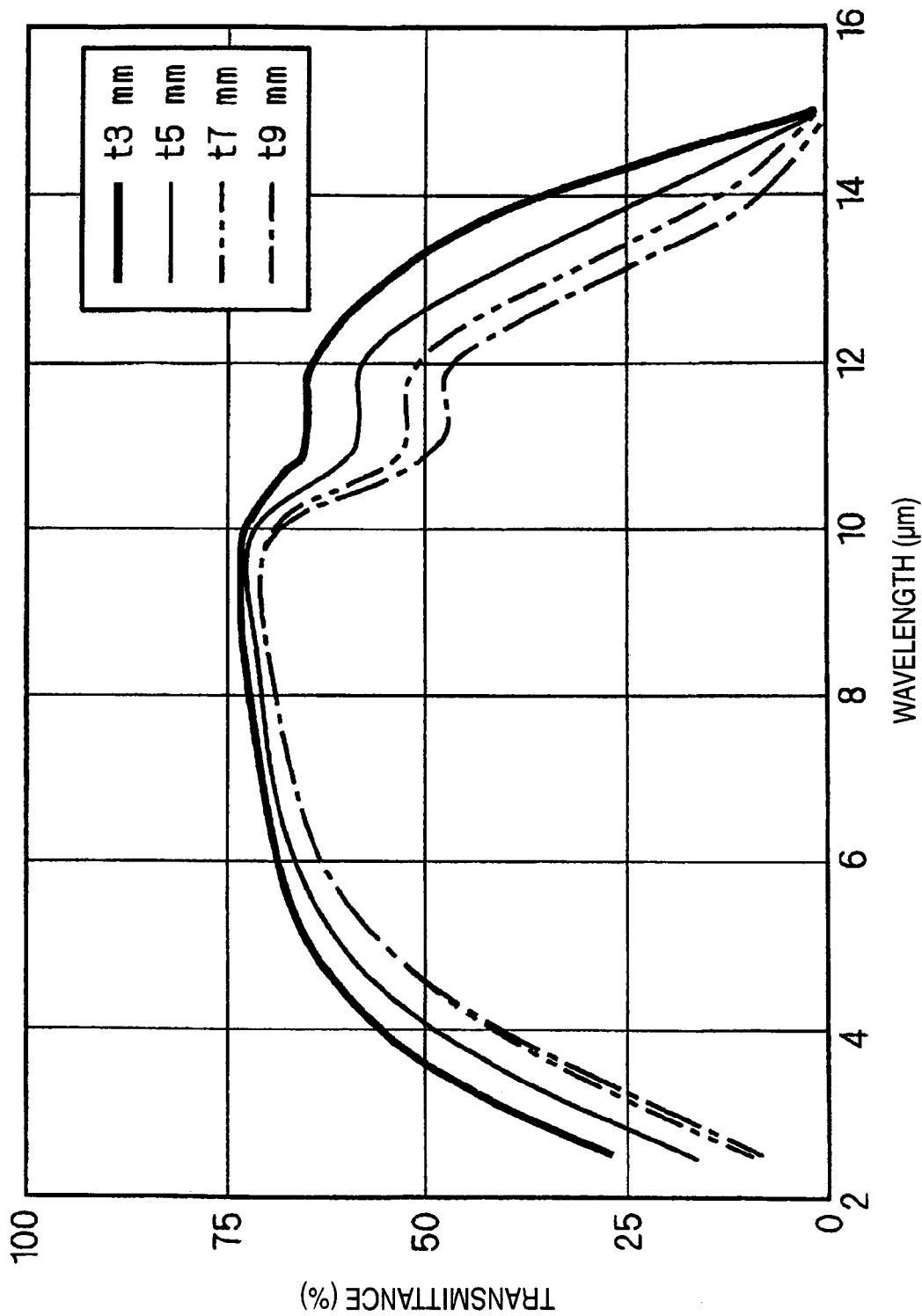

FIG. 152 is a graph illustrating relationship between an infrared wavelength and a transmittance of zinc sulfide lens (in the case where AR coating does not exist) with respect to several lens thicknesses.

DESCRIPTION OF REFERENCE NUMERALS AND SIGNS 1a to 1c: INFRARED LENS
Fi: INFRARED TRANSMISSION WINDOW
Id: IMAGING DEVICE
21: INFRARED CAMERA
23: DISPLAY UNIT
25: CONTROLLER

BEST MODE FOR CARRYING OUT THE INVENTION

Embodiment 1

Basic Configuration

Hereinafter, a basic configuration of an infrared lens according to Embodiment 1 of the invention will be described with reference to FIG. 1. In this section, it will be described about only the basic configuration of the infrared lens 1a shown in FIG. 1, and a further detailed configuration thereof will be described as Example in the following section.

Figure 1:
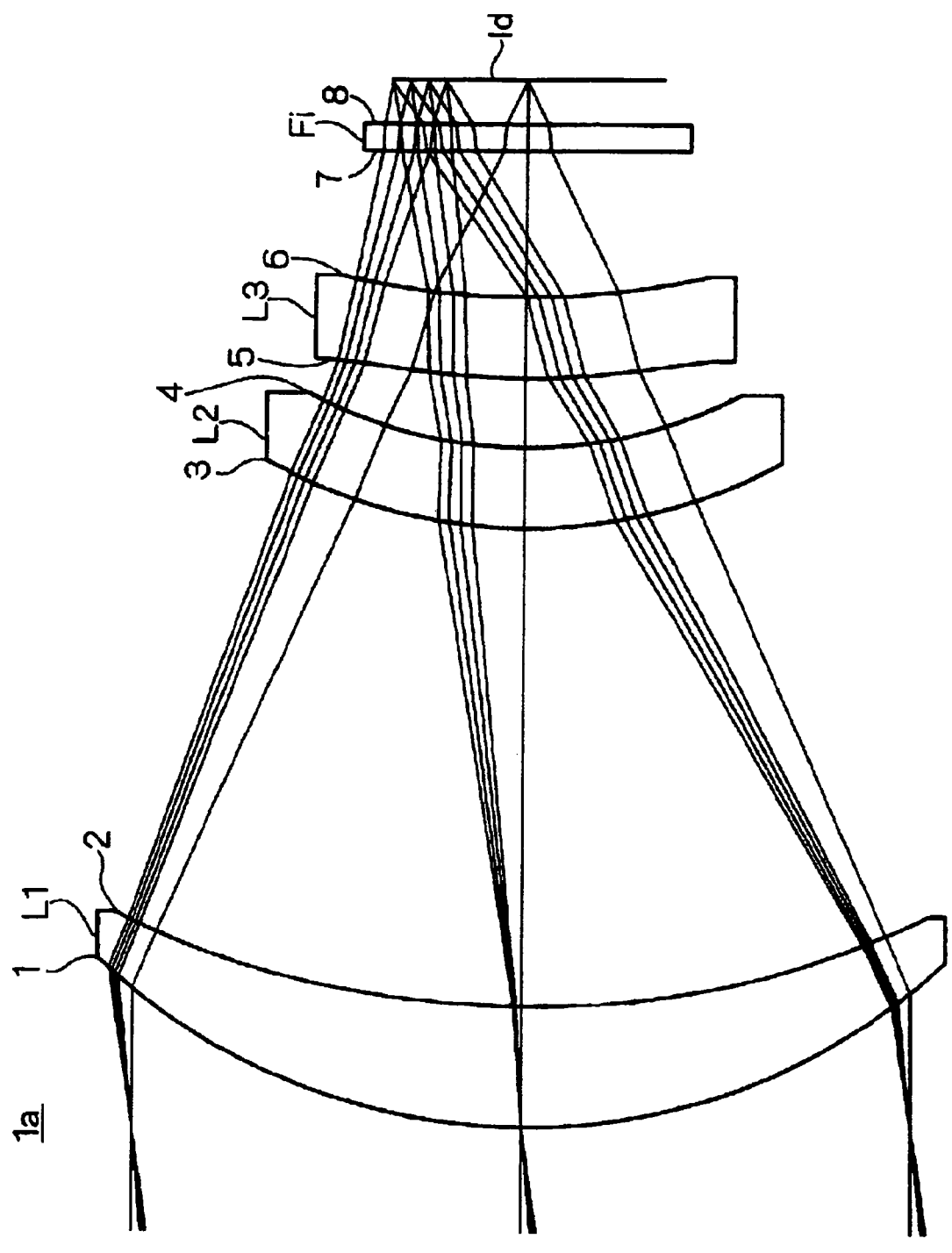
FIG. 1 is a diagram illustrating a configuration of Example 1-1 of an infrared lens according to Embodiment 1 of the invention.
Figure 4:
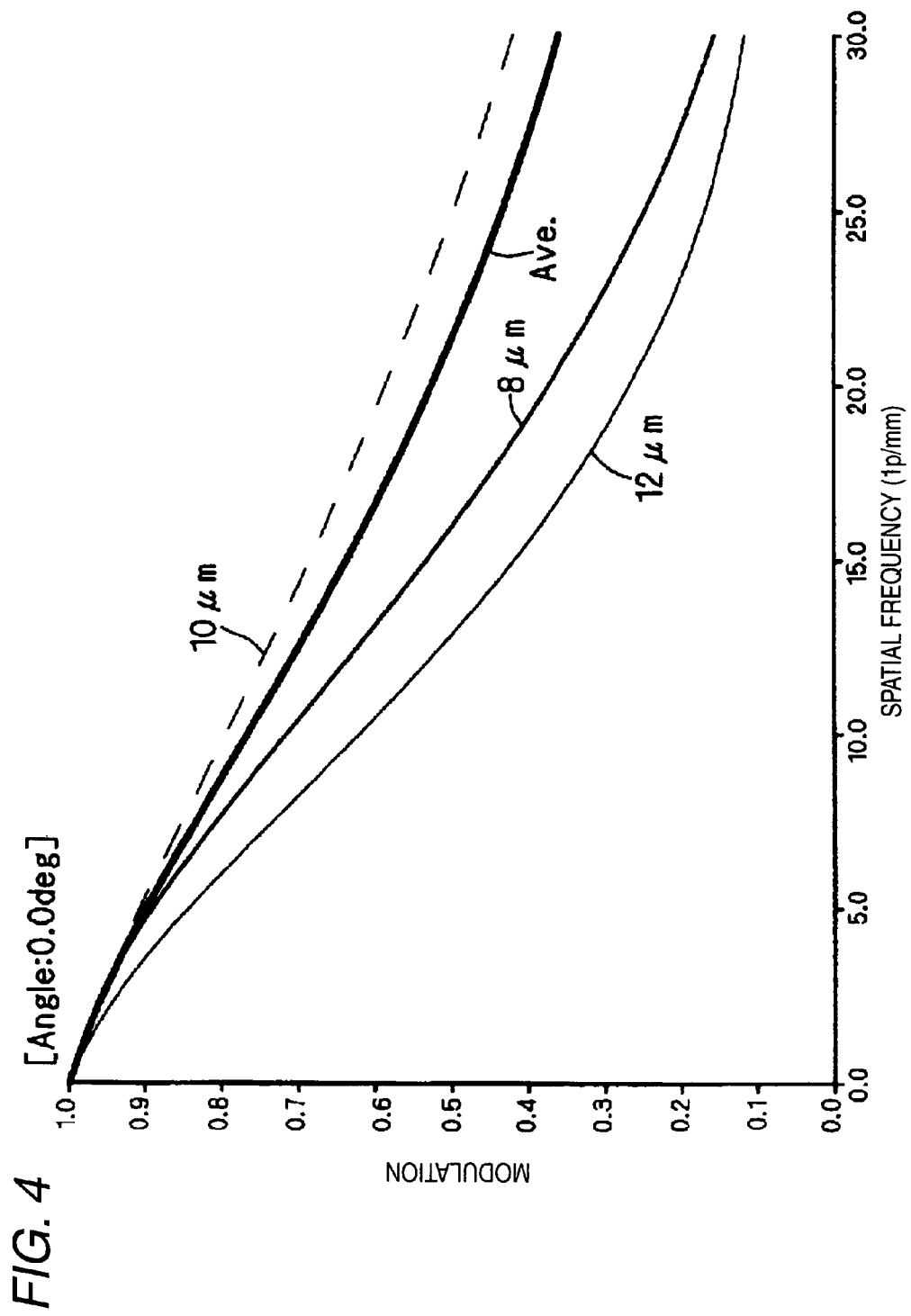
FIG. 4 is a graph illustrating MTF characteristics when the image height is 0° in the configuration of FIG. 1.
Figure 5:
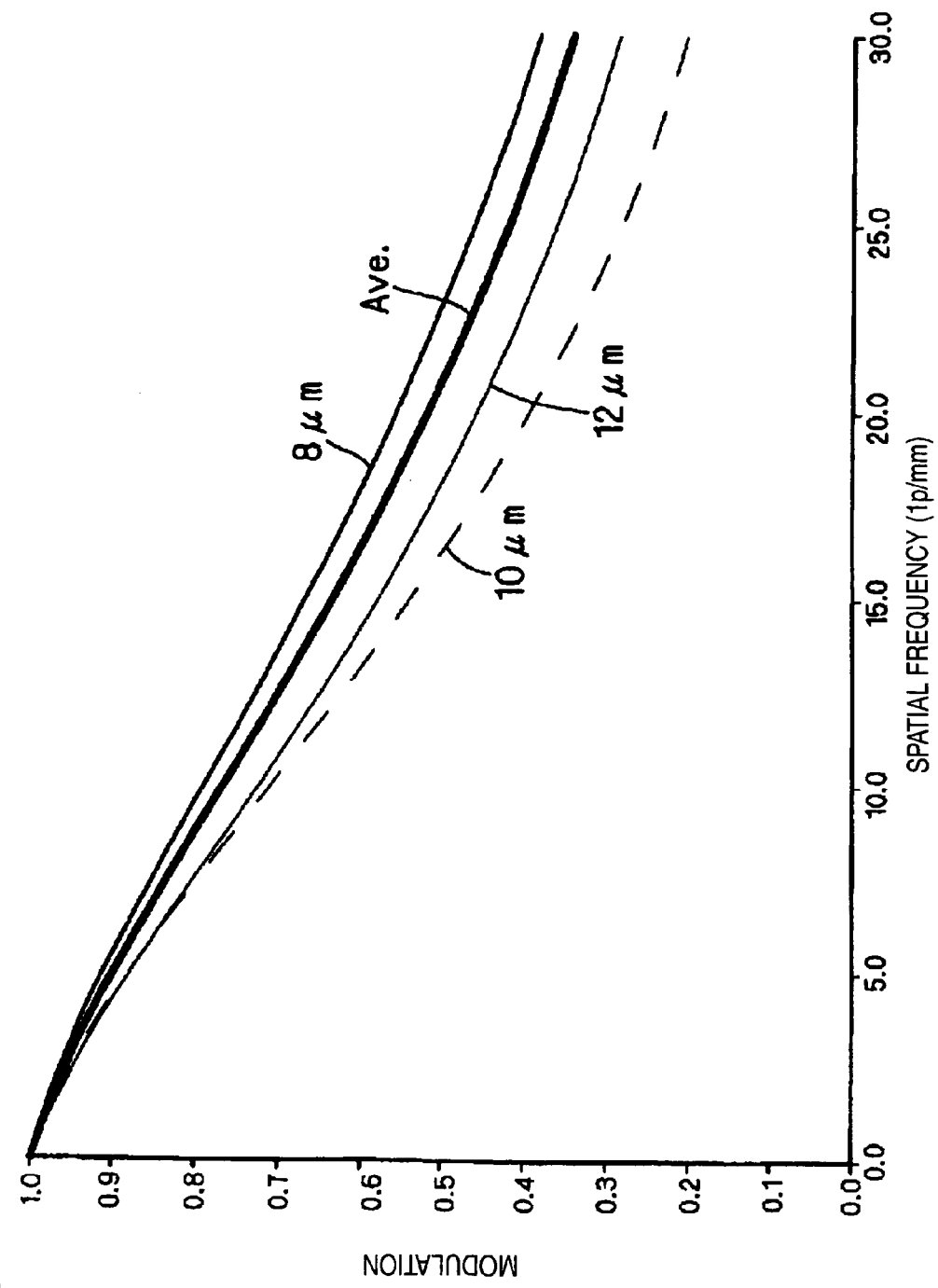
FIG. 5 is a graph illustrating MTF characteristics (sagittal) when the image height is 5.3° in the configuration of FIG. 1.
Figure 6:
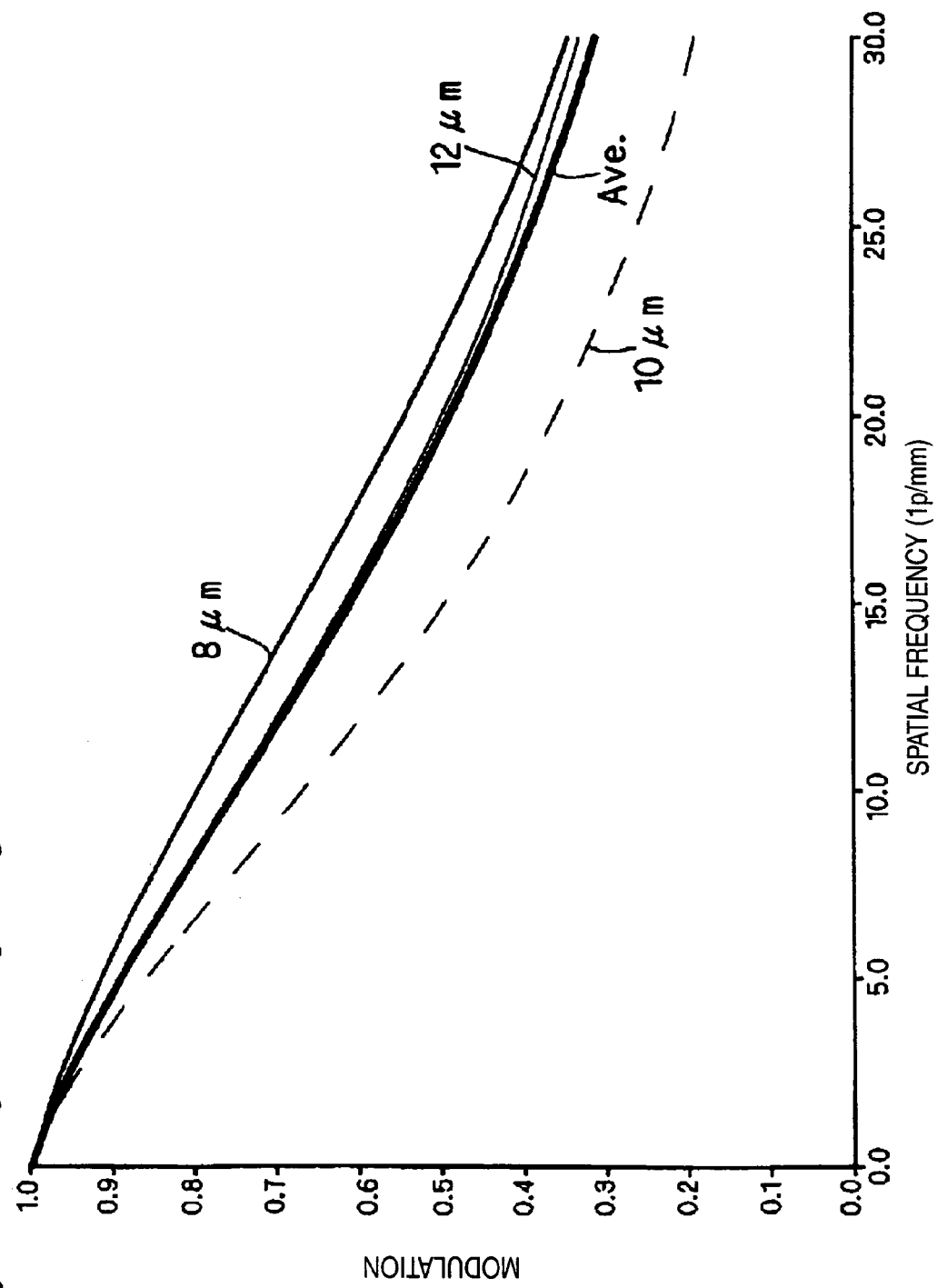
FIG. 6 is a graph illustrating MTF characteristics (tangential) when the image height is 5.3° in the configuration of FIG. 1.
Figure 7:
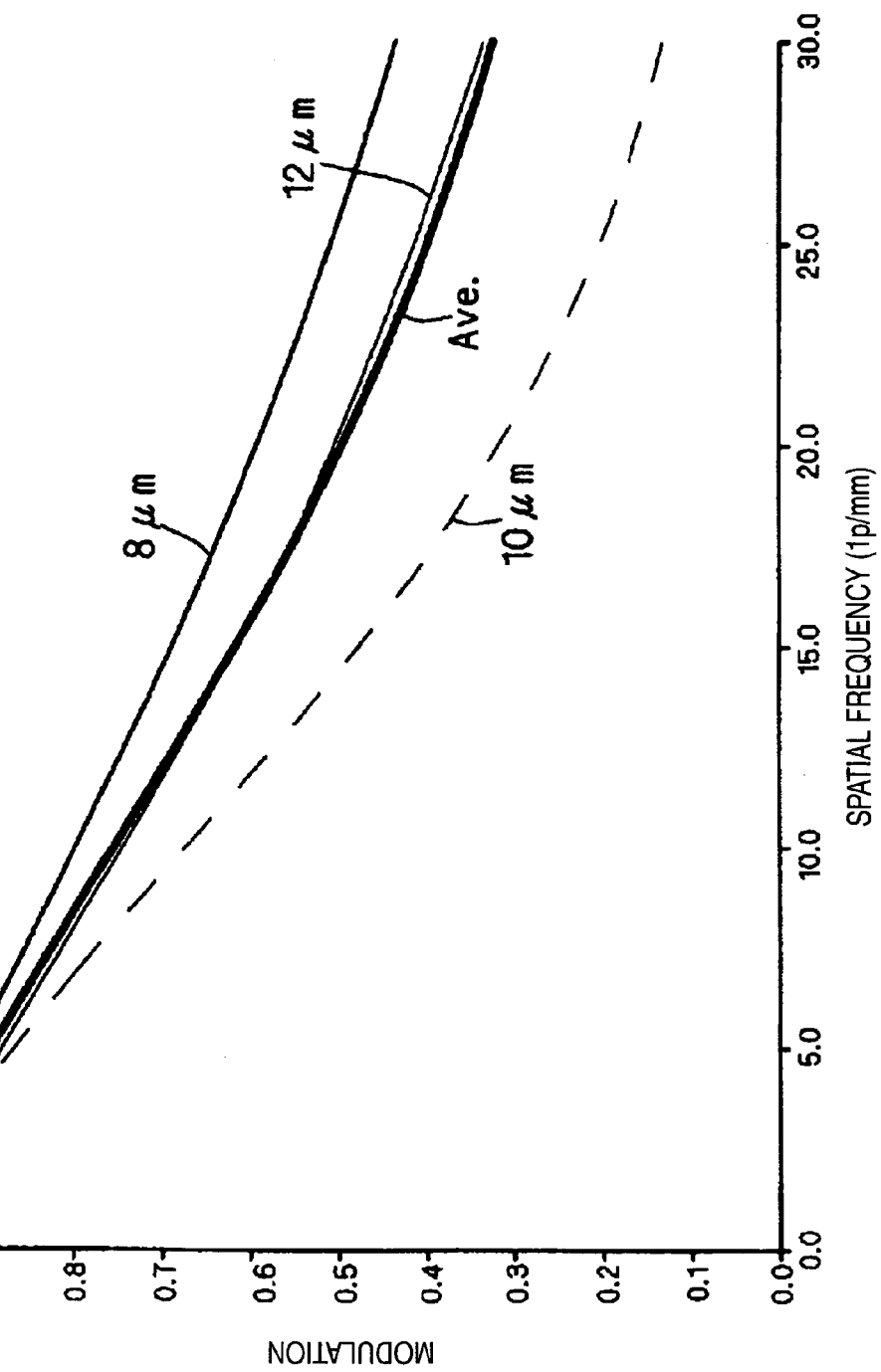
FIG. 7 is a graph illustrating MTF characteristics (sagittal) when the image height is 6.4° in the configuration of FIG. 1.
Figure 8:
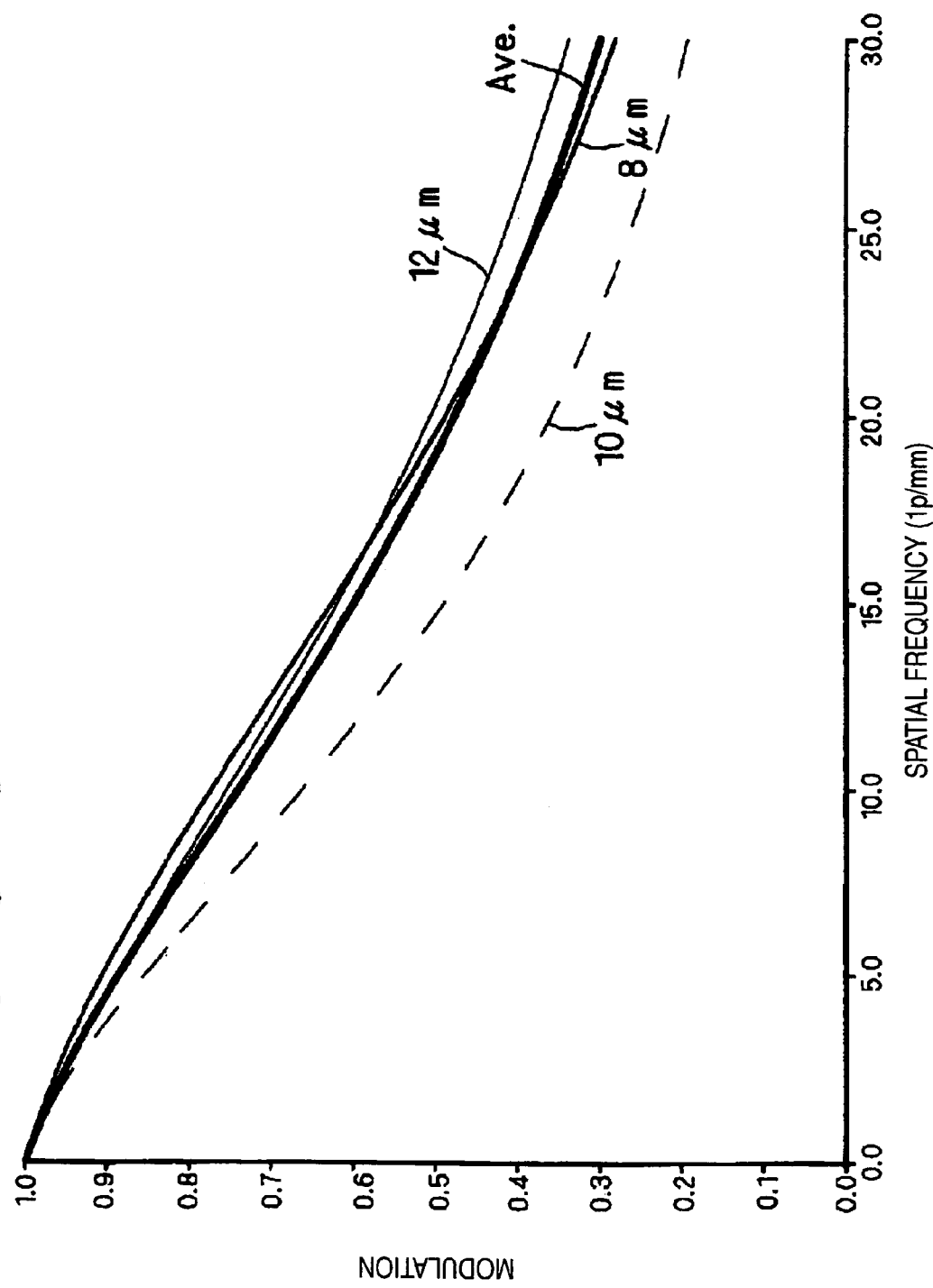
FIG. 8 is a graph illustrating MTF characteristics (tangential) when the image height is 6.4° in the configuration of FIG. 1.
Figure 9:
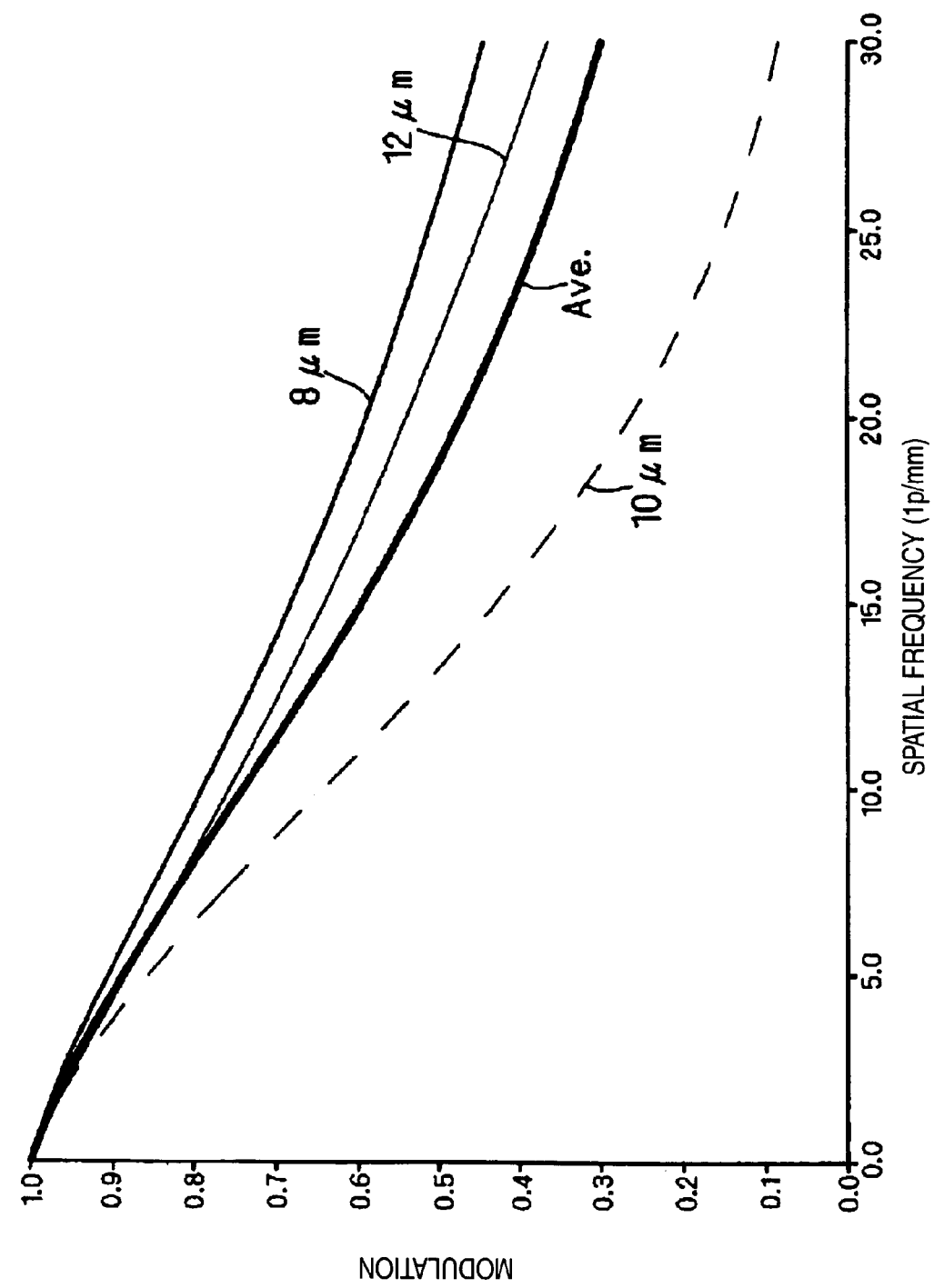
FIG. 9 is a graph illustrating MTF characteristics (sagittal) when the image height is 7.5° in the configuration of FIG. 1.
Figure 10:
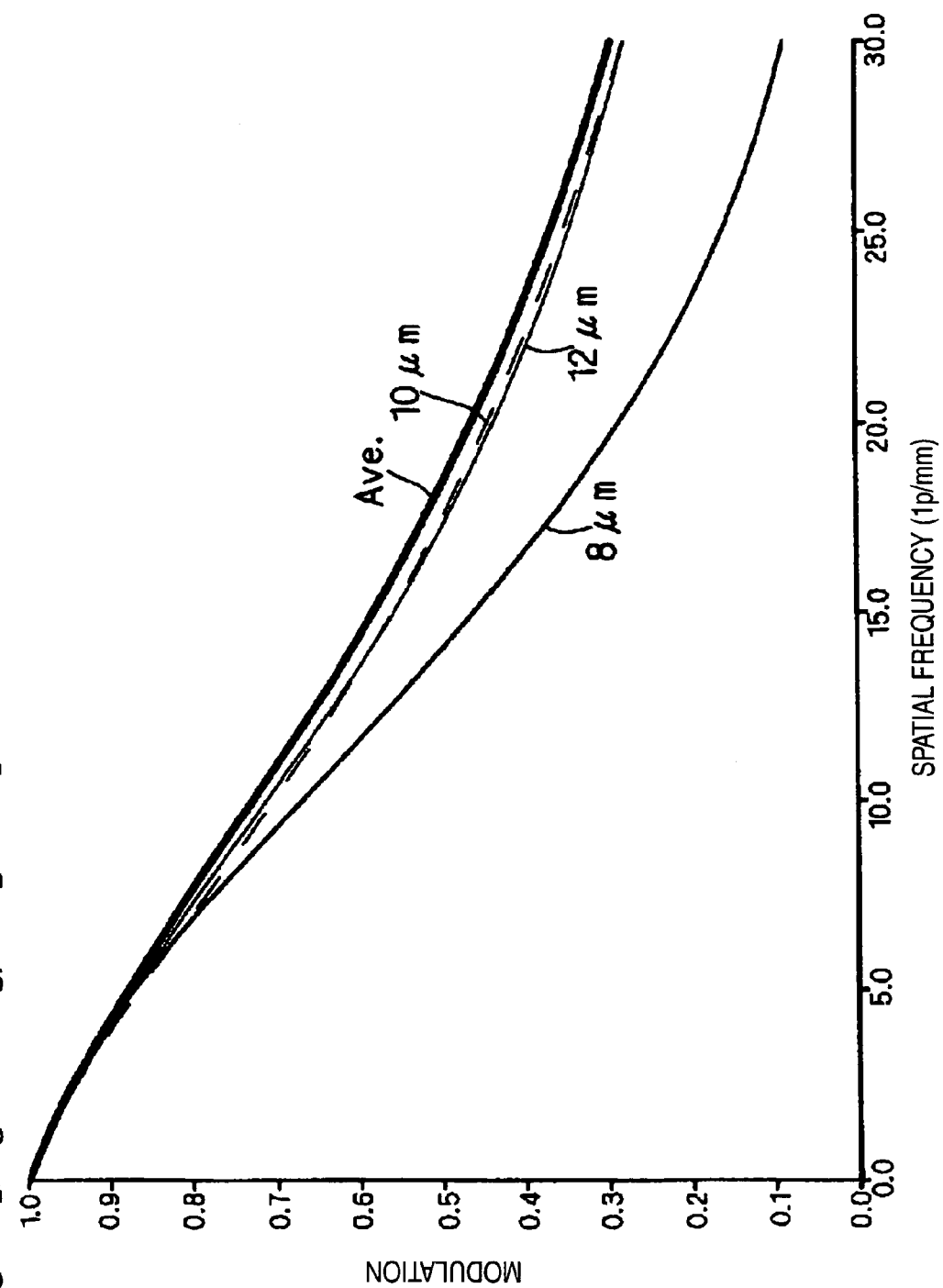
FIG. 10 is a graph illustrating MTF characteristics (tangential) when the image height is 7.5° in the configuration of FIG. 1.

The infrared lens 1a including first to third lenses L1 to L3 which are made of zinc sulfide are arranged in this order from an object side as shown in FIG. 1. The first to third lenses L1 to L3 are configured as a positive meniscus lens of which convex surfaces are opposed to the object side, and these first to third lenses L1 to L3 are configured as the first to third lenses' groups relating to the invention, respectively. Light (infrared rays) transmitted through lenses L1 to L3 is incident on an acceptance surface of an imaging device Id through an infrared transmission window Fi, and the light forms an image on the acceptance surface. In the embodiment, the first to third lens groups are configured by using lenses L1 to L3 so that one group has one lens, but the respective lens groups may be configured by using two lens or more, and the numbers of lenses corresponding to the respective lens groups may be configured to be different to each other.

In this way, the entire lenses L1 to L3 are made of low-cost zinc sulfide, and the infrared lens 1a is configured by the three positive meniscus lenses of which convex surfaces are opposed to the object side. Therefore, it is possible to improve an imaging performance while minimizing the light loss at the time of transmission through the lenses by minimizing thicknesses of the respective lenses L1 to L3. It is also possible to provide the infrared lens 1a forming a bright image, and having a high imaging performance by using a configuration of low cost. Additionally, it is configured to be capable of contriving to minimize the light loss at the time of transmission through the lenses, by minimizing the whole thickness of the entire lenses relative to the known zinc sulfide lenses.

In addition, a concave surface (the surface opposed to the image side) of the first lens L1 is formed as a diffractive surface. Due to this, it is possible to effectively improve chromatic aberration which is a main issue in the infrared lens 1a. It is also possible to bring the most effective improvement result of the chromatic aberration, by forming the diffractive surface on the first lens L1 that a large refractive power is required and the chromatic aberration easily occurs. It is also possible to prevent attaching dust or the like to the diffractive surface caused by being exposed to external environment, by forming the diffractive surface on the surface which is the image side of the first lens L1.

At least any one surface of the convex surface or the concave surface in the first lens L1 is formed as an aspheric surface. In this manner, the aspheric surface is formed on the first lens L1 of which an aperture is large and the spherical aberration easily occurs, and thus it is possible to effectively improve the aberration. By forming the aspheric surface on the first lens L1 having a largest diameter, a degree of a shape change of the aspheric surface (degree of undulation) decreases relative to the case where the aspheric surface is formed on another lens and the mold fabrication and lens process are easy to perform. For example, in the embodiment, the concave surface of the first lens L1 and the convex surface (the surface of the object side) of the third lens are formed as the aspheric surface, and the other lens surfaces are formed as a spherical surface.

An F value of the infrared lens 1a is set by 0.8 to 1.2 or so.

Besides, to achieve a predetermined imaging performance, the infrared lens 1a is configured to satisfy the following relational expression:

$$1.0 \leq f1/f \leq 1.4 \quad (1)$$

where
  f=total focal length of the first to third lenses L1 to L3 and
  f1=focal length of the first lens L1.

Satisfying these conditions, various aberrations within the field of vision are corrected so as to have balance, and it is possible to easily embody the compact and bright infrared lens 1a. For example, if f1/f is set to be smaller than 1.0, it is required to dispose the first lens L1 and the second lens L2 so as to be close to each other. Therefore, it is difficult to correct the spherical aberration. On the contrary, if f1/f is set to be greater than 1.4, it is required to dispose the first lens L1 and the second lens L2 so as to be apart from each other. Therefore, skew rays propagate through a place apart from an optical axis of the first lens L1. Accordingly, astigmatism increases, and difficulty in correction of distortion is also increases therewith.

As the result, employing a compact configuration which satisfies the relational expression 1, within a view angle of the infrared lens 1a (for example, it is set in the range from 10° to 25°), it is possible to obtain the imaging performance (for example, MTF 0.2 or more) enough for the entire wavelength region (for example, 8 to 12 μm) of the received infrared rays for the imaging in the entire region (the detailed description of this scope will be described later, on the basis of Examples and Comparative Examples). On this account, for example, by combining the infrared lens 1a with the imaging device Id having pixel pitch 25 μm and pixel size 320×240, an infrared picture which has high resolution can be obtained.

The first to third lenses L1 to L3 which have such the configuration are formed as follows. Specifically, by using a mold formed in a lens shape and performing a heat press molding in a non-oxidizing atmosphere (for example, vacuum, inert gases such as Argon, or combination of them) on raw powder of zinc sulfide, the lenses L1 to L3 which are made of sintered bodies of polycrystalline zinc sulfide are obtained. In this way, it is possible to contrive a great reduction in material and processing cost of the infrared lens 1a, by fabricating the lenses L1 to L3 by a molding process using the zinc sulfide. It is also possible to perform mechanical processes such as a grinding and a polishing on the lenses L1 to L3 processed by the molding.

More specifically, as for the raw powder of zinc sulfide, the powder having an average particle diameter from 0.5 to 2 μm and purity 98% or more is available. It is desirable that a fabrication of a heat press molding is performed under the condition of temperature from 900 to 1100° C. and pressure from 150 to 800 kg/cm$^2$. Time for maintaining the pressure usually continues for from 0.05 to 1.5 hours, and the time is properly controlled by the combination between the conditions of temperature and pressure.

Here, to fabricate with low cost the infrared lens 1a having a predetermined optical performance by processing the heat press molding which uses the mold formed in a lens shape, it is required to employ a configuration suitable for the molding in the configurations such as the outer diameters or the thicknesses of the lenses L1 to L3.

It is one of effective methods for the polycrystalline zinc sulfide lens to perform a coating for improving the transmittance characteristic or protecting the surface thereof from external affections. At this time, the material and the thickness of the coating layer are appropriately selected in consideration of a using method, a place, and a situation of the infrared lens.

First, in terms of outer diameters Rd of the lenses L1 to L3, the larger outer diameters Rd of the lenses L1 to L3 are set, the brighter image can be obtained. However, in accordance with the increase of the outer diameter Rd, required compressive force of a press apparatus in the process of the heat press molding which is performed by using a lens shaped mold increases. For this reason, in view of the processing cost or the like, for example, assuming that a combination includes the imaging device Id having pixel pitch 25 μm, it is desirable to set the outer diameters Rd of the lenses L1 to L3 so as to satisfy the following relational expression:

$$Rd < 40 \text{ mm}. \tag{2}$$

Thanks to this, the required compressive force of the press apparatus in the process of the heat press molding which is performed by using the lens shaped mold can be minimized. Therefore, it is possible to decrease installation cost for processing the lenses.

In terms of the thicknesses of the lenses L1 to L3, the thicknesses of a certain degree are required to secure molding capability (mechanical strength, processing accuracy, and the like) in the process of the heat press molding which is performed by using the lens shaped mold. Meanwhile, when the thicknesses increase, the light loss at the time of transmission through the lenses also increases. At that time, distribution of the compressive force occurs in a thickness direction of the lenses L1 to L3 in the process of the heat press molding, and thus distribution of the refractive index easily occurs. For this reason, for example, assuming that a combination includes the imaging device Id having pixel pitch 25 μm, in terms of the thicknesses of the lenses L1 to L3, it is desirable to set a central thickness Tm and a peripheral thickness Te so as to satisfy the following relational expressions:

$$1.5 \text{ mm} < Tm < 8.0 \text{ mm and} \tag{3}$$

$$1.0 \text{ mm} < Te < 8.0 \text{ mm}. \tag{4}$$

Due to this, by securing the molding capability in the process of the heat press molding which is performed by using the lens shaped mold, it is possible to embody the infrared lens 1a of which the thicknesses are thin and the light loss at the time of transmission through the lenses is minimized. By minimizing the thicknesses of the lenses L1 to L3, it is possible to prevent the problem that the distribution of the compressive force occurs in the thickness direction of the lenses in the process of the heat press molding and thus the distribution of the refractive index occurs in the thickness direction.

As for the imaging device Id, a non-cooling thermal type imaging device such as a bolometer, a thermopile, and a SOI diode which have sensitivity of about 8 to 12 μm is used. Usually, the imaging device Id which has the number of pixels of 160×120 and 320×240 is used. By using the imaging device Id which has narrow pixel pitches (for example, 25 μm), it is possible to appropriately set the maximum diameter of the infrared lens 1a by 30 mm or so in the fabrication.

Example

Hereinafter, three Examples 1-1, 1-2, and 1-3 fairly suitable as detailed example of Embodiment 1 will be described. Examples 1-4 and 1-5 will be introduced as two Comparative Examples relative to Examples 1-1, 1-2, and 1-3, and Examples 1-1, 1-2, and 1-3 and Examples 1-4 and 1-5 will be compared to each other. The f1/f is set by 1.10 in Example 1-1, the f1/f is set by 1.40 in Example 1-2, and the f1/f is set by 1.00 in Example 1-3. Additionally, the f1/f is set by 1.45 in Example 1-4, and the f1/f is set by 0.96 in Example 1-5.

Example 1-1

The infrared lens 1a according to Example 1-1 have configurations illustrated in the FIGS. 1 to 3, and the lenses are configured that the f1/f is 1.10, the F value is 1.1, the maximum diameter is 28.4 mm, and the view angle is 17° (the view angle is set in the combination case where the imaging device has a pixel pitch 25 μm and a pixel size 320×240). The aspheric surface shape (diffractive surface shape) of a second surface and a fifth surface shown in FIG. 3 is determined by substituting the parameter into the following expression (ditto below):

$$Z(y) = \frac{\frac{y^2}{R}}{1 + \sqrt{1-(1+K)\frac{y^2}{R^2}}} + A2 \cdot y^2 + \qquad \text{[Numerical Formula 1]}$$
$$A4 \cdot y^4 + A6 \cdot y^6 + A8 \cdot y^8 + \ldots + \Phi(y)$$

$$\Phi(y) = \frac{1}{N-1} \cdot \text{mod}(C1 \cdot y^2, -\lambda) \qquad \text{[Numerical Formula 2]}$$

In the formula, the Z is a length (mm) of a perpendicular line down on the tangential surface in contact with the top of the aspheric surface from a point on the aspheric surface, the y is a height (mm) from an optical axis, the K is an eccentricity, the R is a near-axis curvature radius, and the A2, A4, A6, and A8 are aspheric surface coefficients of second order, fourth order, sixth order, and eighth order. In addition, the N is a refractive index, λ is a value of a reference wavelength, and the C1 is diffractive surface coefficient.

Sagittal and tangential MTF characteristics with respect to wavelengths 8 μm, 10 μm, and 12 μm within view angles (0°, 5.3°, 6.4°, and 7.5°) in the configuration of Example 1-1 are illustrated in FIGS. 4 to 10. In FIG. 4 to FIG. 10, the Ave. is a graph illustrating averages of the MTF values of 8 to 12 μm (ditto below).

Figure 11:
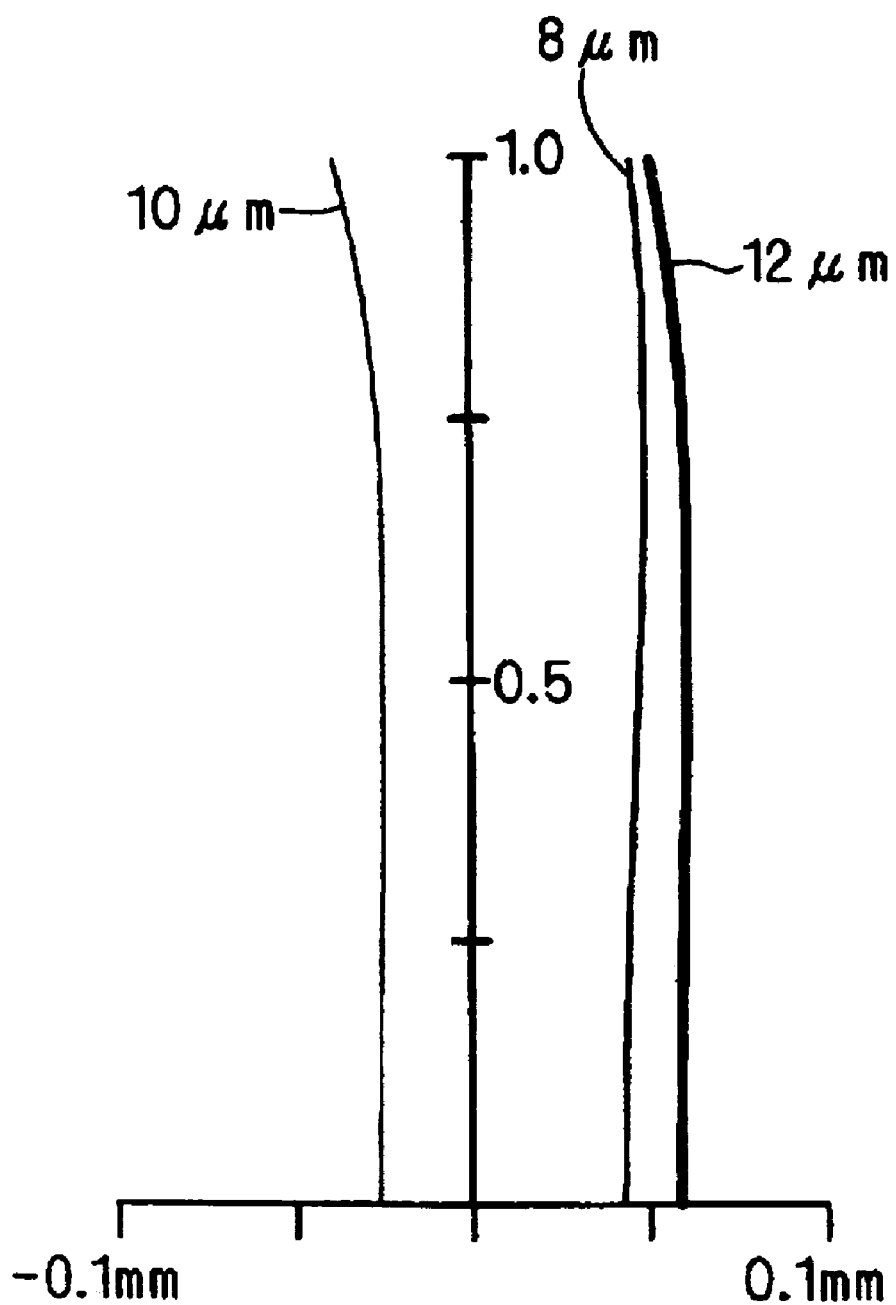
FIG. 11 is a graph illustrating spherical aberration characteristics in the configuration of FIG. 1.
Figure 12:
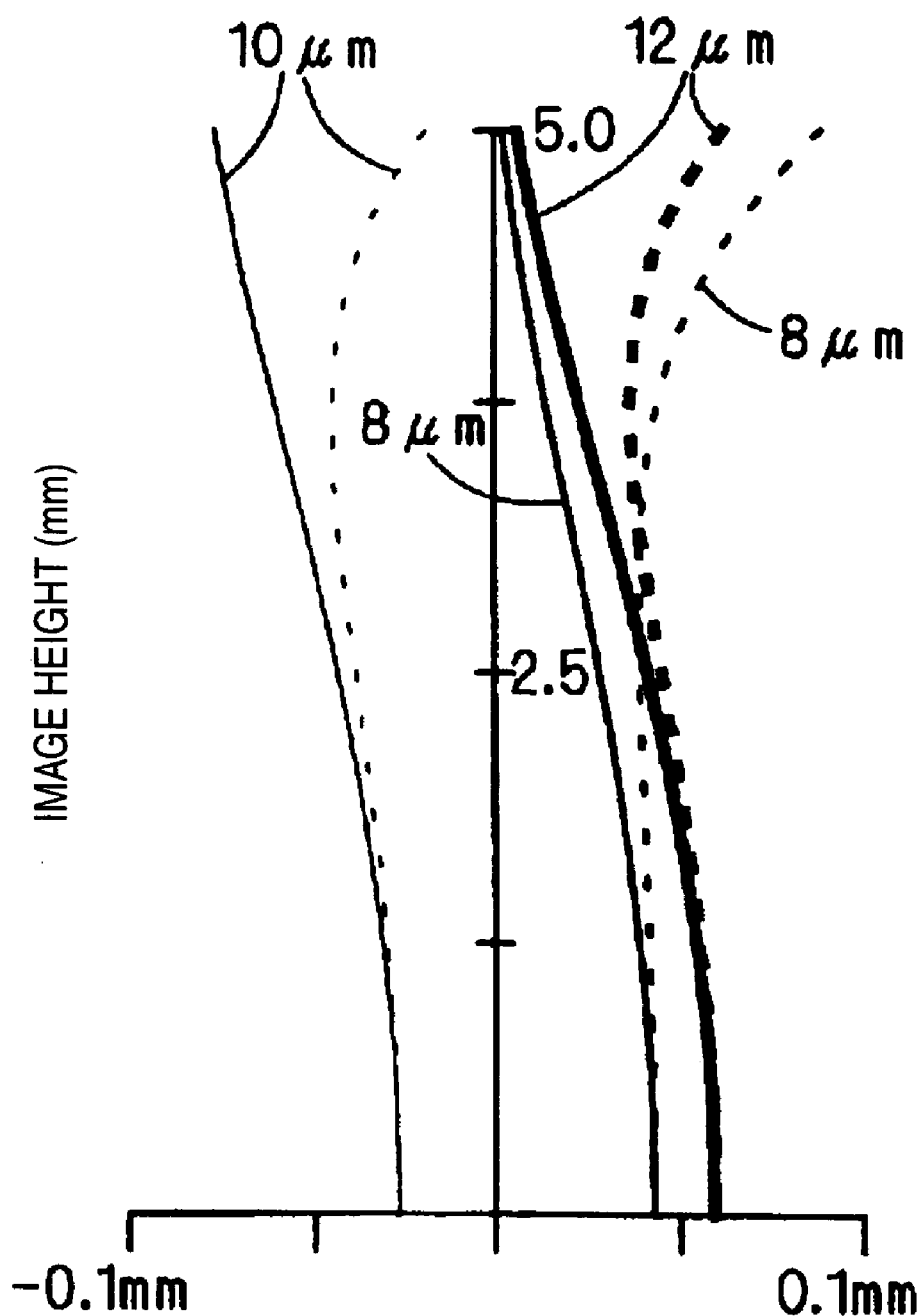
FIG. 12 is a graph illustrating astigmatism characteristics in the configuration of FIG. 1.
Figure 13:
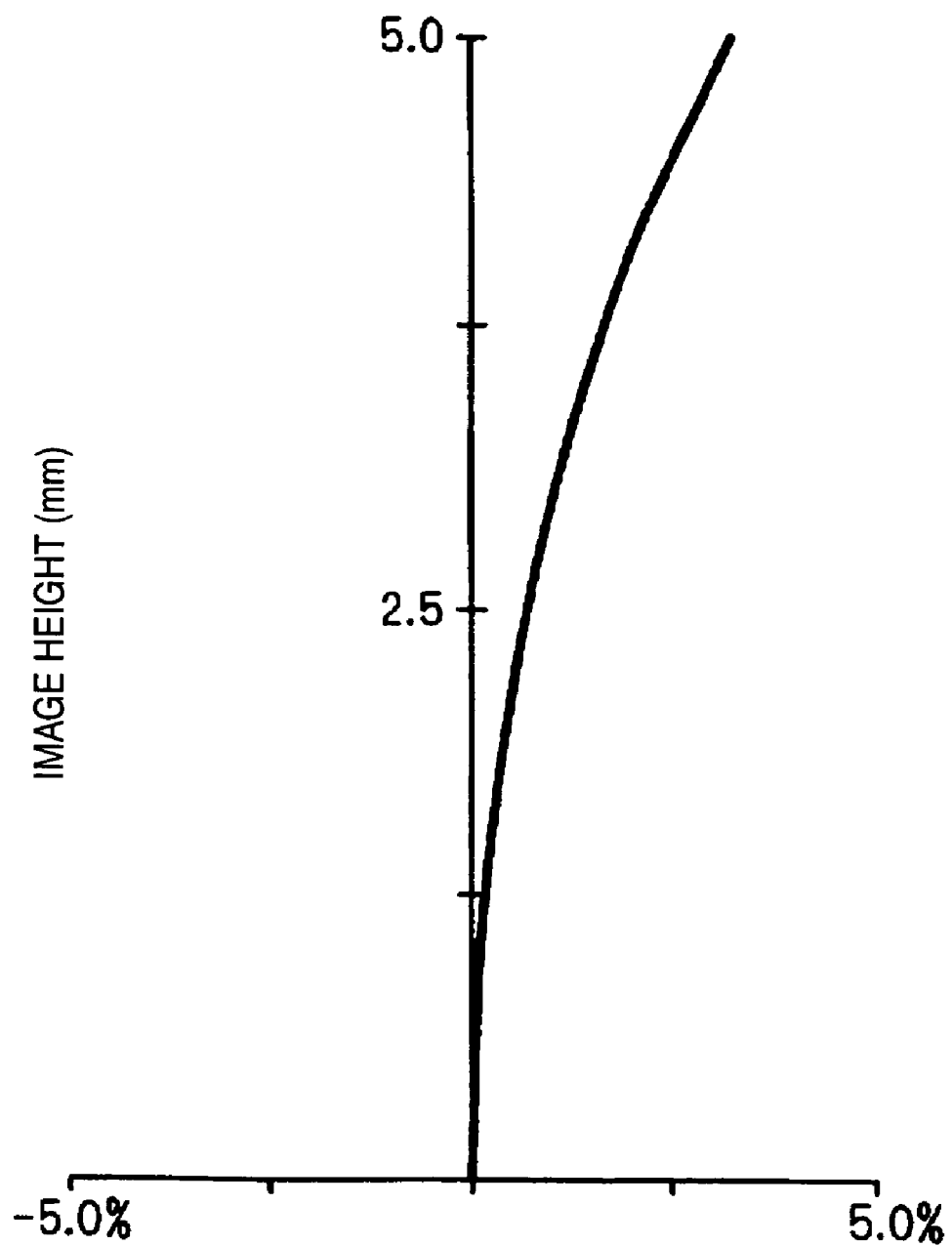
FIG. 13 is a graph illustrating distortion characteristics in the configuration of FIG. 1.
Figure 14A:
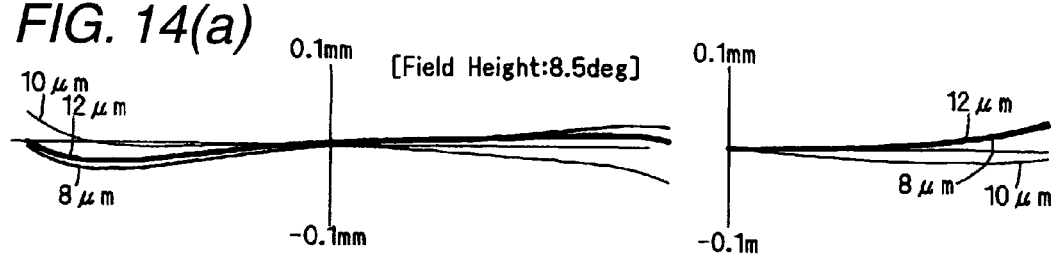
FIGS. 14(a) to 14(e) are graphs illustrating longitudinal aberration characteristics corresponding to the respective image heights in the configuration of FIG. 1.
Figure 14B:
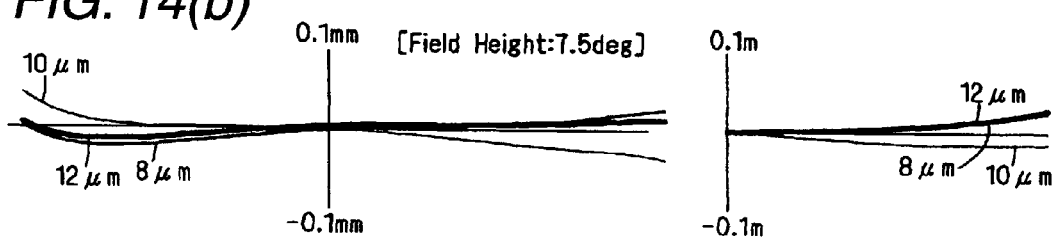
Figure 14C:
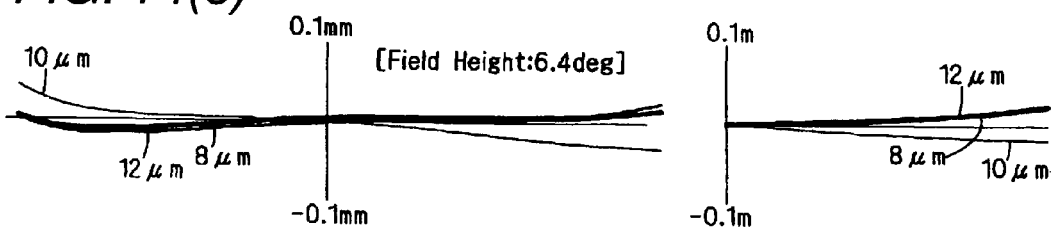
Figure 14D:
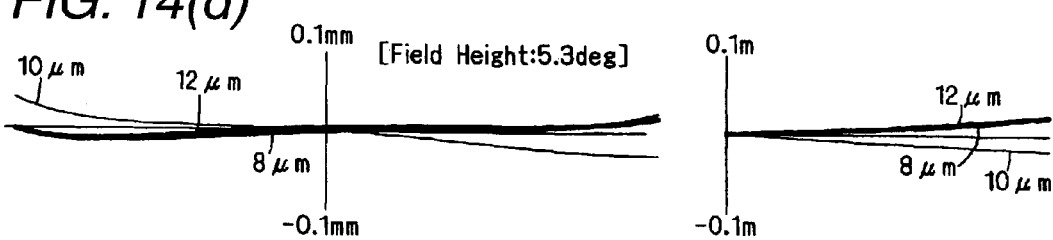
Figure 14E:
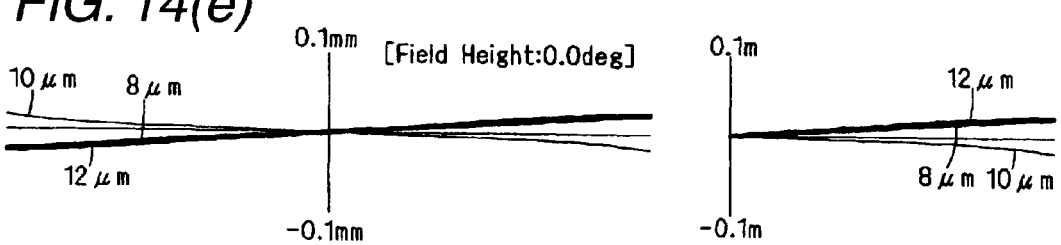

Additionally, spherical aberration and astigmatism characteristics with respect to the wavelengths 8 μm, 10 μm, and 12 μm are illustrated in FIGS. 11 and 12, and distortion characteristics are illustrated in FIG. 13. Longitudinal aberration characteristics corresponding to the respective image heights in the view angle with respect to the wavelengths 8 μm, 10 μm, and 12 μm are illustrated in FIGS. 14(*a*) to 14(*e*) (in the drawings, a left side and a right side corresponds to the tangential and the sagittal, respectively).

Example 1-2

Figure 15:
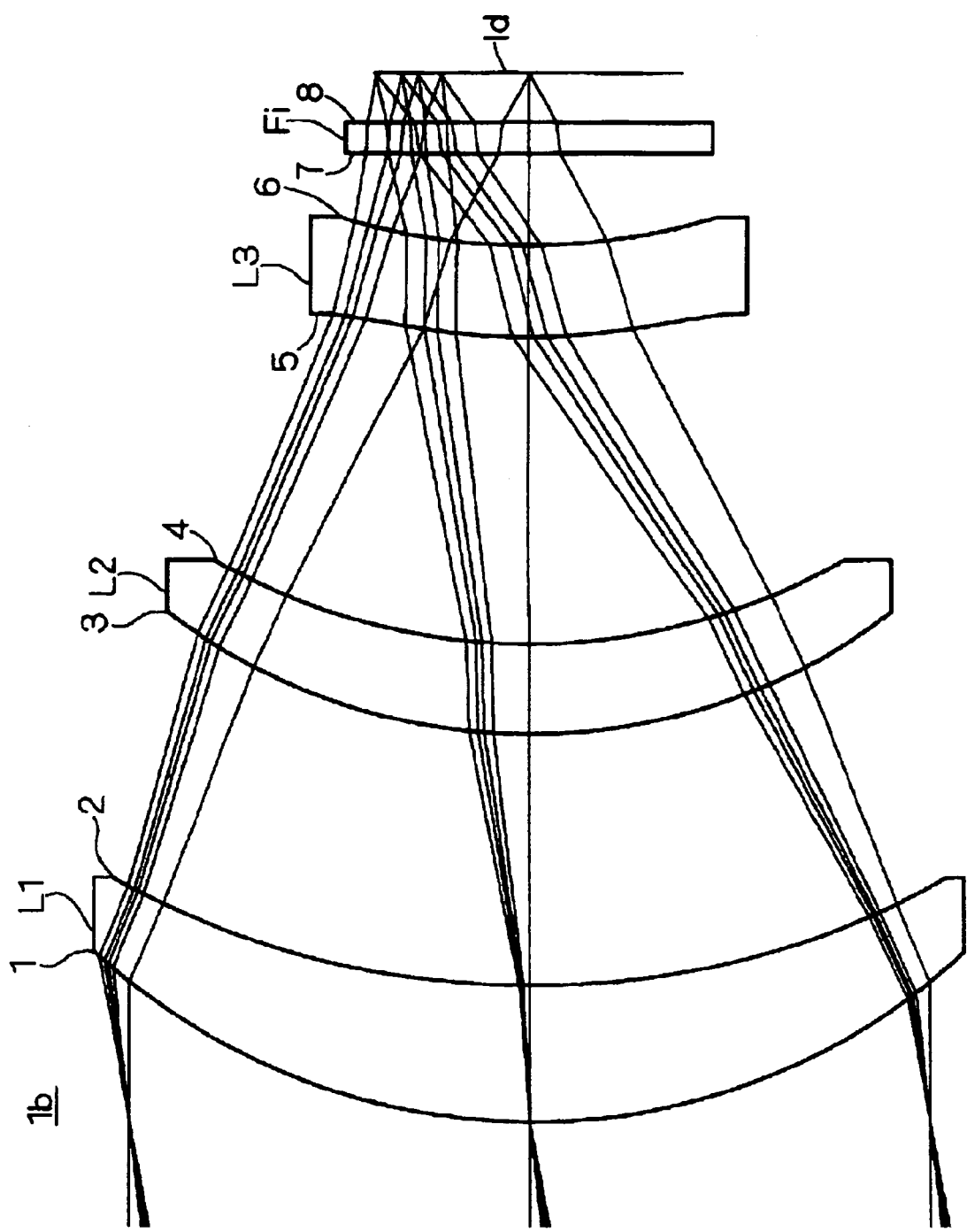
FIG. 15 is a diagram illustrating a configuration of Example 1-2 of an infrared lens according to Embodiment 1 of the invention.
Figure 18:
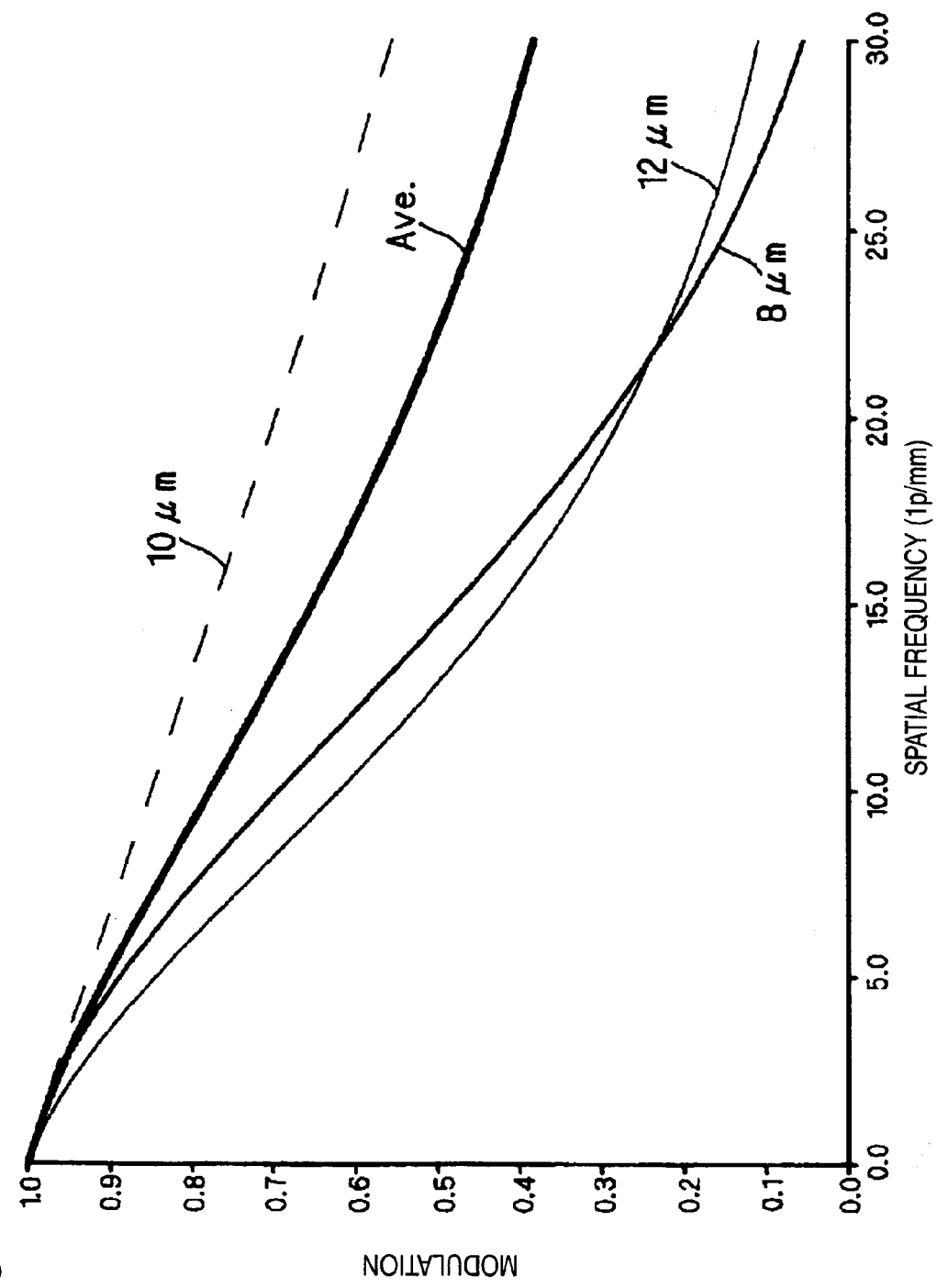
FIG. 18 is a graph illustrating MTF characteristics when the image height is 0° in the configuration of FIG. 15.
Figure 19:
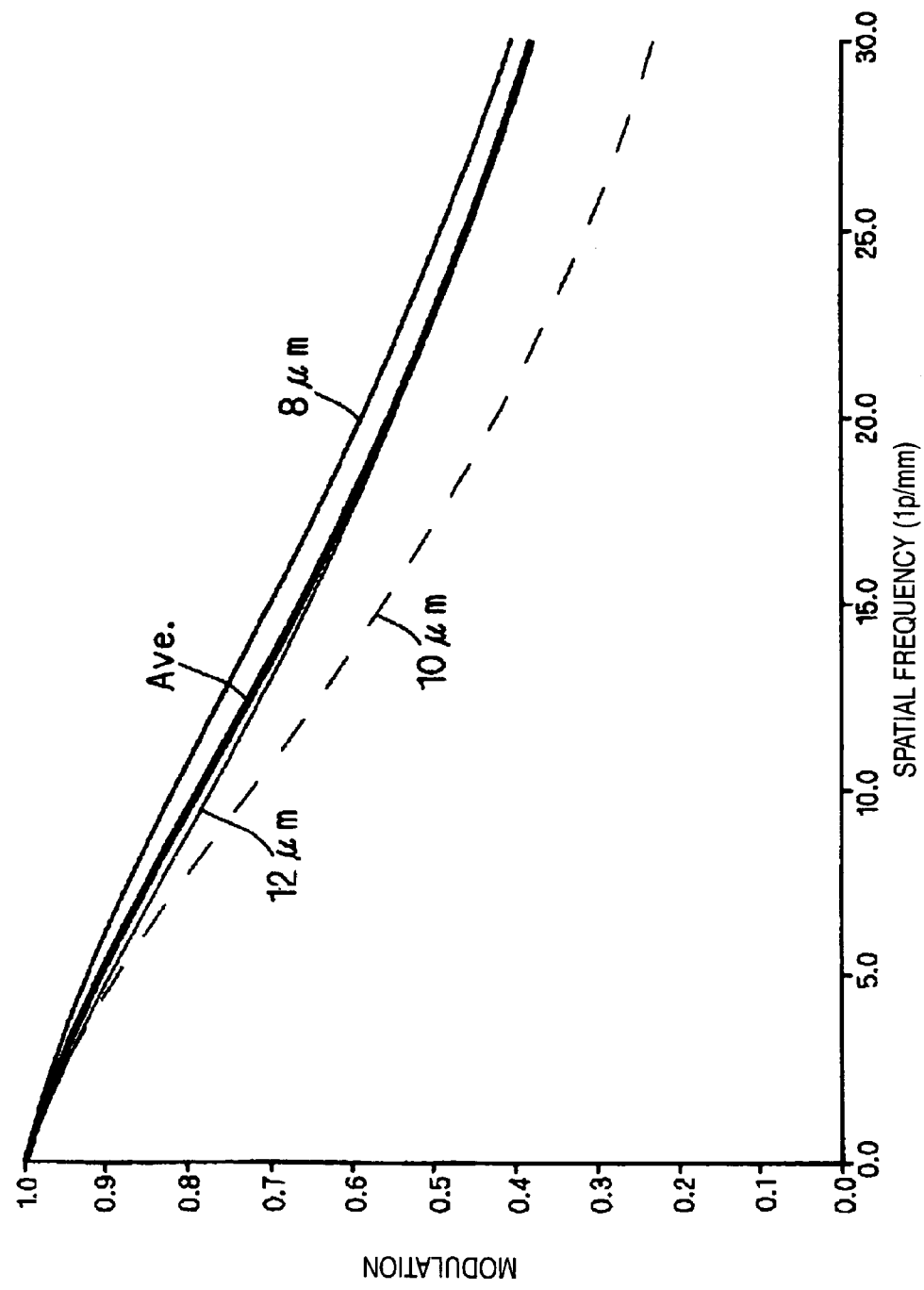
FIG. 19 is a graph illustrating MTF characteristics (sagittal) when the image height is 6.0° in the configuration of FIG. 15.
Figure 20:
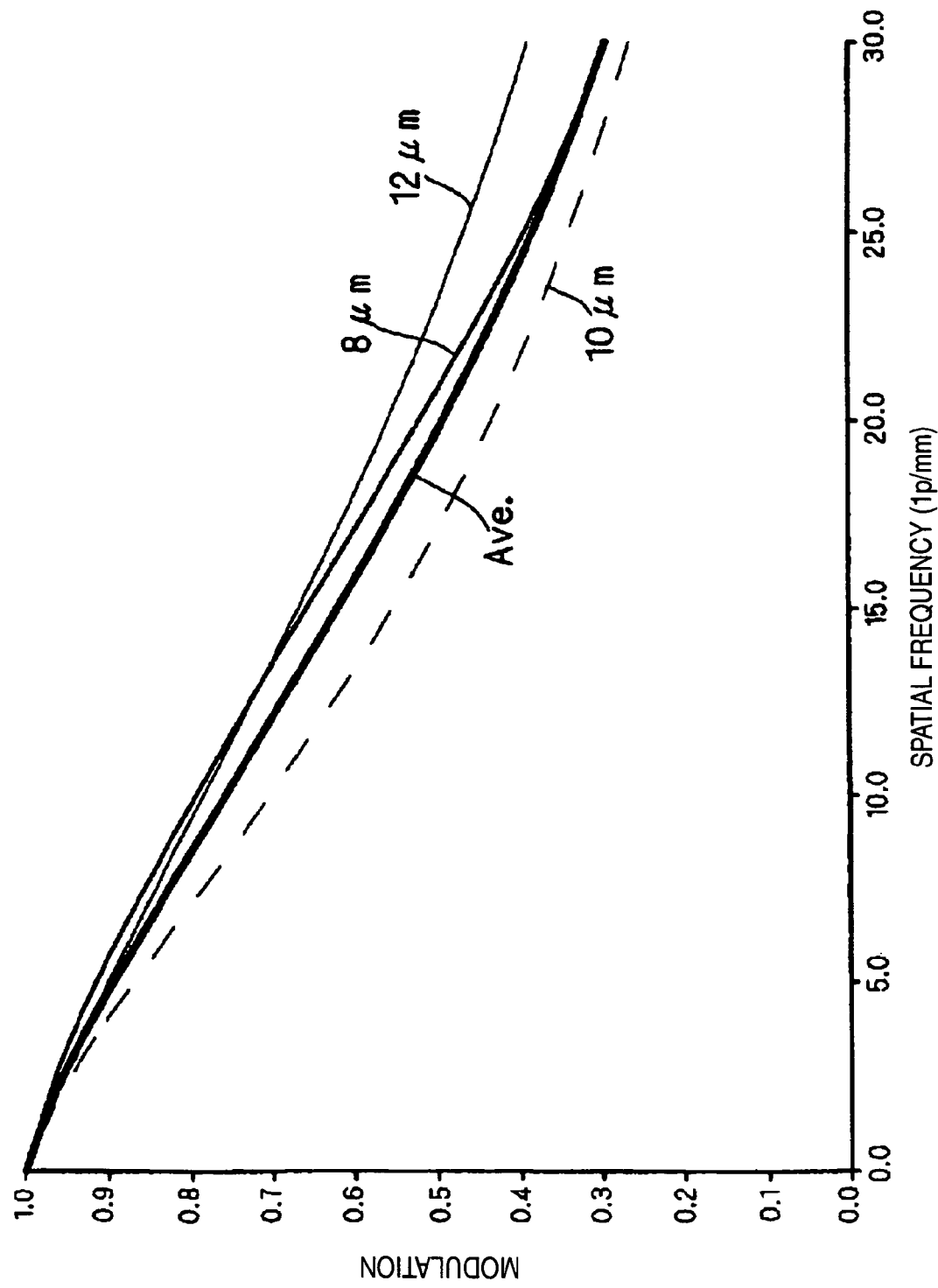
FIG. 20 is a graph illustrating MTF characteristics (tangential) when the image height is 6.0° in the configuration of FIG. 15.
Figure 21:
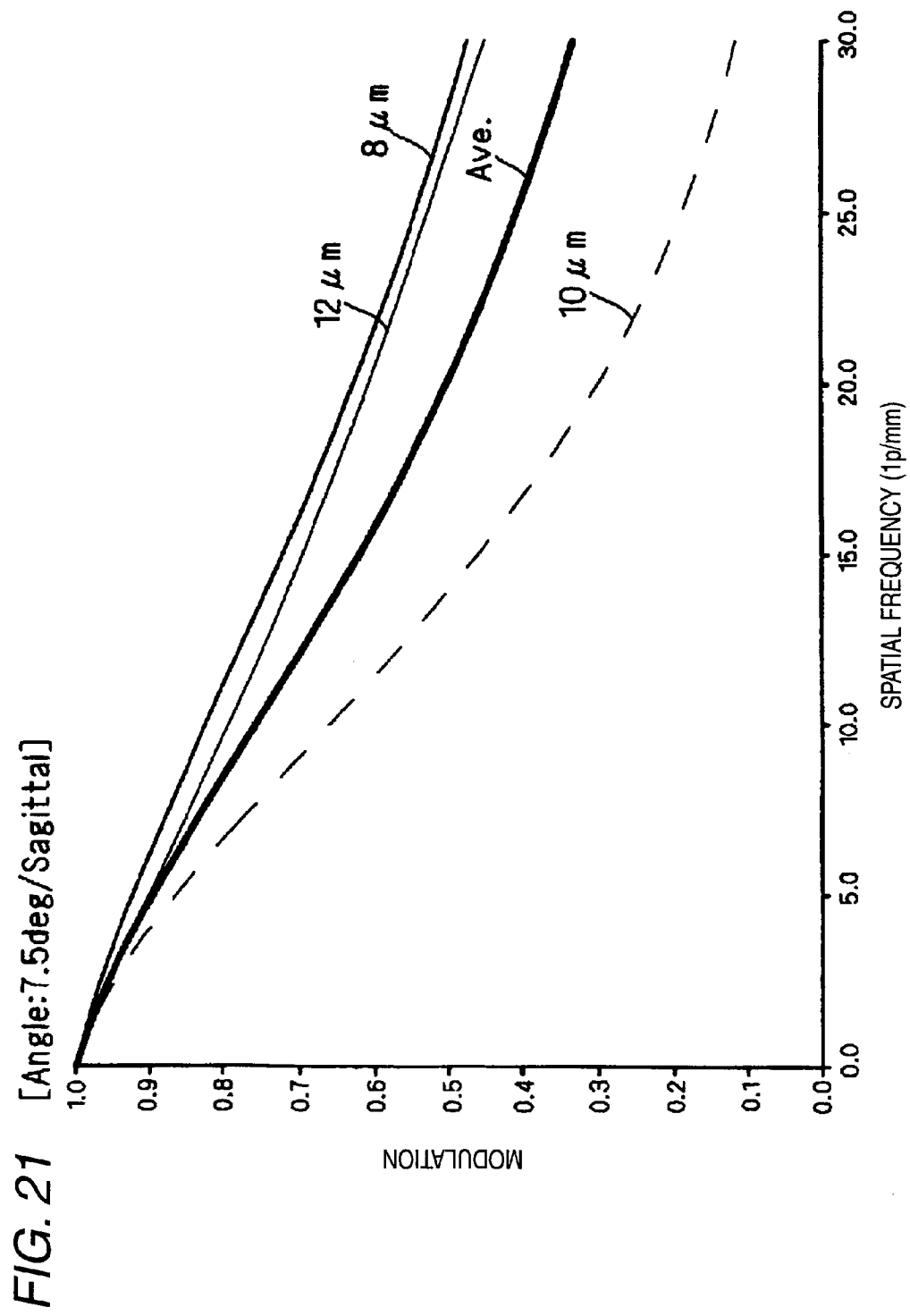
FIG. 21 is a graph illustrating MTF characteristics (sagittal) when the image height is 7.5° in the configuration of FIG. 15.
Figure 22:
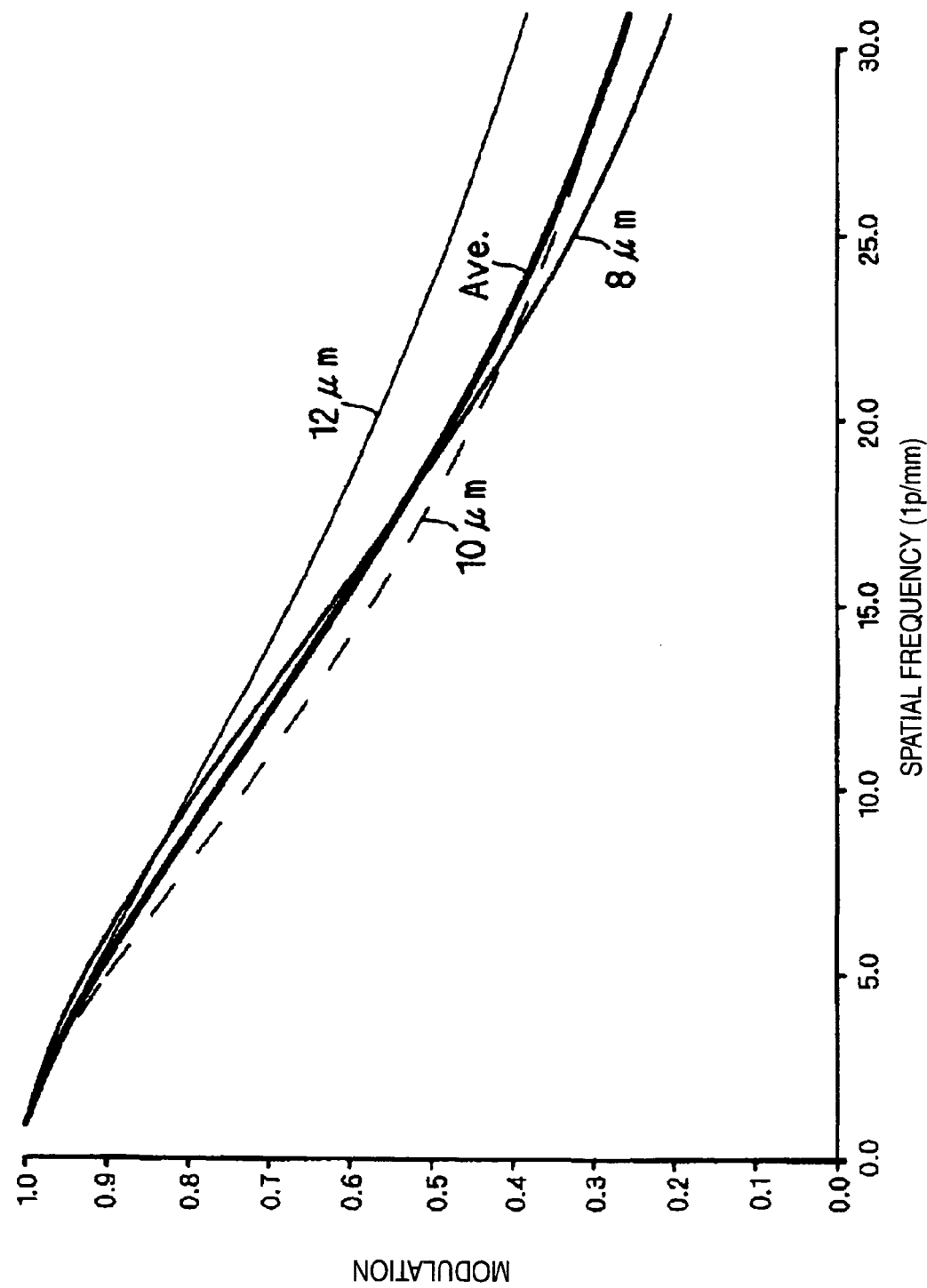
FIG. 22 is a graph illustrating MTF characteristics (tangential) when the image height is 7.5° in the configuration of FIG. 15.
Figure 23:
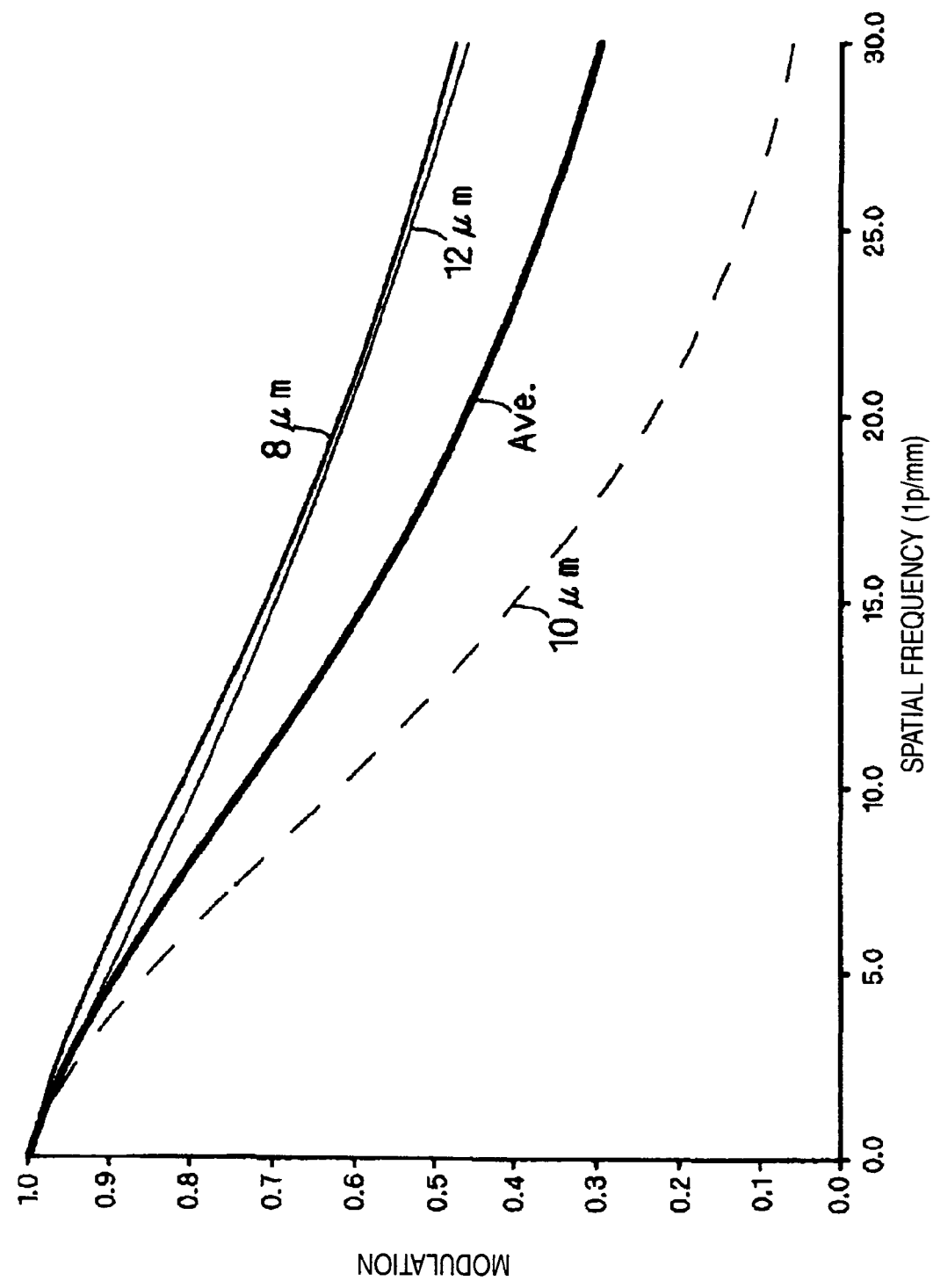
FIG. 23 is a graph illustrating MTF characteristics (sagittal) when the image height is 8.5° in the configuration of FIG. 15.
Figure 24:
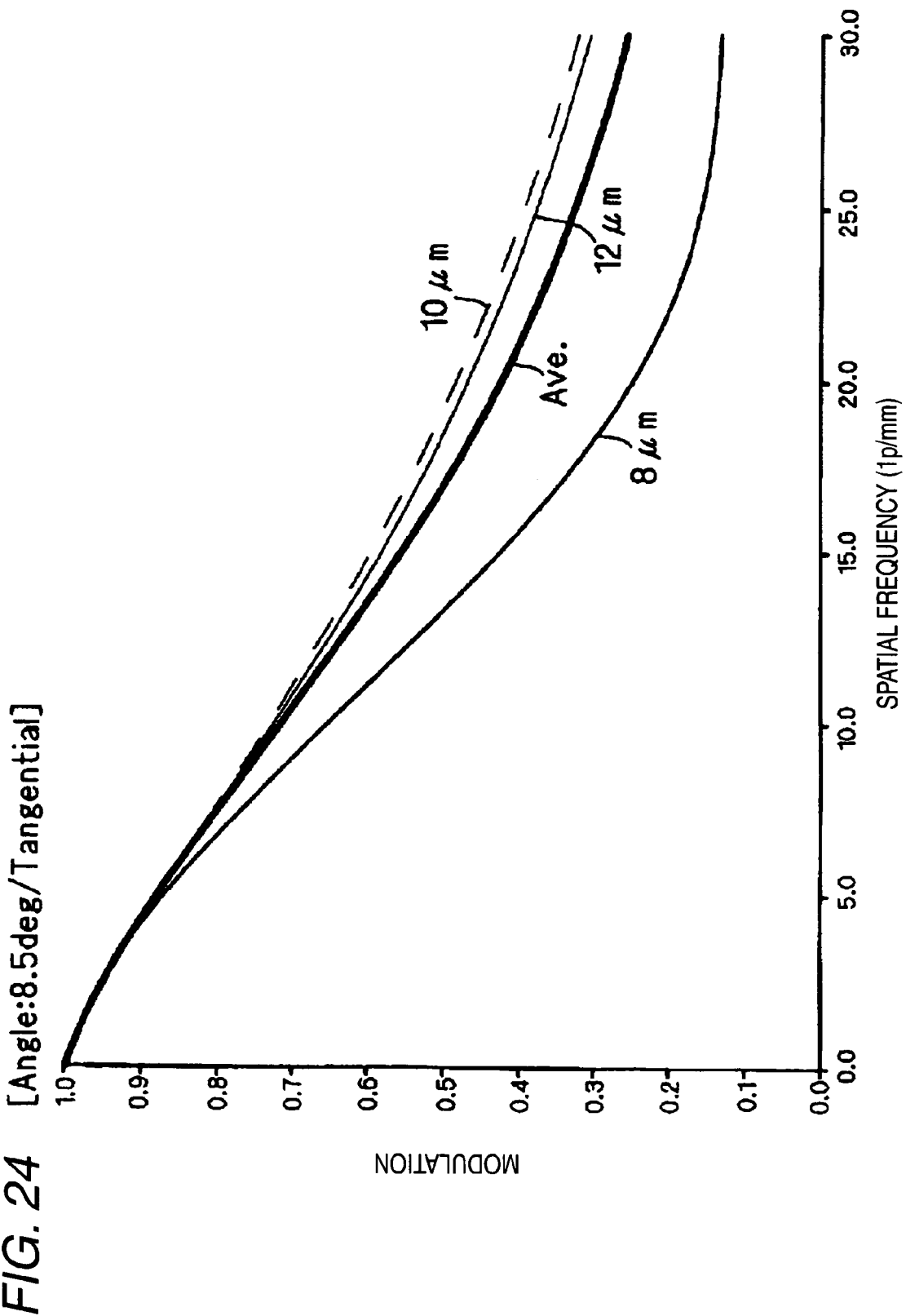
FIG. 24 is a graph illustrating MTF characteristics (tangential) when the image height is 8.5° in the configuration of FIG. 15.
Figure 25:
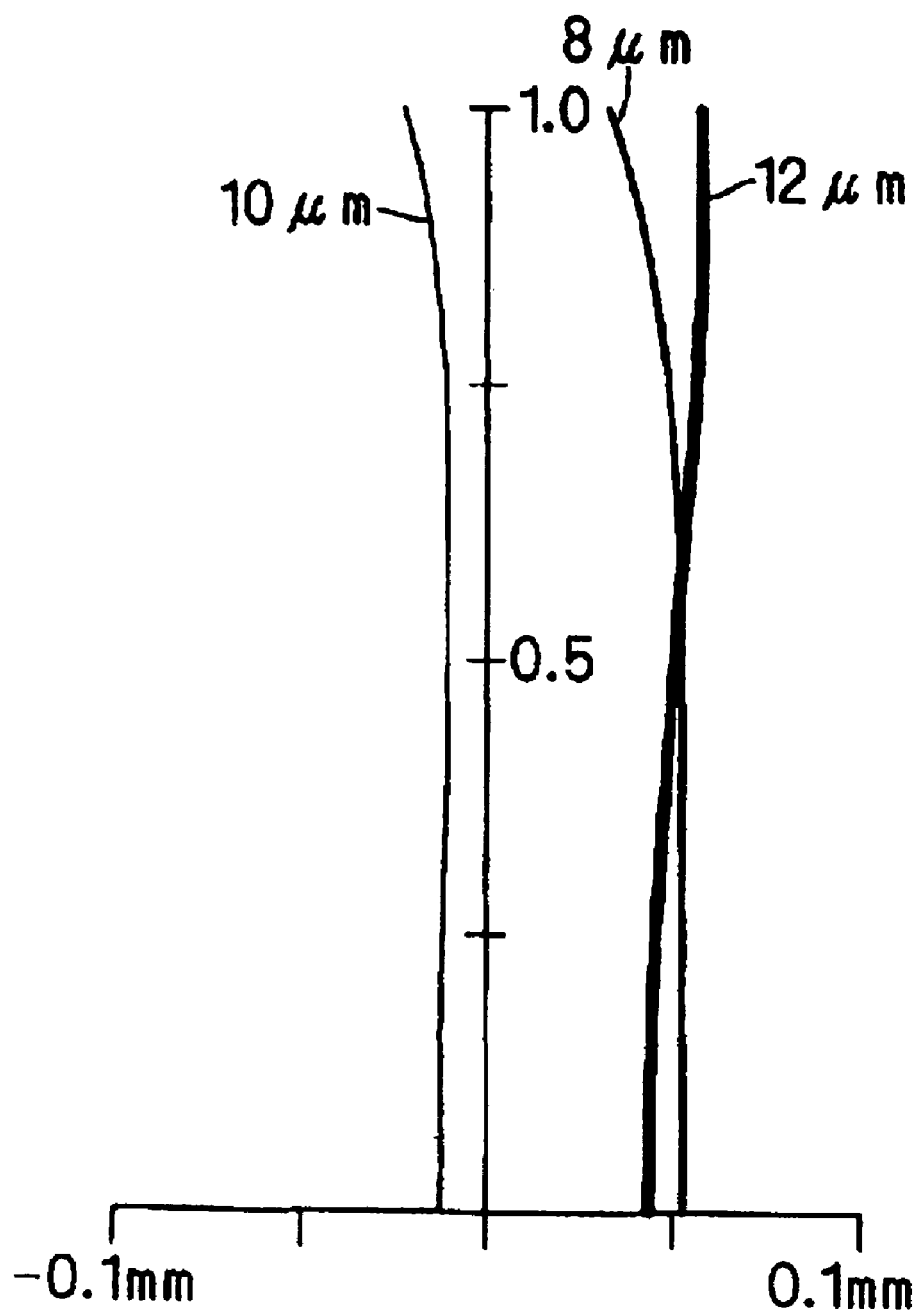
FIG. 25 is a graph illustrating spherical aberration characteristics in the configuration of FIG. 15.
Figure 26:
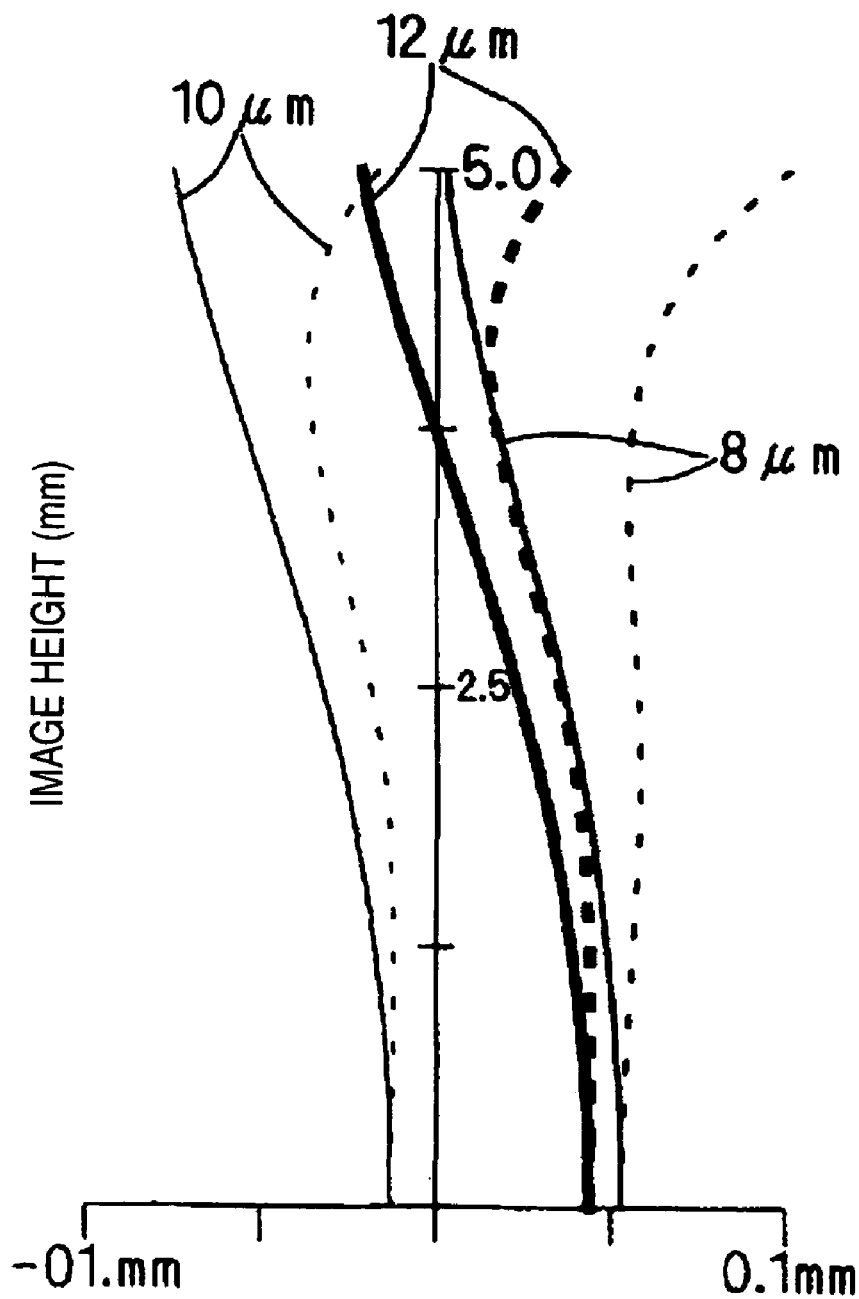
FIG. 26 is a graph illustrating astigmatism characteristics in the configuration of FIG. 15.
Figure 27:
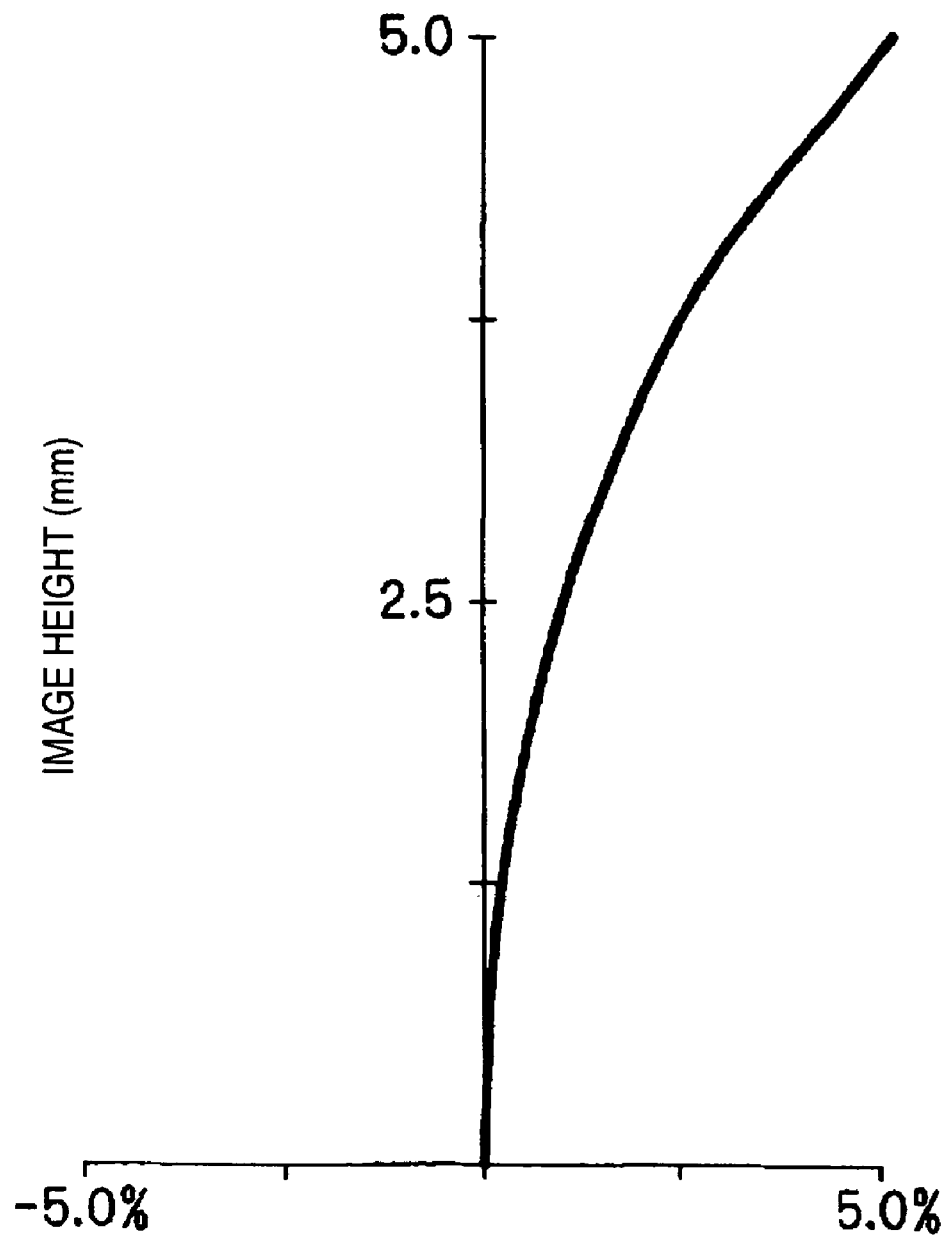
FIG. 27 is a graph illustrating distortion characteristics in the configuration of FIG. 15.

The infrared lens 1*b* according to Example 1-2 have configurations illustrated in FIGS. 15 to 17, and the lenses are configured that the f1/f is 1.40, the F value is 1.0, the maximum diameter is 25.9 mm, and the view angle is 20°.

MTF characteristics with respect to wavelengths 8 μm, 10 μm, and 12 μm within view angles (0°, 6.0°, 7.5°, and 8.5°) in the configuration of Example 1-2 are illustrated in FIGS. 18 to 24. Additionally, the spherical aberration, astigmatism, distortion, and longitudinal aberration characteristics with respect to the wavelengths 8 μm, 10 μm, and 12 μm are illustrated in FIGS. 25 to 27 and FIGS. 28(*a*) to 28(*e*).

Example 1-3

Figure 29:
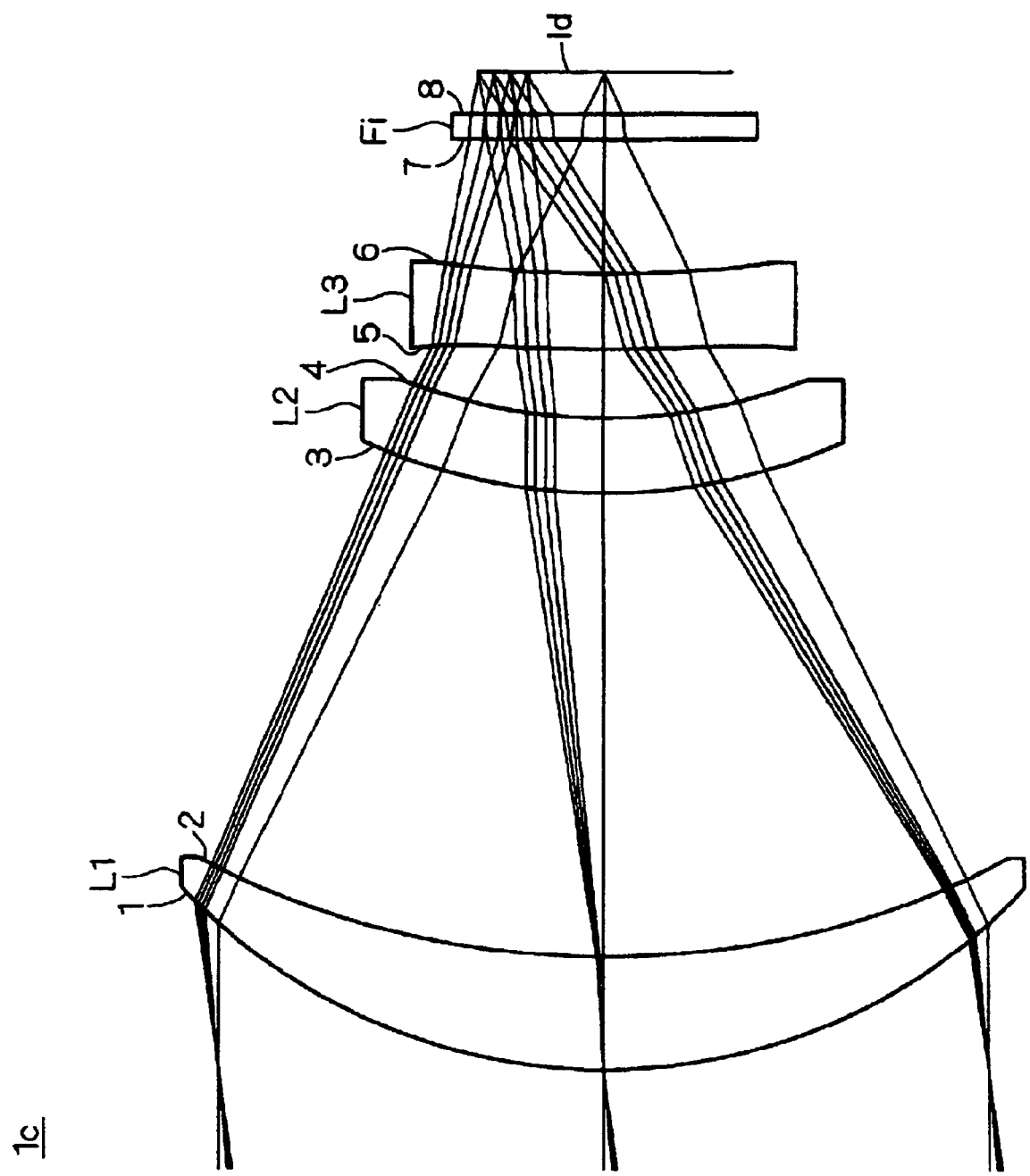
FIG. 29 is a diagram illustrating a configuration of Example 1-3 of an infrared lens according to Embodiment 1 of the invention.
Figure 32:
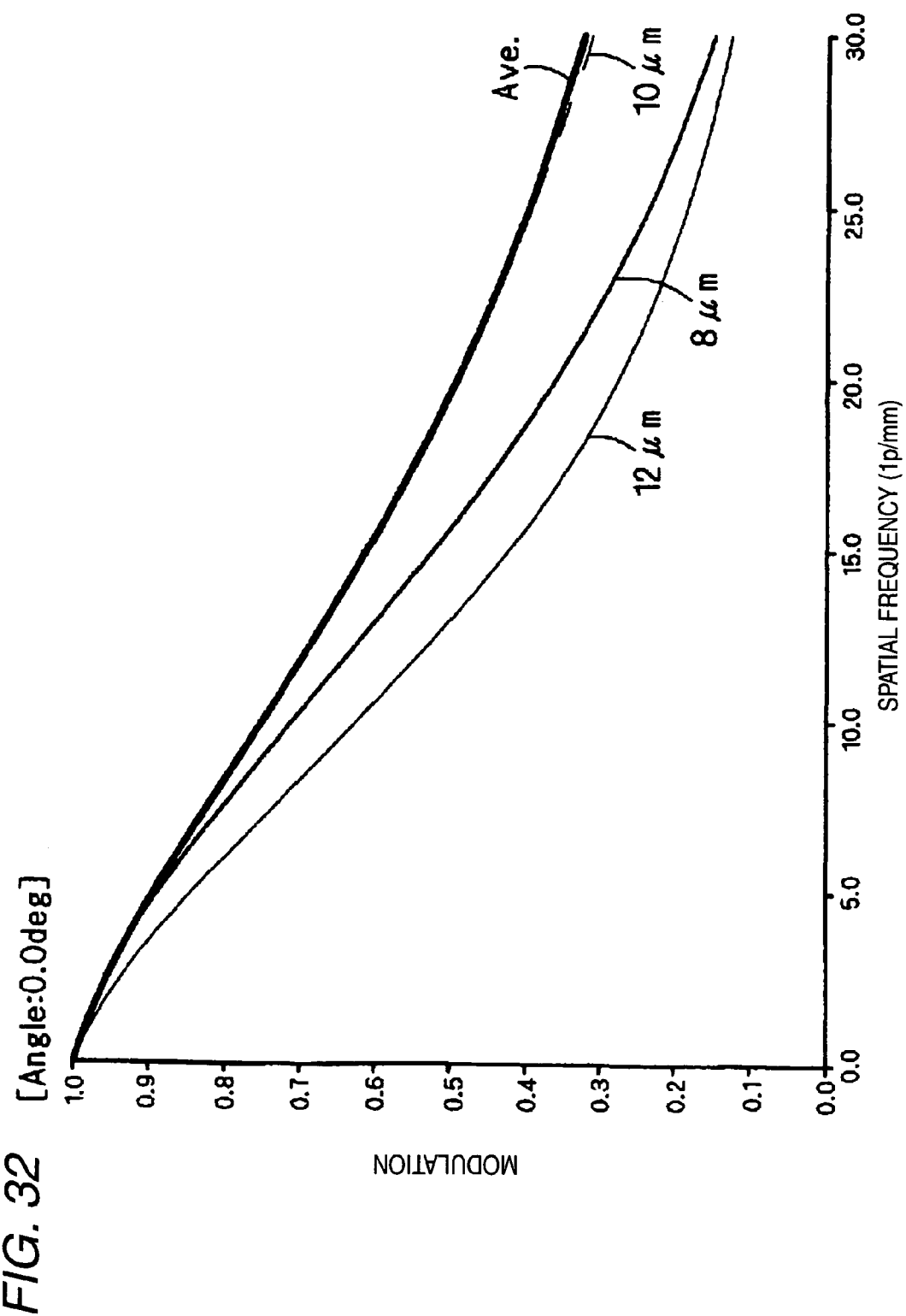
FIG. 32 is a graph illustrating MTF characteristics when the image height is 0° in the configuration of FIG. 29.
Figure 33:
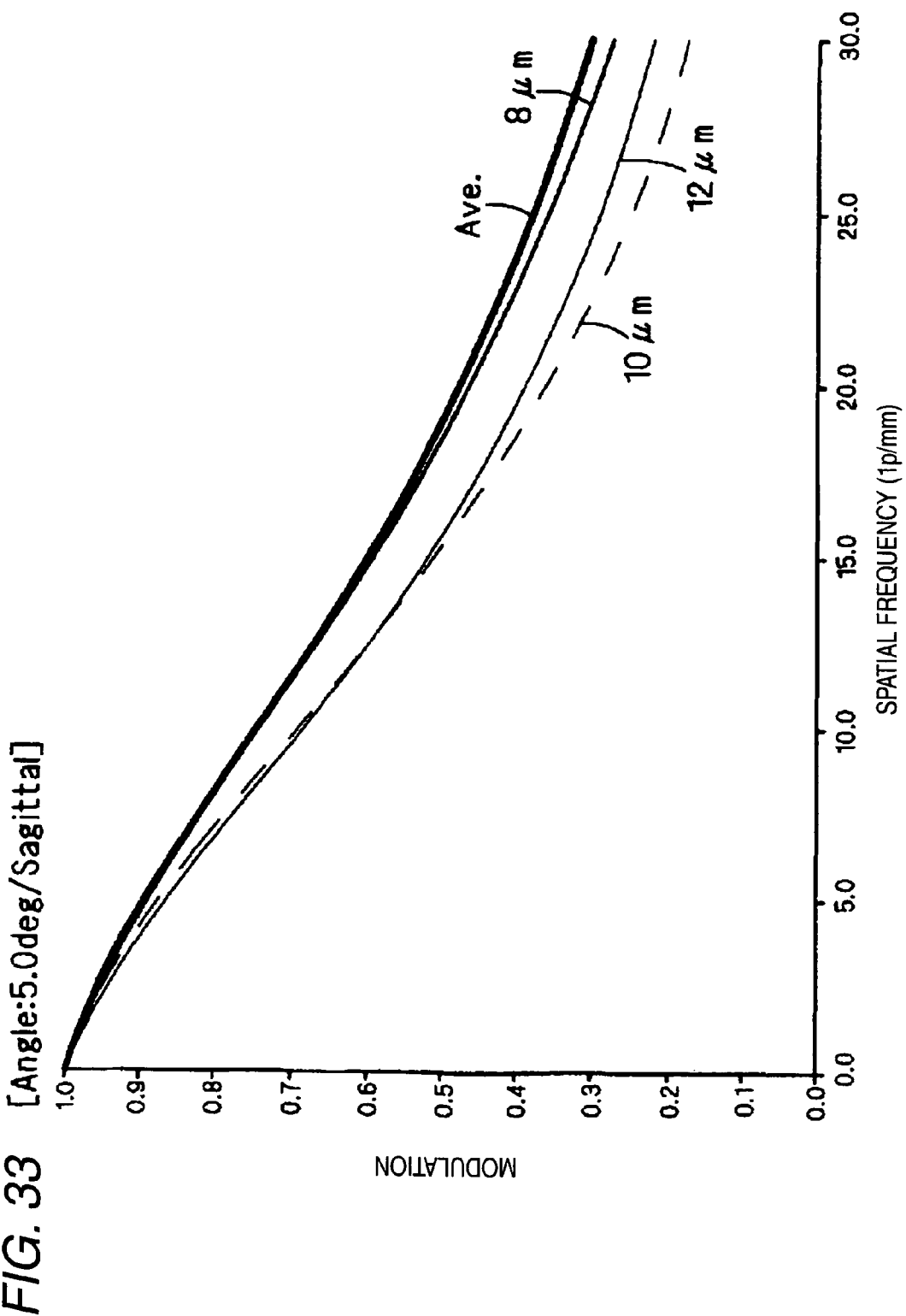
FIG. 33 is a graph illustrating MTF characteristics (sagittal) when the image height is 5.0° in the configuration of FIG. 29.
Figure 34:
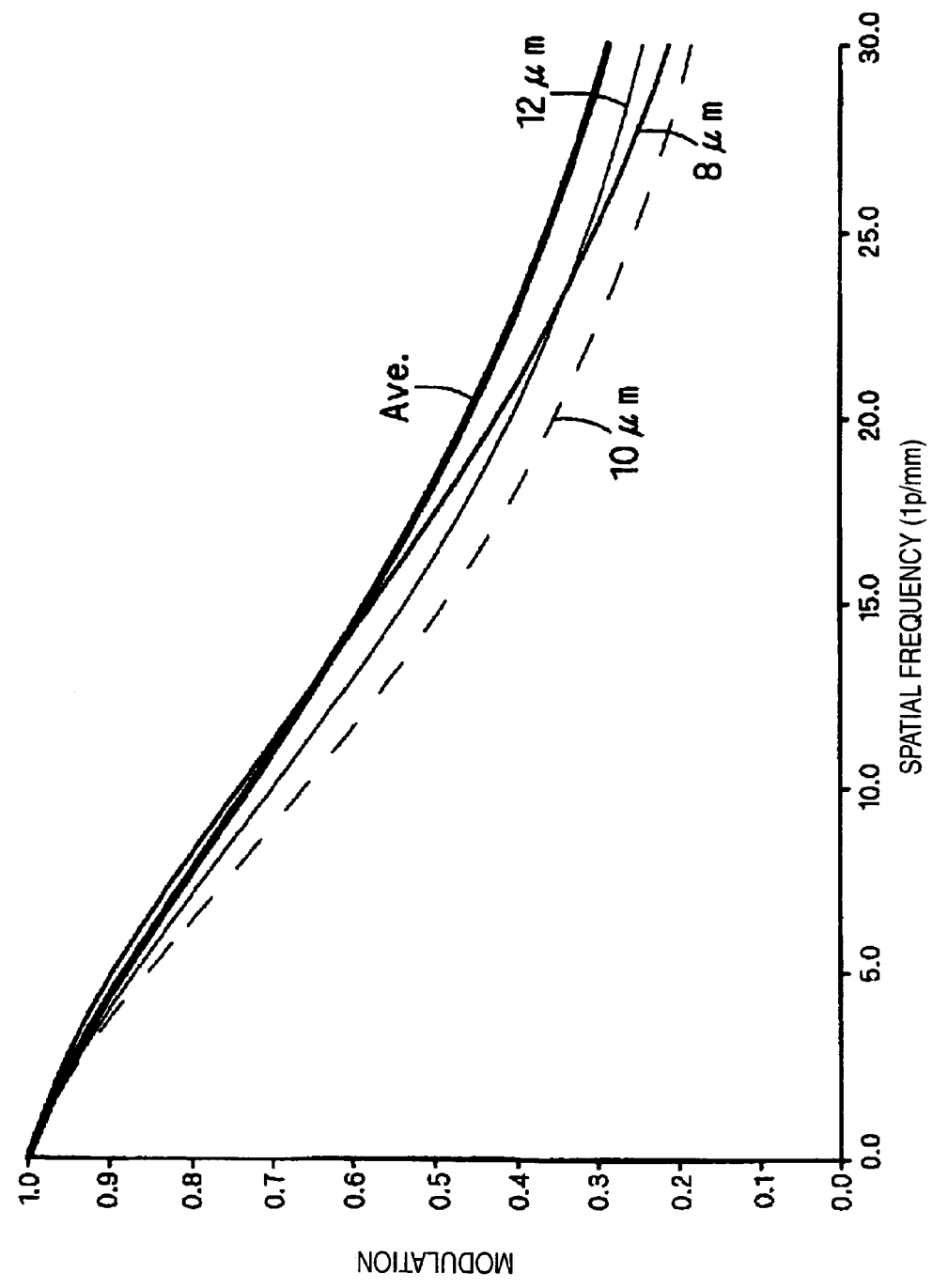
FIG. 34 is a graph illustrating MTF characteristics (tangential) when the image height is 5.0° in the configuration of FIG. 29.
Figure 35:
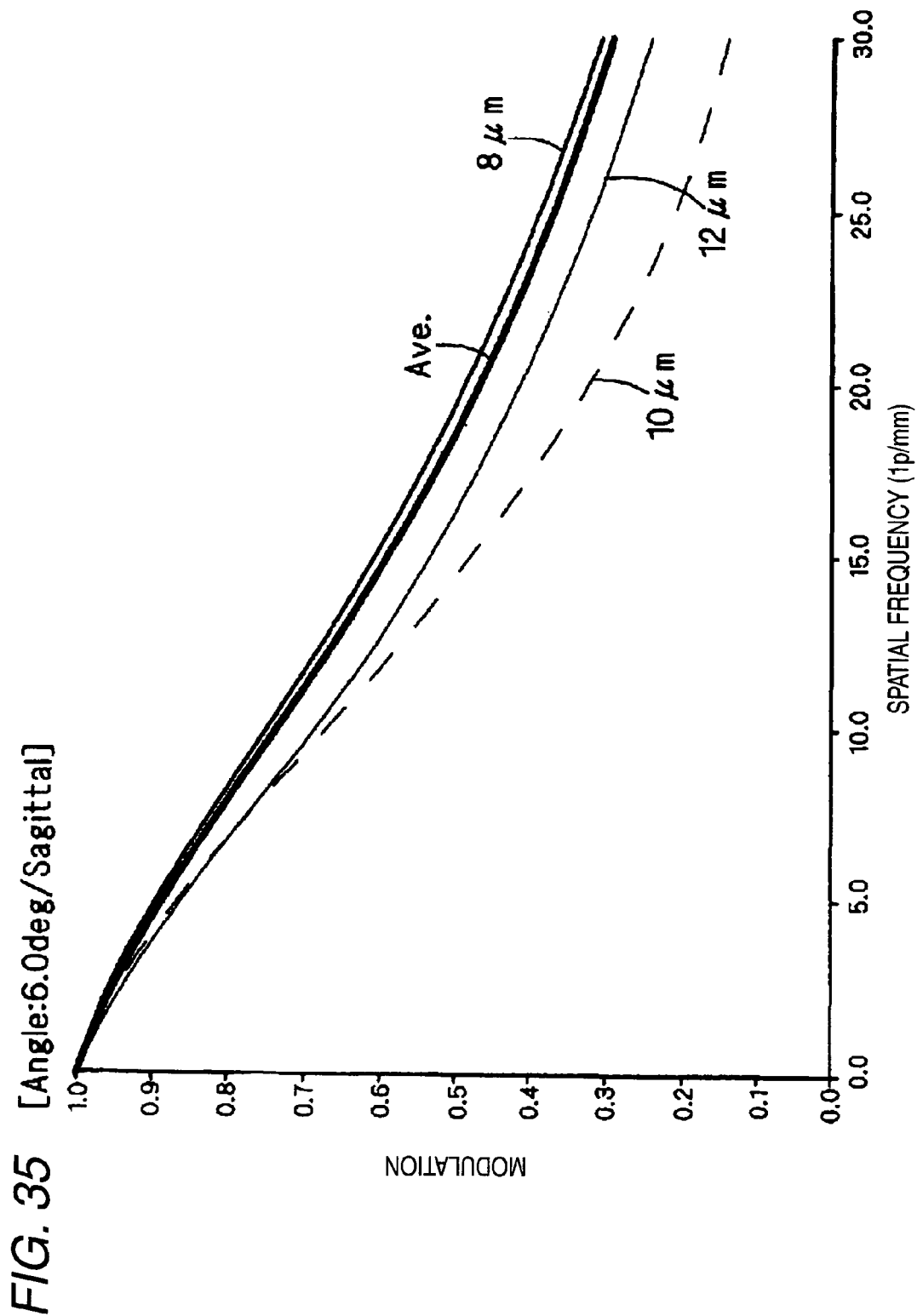
FIG. 35 is a graph illustrating MTF characteristics (sagittal) when the image height is 6.0° in the configuration of FIG. 29.
Figure 36:
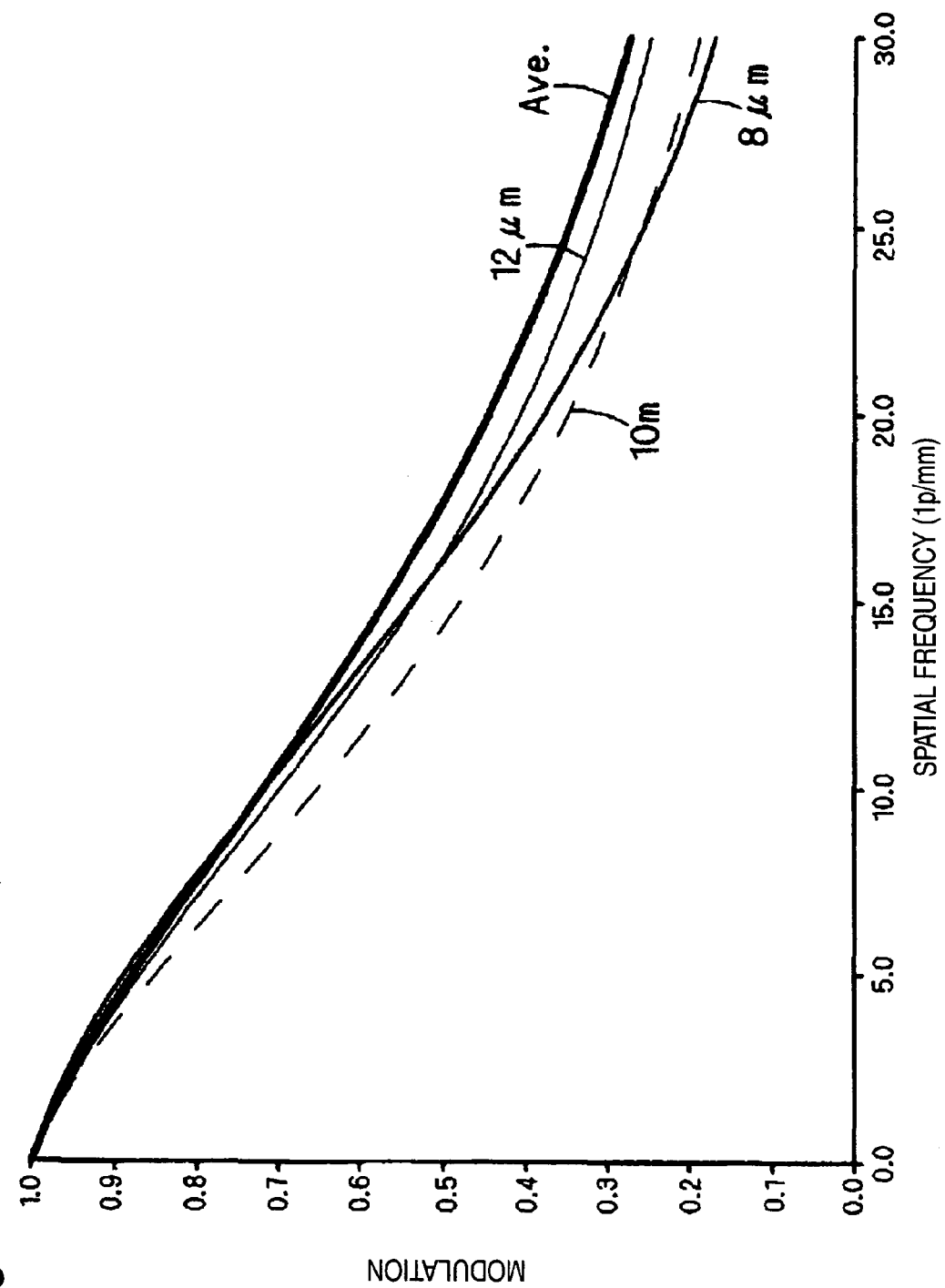
FIG. 36 is a graph illustrating MTF characteristics (tangential) when the image height is 6.0° in the configuration of FIG. 29.
Figure 37:
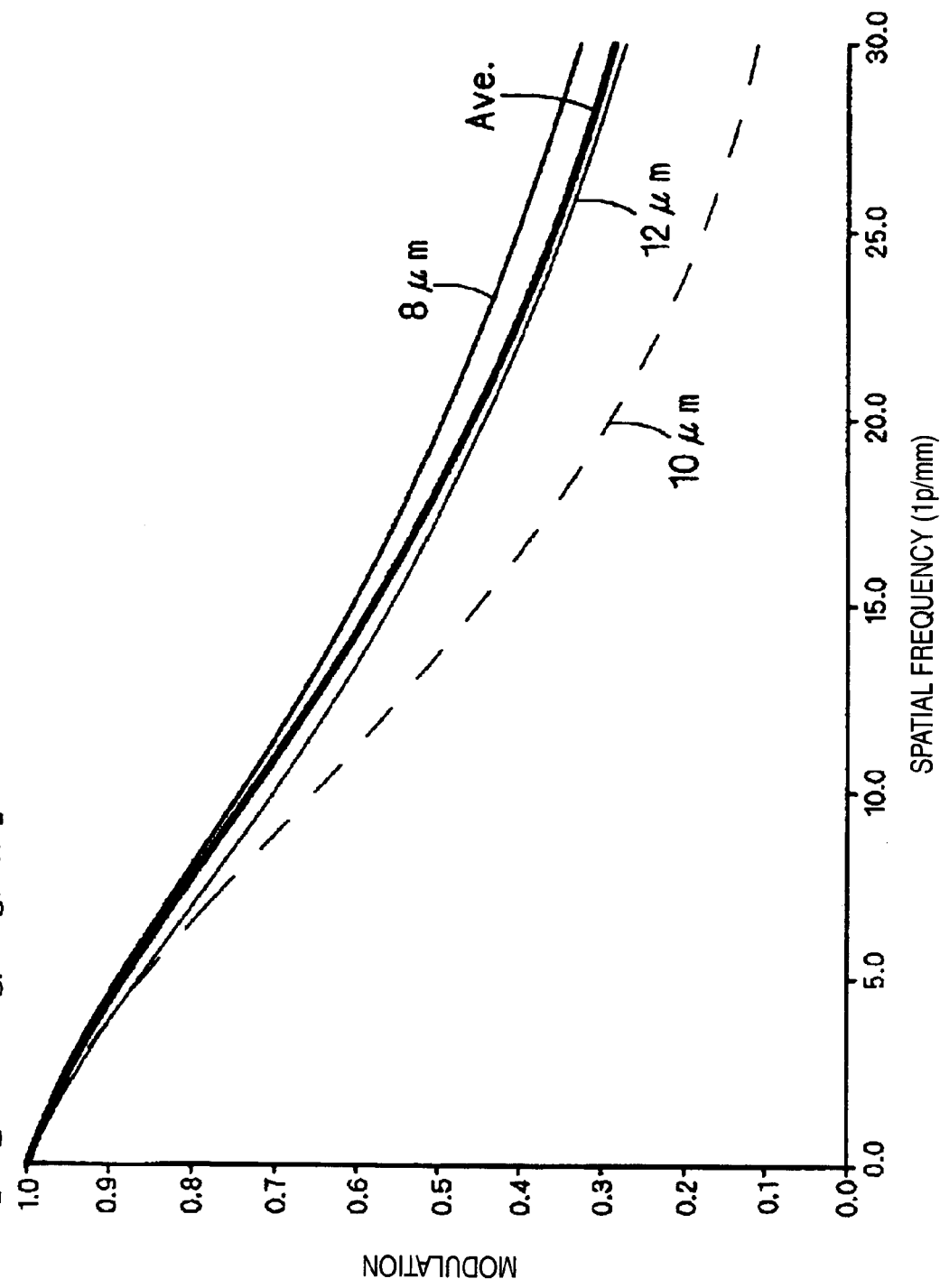
FIG. 37 is a graph illustrating MTF characteristics (sagittal) when the image height is 7.0° in the configuration of FIG. 29.
Figure 38:
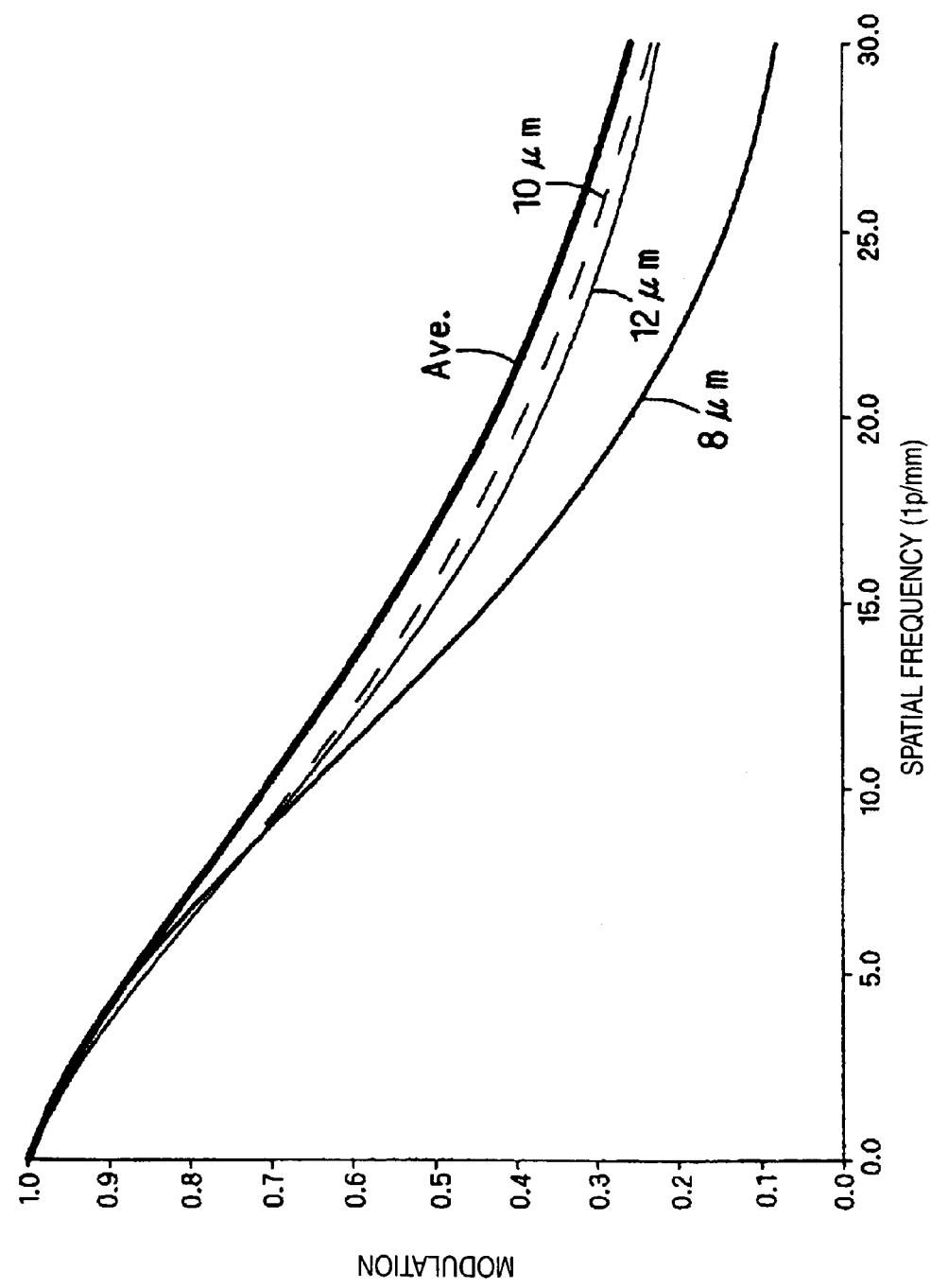
FIG. 38 is a graph illustrating MTF characteristics (tangential) when the image height is 7.0° in the configuration of FIG. 29.
Figure 39:
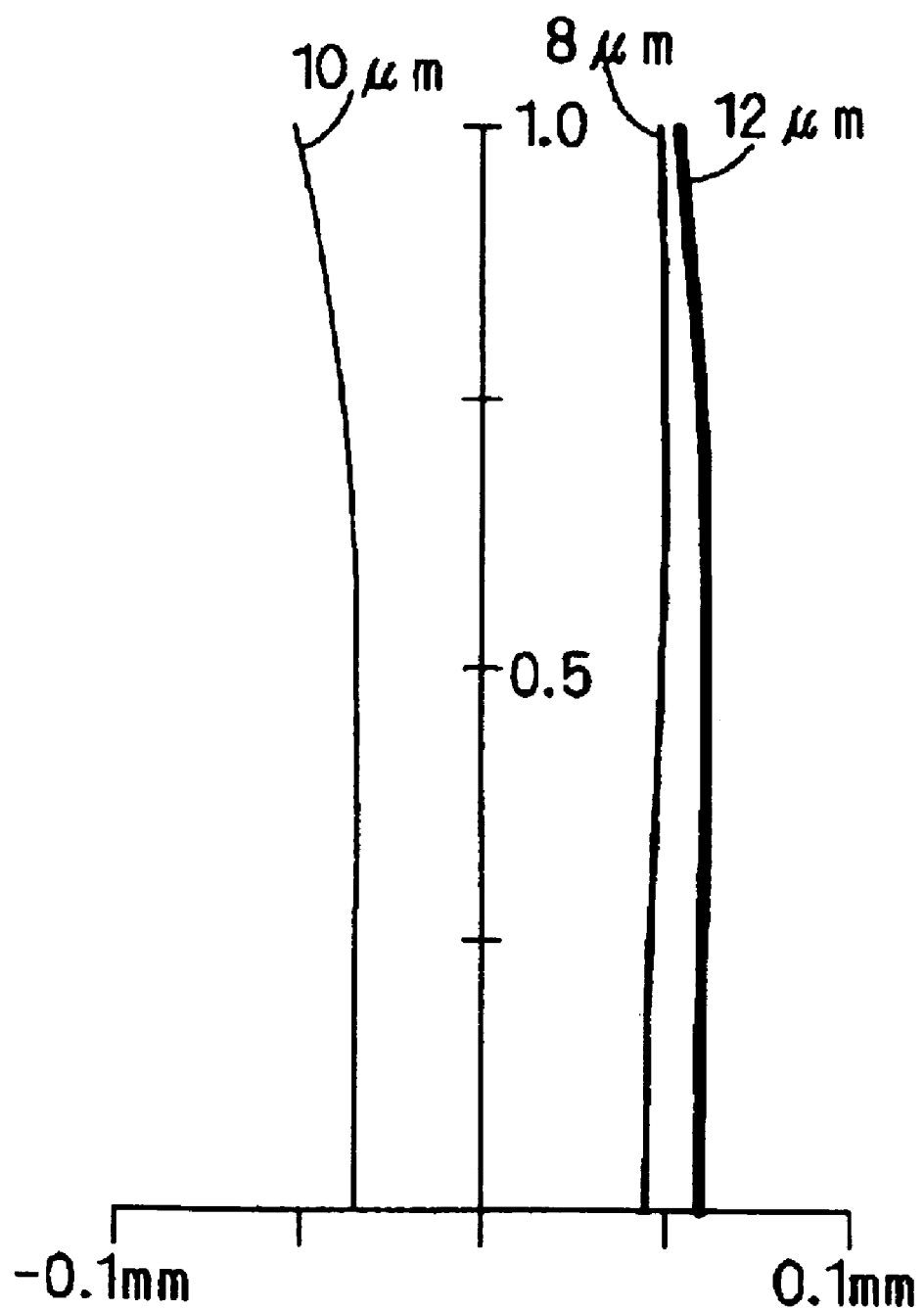
FIG. 39 is a graph illustrating spherical aberration characteristics in the configuration of FIG. 29.
Figure 40:
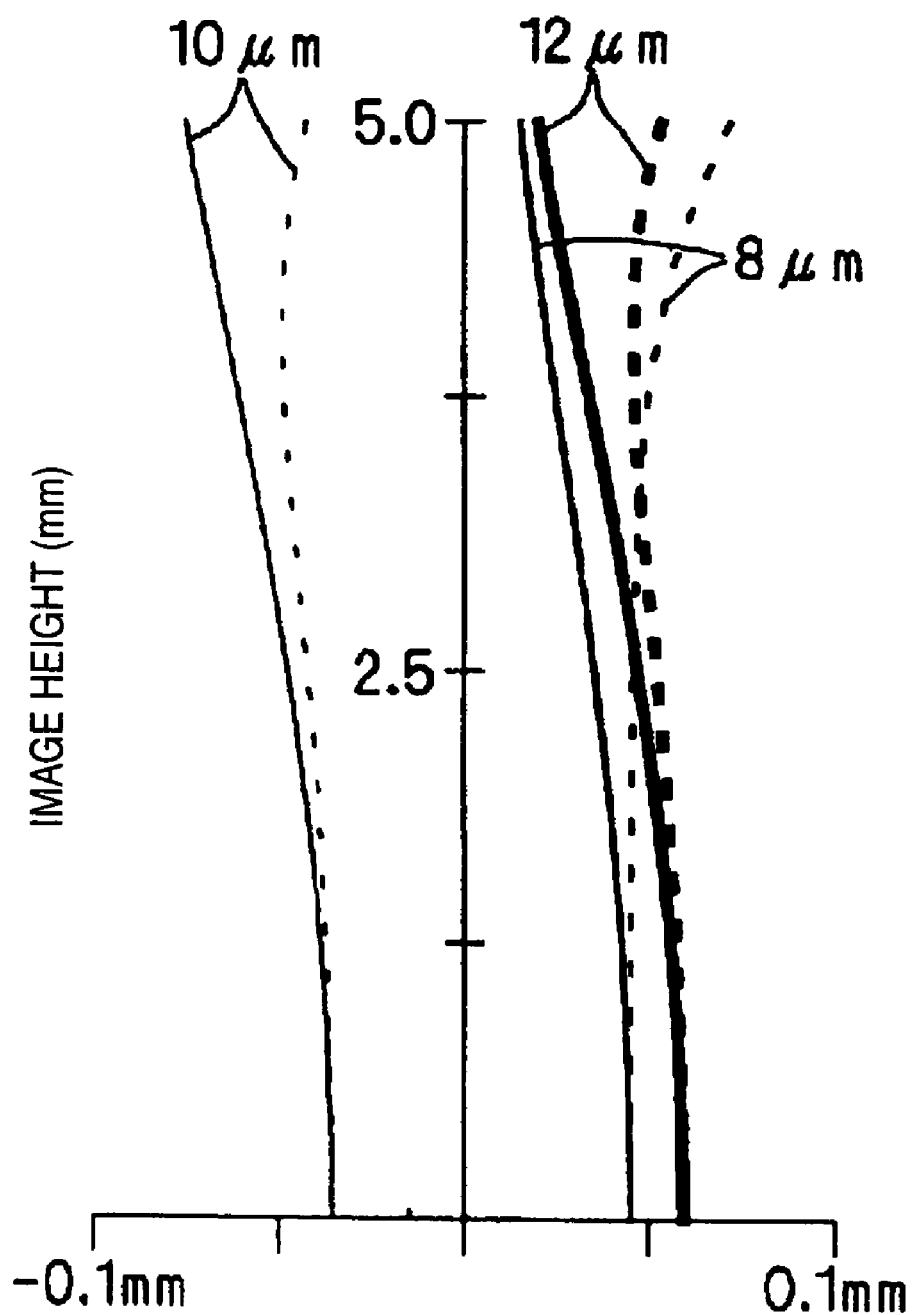
FIG. 40 is a graph illustrating astigmatism characteristics in the configuration of FIG. 29.
Figure 41:
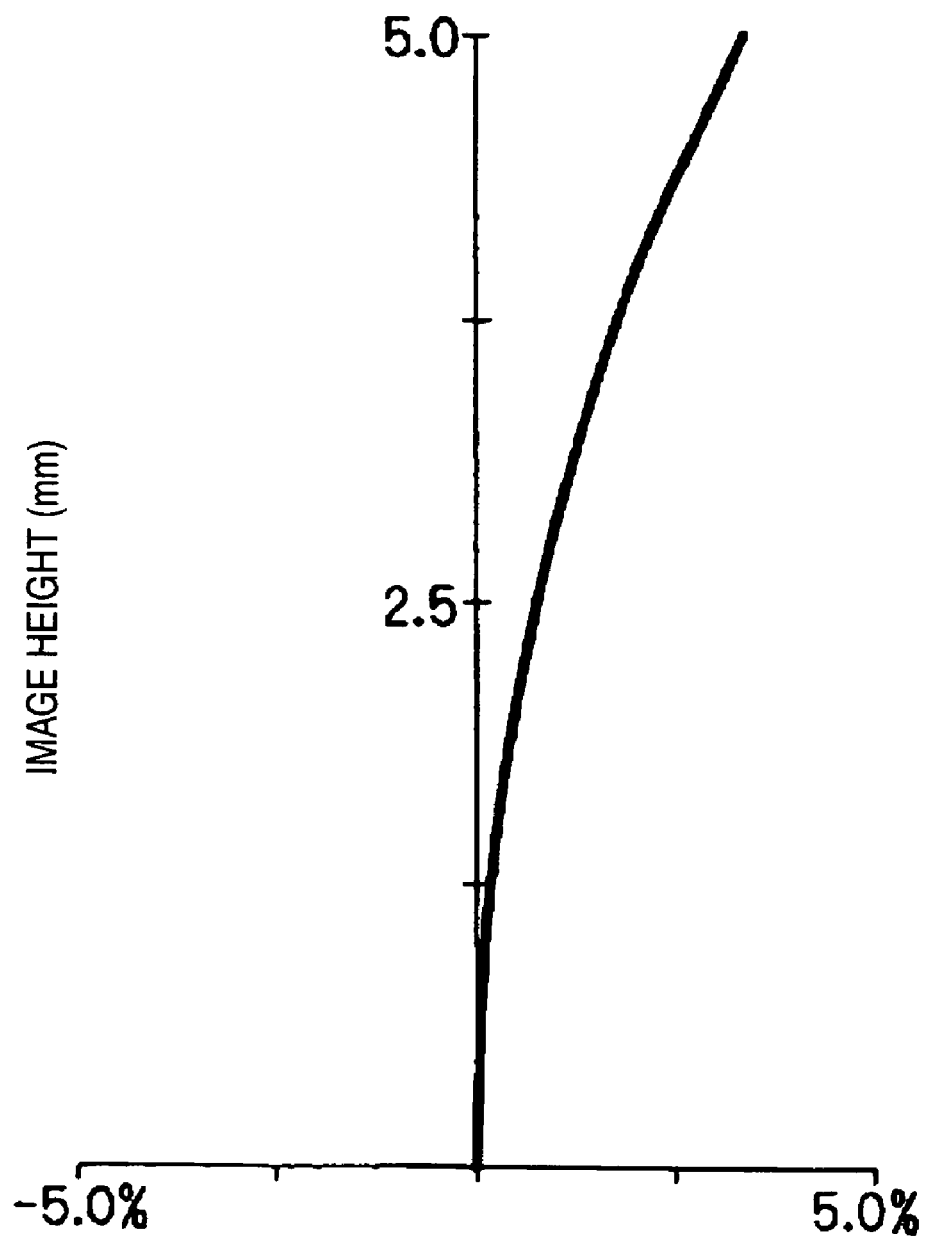
FIG. 41 is a graph illustrating distortion characteristics in the configuration of FIG. 29.

The infrared lens 1*c* according to Example 1-3 have configurations illustrated in FIGS. 29 to 31, and the lenses are configured that the f1/f is 1.00, the F value is 1.1, the maximum diameter is 30.0 mm, and the view angle is 16°.

MTF characteristics with respect to wavelengths 8 μm, 10 μm, and 12 μm within view angles (0°, 5.0°, 6.0°, and 7.0°) in the configuration of Example 1-3 are illustrated in FIGS. 32 to 38. Additionally, the spherical aberration, astigmatism, distortion, and longitudinal aberration characteristics with respect to the wavelengths 8 μm, 10 μm, and 12 μm are illustrated in FIGS. 39 to 41 and FIGS. 42(*a*) to 42(*e*).

Example 1-4

Figure 43:
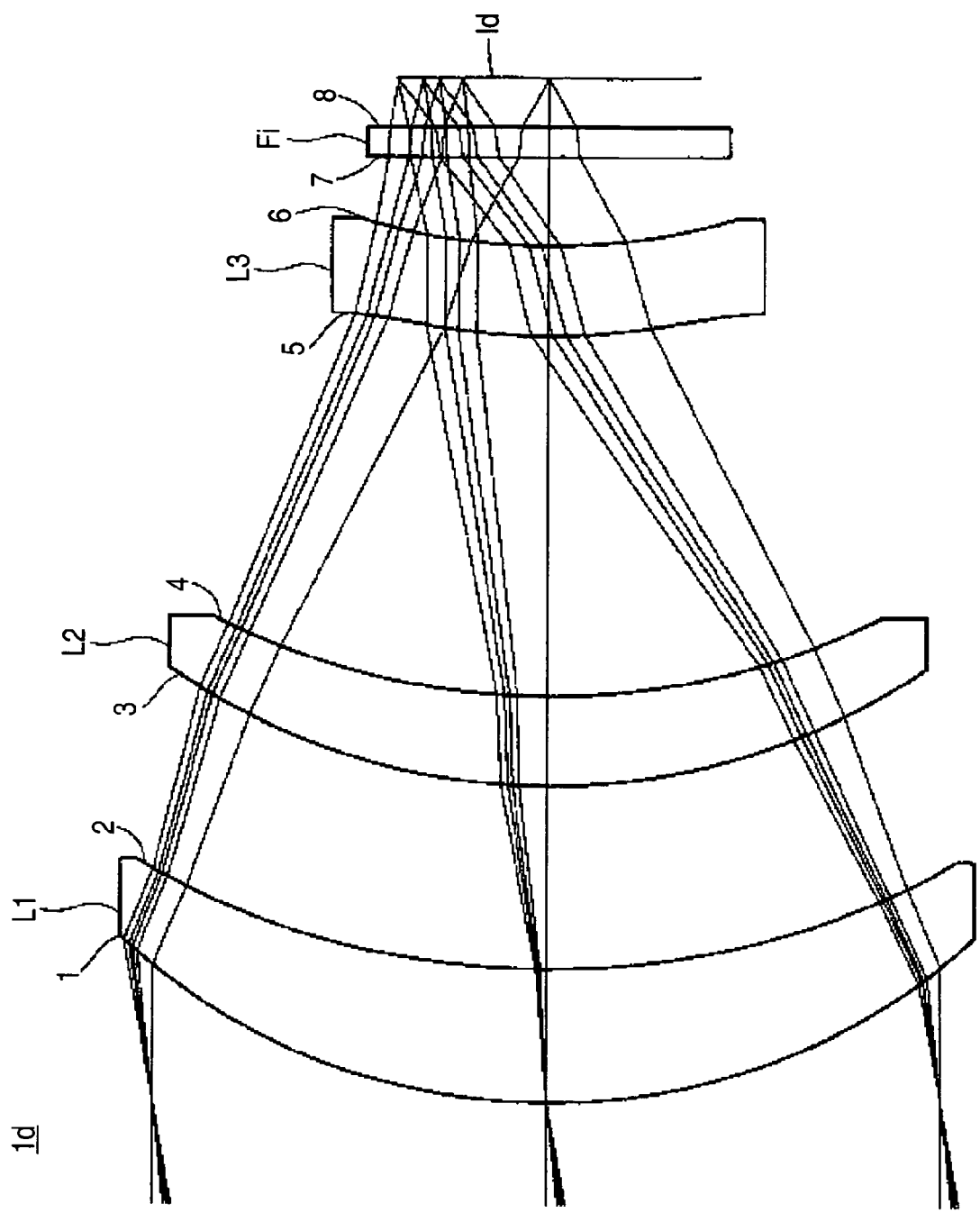
FIG. 43 is a diagram illustrating a configuration of Example 1-4 of infrared lens.

The infrared lens 1*d* according to Example 1-4 have configurations illustrated in FIGS. 43 to 45, and the lenses are configured that the f1/f is 1.45, the F value is 1.0, the maximum diameter is 25.9 mm, and the view angle is 20°.

MTF characteristics with respect to wavelengths 8 μm, 10 μm, and 12 μm within view angles (0°, 6.0°, 7.5°, and 8.5°) in the configuration of Example 1-4 are also researched, and the result will be described later on the basis of FIG. 50(*b*).

Example 1-5

Figure 46:
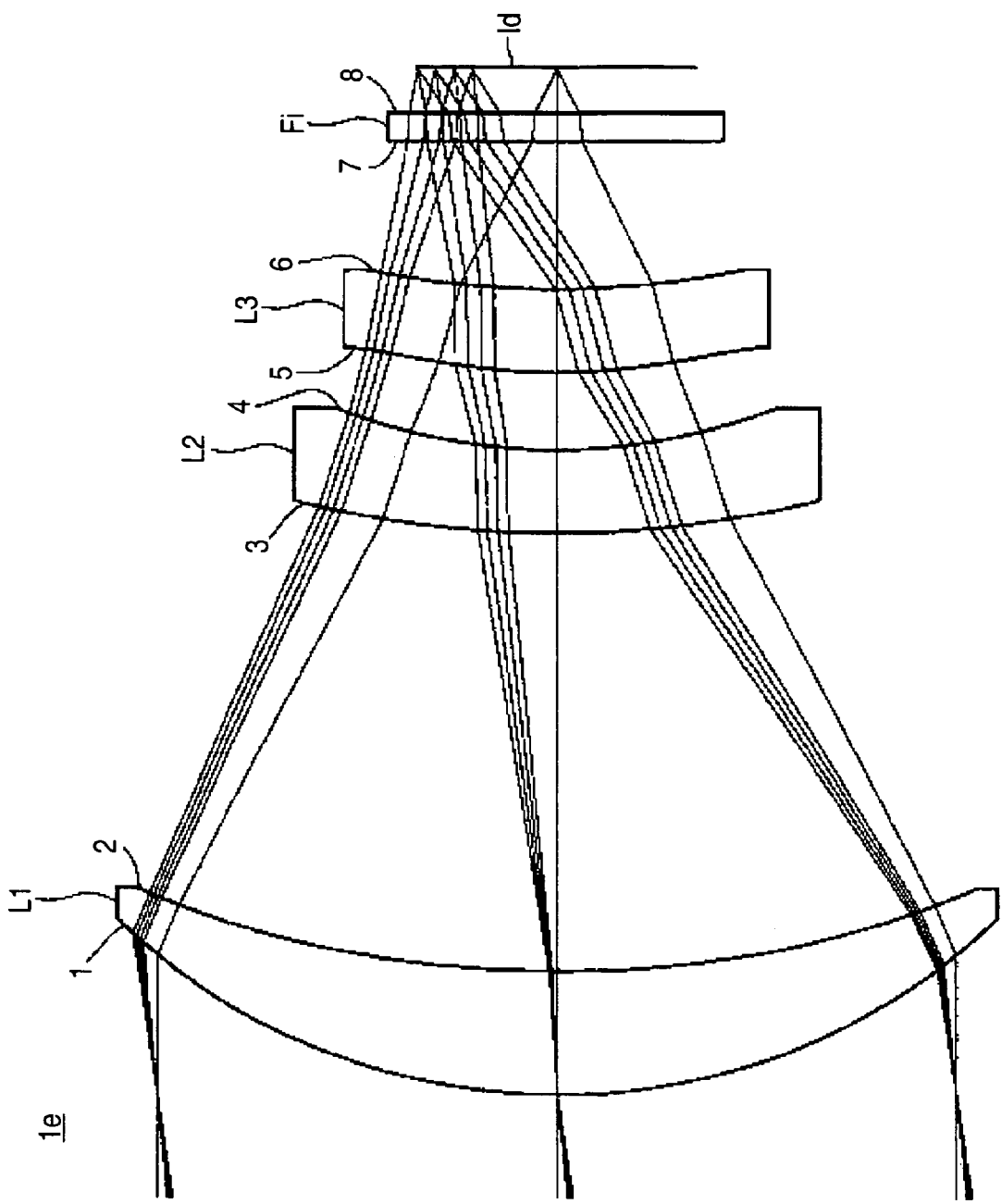
FIG. 46 is a diagram illustrating a configuration of Example 1-5 of infrared lens.

The infrared lens 1*e* according to Example 1-5 have configurations illustrated in FIGS. 46 to 48, and the lenses are configured that the f1/f is 0.96, the F value is 1.1, the maximum diameter is 28.4 mm, and the view angle is 17°.

MTF characteristics with respect to wavelengths 8 μm, 10 μm, and 12 μm within view angles (0°, 5.3°, 6.4°, and 7.5°) in the configuration of Example 1-5 are also researched, and the result will be described later on the basis of FIG. 49(*a*).

[Summary]

FIGS. 49(*a*) to 49(*c*) and FIGS. 50(*a*) and 50(*b*) illustrate that MTF characteristics and the like of Examples 1-1, 1-2, 1-3, 1-4, and 1-5 are summarized in tables. The contents in the tables are inserted in the order of Examples 1-5, 1-3, 1-1, 1-2, and 1-4. The MTF values in the tables are denoted as the values at spatial frequency 20 lp/mm. Additionally, in the tables, MTF values in image heights within the view angle of the wavelength 12 μm, 10 μm, and 8 μm and averages of the MTF value in the range of 8 to 12 μm are noted on the lower side of the upper table.

Here, by using a standard estimation which relates to optical performance of the infrared lens targeting wavelength region of 8 to 12 μm, for example, assuming that the combination includes the imaging device Id having pixel pitch 25 μm, it is possible to experientially expect that contrast of a picture is excessively lowered when the MTF in the condition of the spatial frequency 20 lp/mm is less than 0.2.

Accordingly, based on whether the MTF is 0.2 or more or not in the entire view angle and the entire wavelength of 8 to 12 μm, Examples 1-1, 1-2, 1-3, 1-4, and 1-5 will be estimated. Regarding to Examples 1-1, 1-2, and 1-3 where the value of f1/f satisfies the condition of the relational expression 1 in the MTF characteristics illustrated in FIGS. 49(*a*) to 49(*c*) and FIGS. 50(*a*) and 50(*b*), the MTFs not less than 0.2 are obtained in the entire view angle and the entire wavelength. Conversely, regarding to Examples 1-4 and 1-5 where the value of f1/f does not satisfy the condition of the relational expression 1, there are the portions where the MTFs not less than 0.2 can not be obtained in accordance with a view angle and a wavelength. Accordingly, the result shows that it is possible to obtain the MTF which is not less than 0.2 in the entire view angle and the entire wavelength, when f1/f is set in the range from 1.0 to 1.4 as the relational expression 1.

Embodiment 2

Basic Configuration

Hereinafter, a basic configuration of an infrared lens according to Embodiment 2 of the invention will be described with reference to FIG. 51. In this section, it will be described about only the basic configuration of the infrared lens 2*a* shown in FIG. 51, and a further detailed configuration thereof will be described as Example in the following section.

Figure 51:
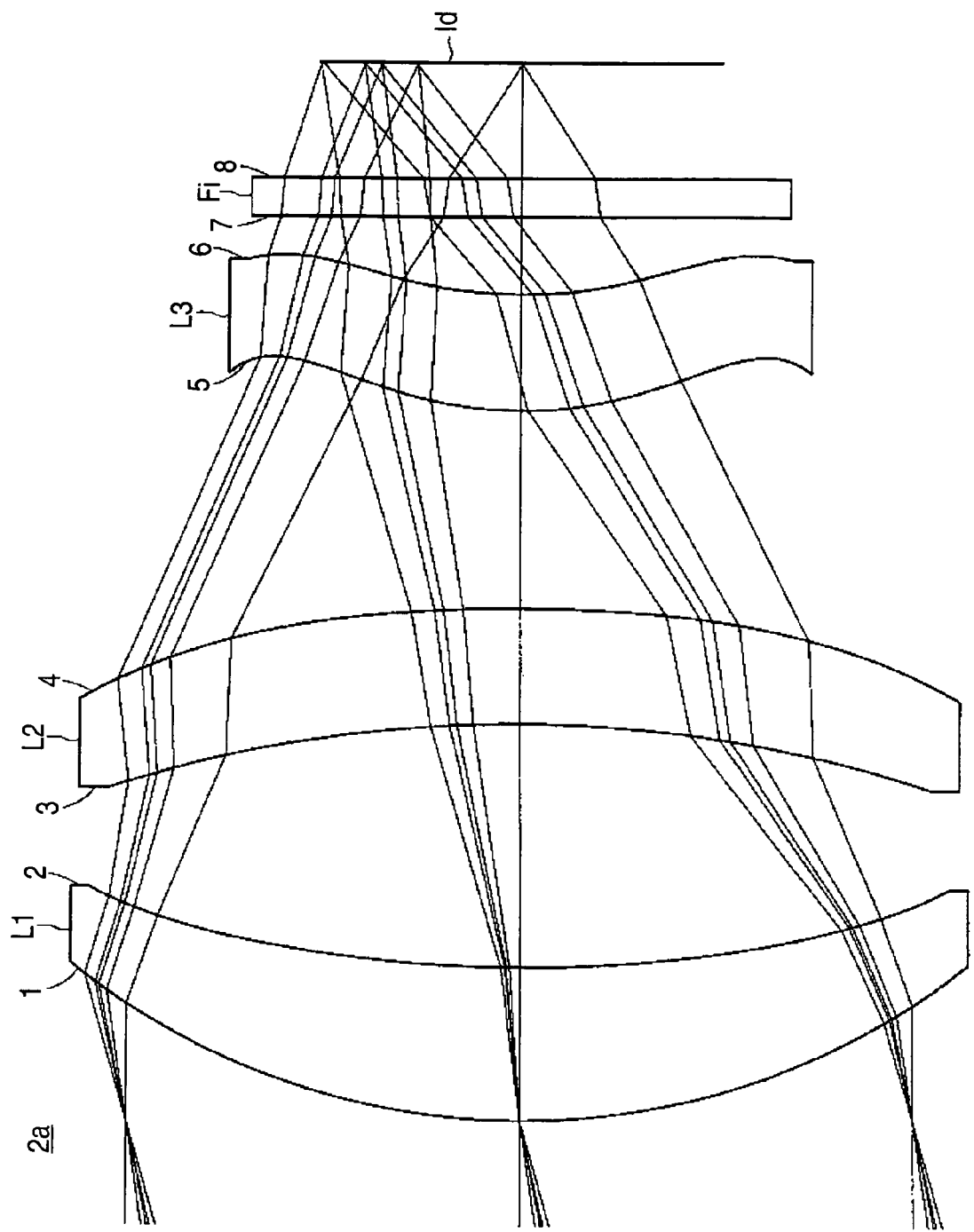
FIG. 51 is a diagram illustrating a configuration of Example 2-1 of an infrared lens according to Embodiment 2 of the invention.
Figure 54:
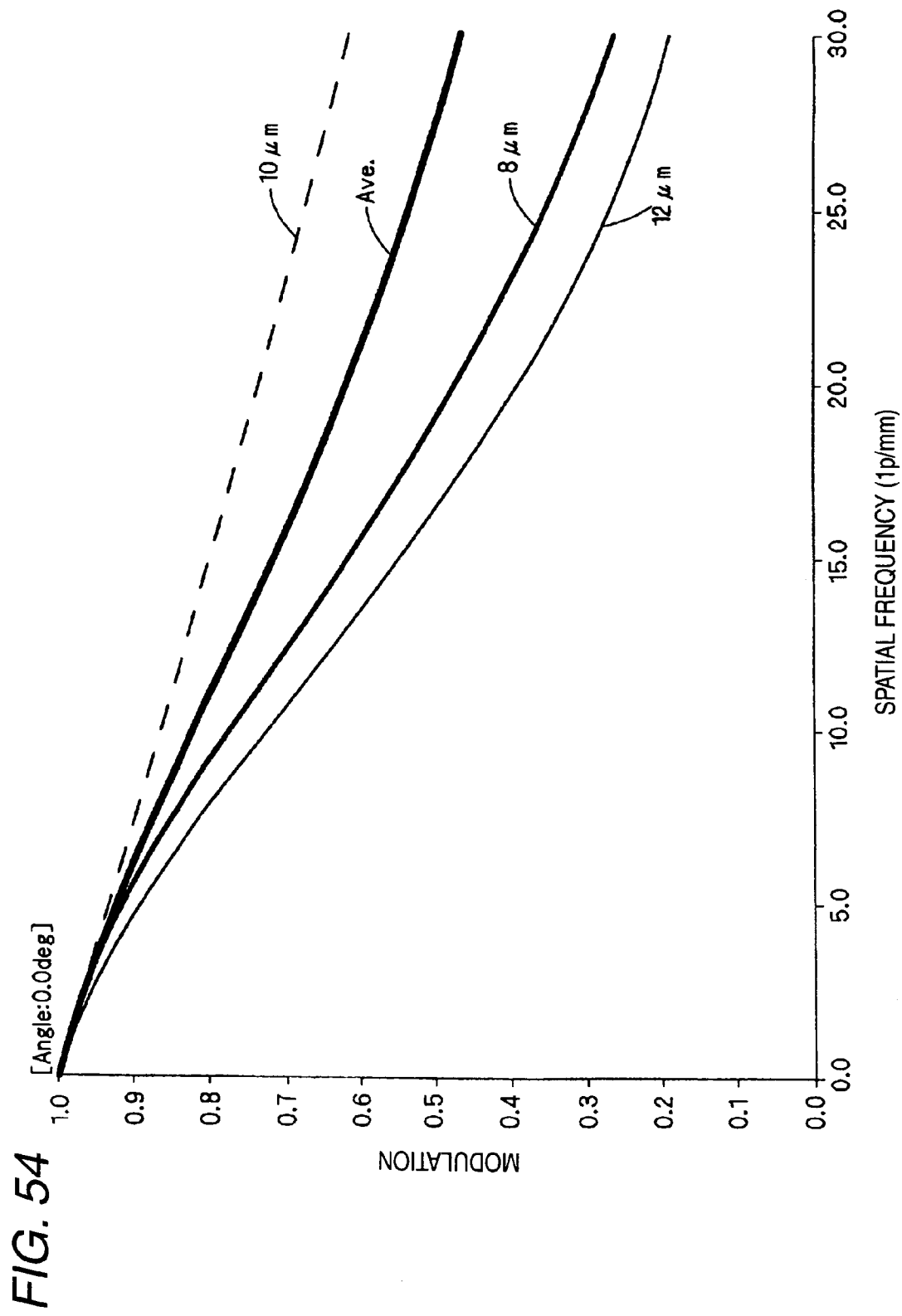
FIG. 54 is a graph illustrating MTF characteristics when the image height is 0° in the configuration of FIG. 51.
Figure 55:
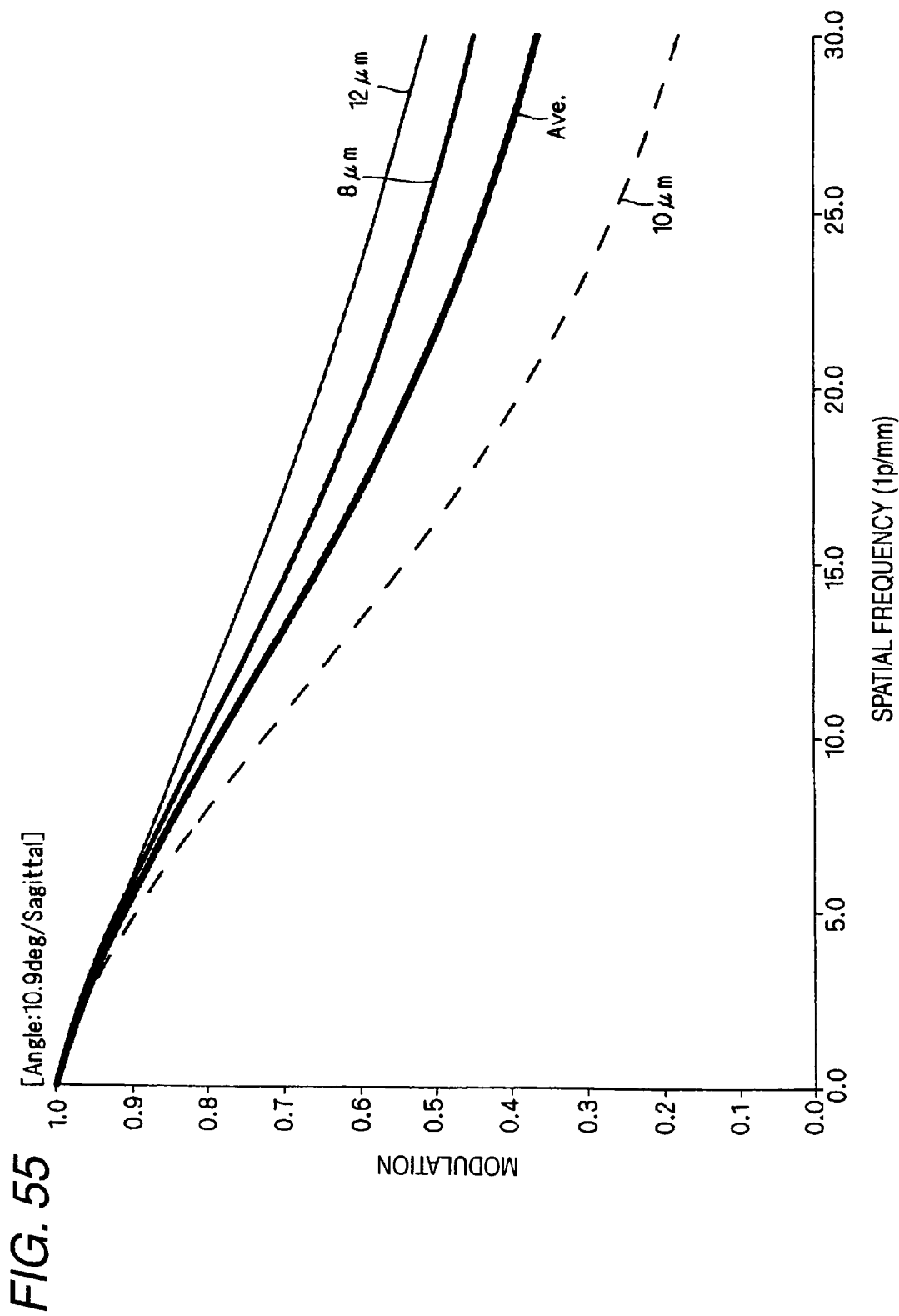
FIG. 55 is a graph illustrating MTF characteristics (sagittal) when the image height is 10.9° in the configuration of FIG. 51.
Figure 56:
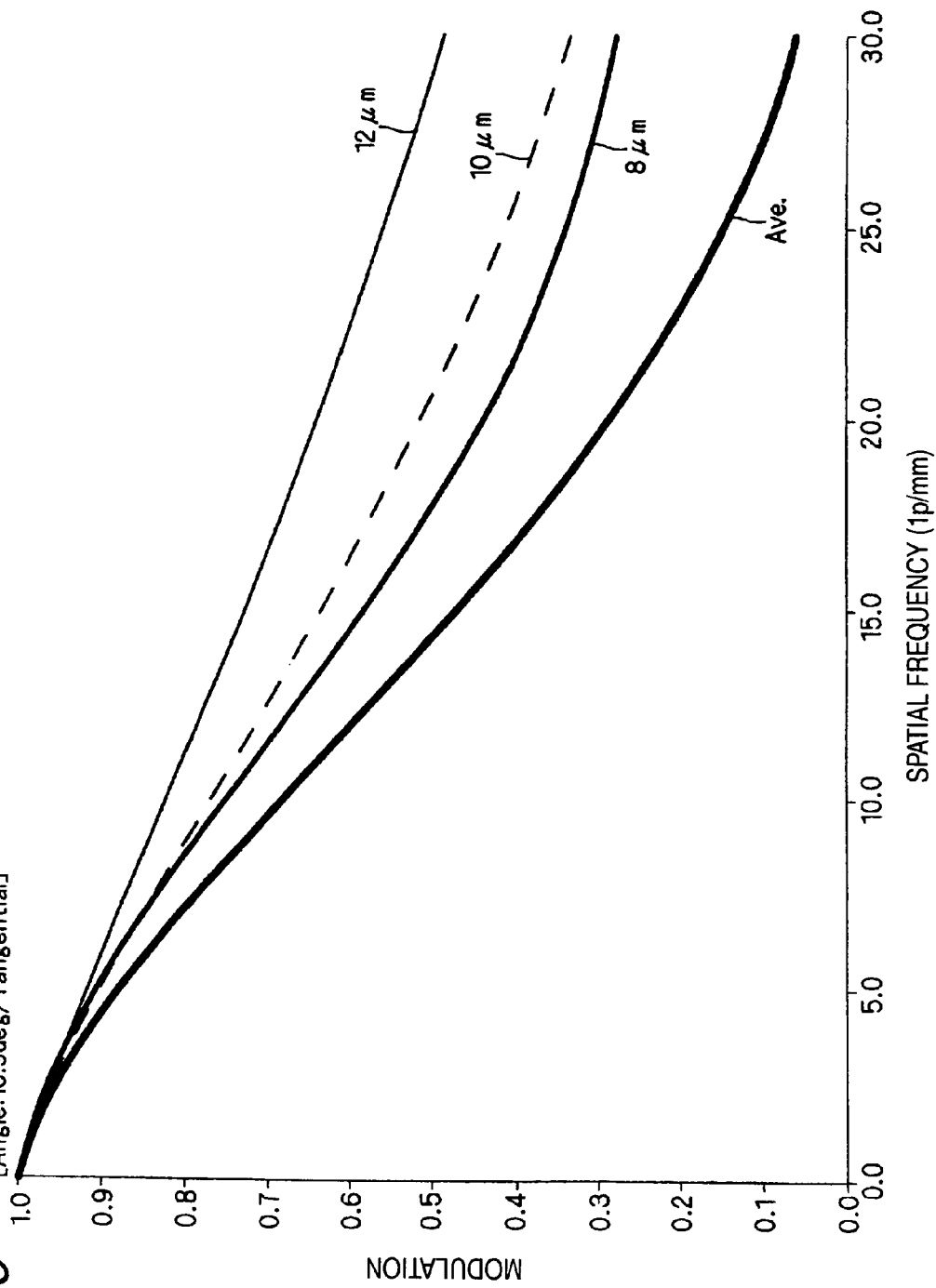
FIG. 56 is a graph illustrating MTF characteristics (tangential) when the image height is 10.9° in the configuration of FIG. 51.
Figure 57:
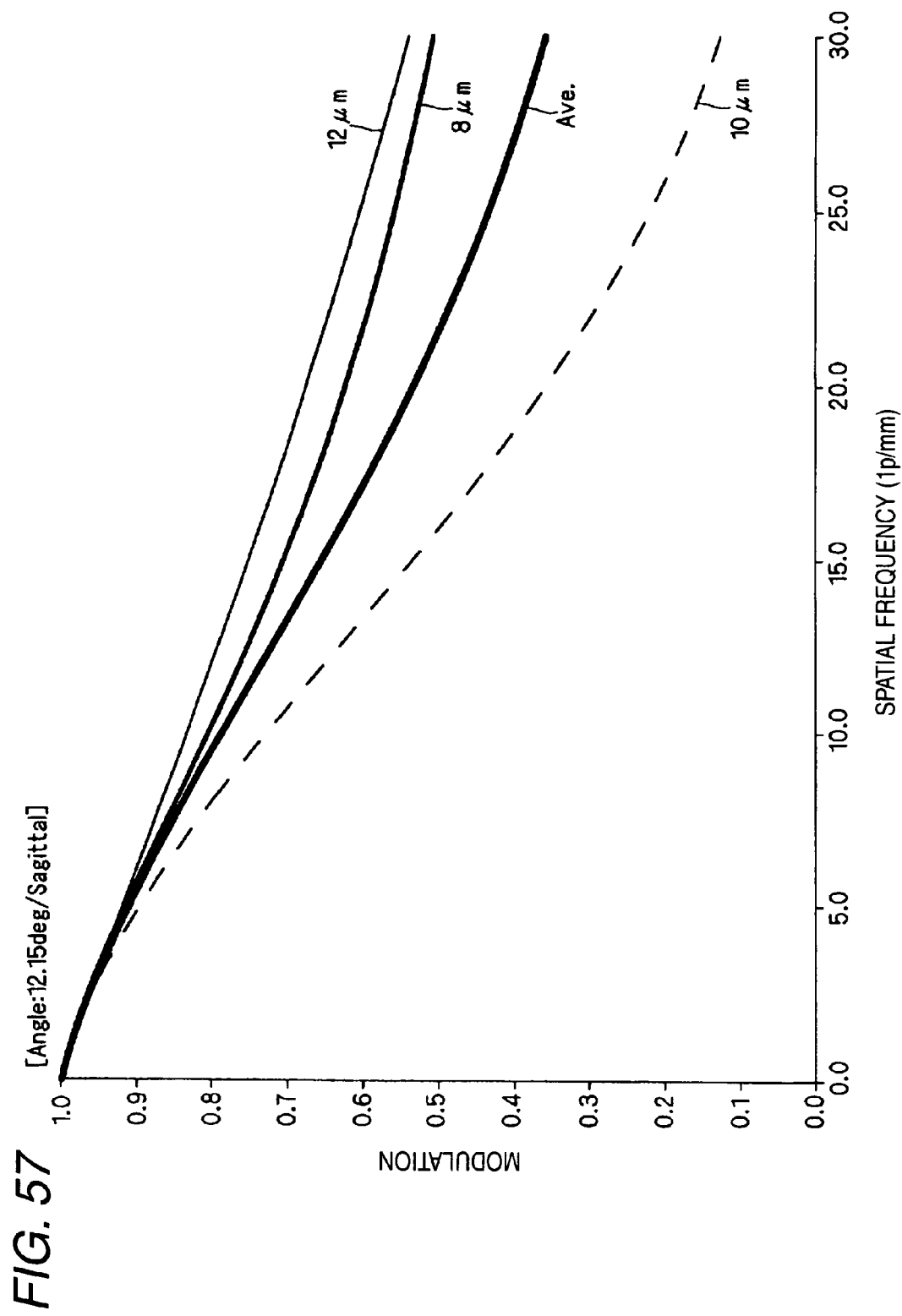
FIG. 57 is a graph illustrating MTF characteristics (sagittal) when the image height is 12.15° in the configuration of FIG. 51.
Figure 58:
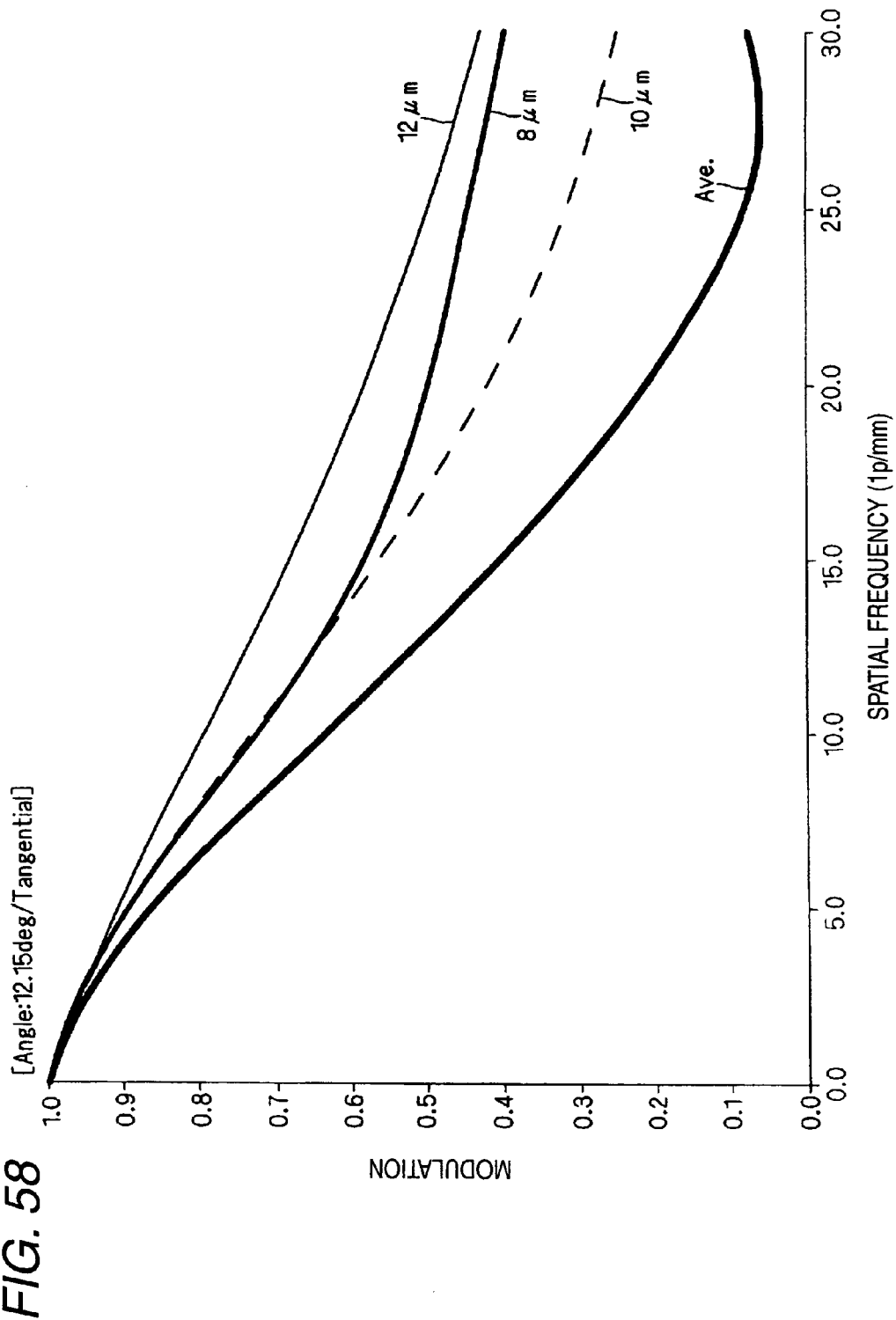
FIG. 58 is a graph illustrating MTF characteristics (tangential) when the image height is 12.15° in the configuration of FIG. 51.
Figure 59:
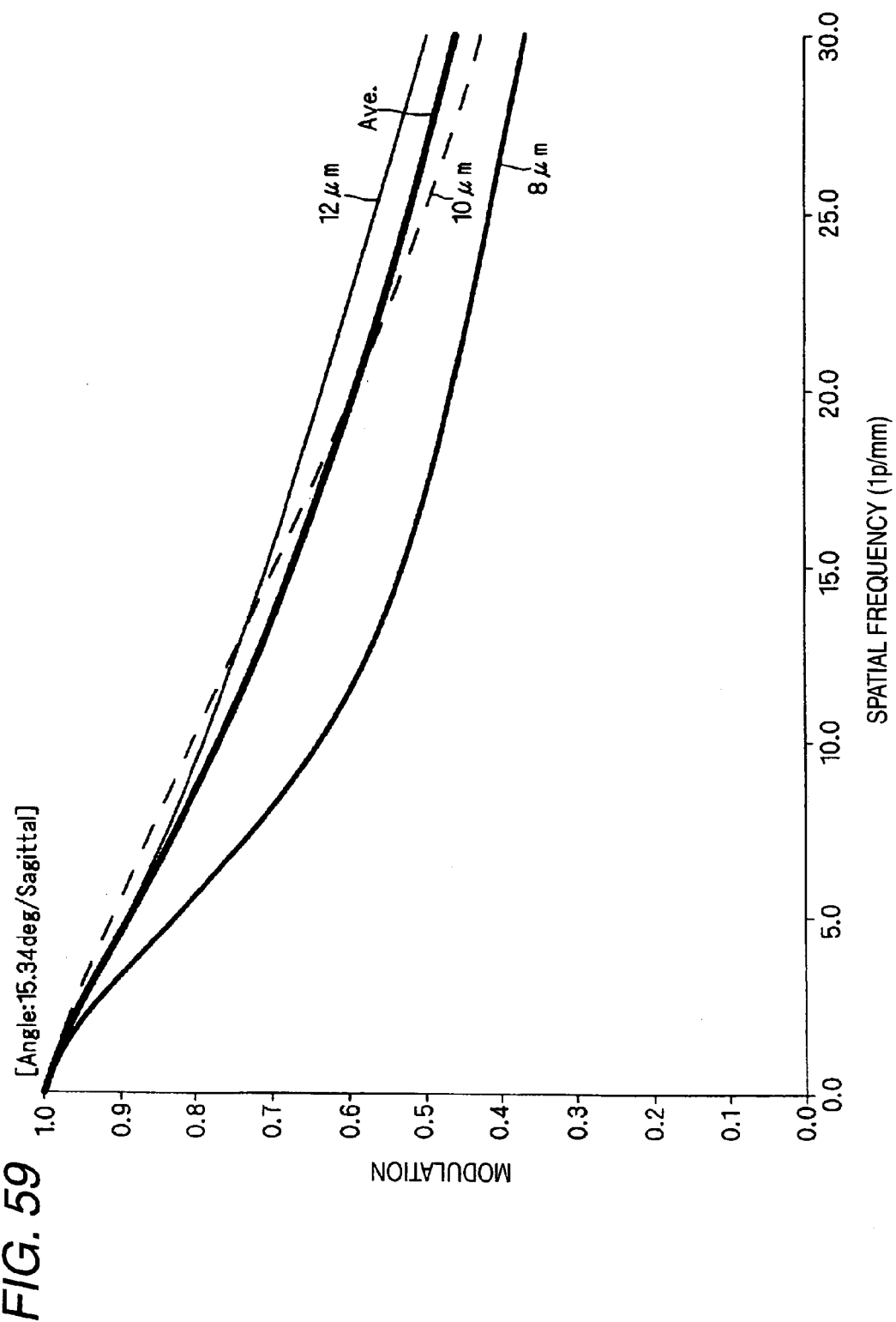
FIG. 59 is a graph illustrating MTF characteristics (sagittal) when the image height is 15.34° in the configuration of FIG. 51.
Figure 60:
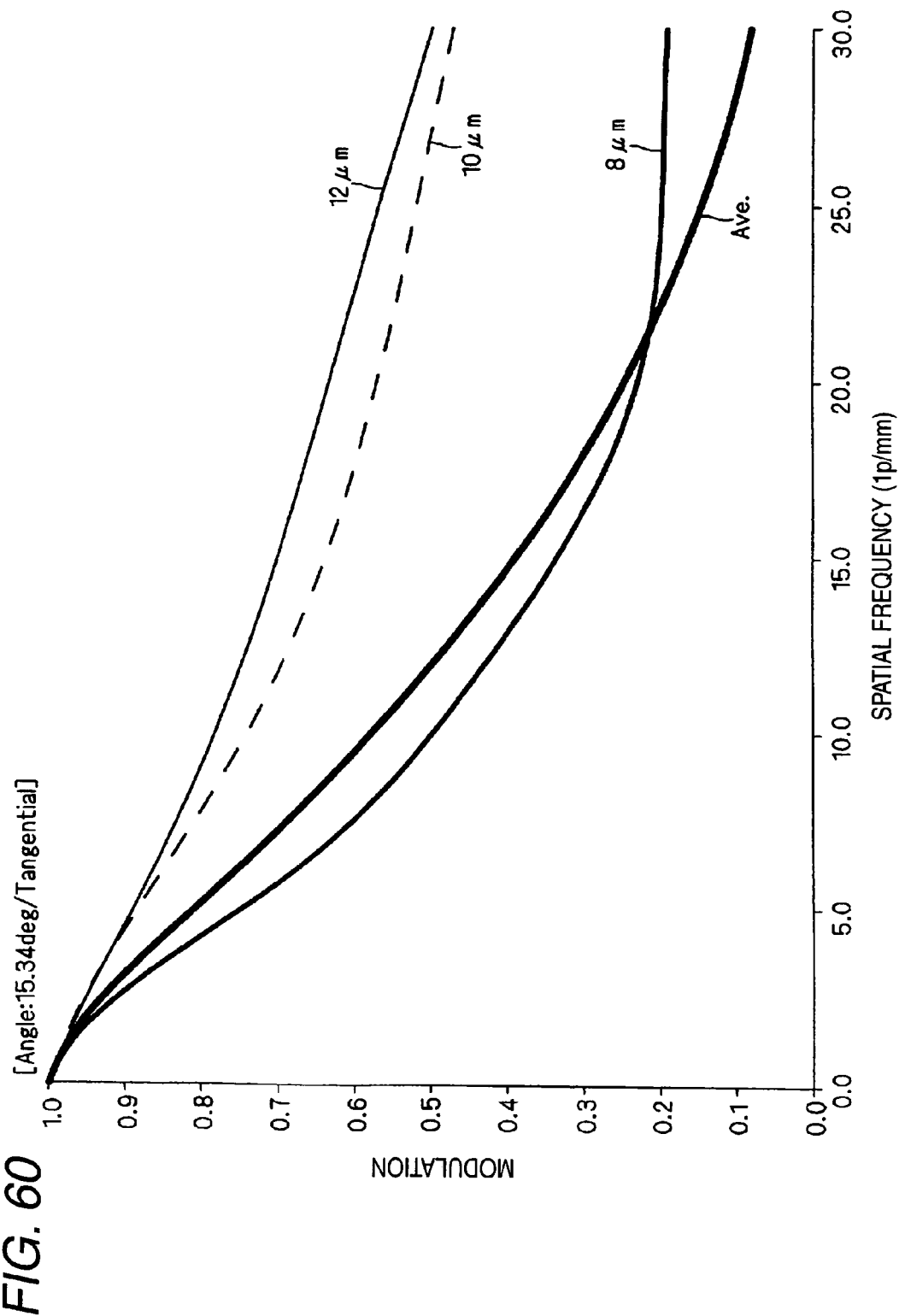
FIG. 60 is a graph illustrating MTF characteristics (tangential) when the image height is 15.34° in the configuration of FIG. 51.

The infrared lens 2a including a first lens L1 (a first lens group), a second lens L2 (a second lens group), and a third lens L3 (a third lens group) which are made of zinc sulfide are arranged in this order from an object side as shown in FIG. 51. The first lens L1 and the third lens L3 are positive meniscus lens of which convex surfaces are opposed to the object side, and the lenses have positive refractive power. The second lens L2 is a negative meniscus lens of which a convex surface is opposed to the image side, and the lens has positive refractive power.

Light (infrared rays) transmitted through lenses L1 to L3 is incident on an acceptance surface of an imaging device Id through an infrared transmission window Fi, and the light forms an image on the acceptance surface. In Embodiment 1, the first to third lens groups are configured by using lenses L1 to L3 so that one group has one lens, but the respective lens groups may be configured by using two lens or more, and the numbers of lenses corresponding to the respective lens groups may be configured to be different to each other.

In this way, the entire lenses L1 to L3 are made of low-cost zinc sulfide, and the infrared lens 2a is configured by the two positive meniscus lens of which convex surfaces are opposed to the object side and one negative meniscus lens of which the convex surface is opposed to the image side. Therefore, it is possible to improve an imaging performance while minimizing the light loss at the time of transmission through the lenses by minimizing thicknesses of the respective lenses L1 to L3. It is also possible to provide the infrared lens 1a forming a bright image, and having a high imaging performance by using a configuration of low cost. Additionally, it is configured to be capable of contriving to minimize the light loss at the time of transmission through the lenses, by minimizing the thicknesses of the entire lenses relative to the known zinc sulfide lenses.

In addition, a concave surface (the surface opposed to the image side, surface No. 2) of the first lens L1 is formed as a diffractive surface. Due to this, it is possible to effectively improve chromatic aberration which is a main issue in the infrared lens 2a. It is also possible to bring the most effective improvement result of the chromatic aberration, by forming the diffractive surface on the first lens L1 that a large refractive power is required and the chromatic aberration easily occurs. It is also possible to prevent attaching dust or the like to the diffractive surface caused by being exposed to external environment, by forming the diffractive surface on the surface which is the image side of the first lens L1.

At least any one surface of the convex surface or the concave surface in the first lens L1 is formed as an aspheric surface. In this manner, the aspheric surface is formed on the first lens L1 of which an aperture is large and the spherical aberration easily occurs, and thus it is possible to effectively improve the aberration. By forming the aspheric surface on the first lens L1 having a largest diameter, a degree of a shape change of the aspheric surface (a degree of undulation) decreases relative to the case where the aspheric surface is formed on another lens and the mold fabrication and lens process are easy to perform. For example, in Embodiment 2 the concave surface (surface No. 2) of the first lens L1, the convex surface (surface No. 4) of the second lens L2, the convex surface (surface No. 5) of the third lens L3, and the concave surface (surface No. 6) of the third lens L3 are formed as the aspheric surface, and the other lens surfaces are formed as a spherical surface.

A F value of the infrared lens 2a is set by 0.8 to 1.2 or so.

Besides, to achieve a predetermined imaging performance, the infrared lens 2a is configured to satisfy the following relational expression:

$$1.05 \leq f12/f \leq 1.75 \tag{5}$$

where f total focal length of the first to third lenses L1 to L3 and f12=composite focal length of the first lens L1 and the second lens L2.

Satisfying these conditions, various aberrations (which include the distortion in the wide angle region) within the field of vision are corrected so as to have balance, and it is possible to easily embody the compact and bright infrared lens 2a. For example, if f12/f is set to be smaller than 1.05, it is required to dispose the first lens L1 and the second lens L2 so as to be close to each other. Therefore, it is difficult to correct the spherical aberration. On the contrary, if f12/f is set to be greater than 1.75, it is required to dispose the first lens L1 and the second lens L2 so as to be apart from each other. Therefore, skew rays propagate through a place apart from an optical axis of the first lens L1. Accordingly, astigmatism increases, and difficulty in correction of distortion is also increases therewith.

As the result, employing a compact configuration which satisfies the relational expression 5 within a view angle of the infrared lens 2a (for example, it is set in the range from 20° to 40°), it is possible to obtain the imaging performance (for example, MTF 0.2 or more) enough for the entire wavelength region (for example, 8 to 12 μm) of the received infrared rays for the imaging in the entire region (the detailed description of this scope will be described later, on the basis of Examples and comparative Examples). On this account, for example, by combining the infrared lens 2a with the imaging device Id having pixel pitch 25 μm and pixel size 320×240, an infrared picture which has high resolution can be obtained.

The first to third lenses L1 to L3 which have such the configuration are formed as follows. Specifically, by using a mold formed in a lens shape and performing a heat press molding in a non-oxidizing atmosphere (for example, vacuum, inert gases such as Argon, or combination of them) on raw powder of zinc sulfide, the lenses L1 to L3 which are made of sintered bodies of polycrystalline zinc sulfide are obtained. In this way, it is possible to contrive a great reduction in material and processing cost of the infrared lens 2a, by fabricating the lenses L1 to L3 by a molding process using the zinc sulfide. It is also possible to perform mechanical processes such as a grinding and a polishing on the lenses L1 to L3 processed by the molding.

More specifically, as for the raw powder of zinc sulfide, the powder having an average particle diameter from 0.5 to 2 μm and purity 98% or more is available. It is desirable that a fabrication of a heat press molding is performed under the condition of temperature from 900 to 1100° C. and pressure from 150 to 800 kg/cm². Time for maintaining the pressure usually continues for from 0.05 to 1.5 hours, and the time is properly controlled by the combination between the conditions of temperature and pressure.

It is one of effective methods for the polycrystalline zinc sulfide lens to perform a coating for improving the transmittance characteristic or protecting the surface thereof from external affections. At this time, the material and the thickness of the coating layer are appropriately selected in consideration of a using method, a place, and a situation of the infrared lens. For example, to improve a transmission characteristic, a process of coating the lens surfaces by using an anti-reflection film may be performed (an AR coating process). Alternatively, to improve solidity of the lenses, a process of coating the lens surface (surface No. 1) located on the closest position relative to the object side of the first lens L1 by using an ultra-hard film such as DLC (diamond-like carbon) may be performed (a DLC coating process).

In particular, the DLC coating process is remarkably effective when applying the infrared lens 2a according to Embodiment 2 to a night vision infrared camera for vehicle installation. The infrared camera for the night vision is installed under severe environment such as a normal vehicle's a front grill portion where the camera is exposed to a rainstorm and ballistic fragment while driving. Accordingly, since measures to resist the environment such as measures to prevent a scar of the lens and to prevent the lens from getting dirty are important, the DLC coating process is performed on the outermost lens surface (surface No. 1) which is exposed to external environment. In this manner, it can be easy to perform the measures. As for the known measures to resist the environment of the infrared camera for the night vision, a measure such as installing a window member made by predetermined material in front of the known outermost lens surface has been performed. However, since germanium which is mostly used as the material of the window member is high price, the cost increases. A lens module also increases in overall size by additionally installing the window member. Meanwhile, since the measures to resist the environment by applying the DLC coating process does not cause such the problems, it has advantages to contrive low cost and a decrease in module size, in comparison with the case of installing the window member.

However, to fabricate with low cost the infrared lens 2a having a predetermined optical performance by processing the heat press molding which uses the mold formed in a lens shape, it is required to employ a configuration suitable for the molding in the configurations such as the outer diameters or the thicknesses of the lenses L1 to L3.

First, in terms of outer diameters Rd of the lenses L1 to L3, the larger outer diameters Rd of the lenses L1 to L3 are set, the brighter image can be obtained. However, in accordance with the increase of the outer diameters Rd, required compressive force of a press apparatus in the process of the heat press molding which is performed by using a lens shaped mold increases. For this reason, in view of the processing cost or the like, for example, assuming that a combination includes the imaging device Id having pixel pitch 25 μm, it is desirable to set the outer diameters Rd of the lenses L1 to L3 so as to satisfy the following relational expression:

Rd<40 mm.

Thanks to this, the required compressive force of the press apparatus in the process of the heat press molding which is performed by using the lens shaped mold can be minimized. Therefore, it is possible to decrease installation cost for processing the lenses.

Second, In terms of the thicknesses of the lenses L1 to L3, the thicknesses of a certain degree are required to secure molding capability (mechanical strength, processing accuracy, and the like) in the process of the heat press molding which is performed by using the lens shaped mold. Meanwhile, when the thicknesses increase, the light loss at the time of transmission through the lenses also increases. At that time, distribution of the compressive force occurs in a thickness direction of the lenses L1 to L3 in the process of the heat press molding, and thus distribution of the refractive index easily occurs. For this reason, for example, assuming that a combination includes the imaging device Id having pixel pitch 25 μm, in terms of the thicknesses of the lenses L1 to L3, it is desirable to set a central thickness Tm and a peripheral thickness Te so as to satisfy the following relational expressions:

1.5 mm<Tm<8.0 mm and 1.0 mm<Te<8.0 mm.

Due to this, by securing the molding capability in the process of the heat press molding which is performed by using the lens shaped mold, it is possible to embody the infrared lens 1a of which the thicknesses are thin and the light loss at the time of transmission through the lenses is minimized. By minimizing the thicknesses of the lenses L1 to L3, it is possible to prevent the problem that the distribution of the compressive force occurs in the thickness direction of the lenses in the process of the heat press molding and thus the distribution of the refractive index occurs in the thickness direction.

As for the imaging device Id, a non-cooling thermal type imaging device such as a bolometer, a thermopile, and a SOI diode which have sensitivity of about 8 to 12 μm is used. Usually, the imaging device Id which has the number of pixels of 160×120 and 320×240 is used. By using the imaging device Id which has narrow pixel pitches (for example, 25 μm), it is possible to appropriately set the maximum diameter of the infrared lens 2a by 30 mm or so in the fabrication.

Example

Hereinafter, three Examples 2-1, 2-2, and 2-3 fairly suitable as detailed example of Embodiment 2 will be described. Examples 2-4 and 2-5 will be introduced as two Comparative Examples relative to Examples 2-1, 2-2, and 2-3, and Examples 2-1, 2-2, and 2-3 and Examples 2-4 and 2-5 will be compared to each other. The f12/f is set by 1.25 in Example 2-1, the f12/f is set by 1.75 in Example 2-2, and the f12/f is set by 1.05 in Example 2-3. Additionally, the f12/f is set by 1.80 in Example 2-4, and the f12/f is set by 1.00 in Example 2-5.

Example 2-1

The infrared lens 2a according to Example 2-1 have configurations illustrated in the FIGS. 51 to 53, and the lenses are configured that the f12/f is 1.25, the F value is 0.89, the maximum diameter is 20.0 mm, and the view angle is 31° (the view angle is set in the combination case where the imaging device has a pixel pitch 25 μm and a pixel size 320×240). The aspheric surface shape (diffractive surface shape) of a second surface, a fourth surface, a fifth surface and a sixth surface shown in FIG. 53 is determined by substituting the parameter into the following expression (ditto below):

$$Z(y) = \frac{\frac{y^2}{R}}{1+\sqrt{1-(1+K)\frac{y^2}{R^2}}} + A2 \cdot y^2 +$$

$$A4 \cdot y^4 + A6 \cdot y^6 + A8 \cdot y^8 + \ldots + \Phi(y)$$

[Numerical Formula 3]

$$\Phi(y) = \frac{1}{N-1} \cdot \mathrm{mod}(C1 \cdot y^2 + C2 \cdot y^4, -\lambda)$$

[Numerical Formula 4]

In the formula, the Z is a length (mm) of a perpendicular line down on the tangential surface in contact with the top of the aspheric surface from a point on the aspheric surface, the y is a height (mm) from an optical axis, the K is an eccentricity, the R is a near-axis curvature radius, and the A2, A4, A6, and A8 are aspheric surface coefficients of second order, fourth order, sixth order, and eighth order. In addition, the N is a refractive index, λ is a value of a reference wavelength, and the C1 and C2 are diffractive surface coefficients.

Sagittal and tangential MTF characteristics with respect to wavelengths 8 μm, 10 μm, and 12 μm within view angles (0°, 10.9°, 12.15°, and 15.34°) in the configuration of Example 2-1 are illustrated in FIGS. 54 to 60. In FIGS. 54 to 60, the Ave. is a graph illustrating averages of the MTF values of 8 to 12 μm (ditto below).

Figure 61:
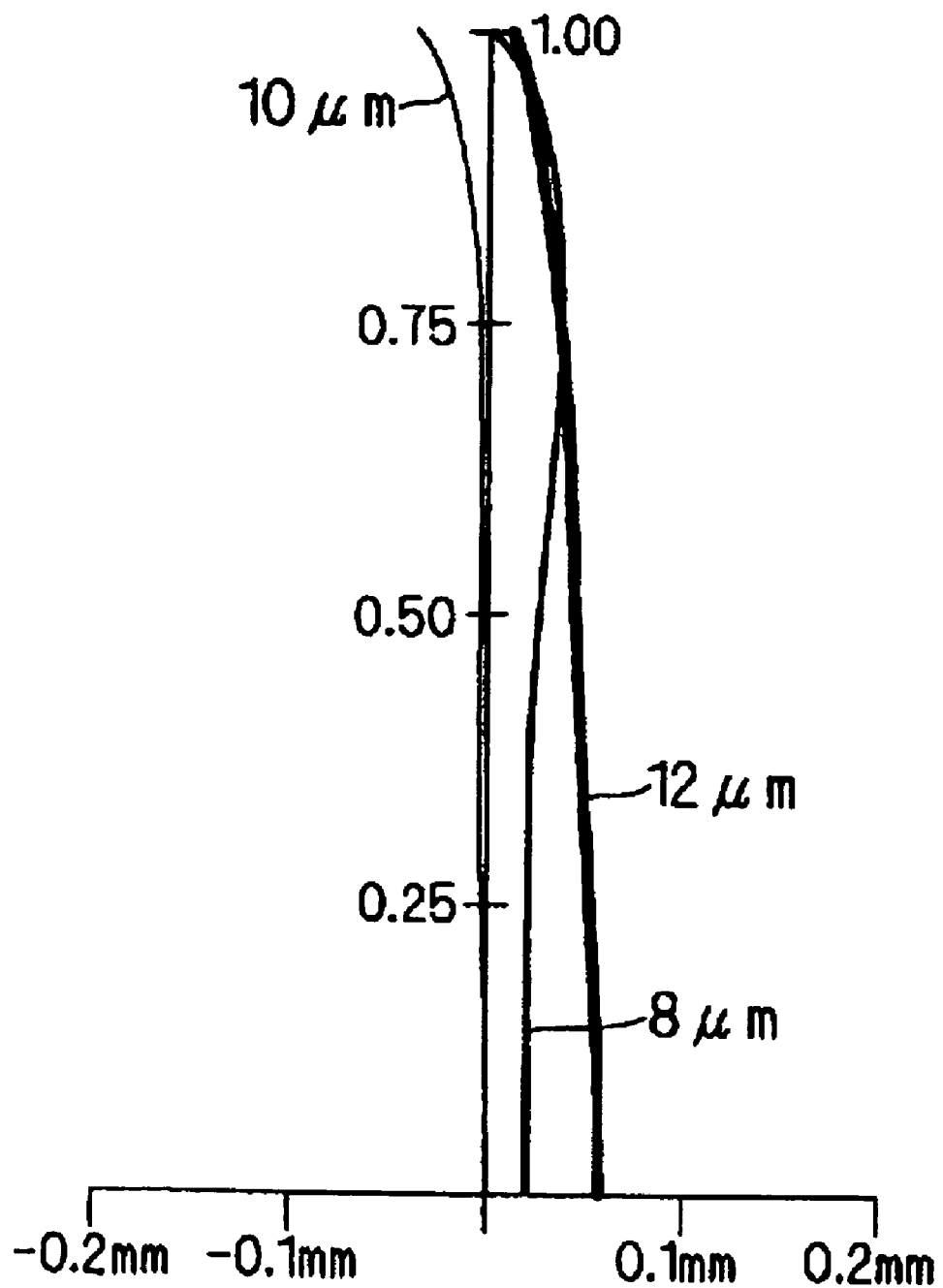
FIG. 61 is a graph illustrating spherical aberration characteristics in the configuration of FIG. 51.
Figure 62:
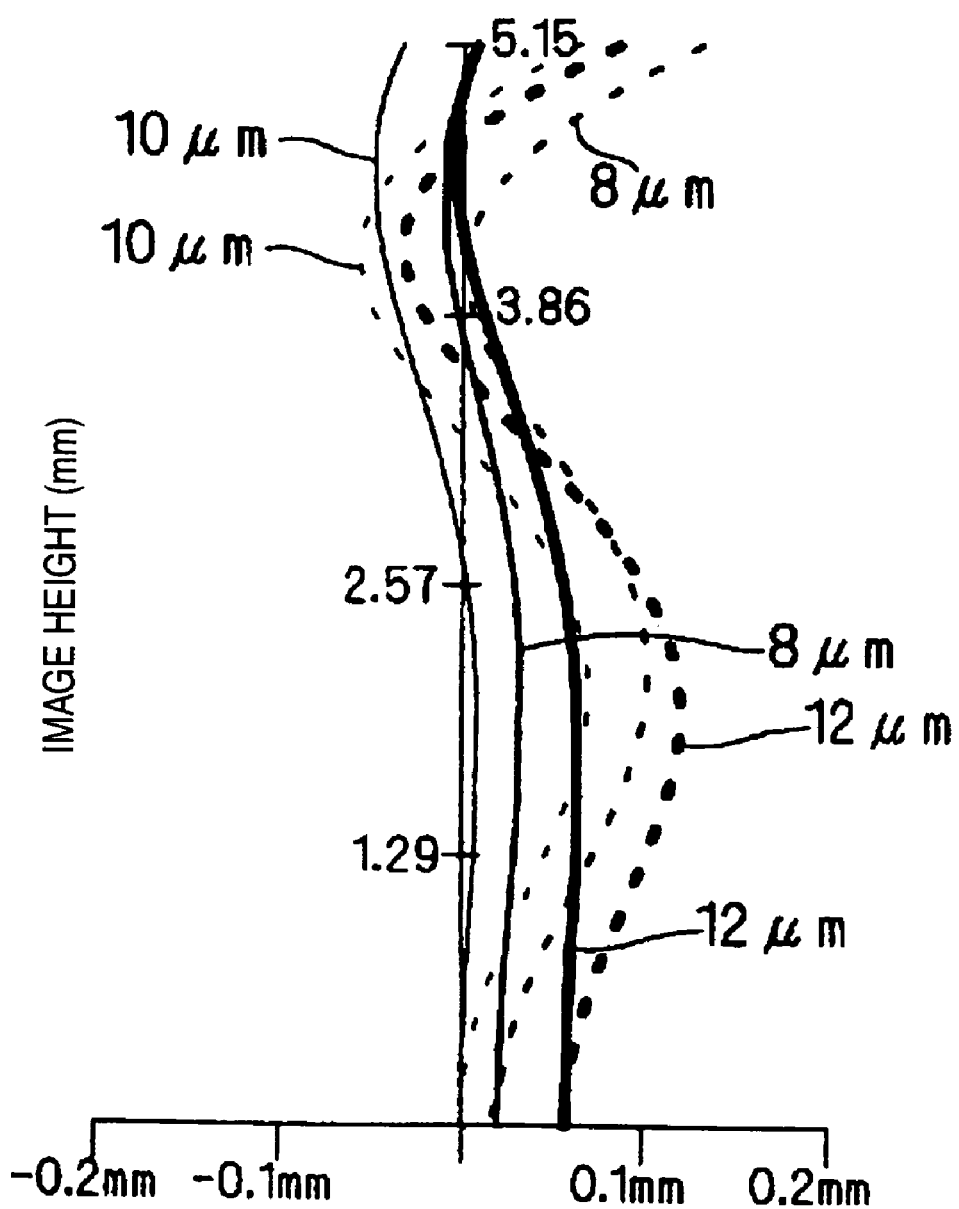
FIG. 62 is a graph illustrating astigmatism characteristics in the configuration of FIG. 51.
Figure 63:
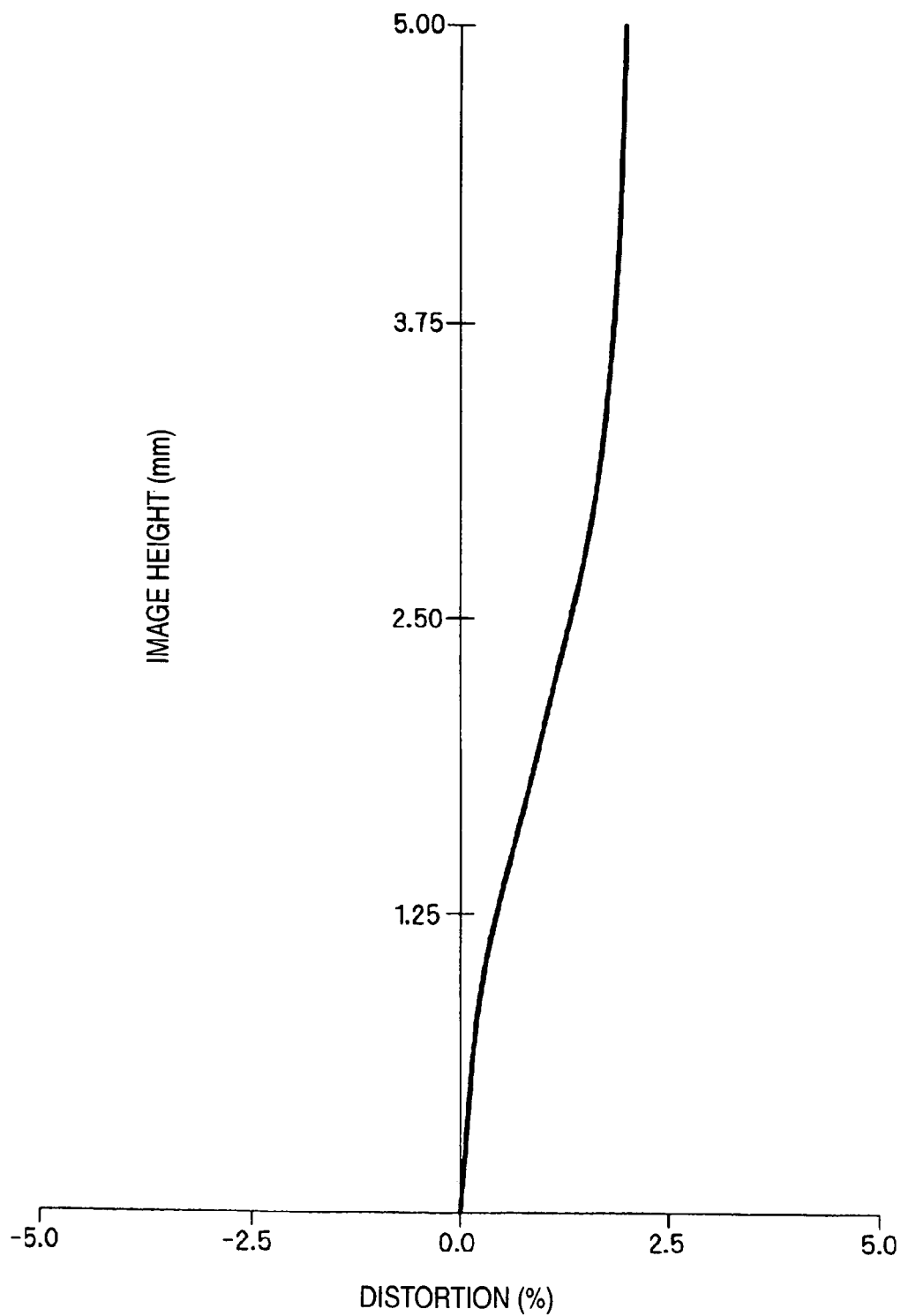
FIG. 63 is a graph illustrating distortion characteristics in the configuration of FIG. 51.
Figure 64A:
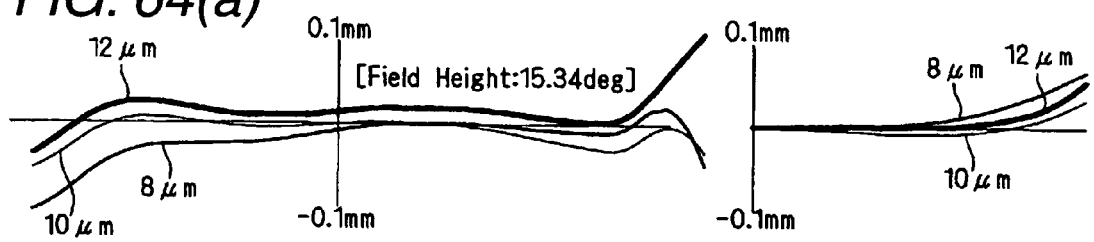
FIGS. 64(a) to 64(e) are graphs illustrating longitudinal aberration characteristics corresponding to the respective image heights in the configuration of FIG. 51.
Figure 64B:
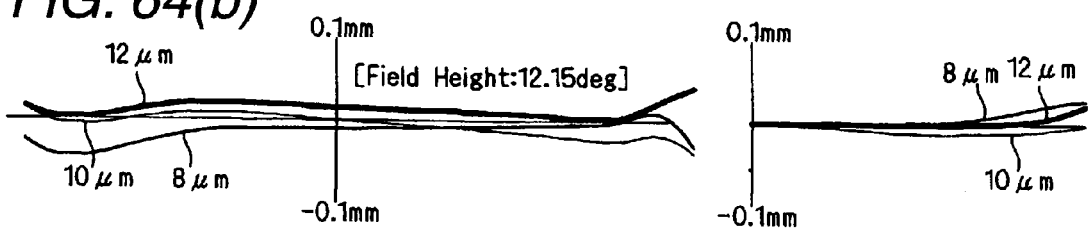
Figure 64C:
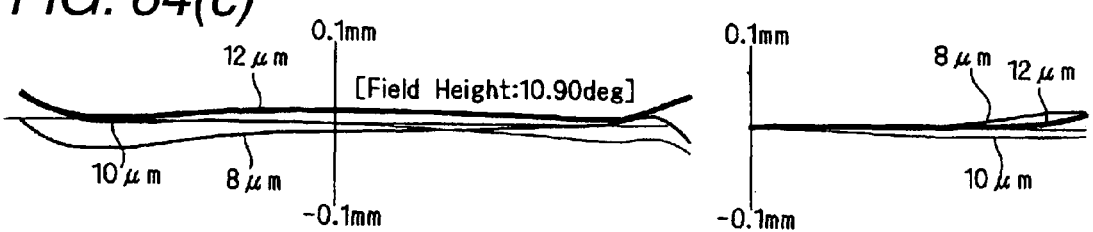
Figure 64D:
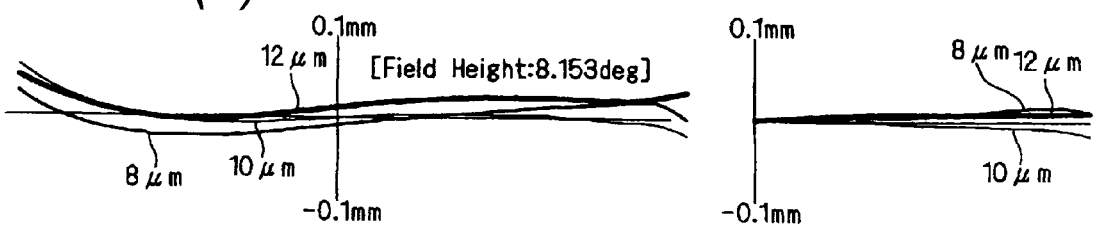
Figure 64E:
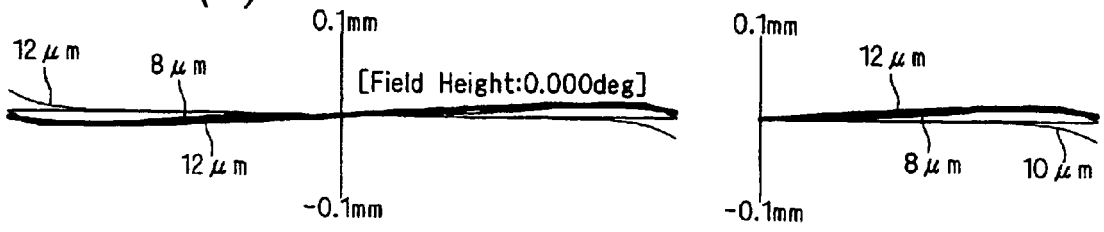

Additionally, spherical aberration and astigmatism characteristics with respect to the wavelengths 8 μm, 10 μm, and 12 μm are illustrated in FIGS. 61 and 62, and distortion characteristics are illustrated in FIG. 63. Longitudinal aberration characteristics corresponding to the respective image heights in the view angle with respect to the wavelengths 8 μm, 10 μm, and 12 μm are illustrated in FIGS. 64(a) to 64(e) (in the drawings, a left side and a right side corresponds to the tangential and the sagittal, respectively).

Example 2-2

Figure 65:
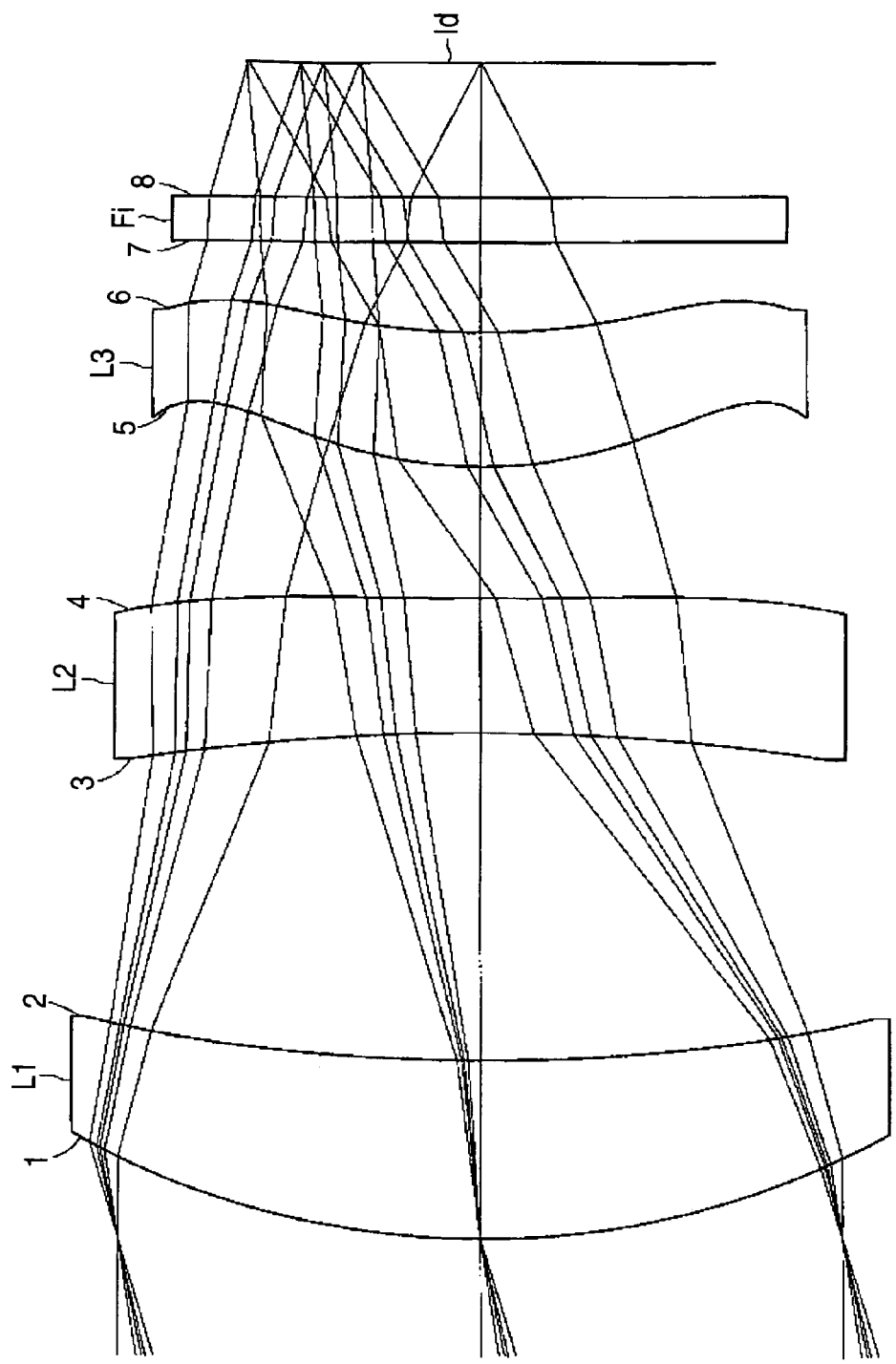
FIG. 65 is a diagram illustrating a configuration of Example 2-2 of an infrared lens according to Embodiment 2 of the invention.
Figure 68:
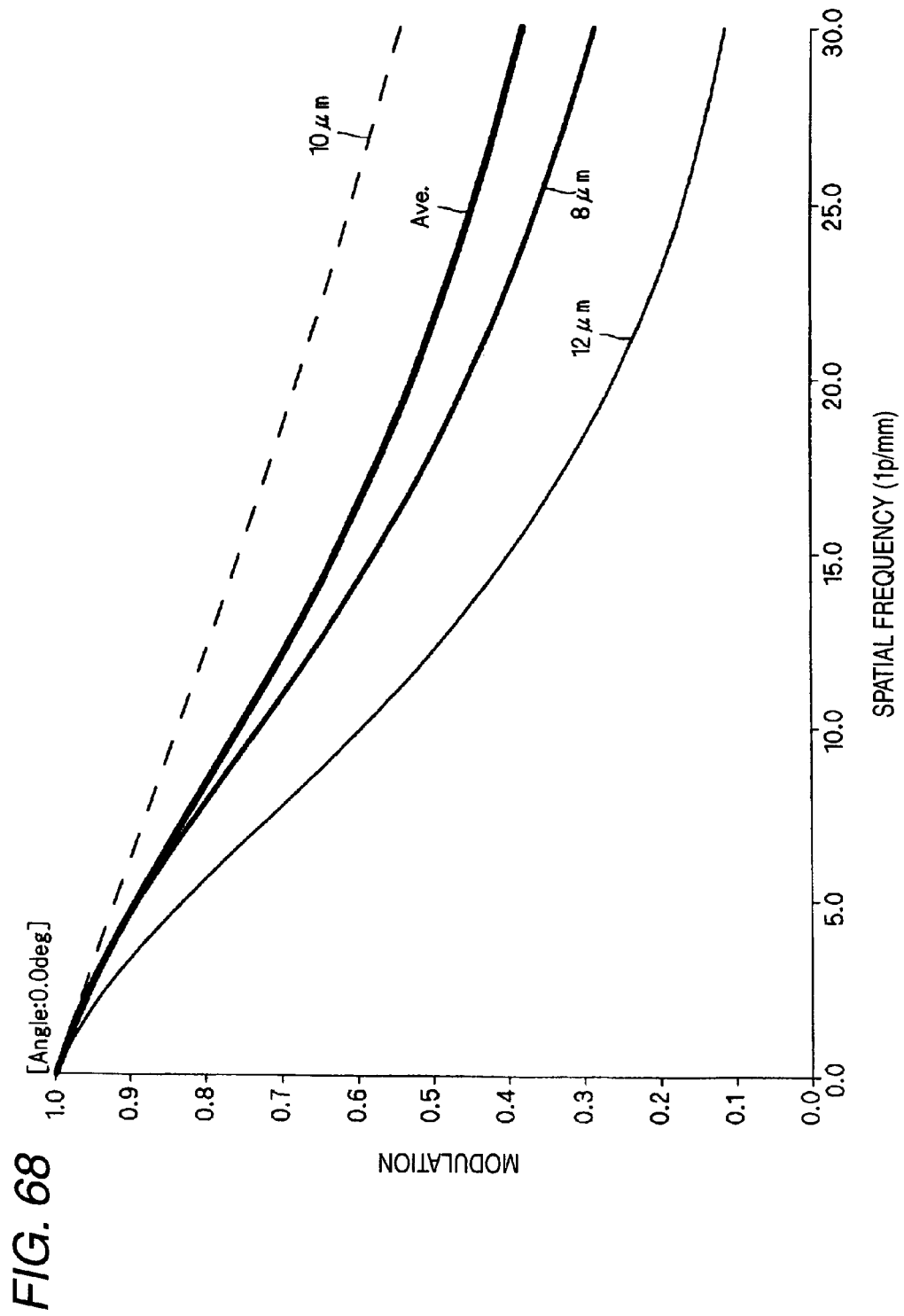
FIG. 68 is a graph illustrating MTF characteristics when the image height is 0° in the configuration of FIG. 65.
Figure 69:
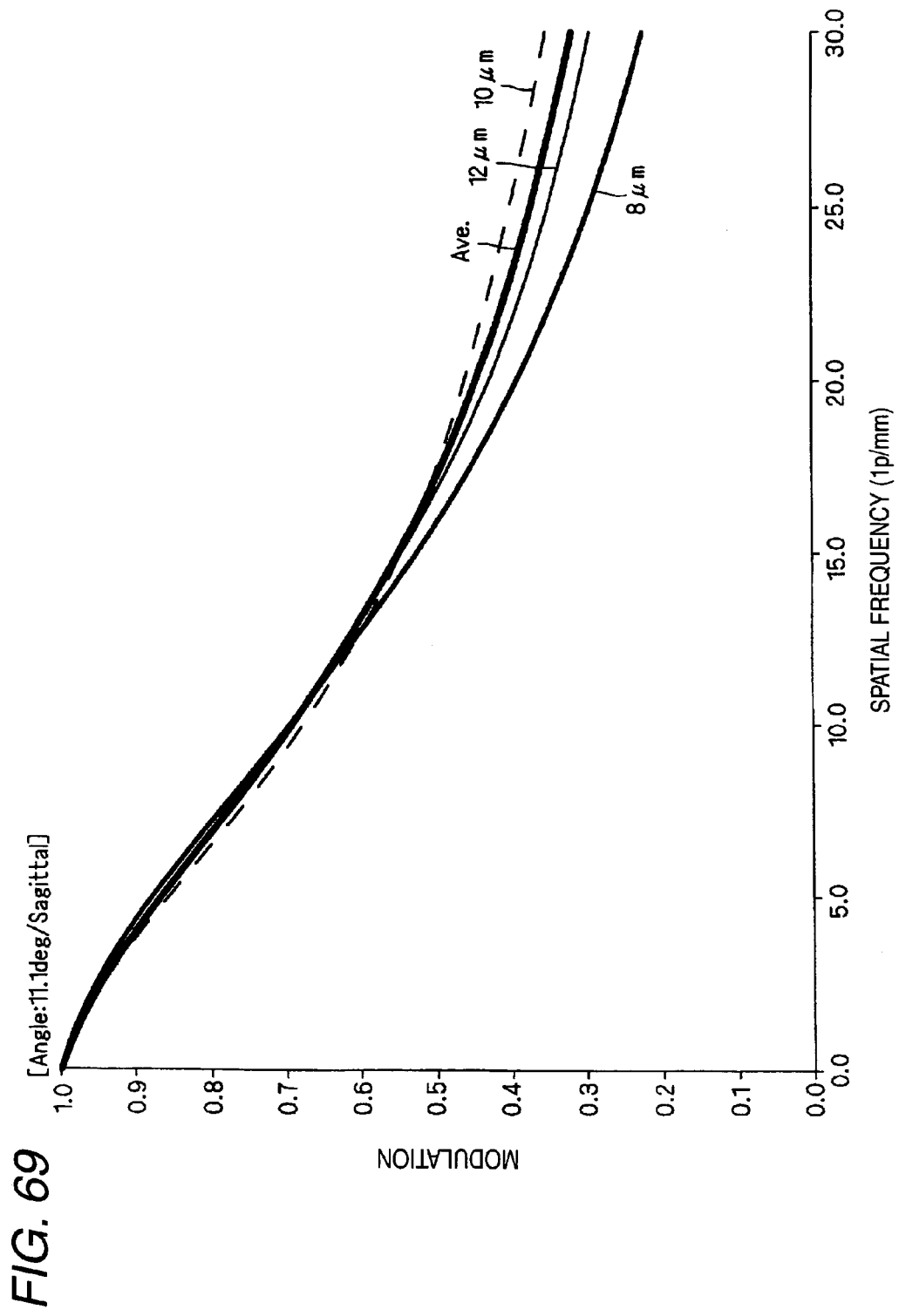
FIG. 69 is a graph illustrating MTF characteristics (sagittal) when the image height is 11.1° in the configuration of FIG. 65.
Figure 70:
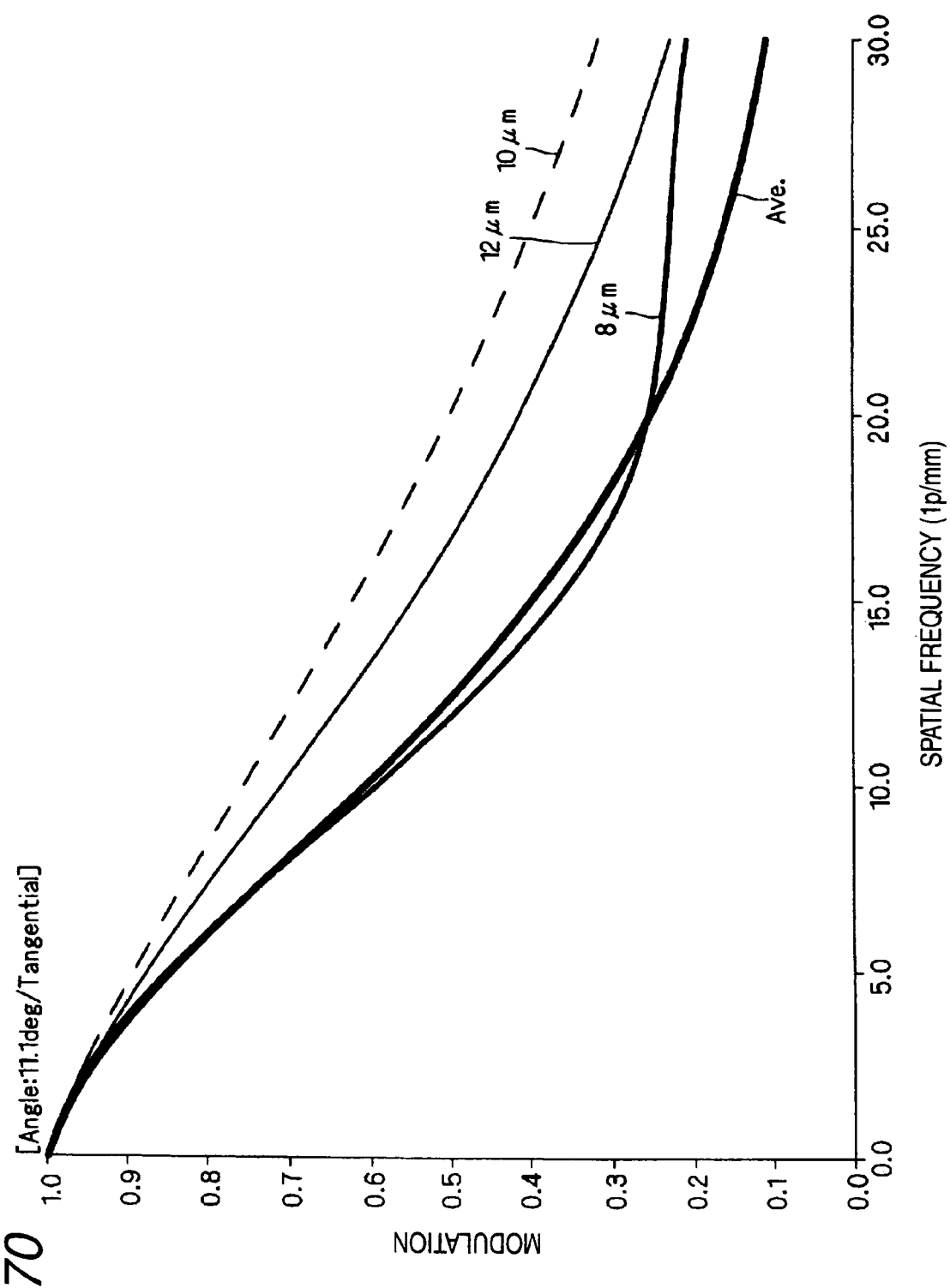
FIG. 70 is a graph illustrating MTF characteristics (tangential) when the image height is 11.1° in the configuration of FIG. 65.
Figure 71:
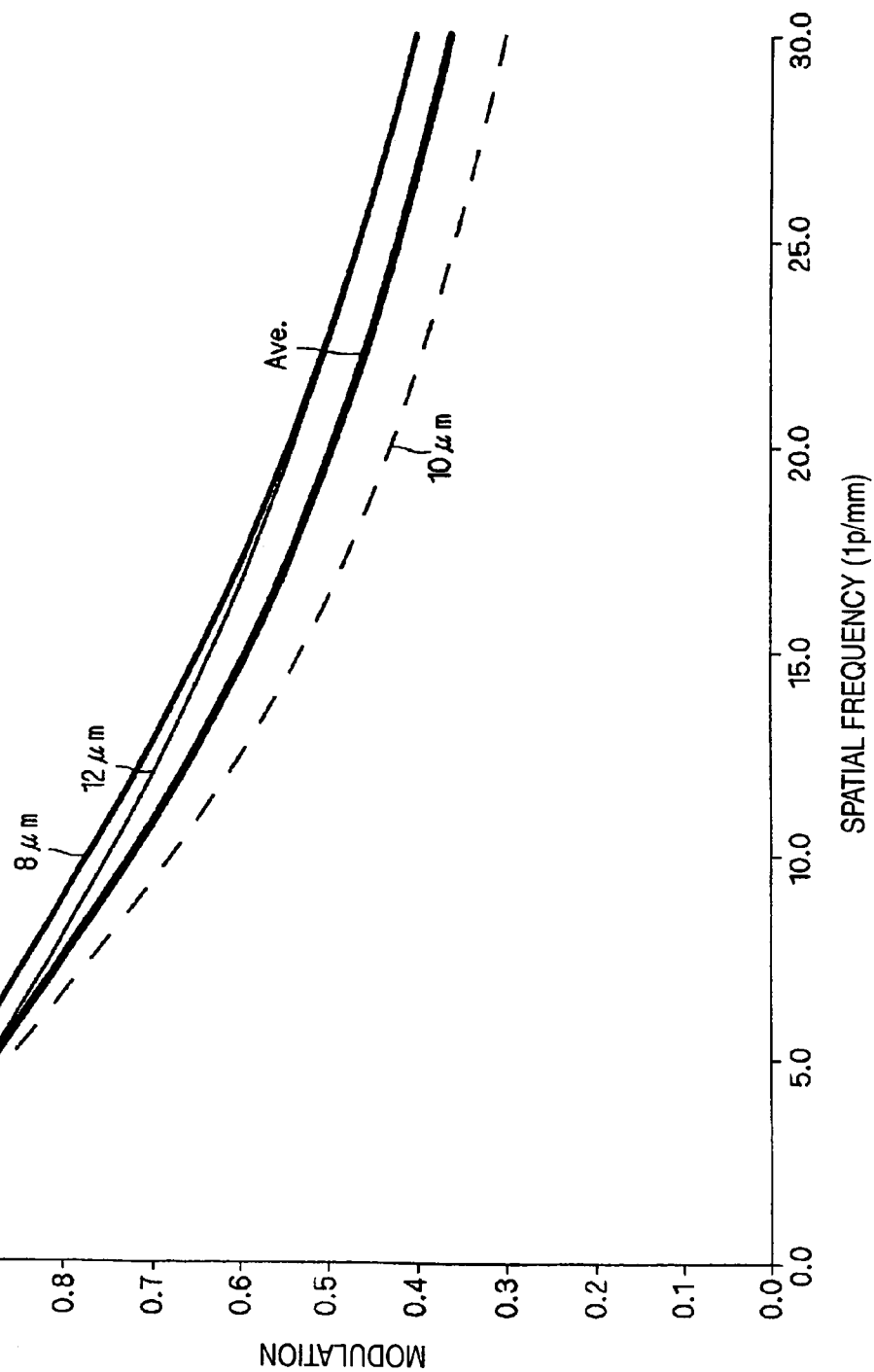
FIG. 71 is a graph illustrating MTF characteristics (sagittal) when the image height is 12.7° in the configuration of FIG. 65.
Figure 72:
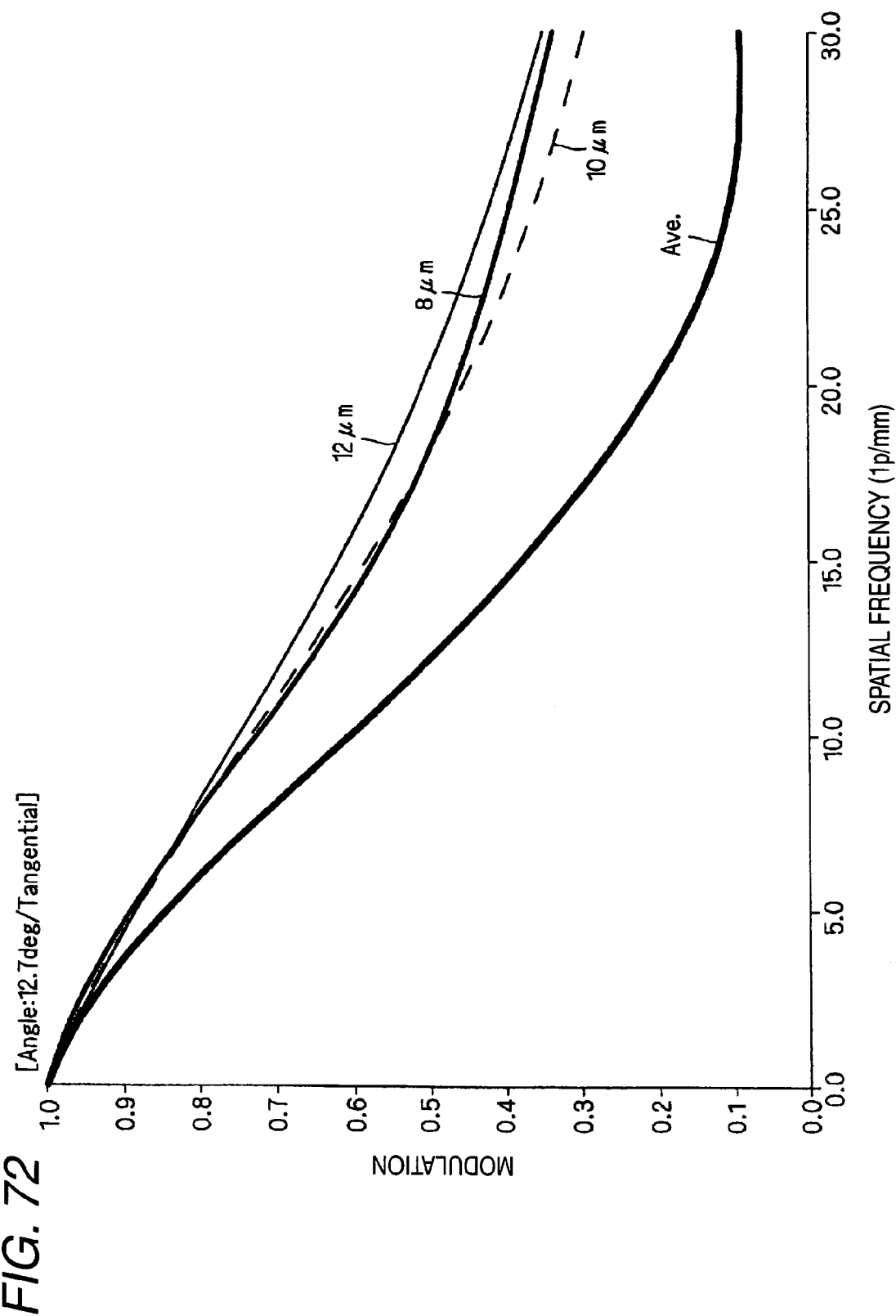
FIG. 72 is a graph illustrating MTF characteristics (tangential) when the image height is 12.7° in the configuration of FIG. 65.
Figure 73:
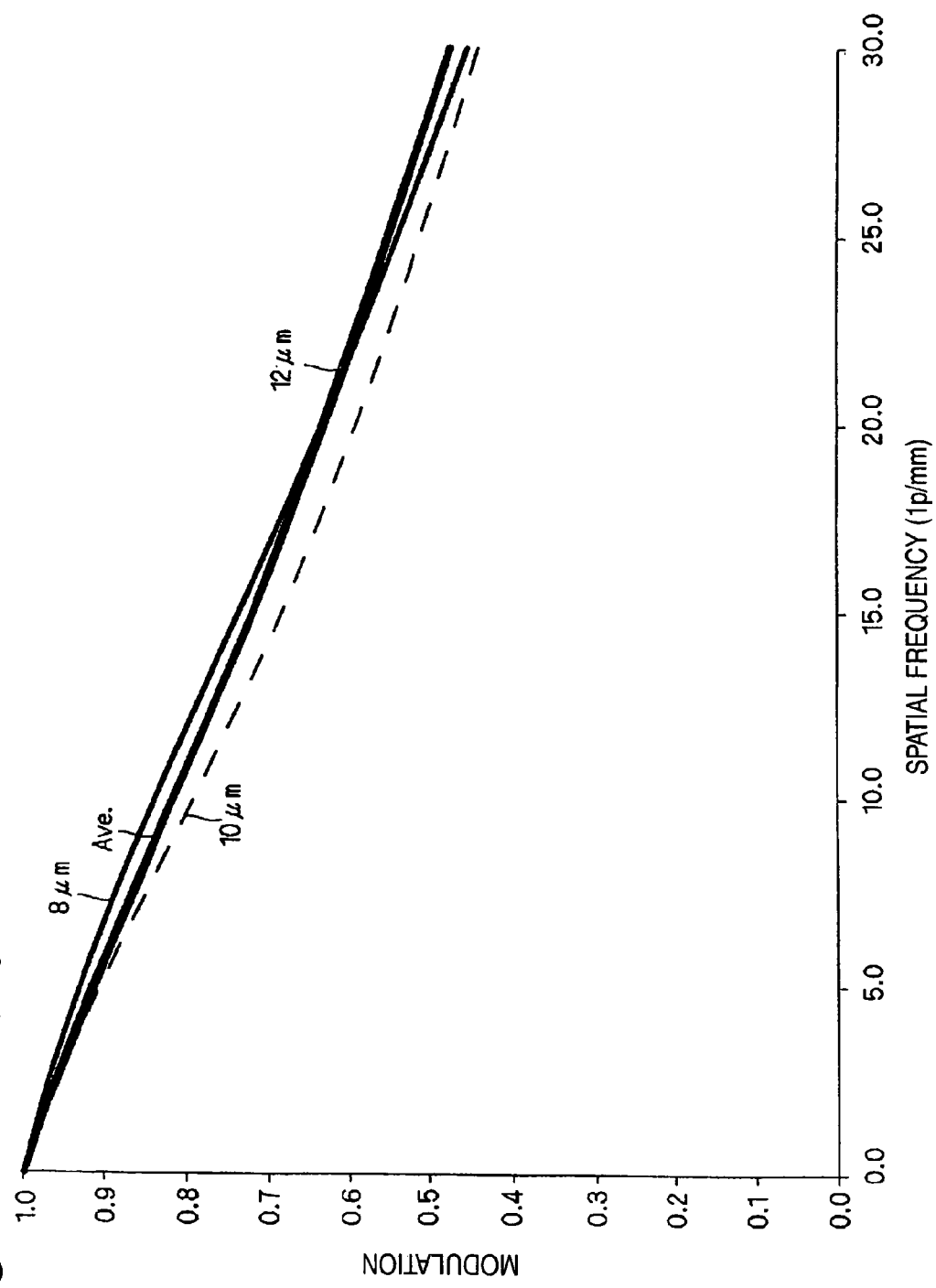
FIG. 73 is a graph illustrating MTF characteristics (sagittal) when the image height is 16.2° in the configuration of FIG. 65.
Figure 74:
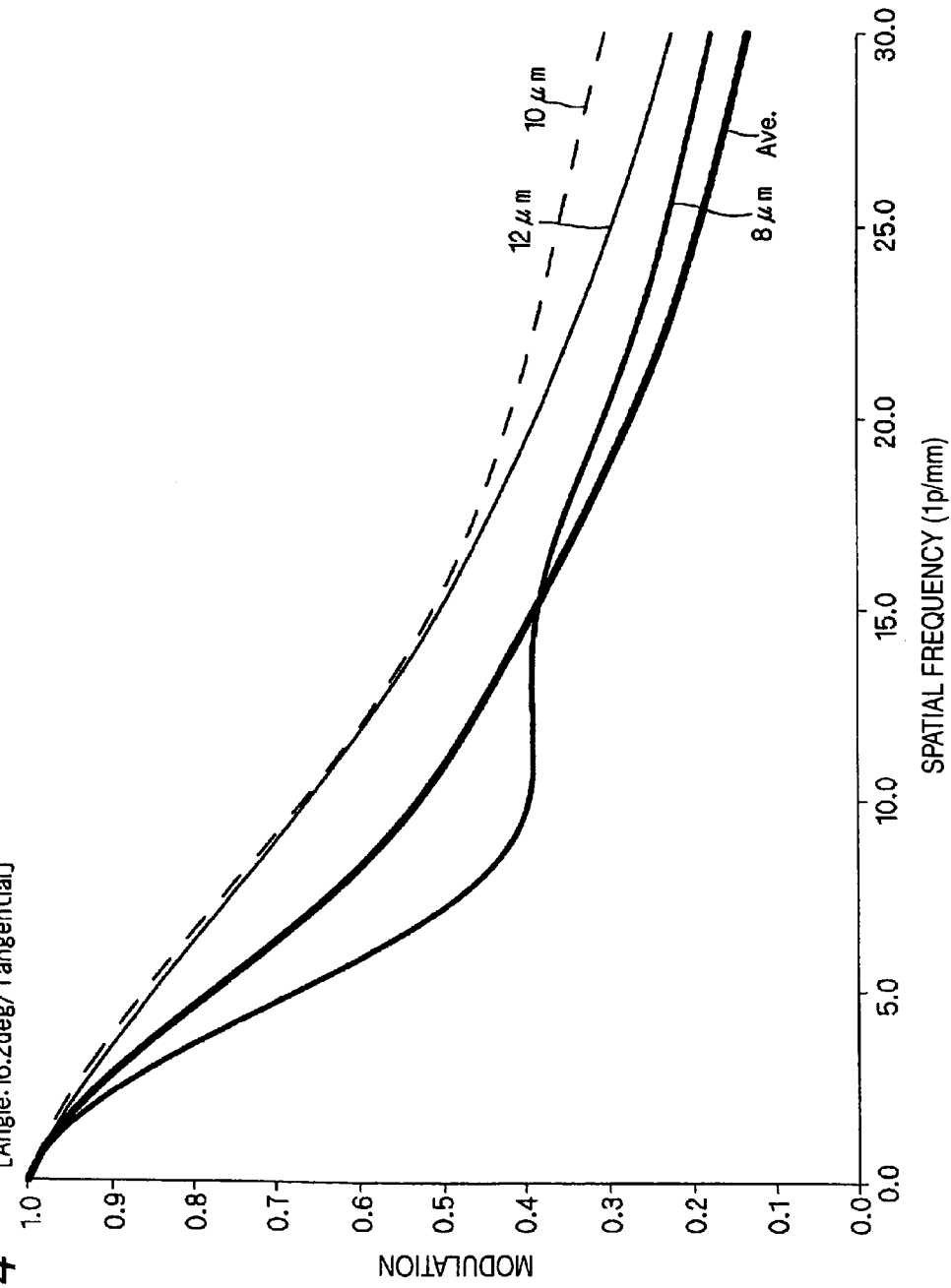
FIG. 74 is a graph illustrating MTF characteristics (tangential) when the image height is 16.2° in the configuration of FIG. 65.
Figure 75:
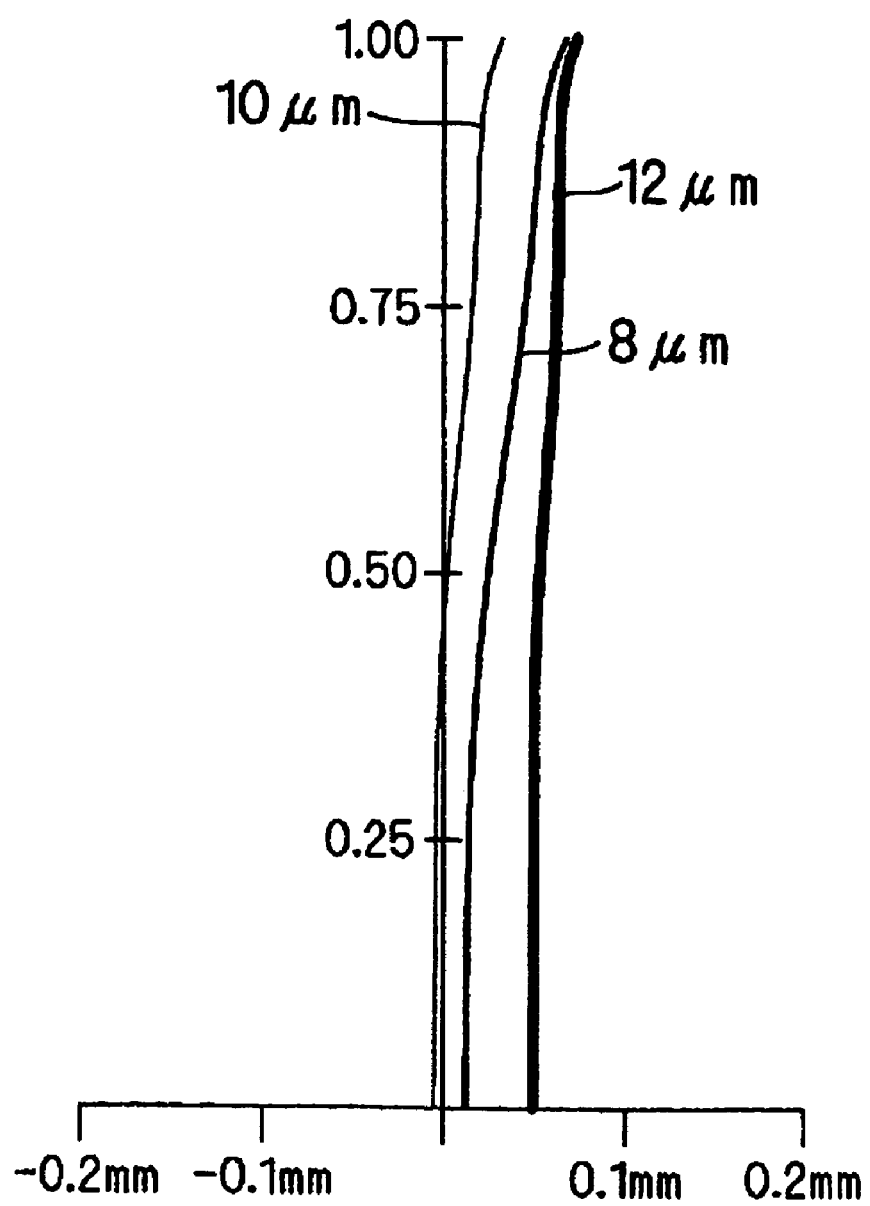
FIG. 75 is a graph illustrating spherical aberration characteristics in the configuration of FIG. 65.
Figure 76:
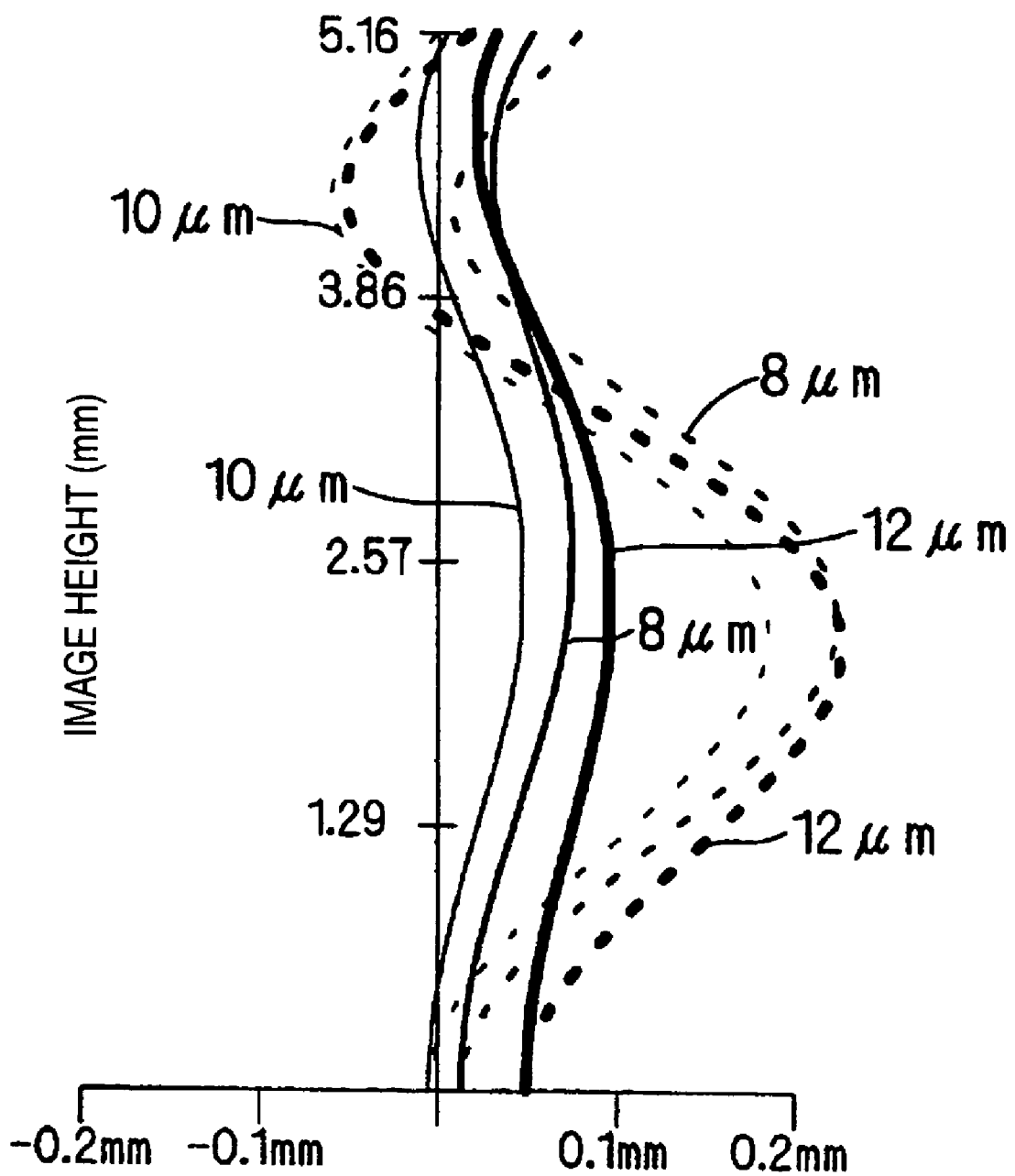
FIG. 76 is a graph illustrating astigmatism characteristics in the configuration of FIG. 65.
Figure 77:
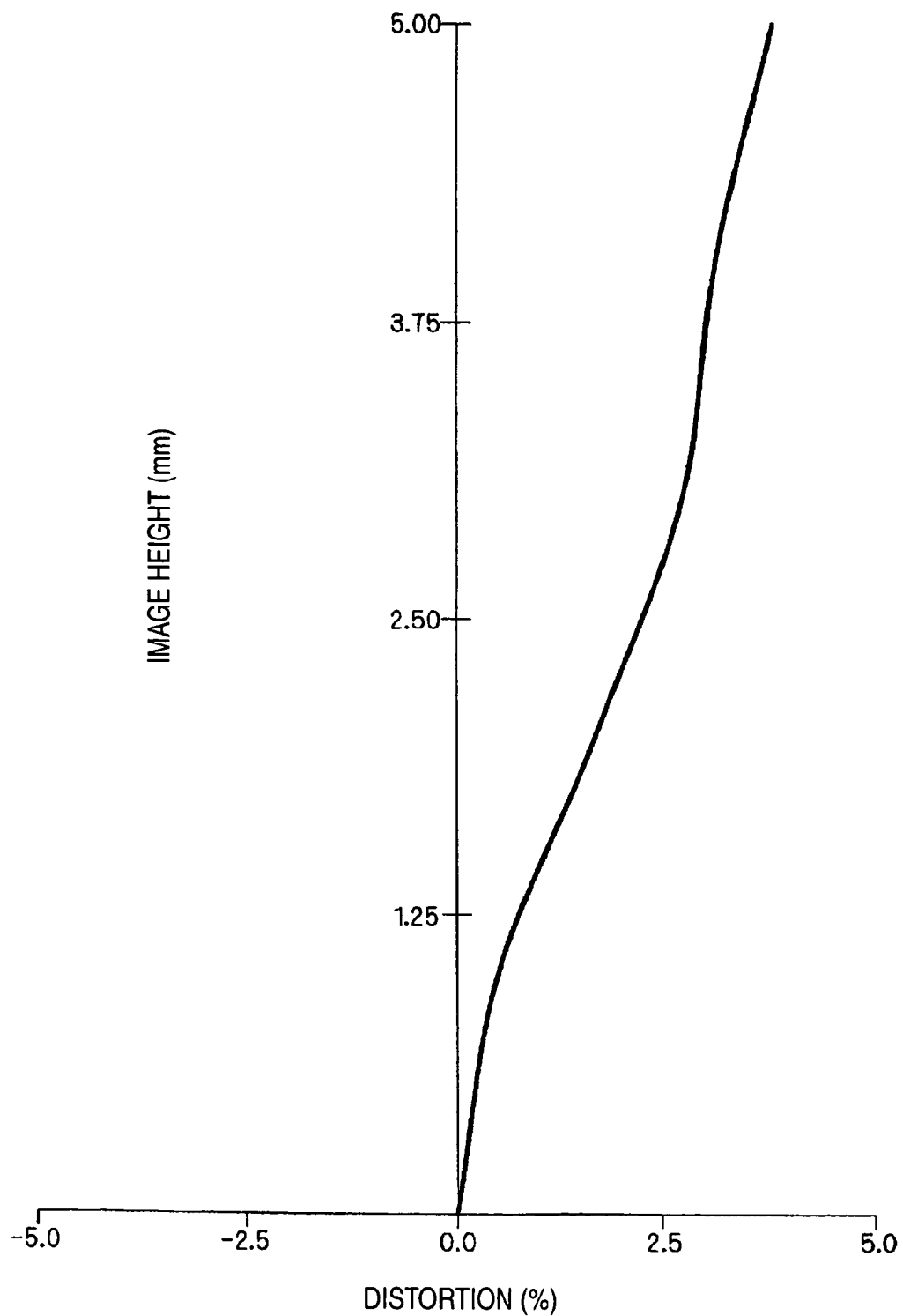
FIG. 77 is a graph illustrating distortion characteristics in the configuration of FIG. 65.

The infrared lens 2b according to Example 2-2 have configurations illustrated in FIGS. 65 to 67, and the lenses are configured that the f12/f is 1.75, the F value is 1.08, the maximum diameter is 15.8 mm, and the view angle is 32°.

MTF characteristics with respect to wavelengths 8 μm, 10 μm, and 12 μm within view angles (0°, 11.1°, 12.7°, and 16.2°) in the configuration of Example 2-2 are illustrated in FIGS. 68 to 74. Additionally, the spherical aberration, astigmatism, distortion, and longitudinal aberration characteristics with respect to the wavelengths 8 μm, 10 μm, and 12 μm are illustrated in FIGS. 75 to 77 and 78(a) to 78(e).

Example 2-3

Figure 79:
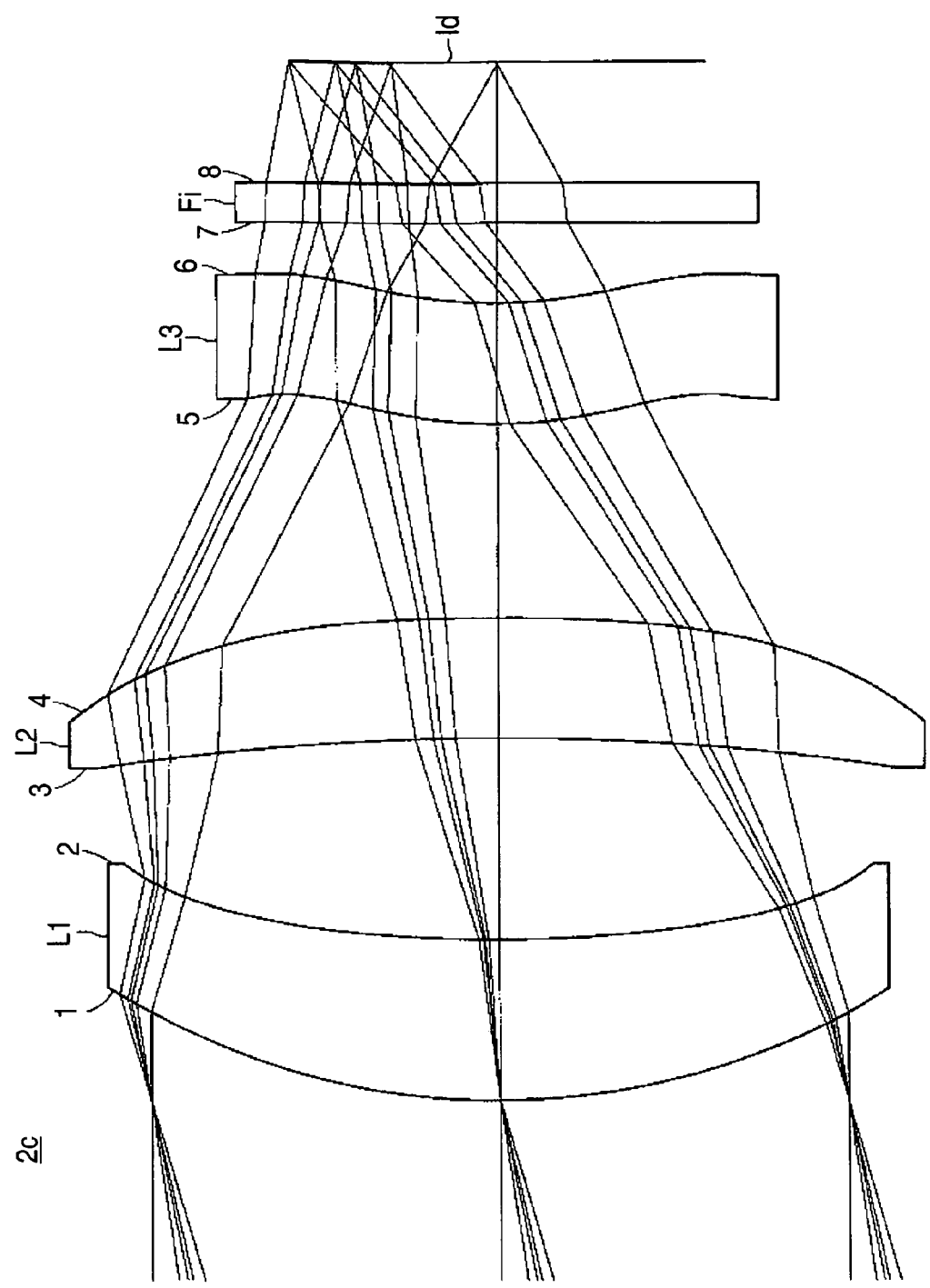
FIG. 79 is a diagram illustrating a configuration of Example 2-3 of an infrared lens according to Embodiment 2 of the invention.
Figure 82:
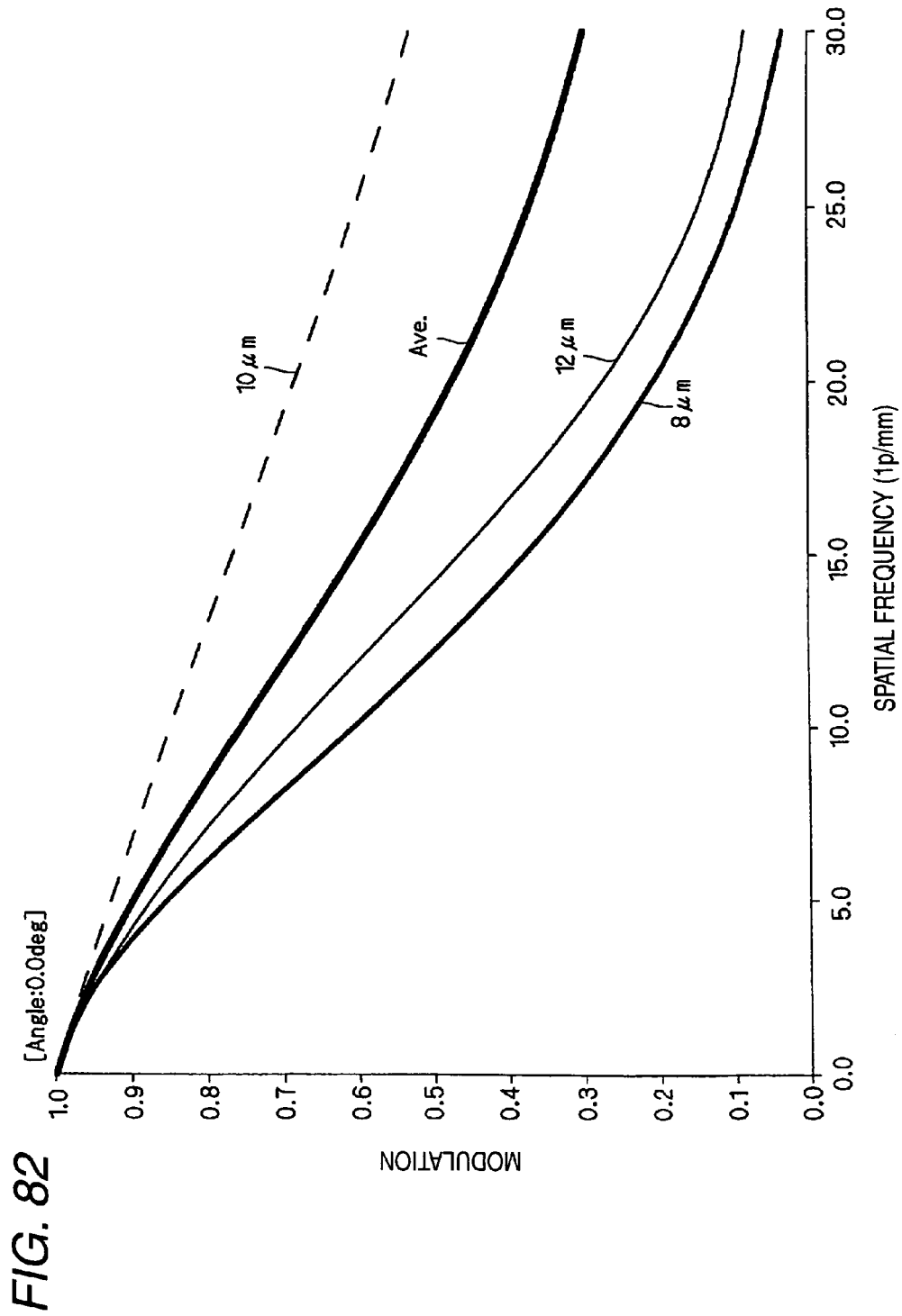
FIG. 82 is a graph illustrating MTF characteristics when the image height is 0° in the configuration of FIG. 79.
Figure 83:
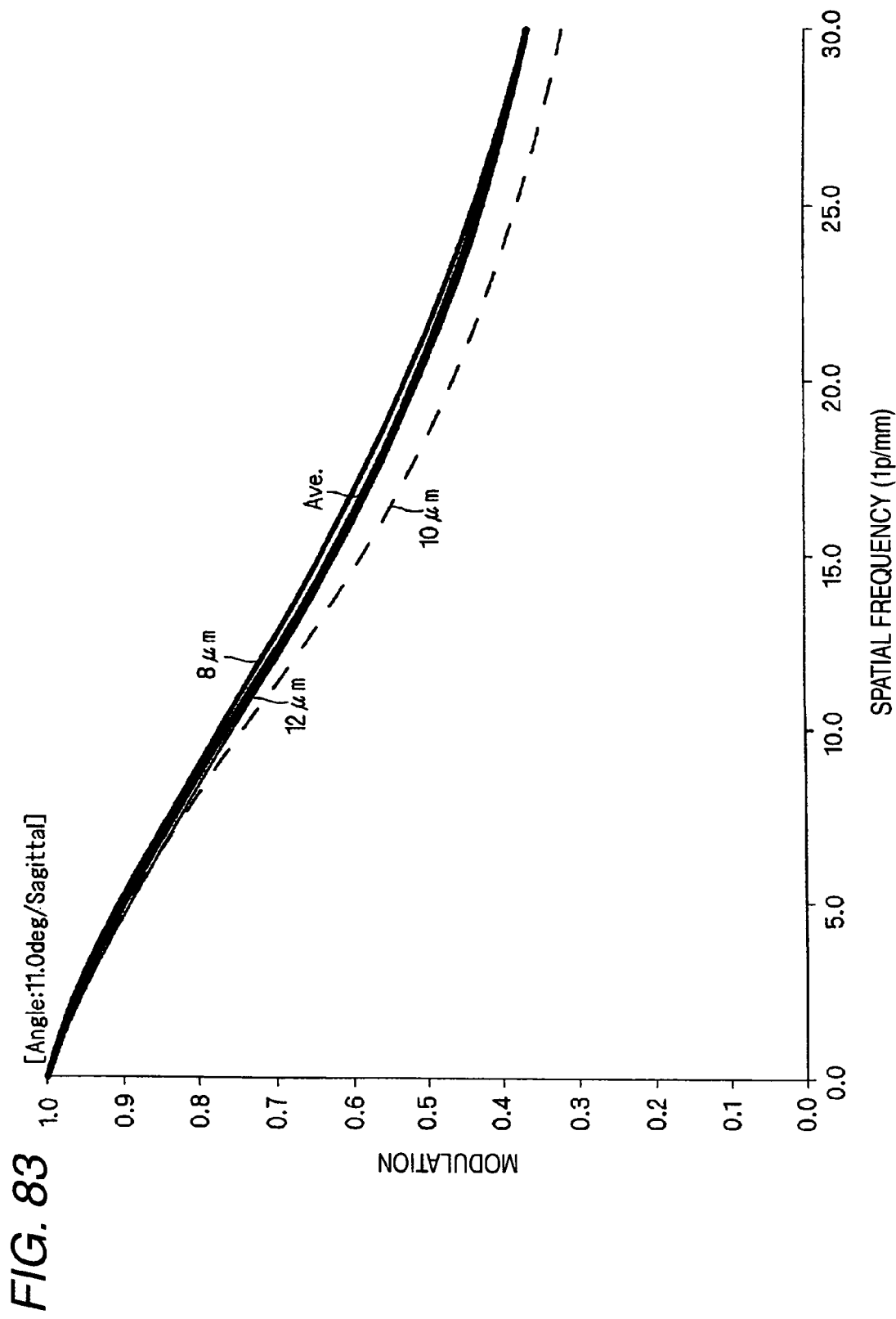
FIG. 83 is a graph illustrating MTF characteristics (sagittal) when the image height is 11.0° in the configuration of FIG. 79.
Figure 84:
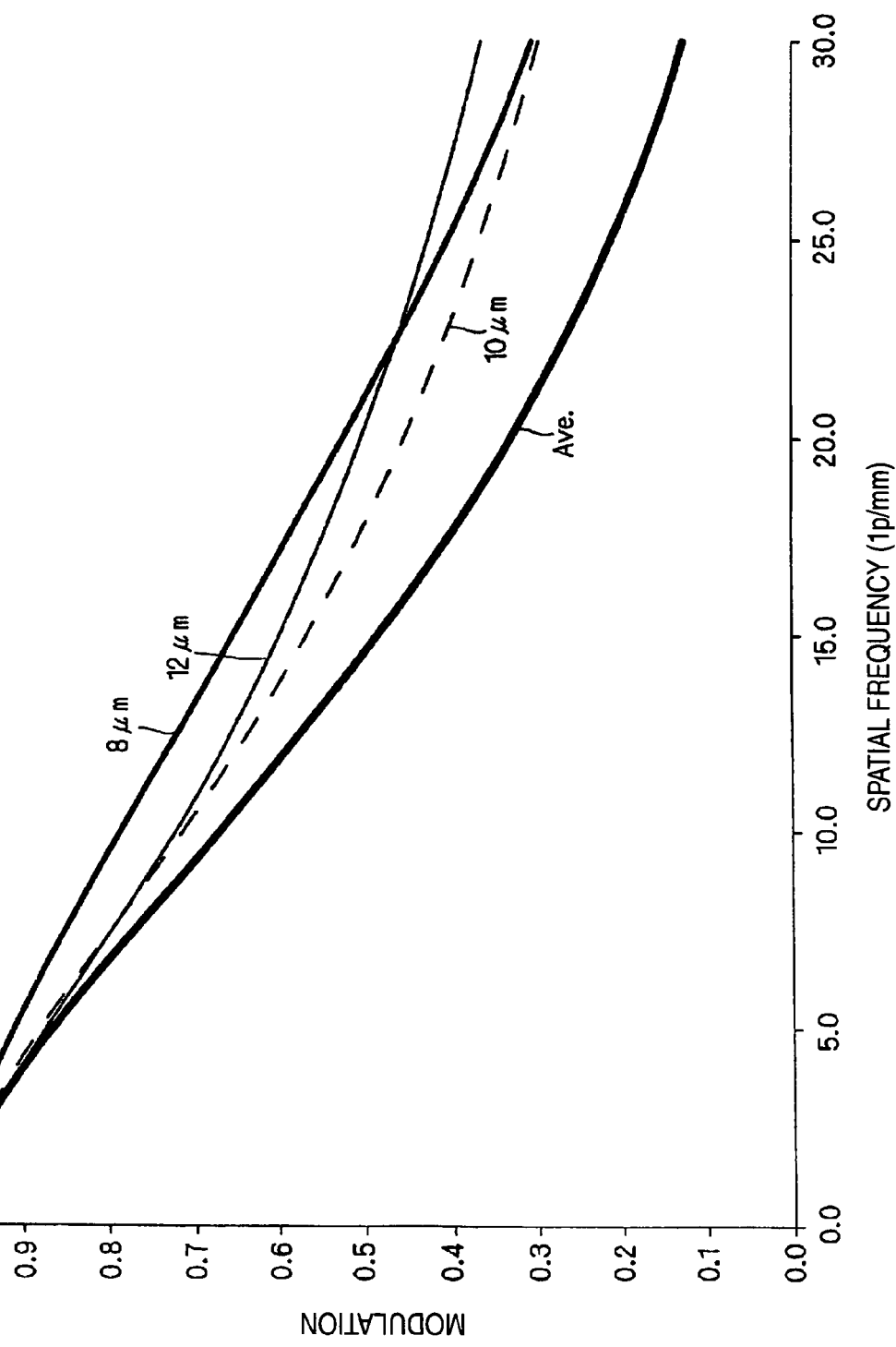
FIG. 84 is a graph illustrating MTF characteristics (tangential) when the image height is 11.0° in the configuration of FIG. 79.
Figure 85:
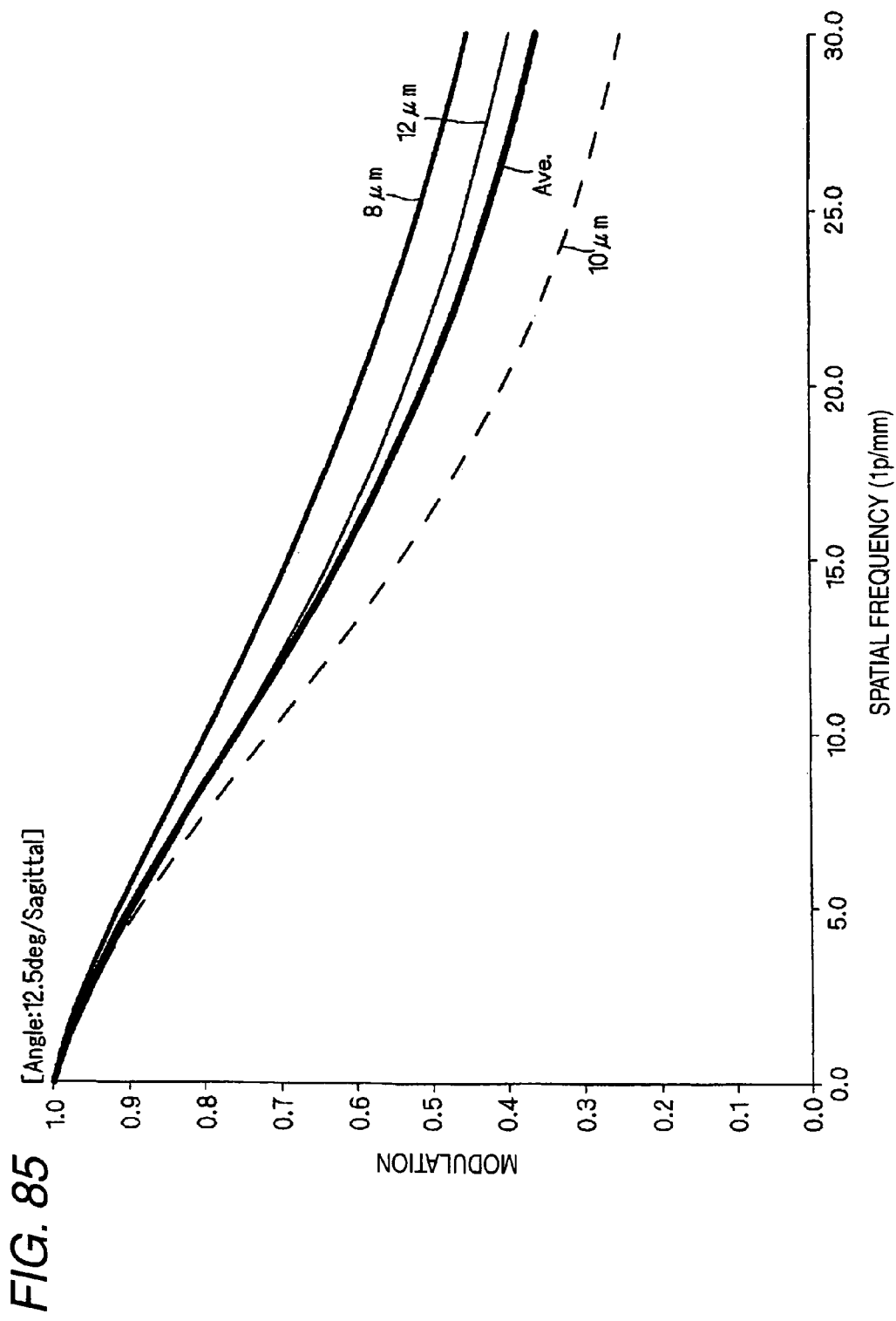
FIG. 85 is a graph illustrating MTF characteristics (sagittal) when the image height is 12.5° in the configuration of FIG. 79.
Figure 86:
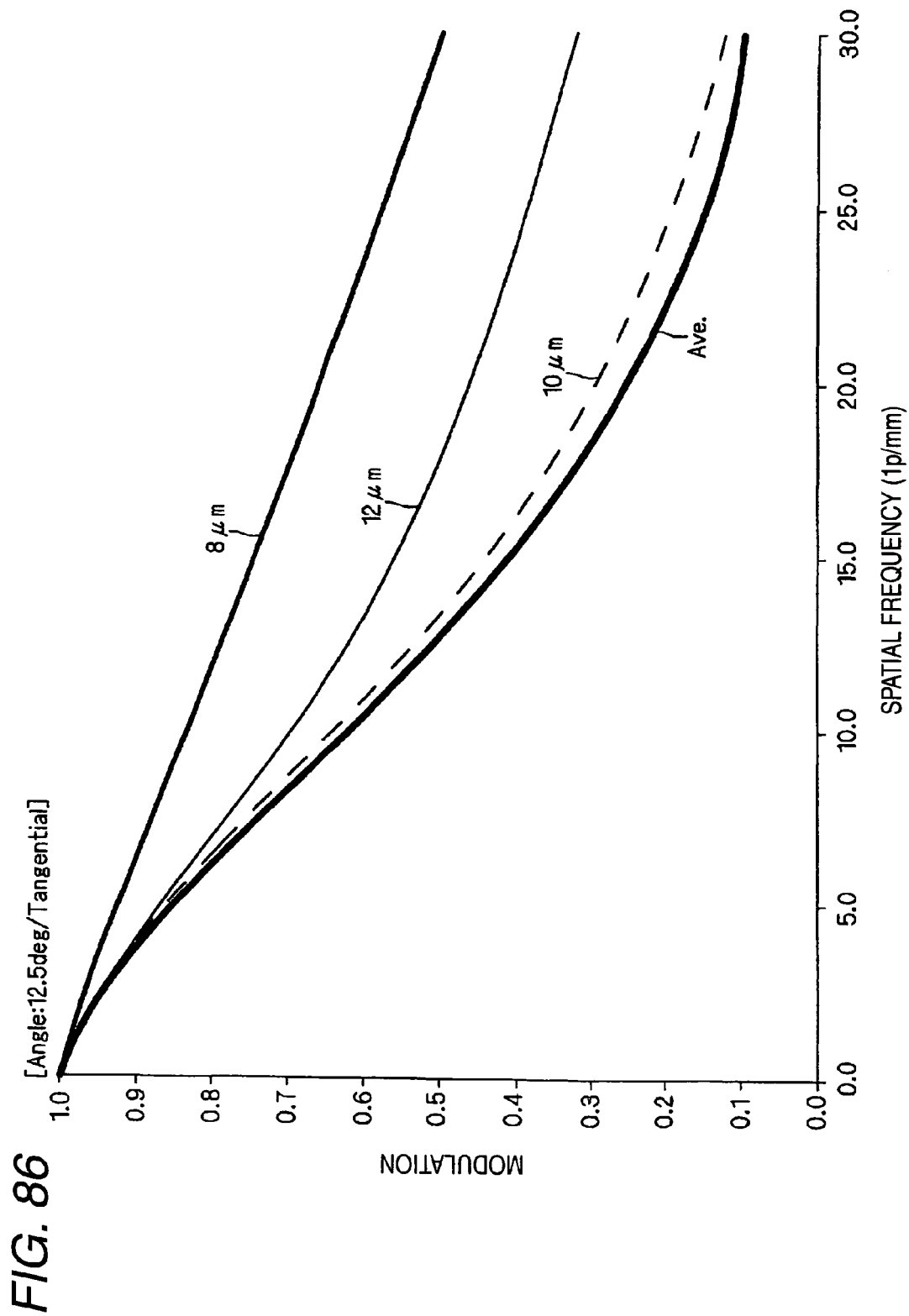
FIG. 86 is a graph illustrating MTF characteristics (tangential) when the image height is 12.5° in the configuration of FIG. 79.
Figure 87:
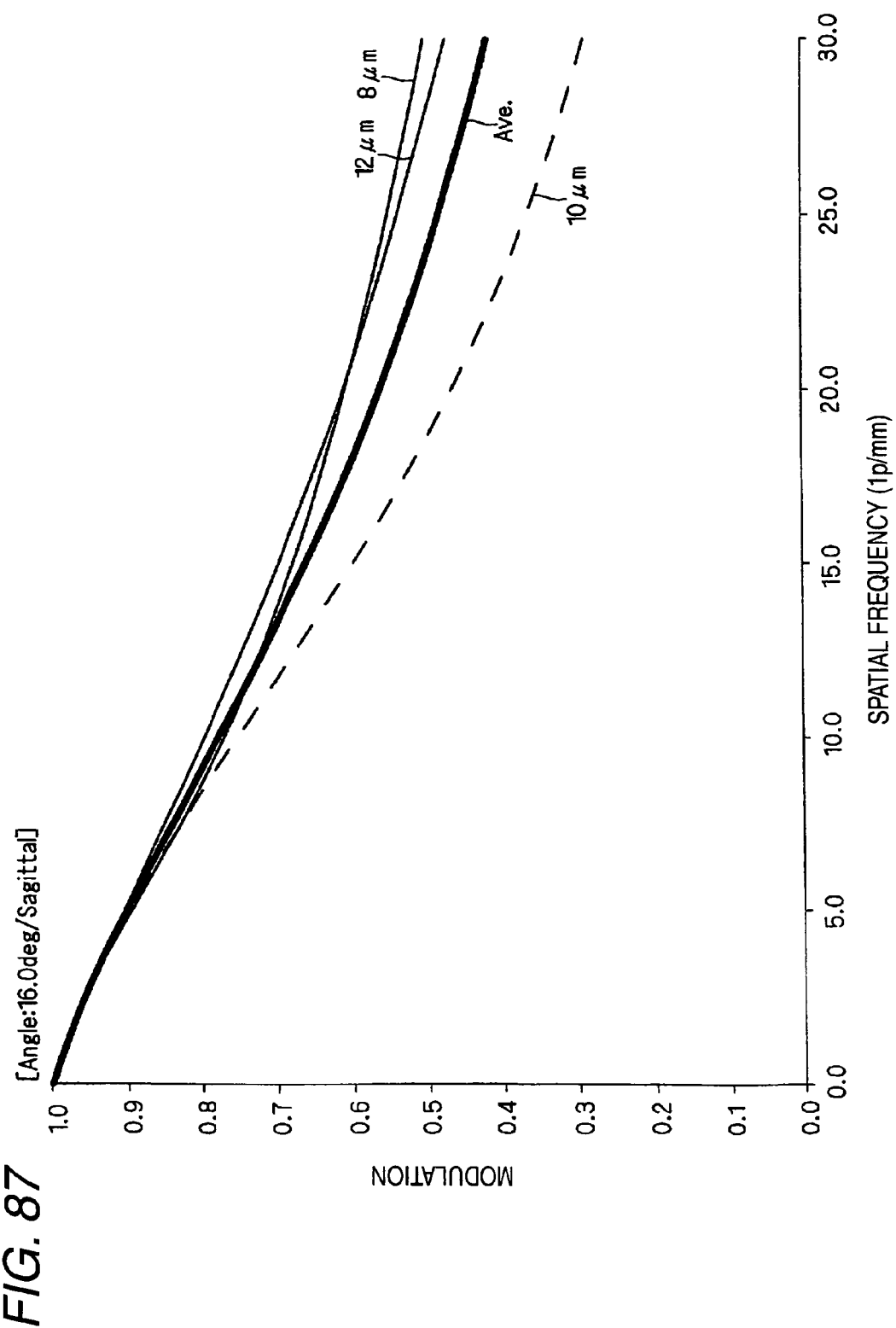
FIG. 87 is a graph illustrating MTF characteristics (sagittal) when the image height is 16.0° in the configuration of FIG. 79.
Figure 88:
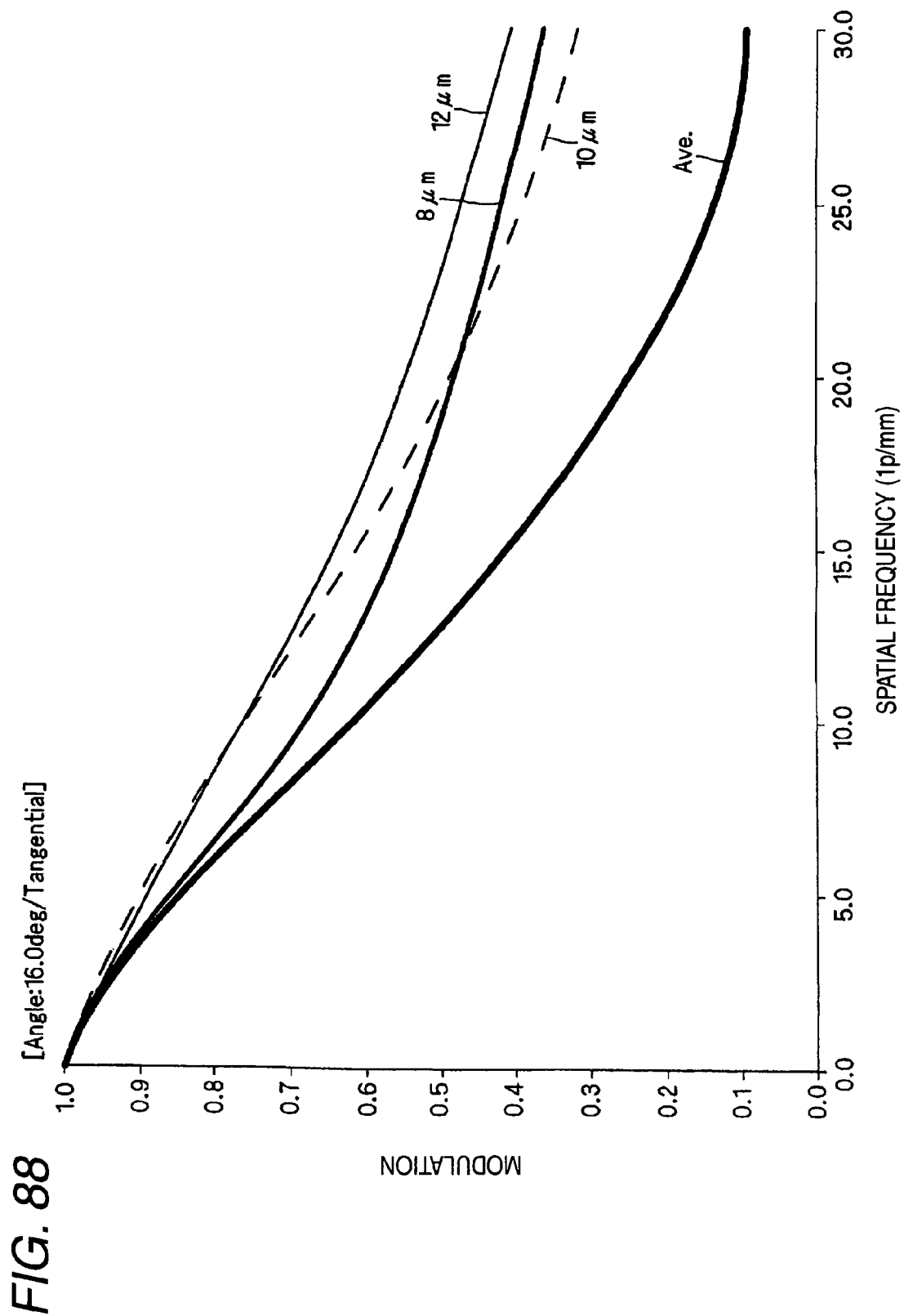
FIG. 88 is a graph illustrating MTF characteristics (tangential) when the image height is 16.0° in the configuration of FIG. 79.
Figure 89:
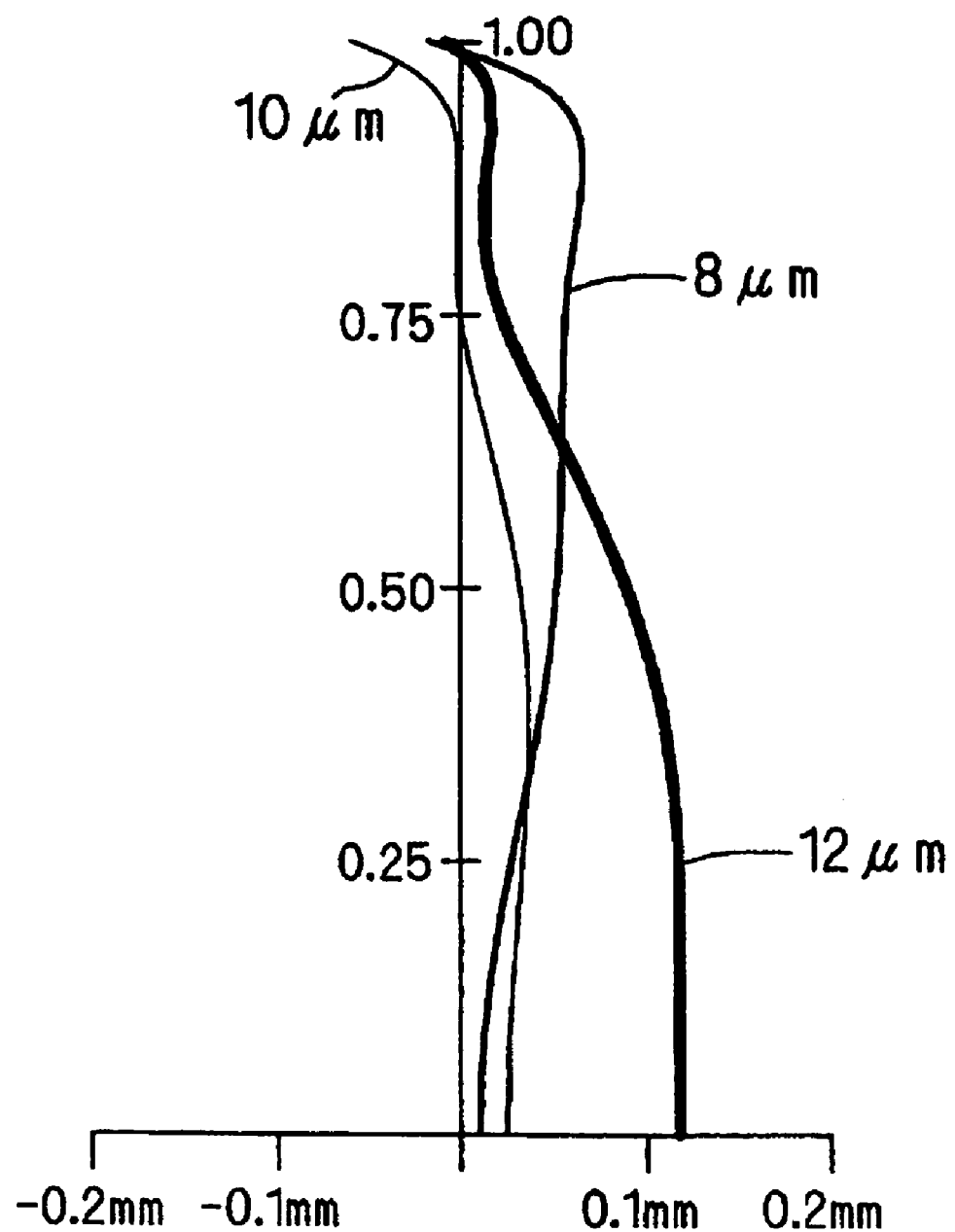
FIG. 89 is a graph illustrating spherical aberration characteristics in the configuration of FIG. 79.
Figure 90:
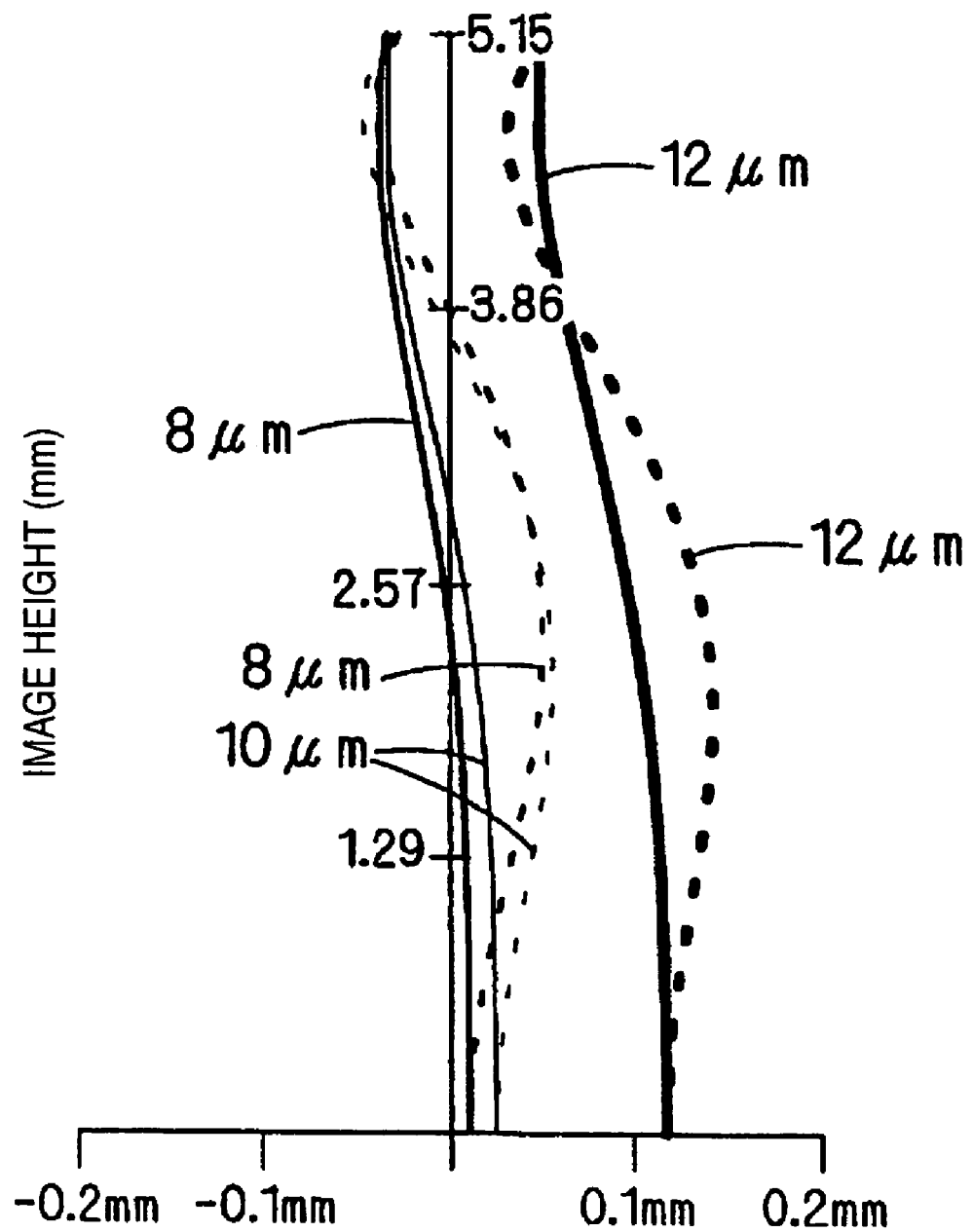
FIG. 90 is a graph illustrating astigmatism characteristics in the configuration of FIG. 79.
Figure 91:
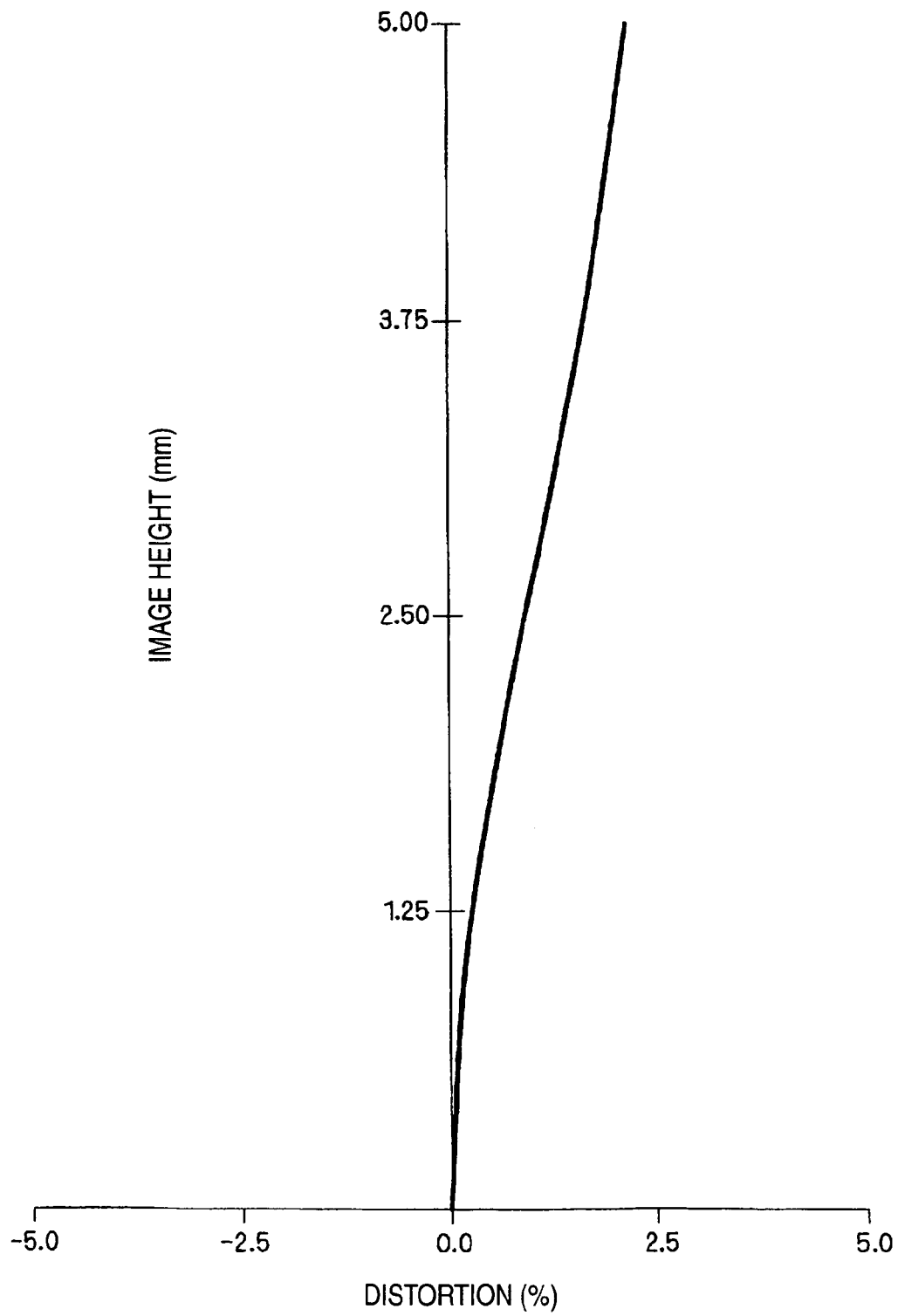
FIG. 91 is a graph illustrating distortion characteristics in the configuration of FIG. 79.

The infrared lens 2c according to Example 2-3 have configurations illustrated in FIGS. 79 to 81, and the lenses are configured that the f12/f is 1.05, the F value is 1.01, the maximum diameter is 17.2 mm, and the view angle is 32°.

MTF characteristics with respect to wavelengths 8 μm, 10 μm, and 12 μm within view angles (0°, 11.0°, 12.5°, and 16.0°) in the configuration of Example 2-3 are illustrated in FIGS. 82 to 88. Additionally, the spherical aberration, astigmatism, distortion, and longitudinal aberration characteristics with respect to the wavelengths 8 μm, 10 μm, and 12 μm are illustrated in FIGS. 89 to 91 and 92(a) to 92(e).

Example 2-4

Figure 93:
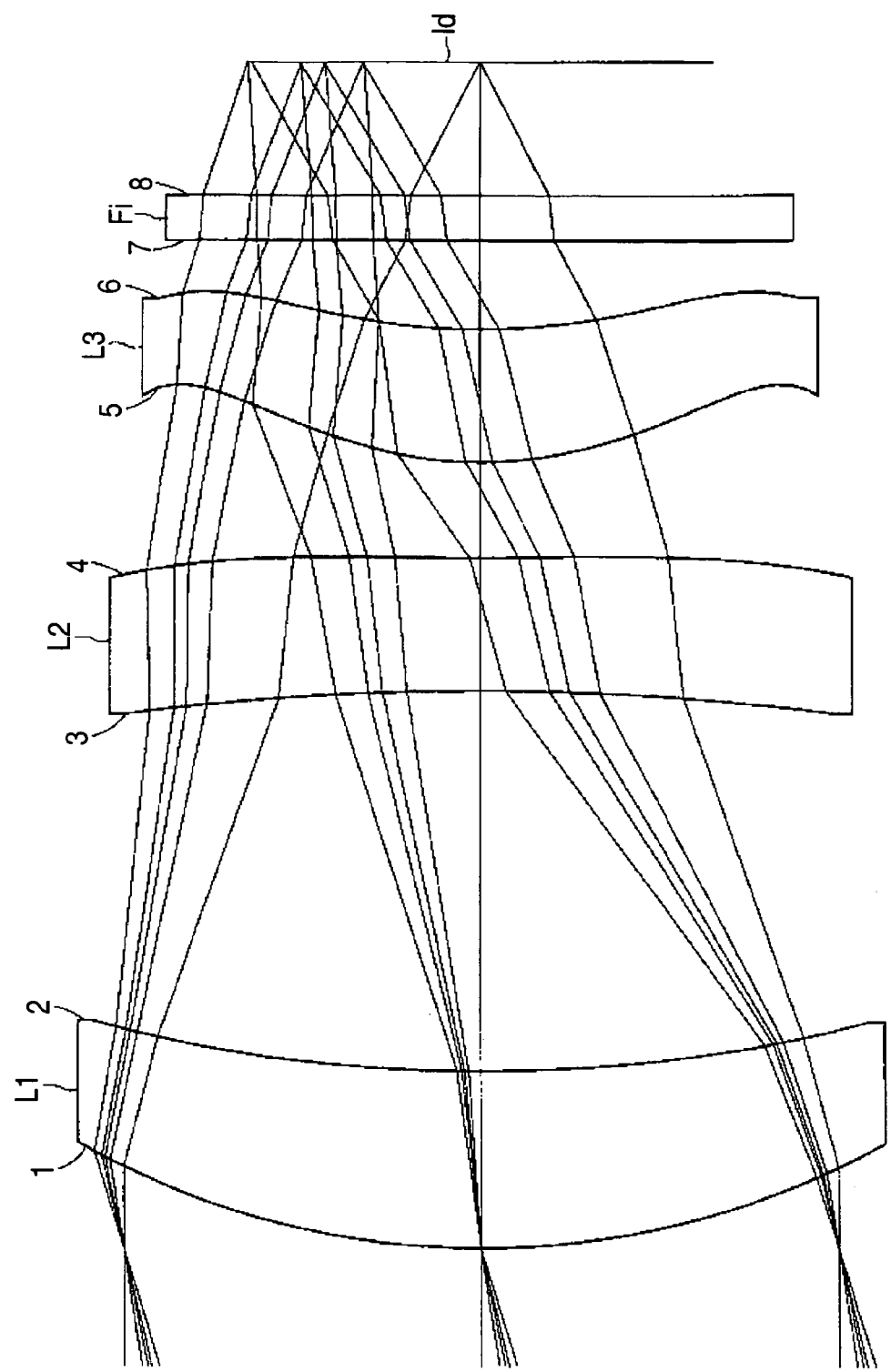
FIG. 93 is a diagram illustrating a configuration of Example 2-4 of infrared lens.

The infrared lens 2d according to Example 2-4 have configurations illustrated in FIGS. 93 to 95, and the lenses are configured that the f12/f is 1.80, the F value is 1.05, the maximum diameter is 15.8 mm, and the view angle is 33°.

MTF characteristics with respect to wavelengths 8 μm, 10 μm, and 12 μm within view angles (0°, 11.4°, 13.1°, and 16.7°) in the configuration of Example 2-4 are also researched, and the result will be described later on the basis of FIG. 100(e).

Example 2-5

Figure 96:
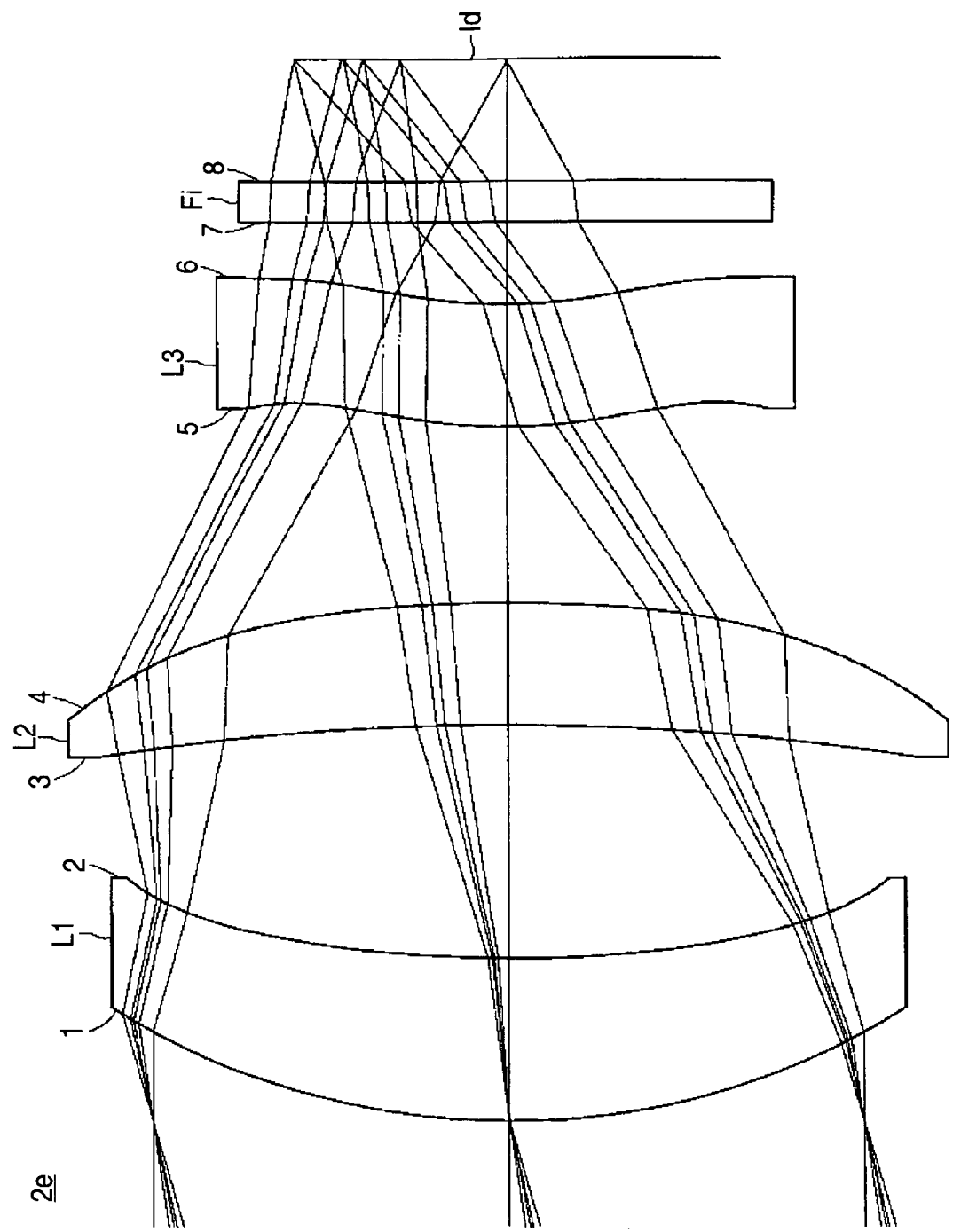
FIG. 96 is a diagram illustrating a configuration of Example 2-5 of infrared lens.

The infrared lens 2e according to Example 2-5 have configurations illustrated in FIGS. 96 to 98, and the lenses are configured that the f12/f is 1.00, the F value is 1.01, the maximum diameter is 17.2 mm, and the view angle is 32°.

MTF characteristics with respect to wavelengths 8 μm, 10 μm, and 12 μm within view angles (0°, 11.0°, 12.5°, and 16.0°) in the configuration of Example 2-5 are also researched, and the result will be described later on the basis of FIG. 99(a).

[Summary]

FIGS. 99(a) to 99(c), and FIGS. 100(d) and 100(e) illustrate that MTF characteristics and the like of Examples 2-1 to 2-5 are summarized in tables. The contents in the tables are inserted in the order of Examples 2-5, 2-3, 2-1, 2-2, and 2-4. The MTF values in the tables are denoted as the values at spatial frequency 20 lp/mm. Additionally, in the tables, MTF values in image heights within the view angle of the wavelength 12 μm, 10 μm, and 8 μm and averages of the MTF value in the range of 8 to 12 μm are noted on the lower side of the upper table.

Here, by using a standard estimation which relates to optical performance of the infrared lens targeting wavelength region of 8 to 12 μm, for example, assuming that the combination includes the imaging device Id having pixel pitch 25 μm, it is possible to experientially expect that contrast of a picture is excessively lowered when the MTF in the condition of the spatial frequency 20 lp/mm is less than 0.2.

Accordingly, based on whether the MTF is 0.2 or more or not in the entire view angle and the entire wavelength of 8 to 12 μm, Examples 2-1 to 2-5 will be estimated. Regarding to Examples 2-1 to 2-3 where the value of f12/f satisfies the condition of the relational expression 5 in the MTF characteristics illustrated in FIGS. 99(a) to 99(c) and FIGS. 100(d) and 100(e), the MTFs not less than 0.2 are obtained in the entire view angle and the entire wavelength. Conversely, regarding to Examples 2-4 and 2-5 where the value of f12/f does not satisfy the condition of the relational expression 5, there are the portions where the MTFs not less than 0.2 can not be obtained in accordance with a view angle and a wavelength. Accordingly, the result shows that it is possible to obtain the MTF which is not less than 0.2 in the entire view angle and the entire wavelength, when f12/f is set in the range from 1.05 to 1.75 as the relational expression 5.

Embodiment 3

Basic Configuration

Hereinafter, a basic configuration of an infrared lens according to Embodiment 3 of the invention will be described with reference to FIG. 101. In this section, it will be described about only the basic configuration of the infrared lens 3a shown in FIG. 101, and a further detailed configuration thereof will be described as Example in the following section.

Figure 101:
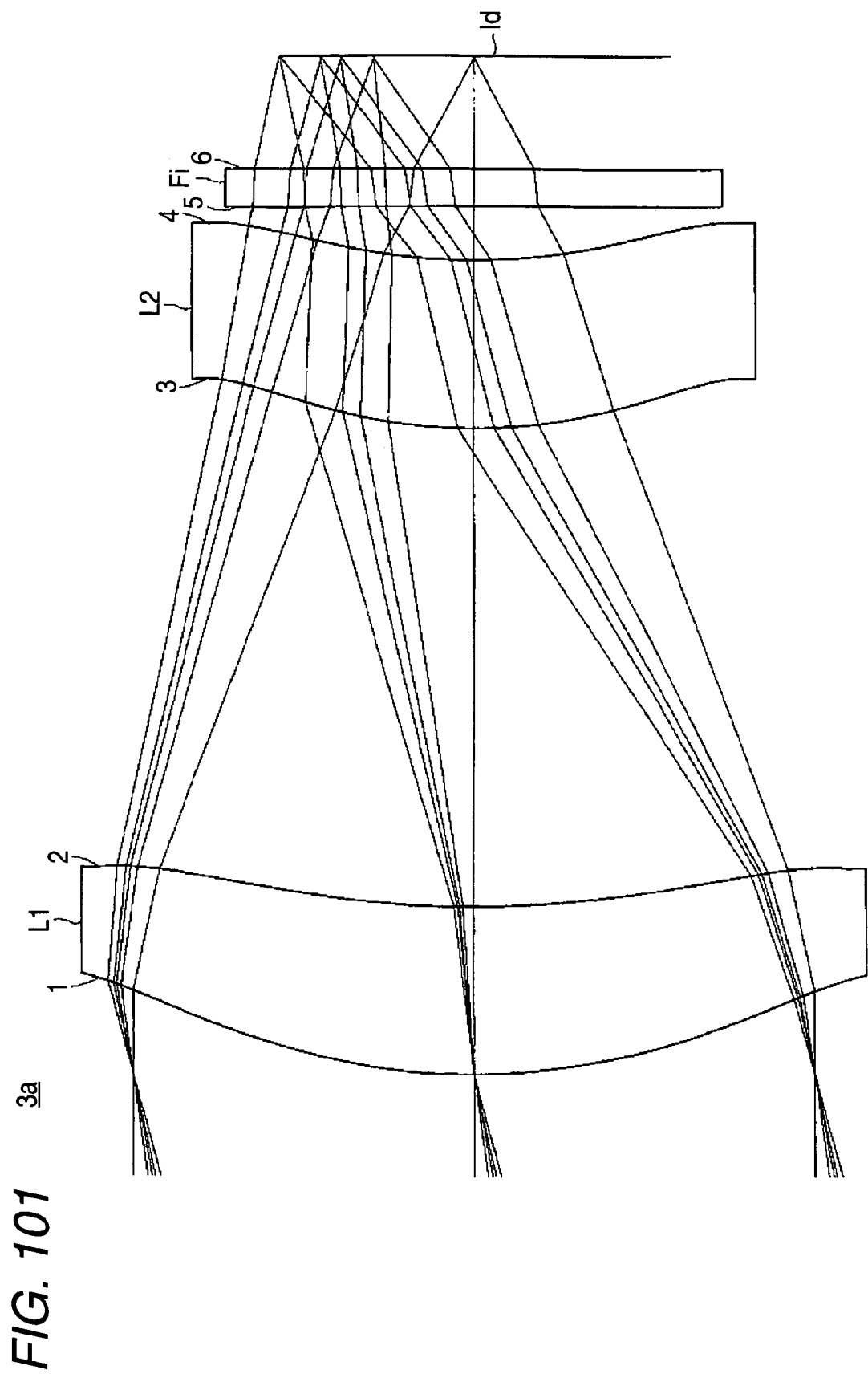
FIG. 101 is a diagram illustrating a configuration of Example 3-1 of an infrared lens according to Embodiment 3 of the invention.
Figure 104:
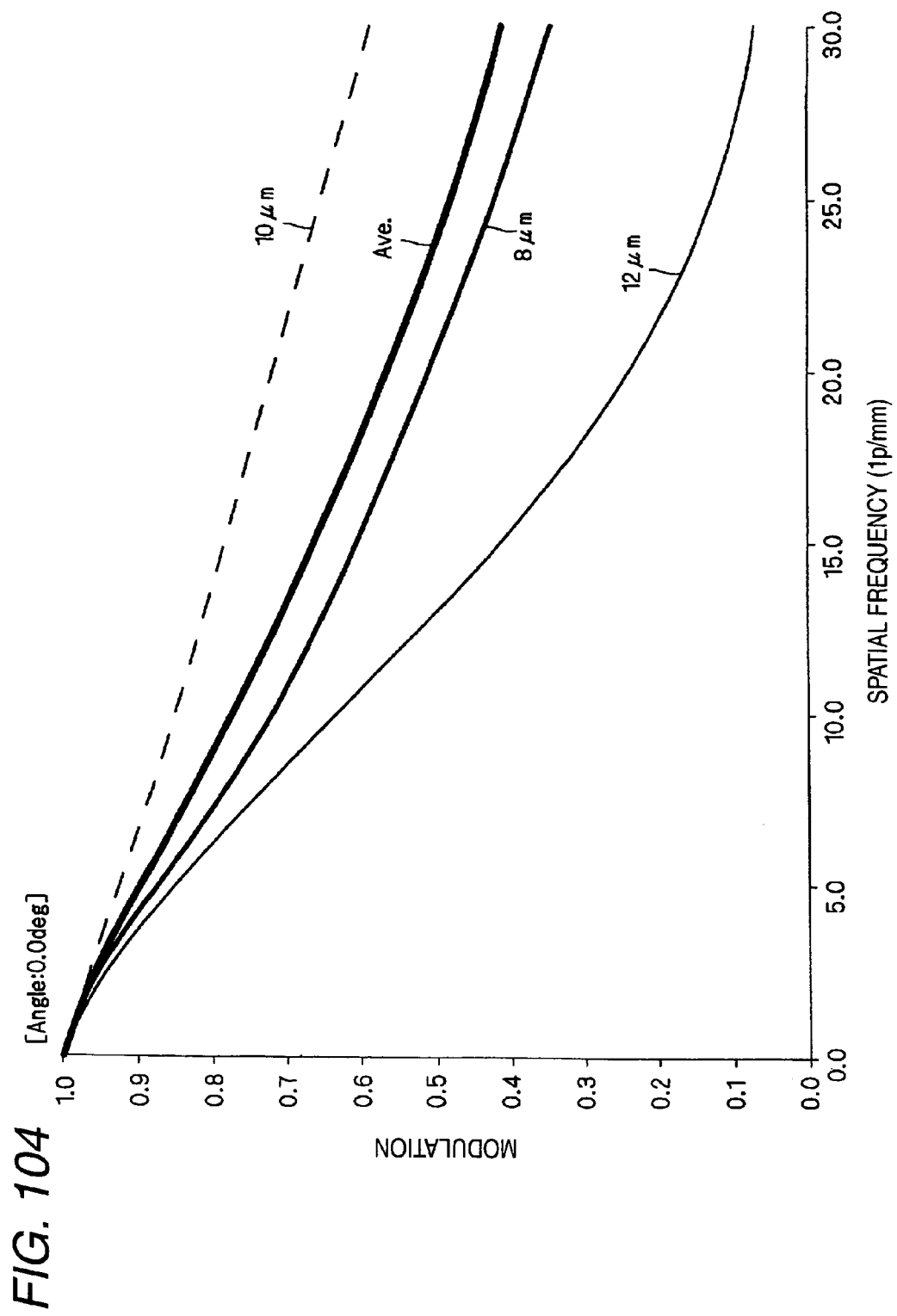
FIG. 104 is a graph illustrating MTF characteristics when the image height is 0° in the configuration of FIG. 101.
Figure 105:
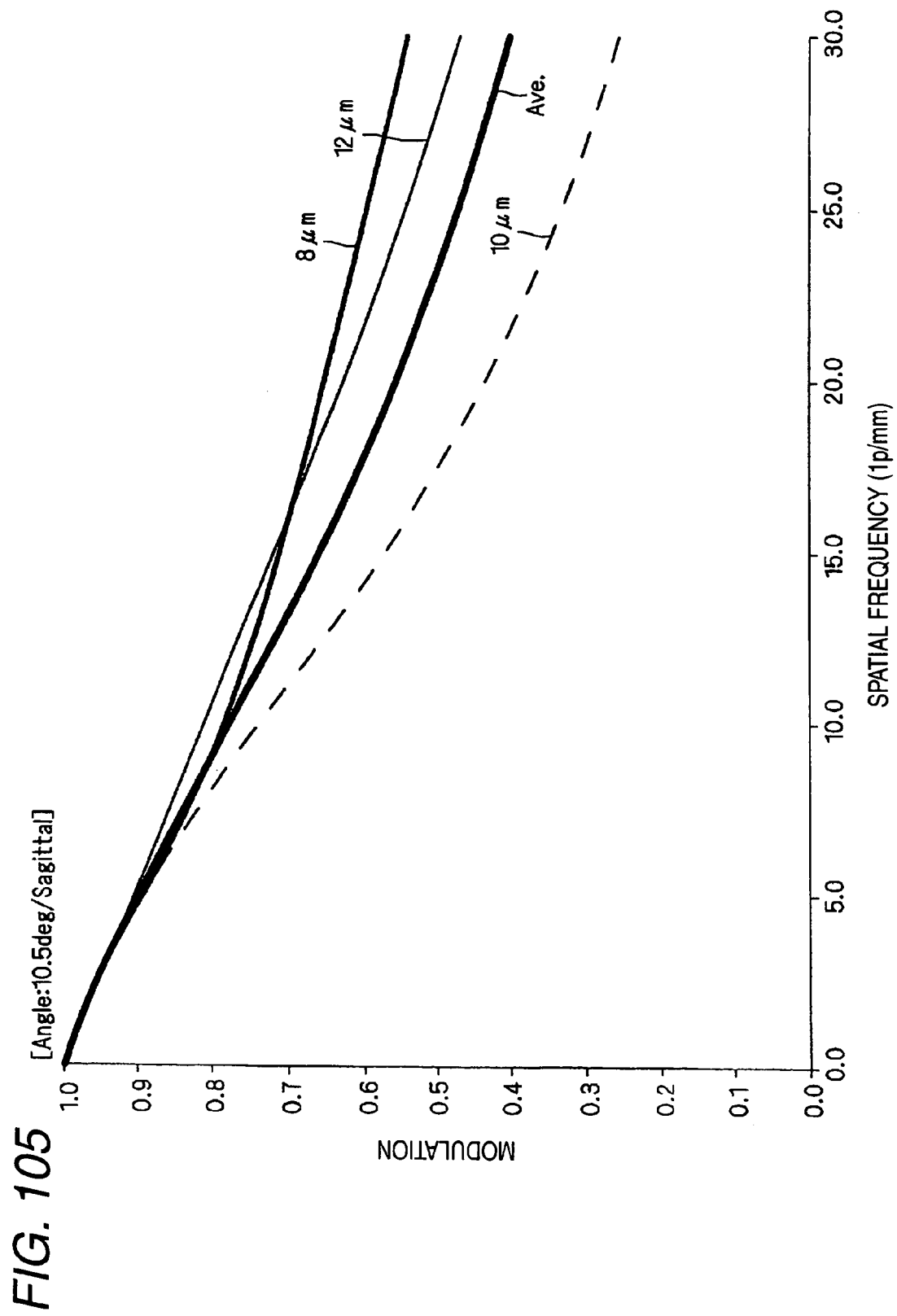
FIG. 105 is a graph illustrating MTF characteristics (sagittal) when the image height is 10.5° in the configuration of FIG. 101.
Figure 106:
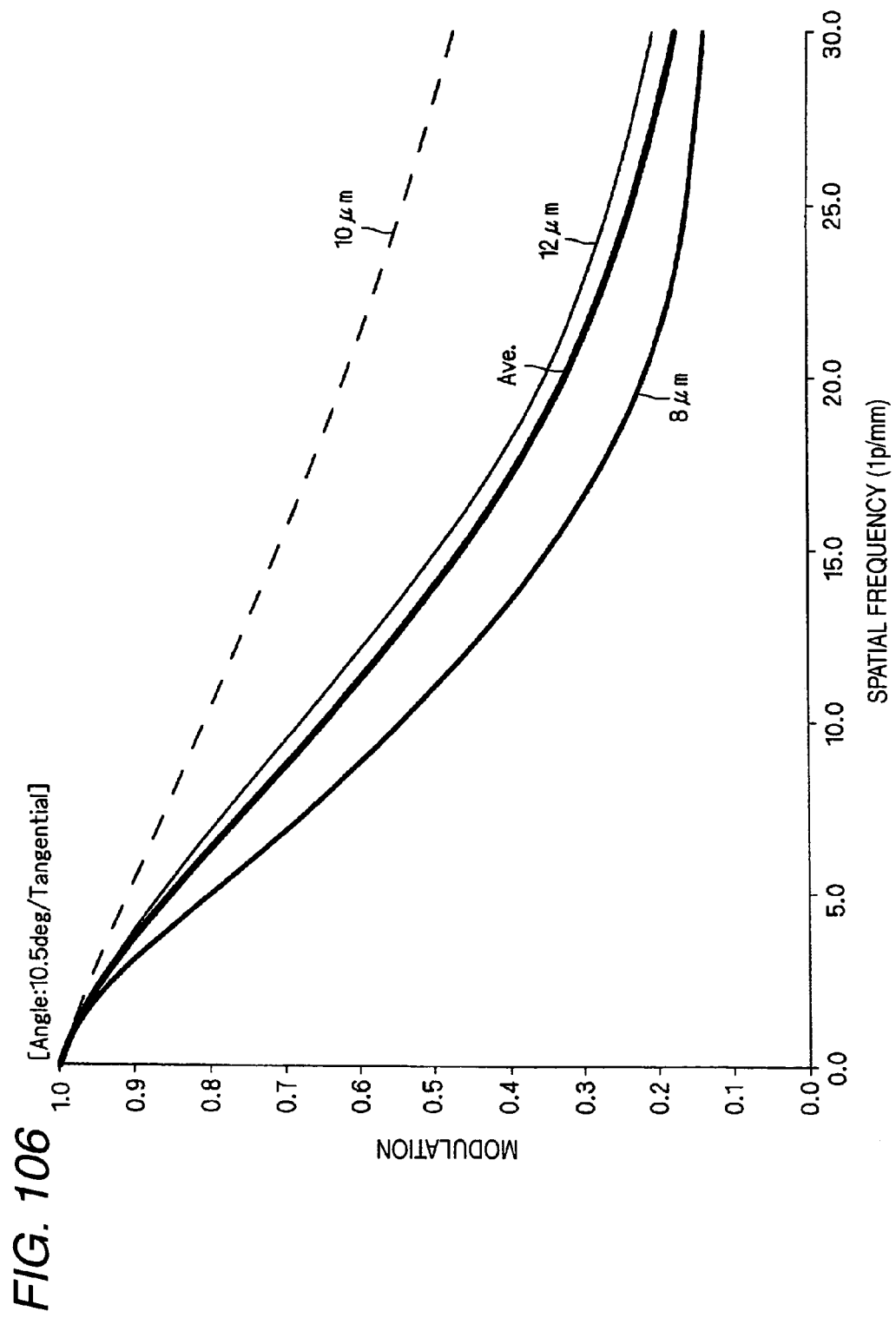
FIG. 106 is a graph illustrating MTF characteristics (tangential) when the image height is 10.5° in the configuration of FIG. 101.
Figure 107:
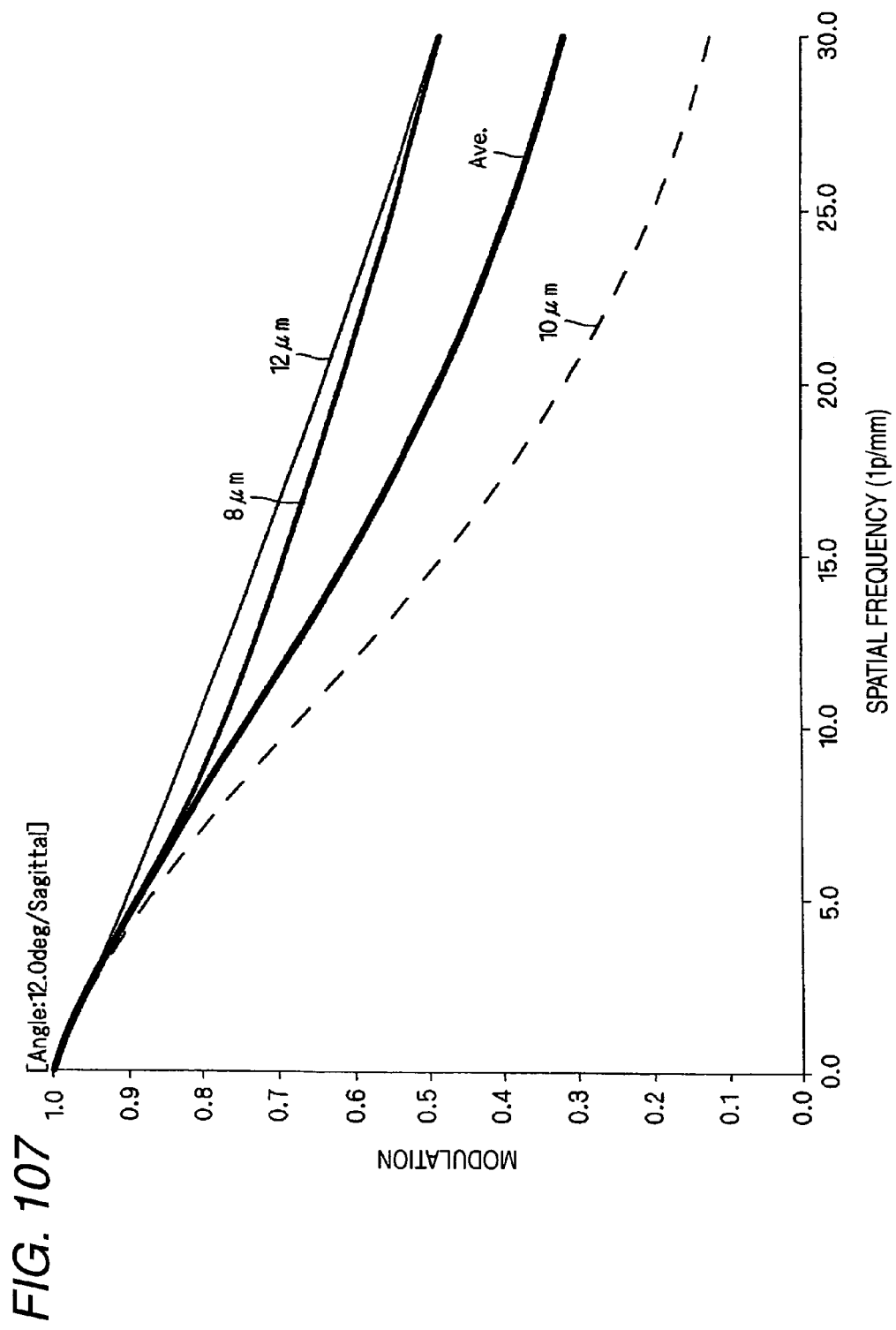
FIG. 107 is a graph illustrating MTF characteristics (sagittal) when the image height is 12.0° in the configuration of FIG. 101.
Figure 108:
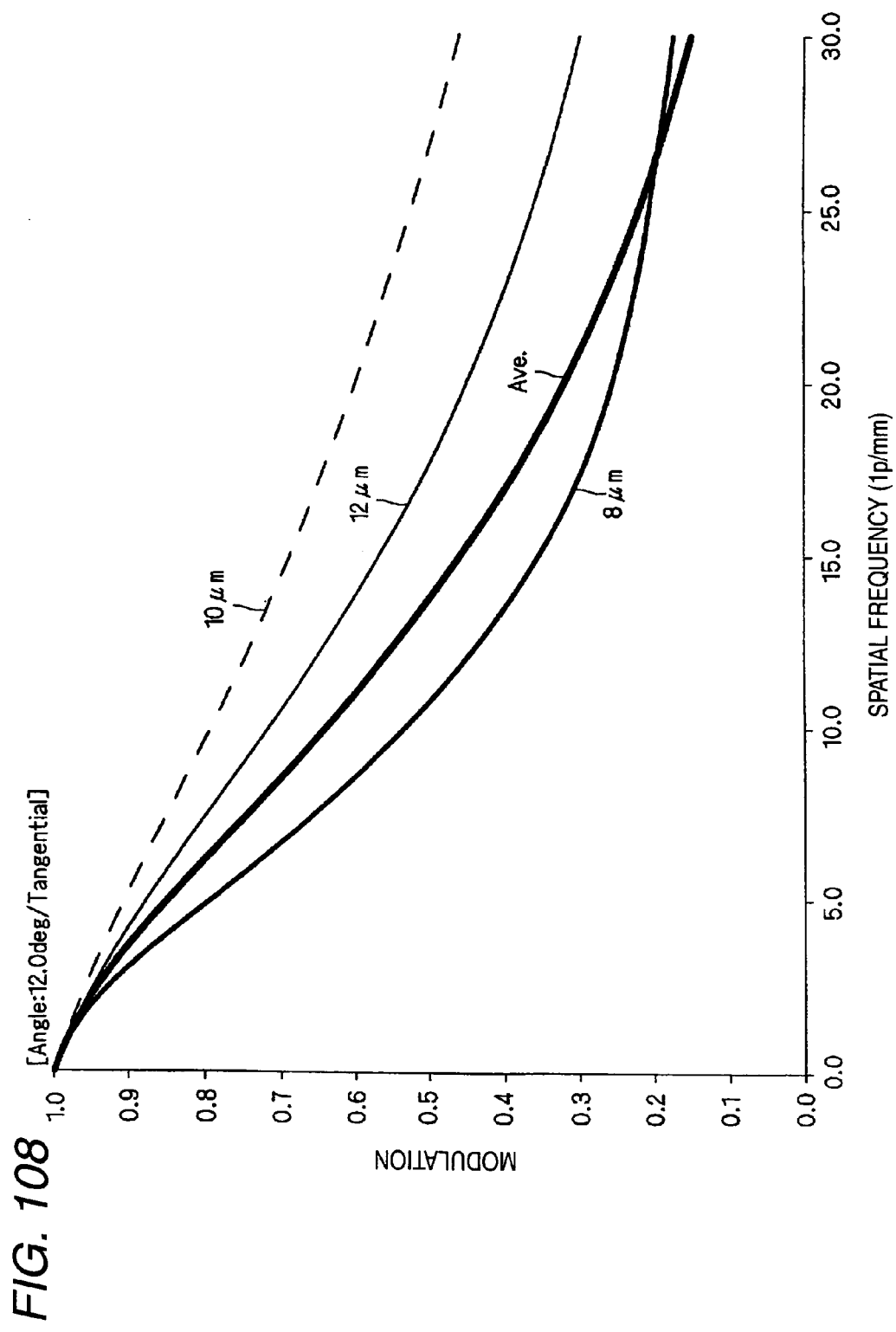
FIG. 108 is a graph illustrating MTF characteristics (tangential) when the image height is 12.0° in the configuration of FIG. 101.
Figure 109:
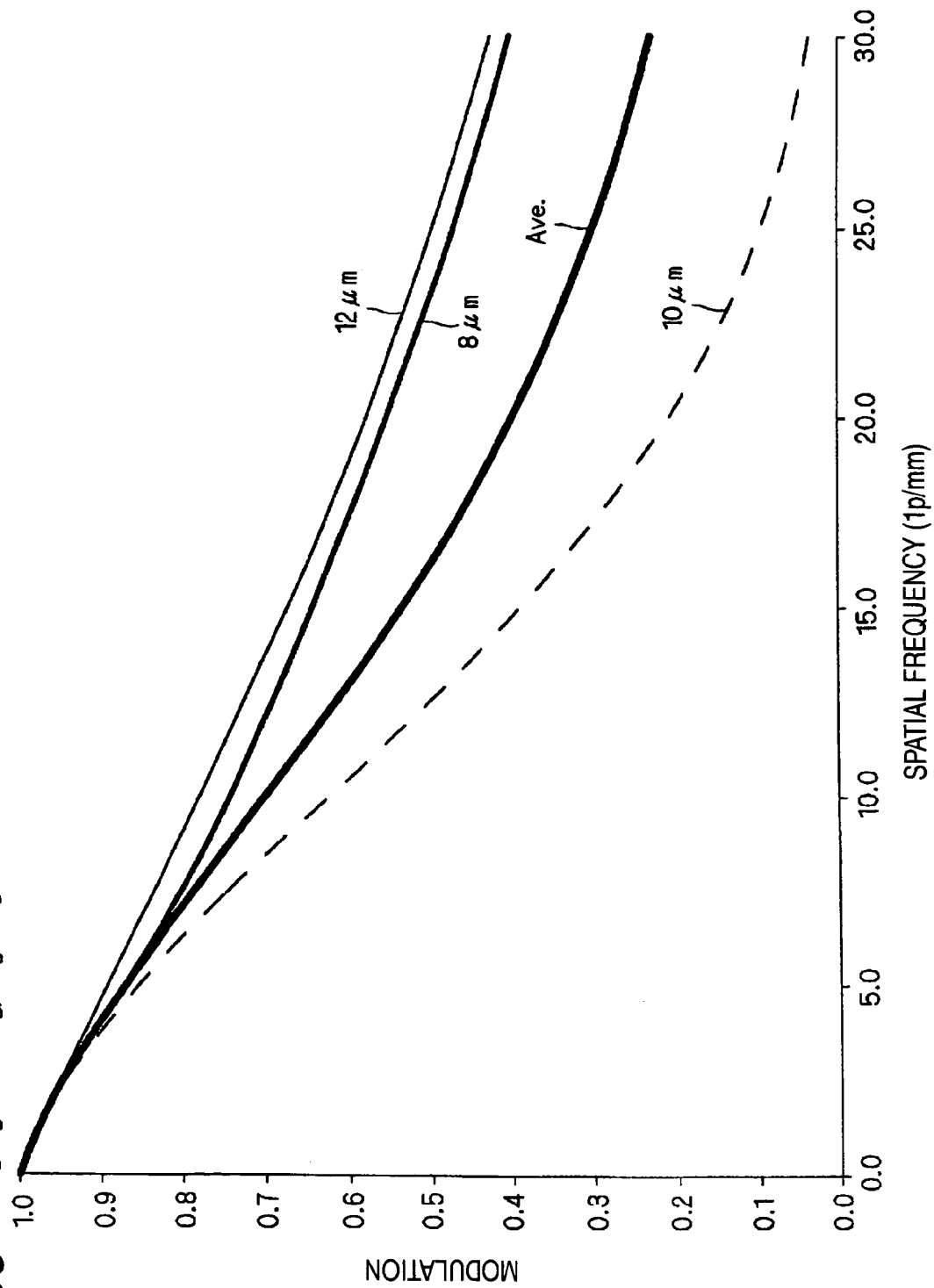
FIG. 109 is a graph illustrating MTF characteristics (sagittal) when the image height is 15.0° in the configuration of FIG. 101.
Figure 110:
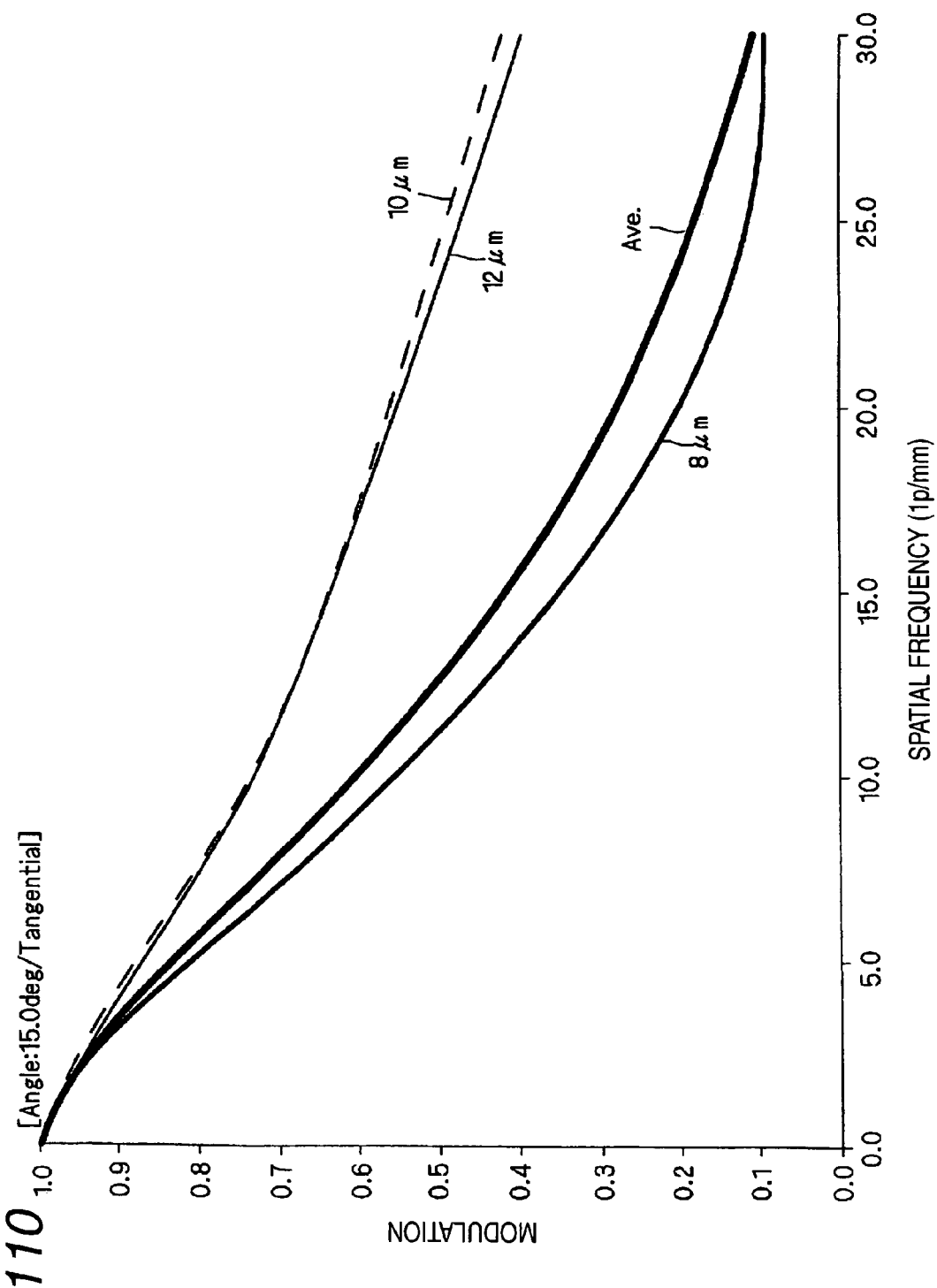
FIG. 110 is a graph illustrating MTF characteristics (tangential) when the image height is 15.0° in the configuration of FIG. 101.

The infrared lens 3a including a first lens L1 (a first lens group) and a second lens L2 (a third lens group) which are made of zinc sulfide are arranged in this order from an object side as shown in FIG. 101. The first lens L1 and the second lens L2 are positive meniscus lens of which convex surfaces are opposed to the object side, and the lenses have positive refractive power.

Light (infrared rays) transmitted through lenses L1 and L2 is incident on an acceptance surface of an imaging device Id through an infrared transmission window Fi, and the light forms an image on the acceptance surface. In Embodiment 2, the first and the second lens groups are configured by using lenses L1 and L2 so that one group has one lens, but the respective lens groups may be configured by using two lens or more, and the numbers of lenses corresponding to the respective lens groups may be configured to be different to each other.

In this way, the entire lenses L1 and L2 are made of low-cost zinc sulfide, and the infrared lens 3a are configured by the two positive meniscus lens of which convex surfaces are opposed to the object side. Therefore, it is possible to improve an imaging performance while minimizing the light loss at the time of transmission through the lenses by minimizing thicknesses of the respective lenses L1 and L2. It is also possible to provide the infrared lens 3a forming a bright image, and having a high imaging performance by using a configuration of low cost. Additionally, it is configured to be capable of contriving to minimize the light loss at the time of transmission through the lenses, by minimizing the thicknesses of the entire lenses relative to the known zinc sulfide lenses.

In addition, a concave surface (the surface opposed to the image side, surface No. 2) of the first lens L1 is formed as a diffractive surface. Due to this, it is possible to effectively improve chromatic aberration which is a main issue in the infrared lens 3a. It is also possible to bring the most effective improvement result of the chromatic aberration, by forming the diffractive surface on the first lens L1 that a large refractive power is required and the chromatic aberration easily occurs. It is also possible to prevent attaching dust or the like to the diffractive surface caused by being exposed to external environment, by forming the diffractive surface on the surface which is the image side of the first lens L1.

At least any one surface of the convex surface or the concave surface in the first lens L1 is formed as an aspheric surface. In this manner, the aspheric surface is formed on the first lens L1 of which an aperture is large and the spherical aberration easily occurs, and thus it is possible to effectively improve the aberration. By forming the aspheric surface on the first lens L1 having a largest diameter, a degree of a shape change of the aspheric surface (a degree of undulation) decreases relative to the case where the aspheric surface is formed on another lens and the mold fabrication and lens process are easy to perform. For example, in Embodiment 3, the convex surface (surface No. 1) of the first lens L1, the concave surface (surface No. 2) of the first lens L1, the convex surface (surface No. 3) of the second lens L2, and the concave surface (surface No. 4) of the second lens L2 are formed as the aspheric surface, and the other lens surfaces are formed as a spherical surface.

An F value of the infrared lens 3a is set by 0.8 to 1.2 or so.

Besides, to achieve a predetermined imaging performance, the infrared lens 3a is configured to satisfy the following relational expression:

$$1.25 \leq f1/f \leq 1.5 \quad (6)$$

where f=total focal length of the first and second lenses L1 and L2 and f1=focal length of the first lens L1.

Satisfying these conditions, various aberrations (which include the distortion in the wide angle region) within the field of vision are corrected so as to have balance, and it is possible to easily embody the compact and bright infrared lens 3a. For example, if f1/f is set to be smaller than 1.25, it is required to dispose the first lens L1 and the second lens L2 so as to be close to each other. Therefore, it is difficult to correct the spherical aberration. On the contrary, if f1/f is set to be greater than 1.5, it is required to dispose the first lens L1 and the second lens L2 so as to be apart from each other. Therefore, skew rays propagate through a place apart from an optical axis of the first lens L1. Accordingly, astigmatism increases, and difficulty in correction of distortion is also increases therewith.

As the result, employing a compact configuration which satisfies the relational expression 6, within a view angle of the infrared lens 3a (for example, it is set in the range from 20° to 40°), it is possible to obtain the imaging performance (for example, MTF 0.2 or more) enough for the entire wavelength region (for example, 8 to 12 μm) of the received infrared rays for the imaging in the entire region (the detailed description of this scope will be described later, on the basis of Examples and Comparative Examples). On this account, for Example, by combining the infrared lens 3a with the imaging device Id having pixel pitch 25 μm and pixel size 320×240, an infrared picture which has high resolution can be obtained.

The first and second lenses L1 and L2 which have such the configuration are formed as follows. Specifically, by using a mold formed in a lens shape and performing a heat press molding in a non-oxidizing atmosphere (for Example, vacuum, inert gases such as Argon, or combination of them) on raw powder of zinc sulfide, the lenses L1 and L2 which are made of sintered bodies of polycrystalline zinc sulfide are obtained. In this way, it is possible to contrive a great reduction in material and processing cost of the infrared lens 3a, by fabricating the lenses L1 and L2 by a molding process using the zinc sulfide. It is also possible to perform mechanical processes such as a grinding and a polishing on the lenses L1 and L2 processed by the molding.

More specifically, as for the raw powder of zinc sulfide, the powder having an average particle diameter from 0.5 to 2 μm and purity 98% or more is available. It is desirable that a fabrication of a heat press molding is performed under the condition of temperature from 900 to 1100° C. and pressure from 150 to 800 kg/cm². Time for maintaining the pressure usually continues for from 0.05 to 1.5 hours, and the time is properly controlled by the combination between the conditions of temperature and pressure.

It is one of effective methods for the polycrystalline zinc sulfide lens to perform a coating for improving the transmittance characteristic or protecting the surface thereof from external affections. At this time, the material and the thickness of the coating layer are appropriately selected in consideration of a using method, a place, and a situation of the infrared lens. For Example, to improve a transmission characteristic, a process of coating the lens surfaces by using an anti-reflection film may be performed (an AR coating process). Alternatively, to improve solidity of the lenses, a process of coating the lens surface (surface No. 1) located on the closest position relative to the object side of the first lens L1 by using an ultra-hard film such as DLC (diamond-like carbon) may be performed (a DLC coating process).

In particular, the DLC coating process is remarkably effective when applying the infrared lens 3a according to Embodiment 3 to the infrared camera for a night vision installed in a vehicle. The infrared camera for the night vision is installed under severe environment such as a normal vehicle's a front grill portion where the camera is exposed to a rainstorm and ballistic fragment while driving. Accordingly, since measures to resist the environment such as measures to prevent a scar of the lens and to prevent the lens from getting dirty are important, the DLC coating process is performed on the outermost lens surface (surface No. 1) which is exposed to external environment. In this manner, it can be easy to perform the measures. As for the known measures to resist the environment of the infrared camera for the night vision, a measure such as installing a window member made by predetermined material in front of the known outermost lens surface has been performed. However, since germanium which is mostly used as the material of the window member is high price, the cost increases. A lens module also increases in overall size by additionally installing the window member. Meanwhile, since the measures to resist the environment by applying the DLC coating process does not cause such the problems, it has advantages to contrive low cost and a decrease in module size, in comparison with the case of installing the window member.

However, to fabricate with low cost the infrared lens 3a having a predetermined optical performance by processing the heat press molding which uses the mold formed in a lens shape, it is required to employ a configuration suitable for the molding in the configurations such as the outer diameters or the thicknesses of the lenses L1 and L2.

First, in terms of outer diameters Rd of the lenses L1 and L2, the larger outer diameters Rd of the lenses L1 and L2 are set, the brighter image can be obtained. However, in accordance with the increase of the outer diameter Rd, required compressive force of a press apparatus in the process of the heat press molding which is performed by using a lens shaped mold increases. For this reason, in view of the processing cost or the like, for Example, assuming that a combination includes the imaging device Id having pixel pitch 25 μm, it is desirable to set the outer diameters Rd of the lenses L1 and L2 so as to satisfy the following relational expression:

Rd≦40 mm.

Thanks to this, the required compressive force of the press apparatus in the process of the heat press molding which is performed by using the lens shaped mold can be minimized. Therefore, it is possible to decrease installation cost for processing the lenses.

Second, In terms of the thicknesses of the lenses L1 and L2, the thicknesses of a certain degree are required to secure molding capability (mechanical strength, processing accuracy, and the like) in the process of the heat press molding which is performed by using the lens shaped mold. Meanwhile, when the thicknesses increase, the light loss at the time of transmission through the lenses also increases. At that time, distribution of the compressive force occurs in a thickness direction of the lenses L1 and L2 in the process of the heat press molding, and thus distribution of the refractive index easily occurs. For this reason, for Example, assuming that a combination includes the imaging device Id having pixel pitch 25 μm, in terms of the thicknesses of the lenses L1 and L2, it is desirable to set a central thickness Tm and a peripheral thickness Te so as to satisfy the following relational expressions:

1.5 mm<Tm<8.0 mm and 1.0 mm<Te<8.0 mm.

Due to this, by securing the molding capability in the process of the heat press molding which is performed by using the lens shaped mold, it is possible to embody the infrared lens 3a of which the thicknesses are thin and the light loss at the time of transmission through the lenses is minimized. By minimizing the thicknesses of the lenses L1 and L2, the distribution of the compressive force occurs in the thickness direction of the lenses in the process of the heat press molding, and thus it is also possible to prevent the problem that the distribution of the refractive index occurs in the thickness direction.

As for the imaging device Id, a non-cooling thermal type imaging device such as a bolometer, a thermopile, and a SOI diode which have sensitivity of about 8 to 12 μm is used. Usually, the imaging device Id which has the number of pixels of 160×120 and 320×240 is used. By using the imaging device Id which has narrow pixel pitches (for Example, 25 μm), it is possible to appropriately set the maximum diameter of the infrared lens 3a by 30 mm or so in the fabrication.

Example

Hereinafter, three examples 3-1, 3-2, and 3-3 fairly suitable as detailed Example of Embodiment 3 will be described. Examples 3-4 and 3-5 will be introduced as two Comparative Examples relative to Examples 3-1, 3-2, and 3-3, and Examples 3-1, 3-2, and 3-3 and Examples 3-4 and 3-5 will be compared to each other. The f1/f is set by 1.37 in Example 3-1, the f1/f is set by 1.50 in Example 3-2, and the f1/f is set by 1.25 in Example 3-3. Additionally, the f1/f is set by 1.55 in Example 3-4, and the f1/f is set by 1.20 in Example 3-5.

Example 3-1

The infrared lens 3a according to Example 3-1 have configurations illustrated in the FIGS. 101 to 103, and the lenses are configured that the f1/f is 1.37, the F value is 1.01, the maximum diameter is 18.0 mm, and the view angle is 30° (the view angle is set in the combination case where the imaging device has a pixel pitch 25 μm and a pixel size 320×240). The aspheric surface shape (diffractive surface shape) of a first surface, a second surface, a third surface and a fourth surface shown in FIG. 53 is determined by substituting the parameter into the following expression (ditto below):

$$Z(y) = \frac{\frac{y^2}{R}}{1+\sqrt{1-(1+K)\frac{y^2}{R^2}}} + A2 \cdot y^2 + A4 \cdot y^4 + A6 \cdot y^6 + A8 \cdot y^8 + \ldots + \Phi(y)$$ [Numerical Formula 5]

$$\Phi(y) = \frac{1}{N-1} \cdot \mathrm{mod}(C1 \cdot y^2 + C2 \cdot y^4, -\lambda)$$ [Numerical Formula 6]

In the formula, the Z is a length (mm) of a perpendicular line down on the tangential surface in contact with the top of the aspheric surface from a point on the aspheric surface, the y is a height (mm) from an optical axis, the K is an eccentricity, the R is a near-axis curvature radius, and the A2, A4, A6, and A8 are aspheric surface coefficients of second order, fourth order, sixth order, and eighth order. In addition, the N is a refractive index, λ is a value of a reference wavelength, and the C1 and C2 are diffractive surface coefficients.

Sagittal and tangential MTF characteristics with respect to wavelengths 8 μm, 10 μm, and 12 μm within view angles (0°, 10.5°, 12.0°, and 15.0°) in the configuration of Example 3-1 are illustrated in FIGS. 104 to 110. In FIG. 104 to FIG. 110, the Ave. is a graph illustrating averages of the MTF values of 8 to 12 μm (ditto below).

Figure 111:
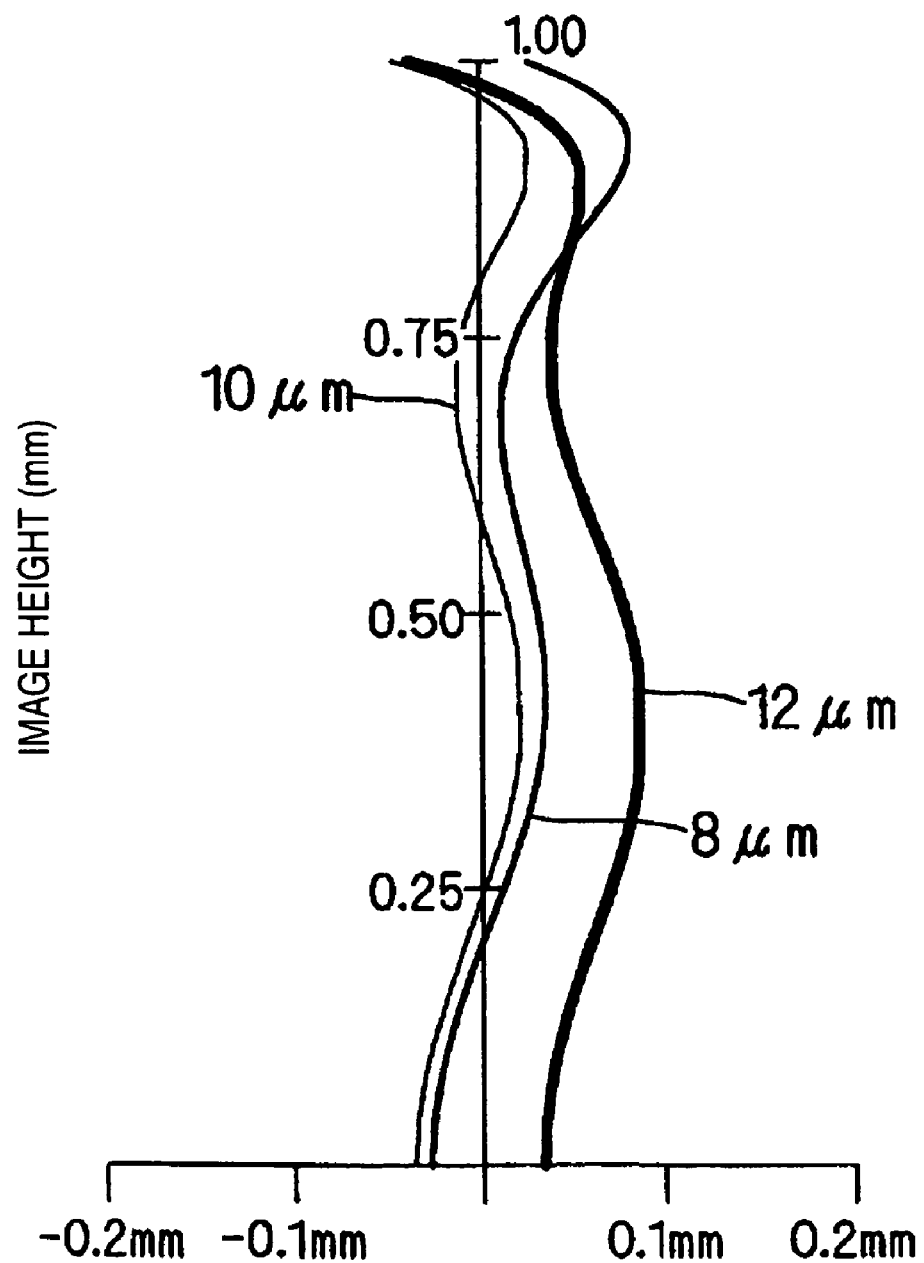
FIG. 111 is a graph illustrating spherical aberration characteristics in the configuration of FIG. 101.
Figure 112:
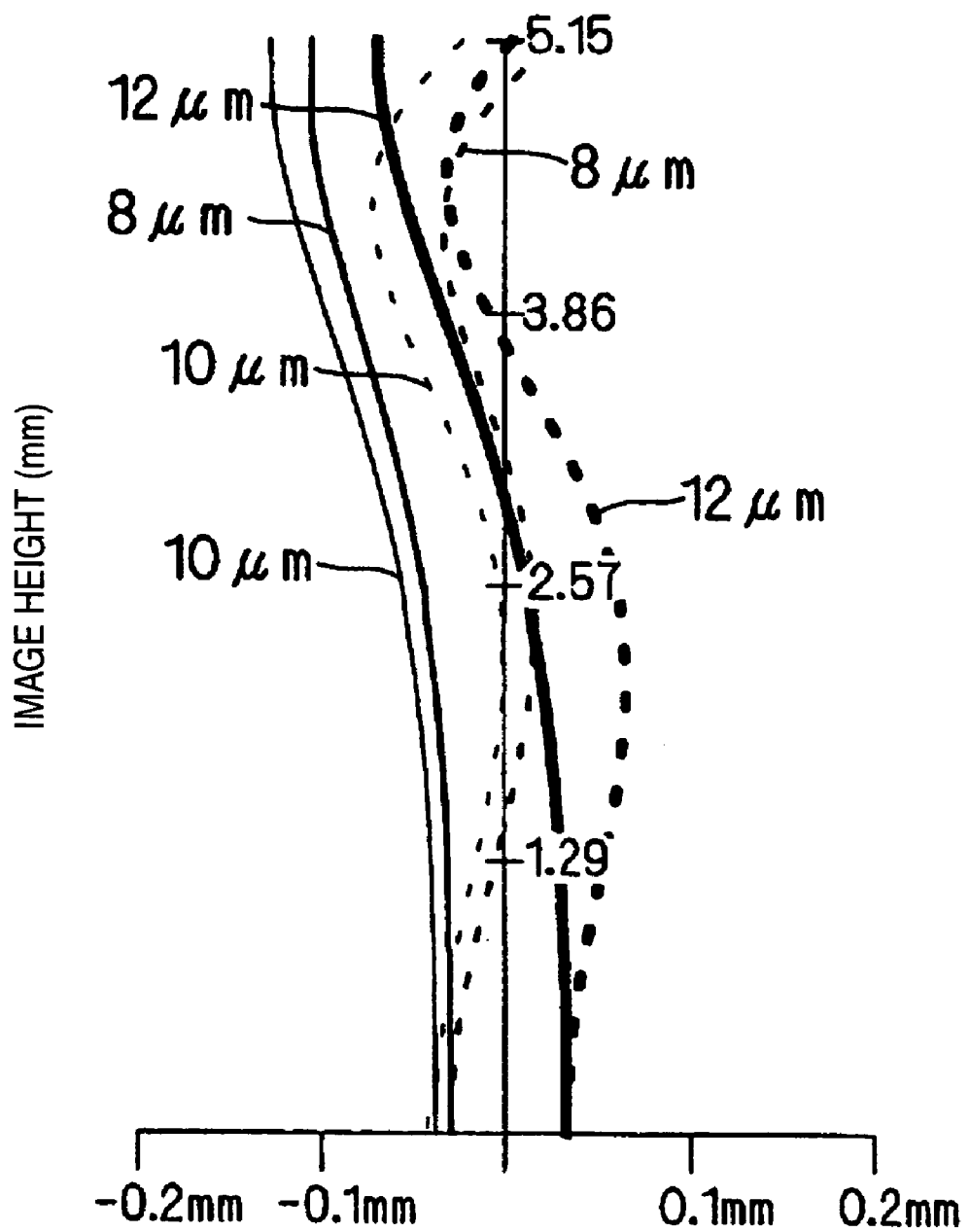
FIG. 112 is a graph illustrating astigmatism characteristics in the configuration of FIG. 101.
Figure 113:
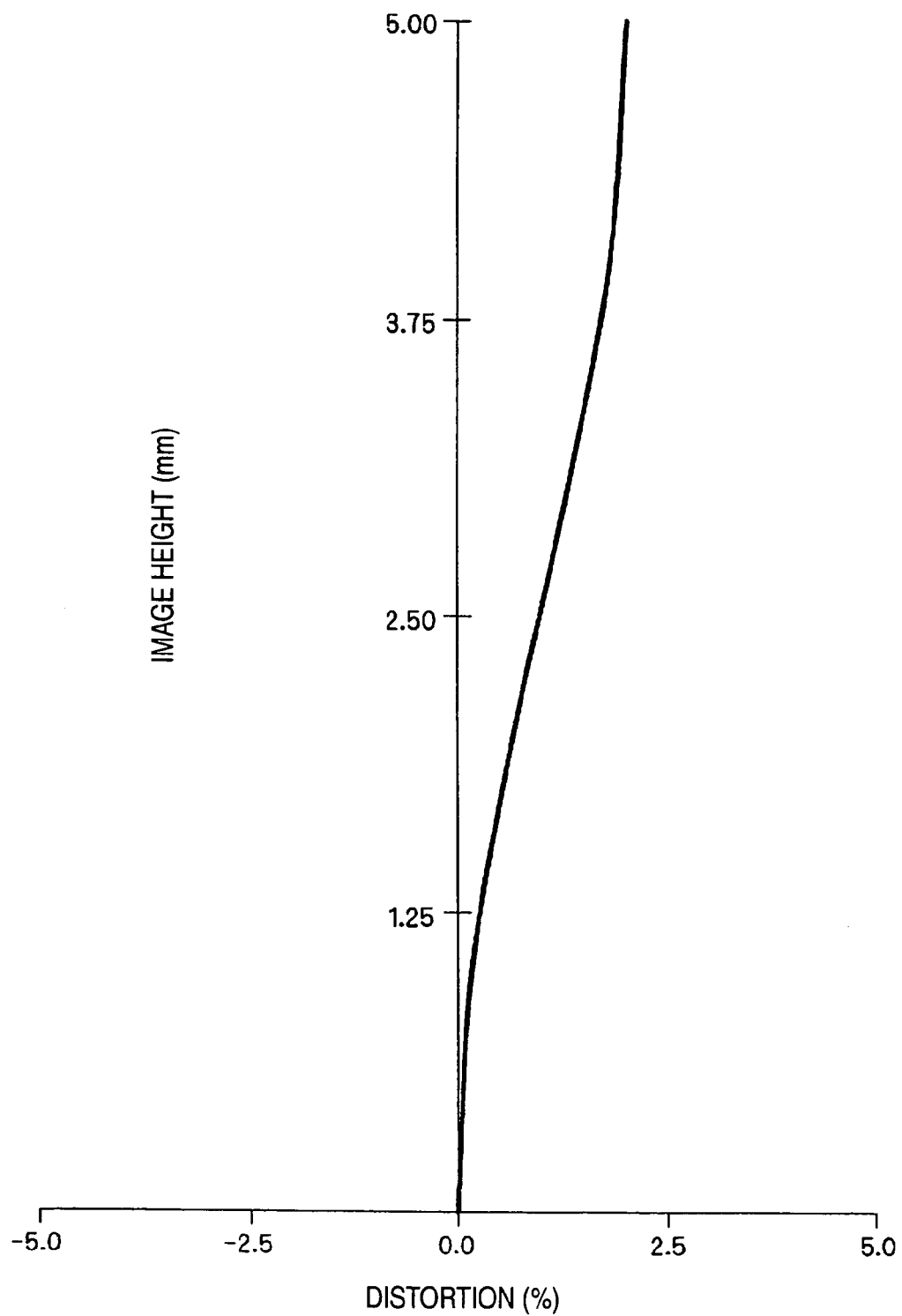
FIG. 113 is a graph illustrating distortion characteristics in the configuration of FIG. 101.

Additionally, spherical aberration and astigmatism characteristics with respect to the wavelengths 8 μm, 10 μm, and 12 μm are illustrated in FIGS. 111 and 112, and distortion characteristics are illustrated in FIG. 113. Longitudinal aberration characteristics corresponding to the respective image heights in the view angle with respect to the wavelengths 8 μm, 10 μm, and 12 μm are illustrated in FIGS. 114(a) to 114(e) (in the drawings, a left side and a right side corresponds to the tangential and the sagittal, respectively).

Example 3-2

The infrared lens 3b according to Example 3-2 have configurations illustrated in FIGS. 115 to 117, and the lenses are configured that the f1/f is 1.50, the F value is 1.09, the maximum diameter is 16.6 mm, and the view angle is 30°.

MTF characteristics with respect to wavelengths 8 μm, 10 μm, and 12 μm within view angles (0°, 10.5°, 12.0°, and 15.0°) in the configuration of Example 3-2 are illustrated in FIGS. 118 to 124. Additionally, the spherical aberration, astigmatism, distortion, and longitudinal aberration characteristics with respect to the wavelengths 8 μm, 10 μm, and 12 μm are illustrated in FIGS. 125 to 127 and 128(*a*) to 128(*e*).

Example 3-3

The infrared lens 3*c* according to Example 3-3 have configurations illustrated in FIGS. 129 to 131, and the lenses are configured that the f1/f is 1.25, the F value is 1.05, the maximum diameter is 17.3 mm, and the view angle is 30°.

MTF characteristics with respect to wavelengths 8 μm, 10 μm, and 12 μm within view angles (0°, 10.5°, 12.0°, and 15.0°) in the configuration of Example 3-3 are illustrated in FIGS. 132 to 138. Additionally, the spherical aberration, astigmatism, distortion, and longitudinal aberration characteristics with respect to the wavelengths 8 μm, 10 μm, and 12 μm are illustrated in FIGS. 139 to 141 and 142(*a*) to 142(*e*).

Example 3-4

The infrared lens 3*d* according to Example 3-4 have configurations illustrated in FIGS. 143 to 145, and the lenses are configured that the f1/f is 1.55, the F value is 1.10, the maximum diameter is 16.4 mm, and the view angle is 30°.

MTF characteristics with respect to wavelengths 8 μm, 10 μm, and 12 μm within view angles (0°, 10.5°, 12.0°, and 15.0°) in the configuration of Example 3-4 are also researched, and the result will be described later on the basis of FIG. 150(*e*).

Example 3-5

The infrared lens 3*e* according to Example 3-5 have configurations illustrated in FIGS. 146 to 148, and the lenses are configured that the f1/f is 1.20, the F value is 1.04, the maximum diameter is 17.4 mm, and the view angle is 30°.

MTF characteristics with respect to wavelengths 8 μm, 10 μm, and 12 μm within view angles (0°, 10.5°, 12.0°, and 15.0°) in the configuration of Example 3-5 are also researched, and the result will be described later on the basis of FIG. 149(*a*).

[Summary]

FIGS. 149(*a*) to 149(*c*), and FIGS. 150(*d*) and 1500(*e*) illustrate that MTF characteristics and the like of Examples 3-1 to 3-5 are summarized in tables. The contents in the tables are inserted in the order of Examples 3-5, 3-3, 3-1, 3-2, and 3-4. The MTF values in the tables are denoted as the values at spatial frequency 20 lp/mm. Additionally, in the tables, MTF values in image heights within the view angle of the wavelength 12 μm, 10 μm, and 8 μm and averages of the MTF value in the range of 8 to 12 μm are noted on the lower side of the upper table.

Here, by using a standard estimation which relates to optical performance of the infrared lens targeting wavelength region of 8 to 12 μm, for example, assuming that the combination includes the imaging device Id having pixel pitch 25 μm, it is possible to experientially expect that contrast of a picture is excessively lowered when the MTF in the condition of the spatial frequency 20 lp/mm is less than 0.2.

Accordingly, based on whether the MTF is 0.2 or more or not in the entire view angle and the entire wavelength of 8 to 12 μm, Examples 3-1 to 3-5 will be estimated. Regarding to Examples 3-1 to 3-3 where the value of f1/f satisfies the condition of the relational expression 6 in the MTF characteristics illustrated in FIGS. 149(*a*) to 149(*c*) and FIGS. 150 (*d*) and 150(*e*), the MTFs not less than 0.2 are obtained in the entire view angle and the entire wavelength. Conversely, regarding to Examples 3-4 and 3-5 where the value of f1/f does not satisfy the condition of the relational expression 6, there are the portions where the MTFs not less than 0.2 can not be obtained in accordance with a view angle and a wavelength. Accordingly, the result shows that it is possible to obtain the MTF which is not less than 0.2 in the entire view angle and the entire wavelength, when f1/f is set in the range from 1.25 to 1.5 as the relational expression 6.

Hereinafter, it will be described about the case where the infrared lens 1*a* to 1*c*, 2*a* to 2*c*, or 3*a* to 3*c* according to Embodiments 1, 2, or 3 are applied to a night vision installed in a vehicle. As shown in FIG. 151, the night vision includes an infrared camera 21 disposed on a front end and the like of a vehicle, a display unit 23 having a liquid crystal display and the like which are disposed on a position visible from a driver's seat in the vehicle, and a controller 25 performing picture processes (i.e. processes such as extracting human images from the picture on the basis of contrast of the picture) on the basis of a picture taken by the infrared camera 21 and making the display unit 23 display an alert picture and the like on the basis of the processing result. The infrared camera 21 includes the aforementioned infrared lens 1*a* to 1*c*, 2*a* to 2*c*, or 3*a* to 3*c*, an infrared transmission window Fi, and an imaging device Id, and the camera performs taking an infrared picture in front of the vehicle by receiving infrared rays which are radiated from objects (i.e. human and the like) in front of the vehicle at night and the like.

As mentioned above, the night vision is configured by using the infrared lens 1*a* to 1*c*, 2*a* to 2*c*, or 3*a* to 3*c* according to Embodiments 1, 2, or 3, thereby enabling to obtain pictures which have high resolution, high brightness, and high contrast required to extract the human images from the infrared picture, by performing the picture processes by the controller 25. Thanks to this, for example, even though the picture is taken at night time or the picture has bright images caused by bright scene of summer season (in the images in summer season, brightness differences between a background and people such as pedestrians decrease), it is possible to recognize humans in the picture by performing the picture process. Additionally, since the infrared lens 1*a* to 1*c*, 2*a* to 2*c*, and 3*a* to 3*c* are suitable for a decrease in size, it is possible for the infrared camera to decrease in size, and it is also possible to easily configure the night vision suitable for vehicle installation.

The invention claimed is:

1. An infrared lens comprising at least first and second lens groups arranged in this order from an object side, wherein the first and second lens groups have positive refractive power, wherein each of the first and second lens groups has at least one lens made of zinc sulfide, and wherein the infrared lens is configured to satisfy the following relational expression:

$$1.25 \leq f1/f \leq 1.5$$

where f=total focal length of the first and second lens groups; and
f1=focal length of the first lens group.

2. The infrared lens according to claim 1, wherein at least one lens surface of the first or second lens group is formed as a diffractive surface.

3. The infrared lens according to claim 1, wherein at least one surface of the first lens group is formed as an aspheric surface.

4. The infrared lens according to claim 1, wherein at least one lens included in the first to third lens groups is formed by heat-press molding raw powder of zinc sulfide using a lens-shaped mold.

5. The infrared lens according to claim 1, wherein outer diameters Rd of the entire lenses included in the first to third lens groups satisfy the following relational expression:

$$Rd < 40 \text{ mm}.$$

6. An infrared lens comprising at least first and second lens groups arranged in this order from an object side,
wherein the first and second lens groups have positive refractive power,
wherein each of the first and second lens groups has at least one lens made of zinc sulfide,
wherein the infrared lend further comprises a third lens group arranged farther than the first and second lens groups from an object side,
wherein the first to third lens groups have positive refractive power,
wherein the third lens group has at least one lens made of zinc sulfide,
wherein each of the first to third lens groups includes one positive meniscus lens of which a convex surface is opposed to the object, and
wherein the infrared lens is configured to satisfy the following relational expression:

$$1.0 \leq f1/f \leq 1.4$$

where
f=total focal length of the first to third lens groups; and
f1=focal length of the positive meniscus lens of the first lens group.

7. The infrared lens according to claim 1, wherein the lens surface of the first lens group closest to the object is coated with an ultra-hard film.

8. An infrared camera comprising:
the infrared lens according to claim 1; and
an imaging device picking up an image formed by the infrared lens.

9. A night vision comprising:
the infrared camera according to claim 8; and
a display for displaying a picture taken by the infrared camera.

10. The infrared lens according to claim 6, wherein central thicknesses Tm and peripheral thicknesses Te of the entire lenses included in the first to third lens groups satisfy the following relational expression:

1.5 mm<Tm<8.0 mm; and 1.0 mm<Te<8.0 mm.

11. The infrared lens according to claim 6, wherein at least one lens surface of the first to third lens groups is formed as a diffractive surface.

12. The infrared lens according to claim 6, wherein at least one surface of the positive meniscus lens of the first lens group is formed as an aspheric surface.

13. The infrared lens according to claim 6, wherein at least one lens included in the first to third lens groups is formed by heat-press molding raw powder of zinc sulfide using a lens-shaped mold.

14. The infrared lens according to claim 6, wherein outer diameters Rd of the entire lenses included in the first to third lens groups satisfy the following relational expression:

Rd<40 mm.

15. The infrared lens according to claim 6, wherein the lens surface of the first lens group closest to the object is coated with an ultra-hard film.

16. An infrared camera comprising:
the infrared lens according to claim 6 and
an imaging device picking up an image formed by the infrared lens.

17. A night vision comprising:
the infrared camera according to claim 16; and
a display for displaying a picture taken by the infrared camera.

* * * * *